US007441515B2

(12) United States Patent
Renz et al.

(10) Patent No.: US 7,441,515 B2
(45) Date of Patent: Oct. 28, 2008

(54) CATTLE MANAGEMENT SYSTEM AND METHOD

(75) Inventors: Steven Renz, Lakin, KS (US); James Carisch, Denver, CO (US)

(73) Assignee: Lextron, Inc., Greeley, CO (US)

( * ) Notice: Subject to any disclaimer, the term of this patent is extended or adjusted under 35 U.S.C. 154(b) by 404 days.

(21) Appl. No.: 11/380,630

(22) Filed: Apr. 27, 2006

(65) Prior Publication Data

US 2006/0185605 A1 Aug. 24, 2006

Related U.S. Application Data

(63) Continuation-in-part of application No. 11/228,020, filed on Sep. 14, 2005.

(60) Provisional application No. 60/609,914, filed on Sep. 14, 2004.

(51) Int. Cl.
*A01K 67/00* (2006.01)

(52) U.S. Cl. .................................... 119/174; 119/51.01

(58) Field of Classification Search ............. 119/51.01, 119/174

See application file for complete search history.

(56) References Cited

U.S. PATENT DOCUMENTS

| | | | |
|---|---|---|---|
| 3,191,807 | A | 6/1965 | Rodrigues, Jr. |
| 3,437,075 | A | 4/1969 | Hawes, Jr. et al. |
| 3,498,311 | A | 3/1970 | Hawes, Jr. |
| 3,670,923 | A | 6/1972 | Hawes, Jr. et al. |
| 3,741,440 | A | 6/1973 | Sanders, Jr. |
| 3,804,303 | A | 4/1974 | Fassauer |
| 3,806,001 | A | 4/1974 | Pratt |
| 3,822,056 | A | 7/1974 | Hawes, Jr. et al. |
| 3,881,688 | A | 5/1975 | Senn |
| 3,981,417 | A | 9/1976 | Fassauer |
| 4,086,663 | A | 4/1978 | Croft |
| 4,288,856 | A | 9/1981 | Linseth |
| 4,395,131 | A | 7/1983 | Barlow |
| 4,430,001 | A | 2/1984 | Schurr |
| 4,733,971 | A | 3/1988 | Pratt |
| 4,801,210 | A | 1/1989 | Gian |
| 4,815,042 | A | 3/1989 | Pratt |

(Continued)

OTHER PUBLICATIONS

International Search Report for International (PCT) Patent Application No. PCT/US2005/032964, mailed Nov. 8, 2007.

(Continued)

*Primary Examiner*—Rob Swiatek
(74) *Attorney, Agent, or Firm*—Sheridan Ross P.C.

(57) ABSTRACT

A cattle management system and method are provided for managing numerous routine and non-routine management activities. The system and method incorporate a data processing system wherein comprehensive data is gathered and maintained on each individual animal as well as on selected groups of animals. Preferably, a central database is used which allows enhanced functionality with respect to not only data entry and data transfer, but also with respect to providing system generated management recommendations. Some significant functionality of the present invention includes the ability to track the location of each individual animal by utilizing unique identification data for each animal, recording all monitored events that take place at each location during the animal's production cycle, managing feeding operations at a feed lot wherein ration changes can be automatically triggered by parameters and rules established for each feed lot, and reporting the events and locations as required to government entities, financial institutions, and other entities within the cattle industry.

21 Claims, 234 Drawing Sheets

U.S. PATENT DOCUMENTS

| | | | |
|---|---|---|---|
| 4,889,433 | A | 12/1989 | Pratt |
| 4,910,024 | A | 3/1990 | Pratt |
| 5,008,821 | A | 4/1991 | Pratt et al. |
| 5,219,224 | A | 6/1993 | Pratt |
| 5,240,324 | A | 8/1993 | Philips et al. |
| 5,280,859 | A | 1/1994 | Rust et al. |
| 5,284,388 | A | 2/1994 | Volk et al. |
| 5,303,998 | A | 4/1994 | Whitlatch et al. |
| 5,315,505 | A | 5/1994 | Pratt et al. |
| 5,340,211 | A | 8/1994 | Pratt |
| 5,350,257 | A | 9/1994 | Newbolt et al. |
| 5,369,032 | A | 11/1994 | Pratt |
| 5,401,501 | A | 3/1995 | Pratt |
| 5,423,456 | A | 6/1995 | Arendonk et al. |
| 5,457,627 | A | 10/1995 | Cureton et al. |
| 5,487,603 | A | 1/1996 | Hoff et al. |
| 5,573,002 | A | 11/1996 | Pratt |
| 5,634,713 | A | 6/1997 | Abe |
| 5,634,716 | A | 6/1997 | Westall et al. |
| 5,636,118 | A | 6/1997 | Brewster et al. |
| 5,673,647 | A | 10/1997 | Pratt |
| 5,718,507 | A | 2/1998 | Gian |
| 5,803,906 | A | 9/1998 | Pratt et al. |
| 5,836,880 | A | 11/1998 | Pratt |
| 5,853,244 | A | 12/1998 | Hoff et al. |
| 5,867,820 | A | 2/1999 | Cureton et al. |
| 5,878,402 | A | 3/1999 | Brewster et al. |
| 5,899,561 | A | 5/1999 | Gian |
| 6,000,361 | A | 12/1999 | Pratt |
| 6,032,084 | A | 2/2000 | Anderson et al. |
| 6,131,744 | A | 10/2000 | Pratt |
| 6,135,055 | A | 10/2000 | Pratt |
| 6,200,210 | B1 | 3/2001 | Pratt |
| 6,203,184 | B1 | 3/2001 | O'Callaghan |
| 6,216,053 | B1 | 4/2001 | Cureton et al. |
| 6,250,793 | B1 | 6/2001 | Gian |
| 6,318,289 | B1 | 11/2001 | Pratt |
| 6,329,001 | B1 | 12/2001 | Ivey et al. |
| 6,516,270 | B2 | 2/2003 | Pavlak et al. |
| 6,516,746 | B2 | 2/2003 | Pratt |
| 6,537,213 | B2 | 3/2003 | Dodds |
| 6,547,726 | B2 | 4/2003 | Pratt et al. |
| 6,579,236 | B2 | 6/2003 | Pratt |
| 6,592,517 | B2 | 7/2003 | Pratt et al. |
| 6,736,272 | B2 | 5/2004 | Pratt |
| 6,745,126 | B1 | 6/2004 | Pavlak et al. |
| 6,805,075 | B2 | 10/2004 | Pratt |
| 6,901,369 | B2 | 5/2005 | Cureton et al. |
| 6,932,024 | B2 | 8/2005 | Da et al. |
| 2005/0000458 | A1 | 1/2005 | Pratt |
| 2005/0024988 | A1 | 2/2005 | Hoff et al. |
| 2005/0263541 | A1 | 12/2005 | Hoff et al. |
| 2006/0054092 | A1 | 3/2006 | Valencia et al. |
| 2006/0201432 | A1 | 9/2006 | Pratt |

OTHER PUBLICATIONS

Written Opinon for International (PCT) Patent Application No. PCT/US2005/032964, mailed Nov. 8, 2007.

International Preliminary Report on Patentability for International (PCT) Patent Application No. PCT/US2005/032964, mailed Dec. 21, 2007.

Pre-Assigned Criteria

| | |
|---|---|
| Average Daily Gain | Owner |
| Assigned Ration | Percent Deads |
| Class Code | Pen Number |
| Consumption by Body Weight | Pen Type |
| Consumption Per Head | Repeat Days |
| Condition Code | Repull Count |
| Current Animal Weight | Retreat Count |
| Current Group Weight | Risk Factor |
| Buyer Code | Ration Dry Matter |
| Breed Code | User Code 1 |
| Days on Feed | User Code 2 |
| Days on Ration | User Code 3 |
| Days Until Projected Ship | Load ID |
| Days Since Last Treatment | Ration Group |
| Diagnosis | Severity Level |
| Diagnosis (Previous) | Severity Level (Previous) |
| Dry Consumption Per Head | Sex |
| Feed Call Priority | Slick Time |
| Custom Formula | Temperature |
| Hospital Head Count | Treatment Count |
| In Date | Yesterday's Call |
| In Weight | Yesterday's Hospital Head Count |
| Last Ration Assigned | Total Digestible Nutrients |
| Origin | Net Energy For Gain |
| Target Consumption | Net Energy for Maintenance |
| Premise Code | USDA Tag |

FIGURE 7

| Ship | Lot | Pen | Sex | In Date | Proj Ship Dt | In Wt | Cur Wt | DOF | ADG | Hd In | Hd Out | In Spcl | In Pen |
|---|---|---|---|---|---|---|---|---|---|---|---|---|---|
| ☐ | 24 | 601 | M | 11/29/2003 | | 613 | 613 | 240 | | 16 | 0 | 3 | 13 |
| ☐ | 322S | 403 | H | 1/16/2004 | | 571 | 571 | 192 | | 143 | 5 | 1 | 137 |
| ☐ | 388 | 606 | S | 10/2/2003 | | 412 | 412 | 298 | | 3 | 0 | 0 | 3 |
| ☐ | 389 | 606 | S | 10/2/2003 | | 496 | 496 | 298 | | 2 | 1 | 0 | 1 |
| ☐ | 390 | 404 | S | 10/3/2003 | | 459 | 459 | 297 | | 7 | 0 | 0 | 7 |
| ☐ | 391S | 501 | H | 1/16/2004 | | 638 | 638 | 192 | | 103 | 39 | 1 | 63 |
| ☐ | 40 | 202 | H | 5/19/2004 | 1/16/2005 | 568 | 568 | 68 | 2.3 | 130 | 0 | 3 | 127 |
| ☐ | 403 | 129 | H | 3/16/2004 | 9/30/2004 | 693 | 693 | 132 | 3.3 | 126 | 1 | 3 | 122 |
| ☐ | 416 | 112 | S | 12/19/2003 | 7/15/2004 | 542 | 542 | 220 | 3.2 | 112 | 43 | 7 | 62 |
| ☐ | 417 | 307 | M | 1/18/2004 | | 667 | 667 | 190 | | 114 | 109 | 3 | 2 |
| ☑ | 419 | 102 | S | 1/22/2004 | 7/1/2004 | 749 | 749 | 186 | 3 | 75 | 1 | 4 | 70 |
| ☐ | 420 | 105 | S | 1/27/2004 | | 677 | 677 | 181 | | 77 | 74 | 3 | 0 |

Hospital Pen Location Report
For All Animals Returned to Home Pens
From 7/30/2004 to 7/30/2004

| Lot | Home Pen | From Pen | Tag Number | Alt. Tag | Head Cnt |
|---|---|---|---|---|---|
| 20 | 311 | 416 | 209363 | | 1 |
| 322S | 403 | 416 | 322343 | | 1 |
| 322S | 403 | 416 | 322343 | | 1 |
| 322S | 403 | 416 | 322382 | | 1 |
| 322S | 403 | 416 | 322382 | | 1 |
| 40 | 202 | 416 | 401 | | 1 |
| 40 | 202 | 416 | 402 | | 1 |
| 403 | 129 | 416 | 403725 | | 1 |
| 403 | 129 | 416 | 403731 | | 1 |
| 403 | 129 | 416 | 403747 | | 1 |
| 403 | 129 | 416 | 403787 | | 1 |
| 430 | 410 | 416 | 430933 | | 1 |
| 430 | 410 | 416 | 430939 | | 1 |
| 432 | 130 | 416 | 432800 | | 1 |
| 432 | 130 | 416 | 432804 | | 1 |
| 432 | 130 | 416 | 432813 | | 1 |
| 441 | 412 | 416 | 441315 | | 1 |
| 443 | 127 | 416 | 44366 | | 1 |
| 443 | 127 | 416 | 44377 | | 1 |
| 444 | 503 | 416 | 444703 | | 1 |

Report 1.1 User: LEX

FIGURE 93

Hospital Pen Location Report
For All Pens

| Hospital Pen | Lot | Pen | Tag Number | Date of Last Treatment |
|---|---|---|---|---|
| H1 | 10 | 307 | 101449 | 08/08/2004 |
| | 428 | 613 | 428970 | 08/10/2004 |
| | 440 | 513 | 440118 | 05/07/2004 |
| | 442 | 502 | 442261 | 08/09/2004 |
| | 443 | 127 | 4436 | 08/09/2004 |
| | 458 | 122 | 458983 | 07/04/2004 |
| | 460 | 204 | 460786 | 06/29/2004 |
| | | | 460915 | 08/09/2004 |
| | | 310 | 460787 | 06/29/2004 |
| | 461N | 507 | 461278 | 08/10/2004 |
| | | | 461420 | 08/09/2004 |
| | | | 461435 | 08/10/2004 |
| | 466N | 417 | 466574 | 08/10/2004 |
| | | | 466584 | 08/09/2004 |
| | | | 466591 | 08/09/2004 |
| | | | 466646 | 08/09/2004 |
| | | | 466647 | 08/10/2004 |
| | 70 | 124 | 701127 | 08/09/2004 |
| | 80 | 512 | 1409801409 | 07/09/2004 |
| | | | 801458 | 07/10/2004 |
| | | | Pen Total: | 20 |
| H3 | 422 | 111 | 422633 | 06/29/2004 |
| | 445 | 504 | 44553 | 08/10/2004 |
| | 456 | 509 | 456285 | 07/31/2004 |
| | 457 | 103 | 457246 | 06/03/2004 |
| | 80 | 201 | 801251 | 07/30/2004 |
| | 90 | 612 | 908914 | 08/10/2004 |
| | | | Pen Total: | 6 |

*Hospital Total: 26

Report 1.2 User: LEX

FIGURE 94

Hospital Location Report by Hospital Pen
For Recovery Pen 416

| Lot | Pen | ID Tag | Date Last Treated |
|---|---|---|---|
| 10 | 307 | 101518 | 08/03/2004 |
| 11 | 304 | 11357 | |
| | | 11365 | |
| 391S | 501 | 391165 | 06/20/2004 |
| 40 | 202 | 404 | 08/10/2004 |
| 403 | 129 | 403169 | 08/03/2004 |
| | | 403180 | 08/05/2004 |
| | | 403182 | 08/05/2004 |
| 425 | RYE | 425153 | 05/12/2004 |
| 427 | 308 | 427821 | 08/07/2004 |
| 431 | 110 | 431103 | 07/25/2004 |
| 432 | 130 | 432760 | 08/06/2004 |
| 438 | 128 | 43877 | 08/09/2004 |
| 442 | 502 | 442175 | 08/08/2004 |
| | | 442284 | 08/10/2004 |
| 443 | 127 | 44332 | |
| 445 | 504 | 44596 | 08/09/2004 |
| 447 | 123 | 447171 | 08/10/2004 |
| | | 447210 | 08/09/2004 |

Pen Total: 19

Report 1.4 User: LEX

FIGURE 95

Hospital Movements Report
For: 7/30/2004 Sorted by Lot
Active Lots

Regular Pen Movements

| Head | Description | Tag # | From Lot | From Pen | To Lot | To Pen |
|---|---|---|---|---|---|---|
| 34 | CATTLE MOVEMENT | | 10 | N1 | 10 | 307 |

34 Total Head Moved in Regular Pens

Hospital/Special Pen Movements Detail

| Lot | Home Pen | Head | Tag # | From Pen | To Pen |
|---|---|---|---|---|---|
| 11 | 304 | 1 | 11365 | 304 | H1 |
| 11 | 304 | 1 | 11357 | 304 | H1 |
| 20 | 311 | 1 | 209363 | 416 | 311 |
| 322S | 403 | 1 | 322343 | 416 | 403 |
| 322S | 403 | 1 | 322382 | 416 | 403 |
| 40 | 202 | 1 | 401 | 416 | 202 |
| 40 | 202 | 1 | 402 | 416 | 202 |
| 403 | 129 | 1 | 403731 | 416 | 129 |
| 403 | 129 | 1 | 403725 | 416 | 129 |
| 403 | 129 | 1 | 403787 | 416 | 129 |
| 403 | 129 | 1 | 403747 | 416 | 129 |
| 416 | 112 | 1 | 416793 | 416 | 300 |
| 430 | 410 | 1 | 430933 | 416 | 410 |

Report 3.0 User: LEX

FIGURE 96

Hospital Movements Report
For: 7/30/2004 Sorted by Lot
Active Lots

Hospital/Special Pen Movements Detail

| Lot | Home Pen | Head | Tag # | From Pen | To Pen |
|---|---|---|---|---|---|
| 462N | 106 | 1 | 4623 | 416 | 106 |
| 462N | 106 | 1 | 4622 | 106 | H1 |
| 462N | 106 | 1 | 4624 | 416 | H1 |
| 463N | 418 | 1 | 463400 | 416 | 418 |
| 464 | 208 | 1 | 464384 | 416 | 208 |
| 464 | 208 | 1 | 464378 | 416 | 208 |
| 50 | 511 | 1 | 505161 | 416 | 511 |
| 50 | 125 | 1 | 501087 | 416 | 125 |
| 70 | 124 | 1 | 701196 | 416 | 124 |
| 70 | 124 | 1 | 701255 | 416 | 124 |

Total Movements: 59

Hospital/Special Pen Movements Summary

| Lot | Home Pen | Home In/Out | Hospital In/Out | Buller In/Out | Railer In/Out | Recovery In/Out | Chronic In/Out | Hosp Dead | Shipped Railers |
|---|---|---|---|---|---|---|---|---|---|
| 11 | 304 | 0/2 | 2/0 | 0/0 | 0/0 | 0/0 | 0/0 | 0 | 0 |
| 20 | 311 | 1/0 | 0/0 | 0/0 | 0/0 | 0/1 | 0/0 | 0 | 0 |
| 322S | 403 | 2/0 | 0/0 | 0/0 | 0/0 | 0/2 | 0/0 | 0 | 0 |
| 40 | 202 | 2/0 | 0/0 | 0/0 | 0/0 | 0/2 | 0/0 | 0 | 0 |
| 403 | 129 | 4/0 | 0/0 | 0/0 | 0/0 | 0/4 | 0/0 | 0 | 0 |
| 416 | 112 | 0/0 | 0/0 | 1/0 | 0/0 | 0/1 | 0/0 | 0 | 0 |
| 430 | 410 | 2/0 | 0/0 | 0/0 | 0/0 | 0/2 | 0/0 | 0 | 0 |
| 432 | 130 | 3/0 | 0/0 | 0/0 | 0/0 | 0/3 | 0/0 | 0 | 0 |
| 437 | 301 | 0/0 | 0/0 | 1/0 | 0/0 | 0/1 | 0/0 | 0 | 0 |
| 441 | 412 | 1/0 | 0/0 | 0/0 | 0/0 | 0/1 | 0/0 | 0 | 0 |
| 442 | 502 | 0/0 | 0/0 | 1/0 | 0/0 | 0/1 | 0/0 | 0 | 0 |
| 443 | 127 | 2/0 | 0/0 | 0/0 | 0/0 | 0/2 | 0/0 | 0 | 0 |
| 444 | 503 | 1/0 | 0/1 | 0/0 | 0/0 | 1/1 | 0/0 | 0 | 0 |
| 446 | 126 | 1/0 | 0/0 | 0/0 | 0/0 | 0/1 | 0/0 | 0 | 0 |
| 448 | 602 | 1/0 | 0/0 | 0/0 | 0/0 | 0/1 | 0/0 | 0 | 0 |
| 449 | 515 | 1/0 | 0/0 | 0/0 | 0/0 | 0/1 | 0/0 | 0 | 0 |

Report 3.0 User: LEX

FIGURE 97

Hospital Movements Report
For: 7/30/2004 Sorted by Lot
Active Lots

| | | | | | | | | | |
|---|---|---|---|---|---|---|---|---|---|
| 463N | 418 | 1/0 | 0/0 | 0/0 | 0/0 | 0/1 | 0/0 | 0 | 0 |
| 464 | 208 | 2/0 | 0/0 | 0/0 | 0/0 | 0/2 | 0/0 | 0 | 0 |
| 50 | 125 | 1/0 | 0/0 | 0/0 | 0/0 | 0/1 | 0/0 | 0 | 0 |
| 50 | 511 | 1/0 | 0/0 | 0/0 | 0/0 | 0/1 | 0/0 | 0 | 0 |
| 70 | 124 | 6/0 | 0/0 | 0/0 | 0/0 | 0/6 | 0/0 | 0 | 0 |
| 80 | 201 | 0/0 | 1/1 | 0/0 | 0/0 | 0/0 | 0/0 | 0 | 0 |
| 80 | 512 | 3/0 | 0/0 | 0/0 | 0/0 | 0/3 | 0/0 | 0 | 0 |
| 90 | 612 | 1/0 | 0/0 | 0/0 | 0/0 | 0/1 | 0/0 | 0 | 0 |
| Yard Totals: | | 46/4 | 7/4 | 4/0 | 0/0 | 2/51 | 0/0 | 0 | 0 |

Summary of First Day Pulls to Hospital

| Lot | Home Pen | Tag # | Diagnosis | Treatment | Tempe | Pen Rider | Hosp Pen |
|---|---|---|---|---|---|---|---|
| 11 | 304 | 11365 | OBSERVE | OB1 | 101.7 | | H1 |
| 11 | 304 | 11357 | OBSERVE | OB1 | 101.0 | | H1 |
| 457 | 103 | 457421 | FOOTROT | L3 | 103.0 | | H1 |
| 462N | 106 | 4622 | PINKEYE | U1 | 103.5 | | H1 |

Total Animals pulled to hospitals: 4

Report 3.0 User: LEX

FIGURE 98

Manager's Summary Report
For Lot# ALL
For Date 07/30/2004

| Number of Animals | | % of Total | Average Days Treated | Average Days On Feed |
|---|---|---|---|---|
| Treatments | | | | |
| 4 | Animals Treated | 100.0% | 3 | 66 |
| 3 | First Time Treats | 75.0% | 1 | 53 |
| 1 | Retreats | 25.0% | 7 | 106 |
| 1 | Treated More Than 3 days | 25.0% | 7 | 106 |

Report 4.1 User: LEX

Manager's Summary Report
For Lot# ALL
For Date 07/30/2004

| Number of Animals | | % of Total | Average Days Treated | Average Days On Feed |
|---|---|---|---|---|
| Diagnosis Breakdown | | | | |
| 1 | CHRONIC PNEUMONIA | 25.0% | 2 | 106 |
| 1 | PINKEYE | 25.0% | 1 | 30 |
| 2 | FOOTROT | 50.0% | 1 | 64 |

Chart of Diagnoses

Movements

To:

| From: | Buller | Chronic | Hospital | Pasture | Railer | Recovery | Regular |
|---|---|---|---|---|---|---|---|
| Buller | | | | | | | |
| Chronic | | | | | | | |
| Hospital | | | | | | | |
| Pasture | | | | | | | |
| Railer | | | | | | | |
| Recovery | | | | | | | 46 |
| Regular | | | 4 | | | | |

Report 4.1 User: LEX

Manager's Analysis Report
For: 8/1/2004 to 8/18/2004

Lot Number 10

| Pen Number | Head Rcvd | In Date | DOF | Shipped |
|---|---|---|---|---|
| 307 | 34 | 07/08/2004 | 42 | |

Total Lot Head Rcvd 34

Treatment Analysis Summary

| | | |
|---|---|---|
| Animals Treated | 2 | 5.88% |
| FirstTimeTreats | 2 | 5.88% |
| Retreats | 0 | 0.00% |
| Deads | 1 | 2.94% |

Cost Analysis Summary

| | Total Price | Per Total Head | Per Head Trt/Proc |
|---|---|---|---|
| Treatments | $19.30 | $0.57 | $9.65 |
| Mass/Process | $0.00 | $0.00 | $0.00 |

Lot Number 11

| Pen Number | Head Rcvd | In Date | DOF | Shipped |
|---|---|---|---|---|
| 304 | 73 | 07/20/2004 | 30 | |

Total Lot Head Rcvd 73

Treatment Analysis Summary

| | | |
|---|---|---|
| Animals Treated | 0 | 0.00% |
| FirstTimeTreats | 0 | 0.00% |
| Retreats | 0 | 0.00% |
| Deads | 0 | 0.00% |

Cost Analysis Summary

| | Total Price | Per Total Head | Per Head Trt/Proc |
|---|---|---|---|
| Treatments | | | |
| Mass/Process | | | |

Report 4.3 User: LEX

FIGURE 101

Manager's Overall Lot Summary Report
For Lot: 10
As Of: 8/18/2004

Lot Summary

| Pen Number | Head Rcvd | In Date | In Weight | DOF | Shipped |
|---|---|---|---|---|---|
| 307 | 34 | 07/08/2004 | 335 | 42 | |
| Total Hd Cnt and Averages | 34 | 07/08/2004 | 335 | 42 | |

Current Head Counts

| Home Per | Hospital | Recovery | Chronic | Buller | Railer | Deads | Shipped |
|---|---|---|---|---|---|---|---|
| 31 | 1 | 1 | 0 | 0 | 0 | 1 | 0 |

Treatments Summary

Number of animals treated: 2
Total number of treatments: 2
Average number of treatments for each treated animal: 1.0

| Diagnosis | Head Count | # Treatments | % Of Lot | % Of Treated |
|---|---|---|---|---|
| ACUTE PNEUMONIA | 2 | 2 | 5.9% | 100.0 |

Death Summary

Number of animals that have died in lot: 1

| Diagnosis | Head Count | % Of Lot | % Of Treated |
|---|---|---|---|
| CHRONIC PNEUMONIA | 1 | 2.9 | 50.0 |

Price Summary

| | | | |
|---|---|---|---|
| Total Price of Processing: | $0.00 | *Price per Head for Processing: | $0.00 |
| Total Price of Mass Treatment: | $0.00 | *Price per Head for Mass Treat: | $0.00 |
| Total Price of Treatments: | $19.30 | *Price per Head for Treatments: | $0.57 |
| Average Price per Treatment: | $9.65 | **Price per Head Treated: | $9.65 |

* Based on total head count
** Based on number of animals treated

Report 4.4 User: LEX

FIGURE 102

Manager's Detail Report of All Treatments
For Lot# ALL
For Date 07/30/2004

| | Disease | 1st Time Treat | Retreats | Head Count Treated | Percent of Treatments |
|---|---|---|---|---|---|
| Lot: 456 Pen: 509 | FOOTROT | 1 | | 1 | 100.0 % |
| | Total Treated for Lot 456 | | | 1 | 2.6 %Lot |
| Lot: 457 Pen: 103 | FOOTROT | 1 | | 1 | 100.0 % |
| | Total Treated for Lot 457 | | | 1 | 1.1 %Lot |
| Lot: 462N Pen: 106 | PINKEYE | 1 | | 1 | 100.0 % |
| | Total Treated for Lot 462N | | | 1 | 0.7 %Lot |
| Lot: 80 Pen: 201 | CHRONIC PNEUMONIA | | 1 | 1 | 100.0 % |
| | Total Treated for Lot 80 | | | 1 | 1.7 %Lot |
| | Total Treated for Day | | | 4 | 0.1 %Yard |

Report 4.2 User: LEX

FIGURE 103

Manager's Lot Summary Report
For 08/01/2004 to 08/18/2004

| Lot | Date In | Head In | Animals Pulled | 1st Treat | 1st ReTrt | 2nd ReTrt | 3rd ReTrt | 4/More ReTrts | Morbidity Deads Total | %Pull | %Lot |
|---|---|---|---|---|---|---|---|---|---|---|---|
| 10 | 07/08/2004 | 34 | 2 | 2 | 0 | 0 | 0 | 0 | 0 | 0.00 | 0.00 |
| 40 | 05/19/2004 | 130 | 1 | 1 | 0 | 0 | 0 | 0 | 0 | 0.00 | 0.00 |
| 403 | 03/16/2004 | 126 | 3 | 3 | 0 | 0 | 0 | 0 | 0 | 0.00 | 0.00 |
| 427 | 05/10/2004 | 185 | 1 | 0 | 1 | 0 | 0 | 0 | 0 | 0.00 | 0.00 |
| 428 | 03/09/2004 | 143 | 1 | 0 | 0 | 1 | 0 | 0 | 0 | 0.00 | 0.00 |
| 432 | 03/17/2004 | 196 | 1 | 1 | 0 | 0 | 0 | 0 | 0 | 0.00 | 0.00 |
| 438 | 03/24/2004 | 87 | 1 | 1 | 0 | 0 | 0 | 0 | 0 | 0.00 | 0.00 |
| 442 | 04/27/2004 | 117 | 3 | 3 | 0 | 0 | 0 | 0 | 0 | 0.00 | 0.00 |
| 445 | 05/04/2004 | 125 | 2 | 2 | 0 | 0 | 0 | 0 | 0 | 0.00 | 0.00 |
| 447 | 05/12/2004 | 228 | 2 | 1 | 1 | 0 | 0 | 0 | 0 | 0.00 | 0.00 |

Report 4.5 User: LEX

FIGURE 104

Manager's Lot Comparison Report
For Date Range: 08/01/2004 to 08/18/2004

* Feedlot Summary *

* Head Count: 444 *

Health Related Deaths
*Selected Lots*

| Description | Head Count | % | # Of Lots | Average | Low | High |
|---|---|---|---|---|---|---|
| CHRONIC PNEUMONIA | 2 | 0.450% | 2 | 1.783% | 0.625% | 2.941% |
| Total Deaths: | 2 | 0.450% | 2 | 1.783% | 0.625% | 2.941% |

Health Occurences
*Selected Lots*

| Description | Head Count | % | # Of Lots | Average | Low | High |
|---|---|---|---|---|---|---|
| ACUTE PNEUMONIA | 11 | 2.477% | 2 | 5.754% | 5.625% | 5.882% |
| CHRONIC PNEUMONIA | 2 | 0.450% | 2 | 0.513% | 0.400% | 0.625% |
| FROTHY PNEUMONIA | 1 | 0.225% | 1 | 0.625% | 0.625% | 0.625% |

* Lot #: 10 *

* Head Count: 34 *

Health Related Deaths
* This Lot *

| Description | Head Count | % of Lot | # Of Lots | Average | Low | High |
|---|---|---|---|---|---|---|
| CHRONIC PNEUMONIA | 1 | 2.941% | 2 | 1.783% | 0.625% | 2.941% |
| Total Deaths: | 1 | 2.941% | 2 | 1.783% | 0.625% | 2.941% |

Health Occurences
* This Lot *

| Description | Head Count | % of Lot | # Of Lots | Average | Low | High |
|---|---|---|---|---|---|---|
| ACUTE PNEUMONIA | 2 | 5.882% | 2 | 5.754% | 5.625% | 5.882% |

Report 4.6 User: LEX

FIGURE 105

Lot Analysis by Owner Report
For Date Range: 07/01/2004 to 08/18/2004

| Lot | Pen | Head Count | In Date | In Weight | # Head Treated | — Retreats — # | % | Avg Price | — Deads — # | % |
|---|---|---|---|---|---|---|---|---|---|---|
| ** Any Feedyard ** | | | | | | | | | | |
| 0 | 606 | 48 | 10/02/2003 | 497 | 0 | 0 | 0.00 | 0.00 | 0 | 0.00 |
| 10 | 307 | 34 | 07/08/2004 | 335 | 2 | 0 | 0.00 | 0.57 | 1 | 2.94 |
| 11 | 304 | 73 | 07/20/2004 | 772 | 0 | 0 | 0.00 | 0.00 | 0 | 0.00 |
| 13 | 601 | 39 | 07/30/2004 | 1234 | 0 | 0 | 0.00 | 0.00 | 0 | 0.00 |
| 20 | 312 | 35 | 08/07/2003 | 340 | 0 | 0 | 0.00 | 0.00 | 1 | 2.86 |
| | 511 | 12 | 08/07/2003 | 340 | 0 | 0 | 0.00 | 0.00 | 0 | 0.00 |
| 322S | 403 | 143 | 01/16/2004 | 571 | 2 | 1 | 0.70 | 0.48 | 1 | 0.70 |
| 388 | 606 | 3 | 10/02/2003 | 412 | 0 | 0 | 0.00 | 0.00 | 0 | 0.00 |
| 389 | 606 | 2 | 10/02/2003 | 496 | 0 | 0 | 0.00 | 0.00 | 0 | 0.00 |
| ** Owner Total | | 389 | | | 4 | 1 | 0.26 | 0.23 | 3 | 0.77 |

Report 4.7 User: LEX

FIGURE 106

Pen Rider Analysis Report
For: 07/01/2004 to 08/18/2004
For Pen Rider: All

| Lot | Pen | TagID | Diagnosis | Death Date | Death Location | 1st Time Pull |
|---|---|---|---|---|---|---|
| | | | Pen Rider: LAST, ADAM | | | |
| 322S | 403 | 322416 | ACUTE PNEUMONIA | 07/12/2004 | Hospital | N |
| 449 | 515 | 449365 | ACUTE PNEUMONIA | 07/01/2004 | Home Pen | Y |
| 450 | 610 | 450231 | ACUTE PNEUMONIA | 07/23/2004 | Home Pen | Y |
| 459N | 105 | 459362 | ACUTE PNEUMONIA | 07/16/2004 | Hospital | N |
| 461N | 507 | 461423 | ACUTE PNEUMONIA | 07/23/2004 | Hospital | Y |
| 461N | 507 | 461297 | ACUTE PNEUMONIA | 07/23/2004 | Hospital | Y |
| 50 | 125 | 505289 | ACUTE PNEUMONIA | 07/22/2004 | Hospital | N |
| 70 | 124 | 701126 | ACUTE PNEUMONIA | 07/17/2004 | Hospital | Y |

Report 4.8 User: LEX

FIGURE 107

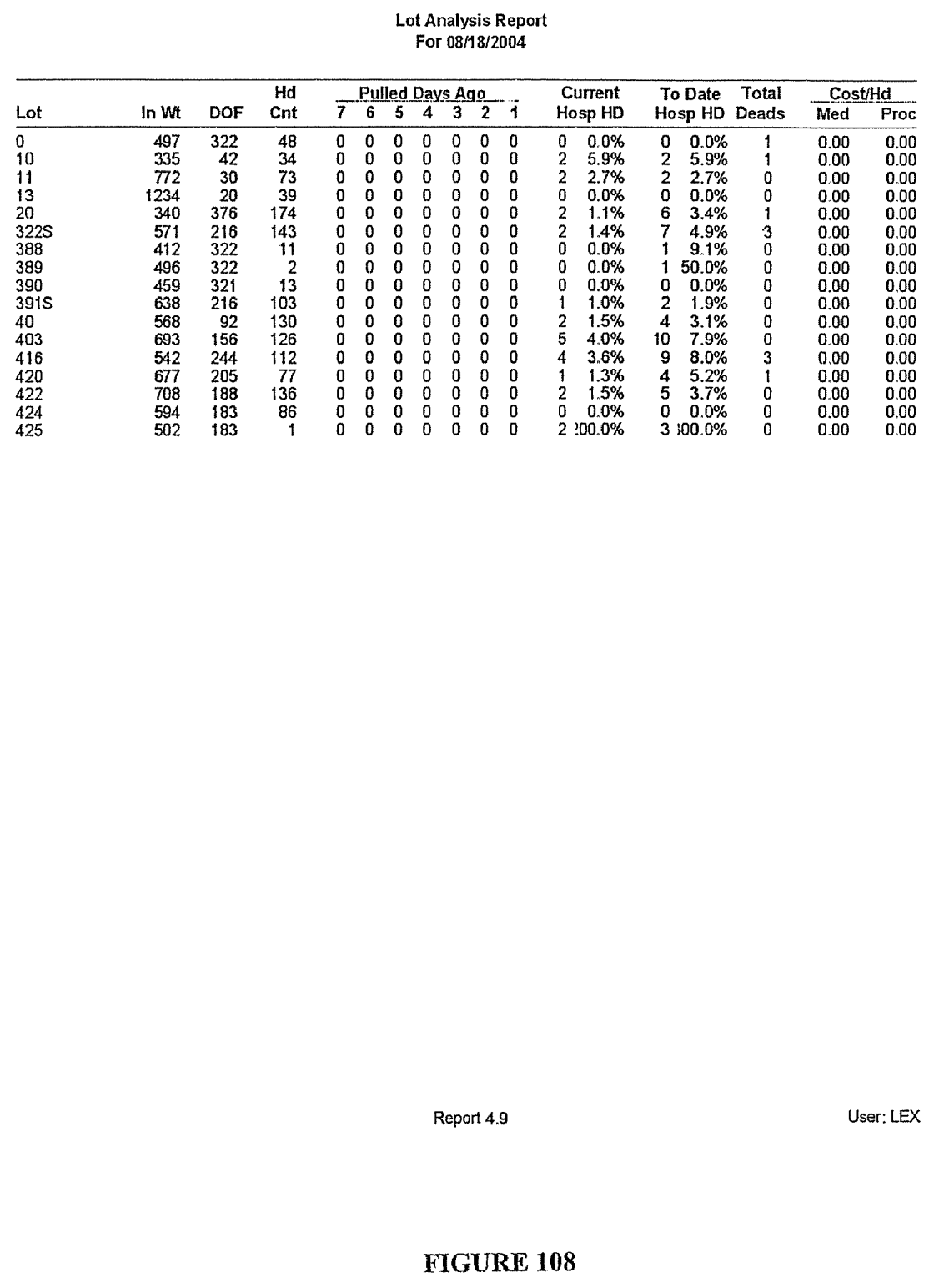

Lot Analysis Report
For 08/18/2004

| | | | Hd | Pulled Days Ago | | | | | | | Current | | To Date | | Total | Cost/Hd | |
|---|---|---|---|---|---|---|---|---|---|---|---|---|---|---|---|---|---|
| Lot | In Wt | DOF | Cnt | 7 | 6 | 5 | 4 | 3 | 2 | 1 | Hosp HD | | Hosp HD | | Deads | Med | Proc |
| 0 | 497 | 322 | 48 | 0 | 0 | 0 | 0 | 0 | 0 | 0 | 0 | 0.0% | 0 | 0.0% | 1 | 0.00 | 0.00 |
| 10 | 335 | 42 | 34 | 0 | 0 | 0 | 0 | 0 | 0 | 0 | 2 | 5.9% | 2 | 5.9% | 1 | 0.00 | 0.00 |
| 11 | 772 | 30 | 73 | 0 | 0 | 0 | 0 | 0 | 0 | 0 | 2 | 2.7% | 2 | 2.7% | 0 | 0.00 | 0.00 |
| 13 | 1234 | 20 | 39 | 0 | 0 | 0 | 0 | 0 | 0 | 0 | 0 | 0.0% | 0 | 0.0% | 0 | 0.00 | 0.00 |
| 20 | 340 | 376 | 174 | 0 | 0 | 0 | 0 | 0 | 0 | 0 | 2 | 1.1% | 6 | 3.4% | 1 | 0.00 | 0.00 |
| 322S | 571 | 216 | 143 | 0 | 0 | 0 | 0 | 0 | 0 | 0 | 2 | 1.4% | 7 | 4.9% | 3 | 0.00 | 0.00 |
| 388 | 412 | 322 | 11 | 0 | 0 | 0 | 0 | 0 | 0 | 0 | 0 | 0.0% | 1 | 9.1% | 0 | 0.00 | 0.00 |
| 389 | 496 | 322 | 2 | 0 | 0 | 0 | 0 | 0 | 0 | 0 | 0 | 0.0% | 1 | 50.0% | 0 | 0.00 | 0.00 |
| 390 | 459 | 321 | 13 | 0 | 0 | 0 | 0 | 0 | 0 | 0 | 0 | 0.0% | 0 | 0.0% | 0 | 0.00 | 0.00 |
| 391S | 638 | 216 | 103 | 0 | 0 | 0 | 0 | 0 | 0 | 0 | 1 | 1.0% | 2 | 1.9% | 0 | 0.00 | 0.00 |
| 40 | 568 | 92 | 130 | 0 | 0 | 0 | 0 | 0 | 0 | 0 | 2 | 1.5% | 4 | 3.1% | 0 | 0.00 | 0.00 |
| 403 | 693 | 156 | 126 | 0 | 0 | 0 | 0 | 0 | 0 | 0 | 5 | 4.0% | 10 | 7.9% | 0 | 0.00 | 0.00 |
| 416 | 542 | 244 | 112 | 0 | 0 | 0 | 0 | 0 | 0 | 0 | 4 | 3.6% | 9 | 8.0% | 3 | 0.00 | 0.00 |
| 420 | 677 | 205 | 77 | 0 | 0 | 0 | 0 | 0 | 0 | 0 | 1 | 1.3% | 4 | 5.2% | 1 | 0.00 | 0.00 |
| 422 | 708 | 188 | 136 | 0 | 0 | 0 | 0 | 0 | 0 | 0 | 2 | 1.5% | 5 | 3.7% | 0 | 0.00 | 0.00 |
| 424 | 594 | 183 | 86 | 0 | 0 | 0 | 0 | 0 | 0 | 0 | 0 | 0.0% | 0 | 0.0% | 0 | 0.00 | 0.00 |
| 425 | 502 | 183 | 1 | 0 | 0 | 0 | 0 | 0 | 0 | 0 | 2 | 200.0% | 3 | 300.0% | 0 | 0.00 | 0.00 |

Report 4.9

User: LEX

FIGURE 108

Detail Treatment History By Drug Report
For Lot: 464
As Of: 08/18/2004
Days of History To Display: 90

***** Processing/Mass Treats *****

| Lot | Pen | Processing Date | Days Since Proc | Drug Name |
|---|---|---|---|---|
| 464 | 208 | 08/05/2004 | 13 | COMPEH |
| 464 | 208 | 08/05/2004 | 13 | COMPTH |
| 464 | 208 | 08/05/2004 | 13 | EAR |
| 464 | 208 | 08/05/2004 | 13 | IVERPO |
| 464 | 208 | 08/05/2004 | 13 | PYR 5 |

***** Individual Treatments *****

| Tag ID | Lot | Pen | Treatment Date | Days Since Trtd | Drug Name |
|---|---|---|---|---|---|
| 464379 | 464 | 208 | 07/19/2004 | 30 | ALBONB |
| 464378 | 464 | 208 | 07/19/2004 | 30 | ALBONB |
| 464407 | 464 | 208 | 08/05/2004 | 13 | BANAMI |
| 464379 | 464 | 208 | 07/19/2004 | 30 | BANAMI |
| 464378 | 464 | 208 | 07/19/2004 | 30 | BANAMI |
| 464379 | 464 | 208 | 07/19/2004 | 30 | LA200 |
| 464378 | 464 | 208 | 07/19/2004 | 30 | LA200 |
| 464407 | 464 | 208 | 08/07/2004 | 11 | NUFLOR |
| 464407 | 464 | 208 | 08/05/2004 | 13 | NUFLOR |
| 464384 | 464 | 208 | 07/28/2004 | 21 | NUFLOR |
| 464384 | 464 | 208 | 07/26/2004 | 23 | NUFLOR |

Report 4.15 User: LEX

FIGURE 109

Manager's Lot Summary Report

| Lot | Date In | Head In | Animals Pulled | 1st Treat | 1st ReTrt | 2nd ReTrt | 3rd ReTrt | 4/More ReTrts | Morbidity Deads Total | %Pull | %Lot |
|---|---|---|---|---|---|---|---|---|---|---|---|
| 0 | 10/02/2003 | 48 | 0 | 0 | 0 | 0 | 0 | 0 | 0 | 0.00 | 0.00 |
| 10 | 07/08/2004 | 34 | 2 | 2 | 0 | 0 | 0 | 0 | 0 | 0.00 | 0.00 |
| 11 | 07/20/2004 | 73 | 0 | 0 | 0 | 0 | 0 | 0 | 0 | 0.00 | 0.00 |
| 13 | 07/30/2004 | 39 | 0 | 0 | 0 | 0 | 0 | 0 | 0 | 0.00 | 0.00 |
| 20 | 08/07/2003 | 174 | 3 | 2 | 1 | 0 | 0 | 0 | 0 | 0.00 | 0.00 |
| 322S | 01/16/2004 | 143 | 3 | 2 | 0 | 0 | 1 | 0 | 2 | 66.67 | 1.40 |
| 388 | 10/02/2003 | 11 | 1 | 1 | 0 | 0 | 0 | 0 | 0 | 0.00 | 0.00 |
| 389 | 10/02/2003 | 2 | 0 | 0 | 0 | 0 | 0 | 0 | 0 | 0.00 | 0.00 |
| 390 | 10/03/2003 | 13 | 0 | 0 | 0 | 0 | 0 | 0 | 0 | 0.00 | 0.00 |
| 391S | 01/16/2004 | 103 | 2 | 1 | 1 | 0 | 0 | 0 | 0 | 0.00 | 0.00 |
| 40 | 05/19/2004 | 130 | 4 | 4 | 0 | 0 | 0 | 0 | 0 | 0.00 | 0.00 |
| 403 | 03/16/2004 | 126 | 8 | 8 | 0 | 0 | 0 | 0 | 0 | 0.00 | 0.00 |
| 416 | 12/19/2003 | 112 | 6 | 5 | 1 | 0 | 0 | 0 | 1 | 16.67 | 0.89 |
| 420 | 01/27/2004 | 77 | 2 | 2 | 0 | 0 | 0 | 0 | 1 | 50.00 | 1.30 |
| 422 | 02/13/2004 | 136 | 4 | 2 | 2 | 0 | 0 | 0 | 0 | 0.00 | 0.00 |
| 424 | 02/18/2004 | 86 | 0 | 0 | 0 | 0 | 0 | 0 | 0 | 0.00 | 0.00 |
| 425 | 02/18/2004 | 1 | 2 | 2 | 0 | 0 | 0 | 0 | 0 | 0.00 | 0.00 |
| 425P | 03/22/2004 | 129 | 0 | 0 | 0 | 0 | 0 | 0 | 0 | 0.00 | 0.00 |

Report 4.16 User: LEX

FIGURE 110

Treatment Exceptions
For 7/30/2004 to 8/18/2004
Active/Inactive Lots

| Lot | Pen | Tag | Date/ Drug | Weight | Temp/ Dosag | Diag | Sev | Treatment | Seq |
|---|---|---|---|---|---|---|---|---|---|
| 10 | | | | | | | | | |
| | 307 | | | | | | | | |
| | | 101449 | | | | | | | |
| | | | 08/08/2004 | 385 | 105.5 | A | | A1 | 1 |
| | | | BANAMINE | | 6.0 CC | Drug Added | | | |
| | | 101518 | | | | | | | |
| | | | 08/01/2004 | 335 | 104.5 | A | | A1 | 1 |
| | | | BANAMINE | | 6.0 CC | Drug Added | | | |
| 40 | | | | | | | | | |
| | 202 | | | | | | | | |
| | | 404 | | | | | | | |
| | | | 08/08/2004 | 740 | 105.3 | B | | B1 | 1 |
| | | | BANAMINE | | 12.0 CC | Drug Added | | | |
| 403 | | | | | | | | | |
| | 129 | | | | | | | | |
| | | 403169 | | | | | | | |
| | | | 08/03/2004 | 1,010 | 103.5 | L | | L3 | 1 |
| | | | ALBON-SR BOLUS | | 3.5 Bolus | Dosage Change | | | |
| | | | 08/03/2004 | 1,010 | 103.5 | L | | L3 | 1 |
| | | | BANAMINE | | 16.0 CC | Drug Added | | | |
| | | 403180 | | | | | | | |
| | | | 08/05/2004 | 1,160 | 102.9 | L | | L1 | 2 |
| | | | SULFADIMETHIZINE | | 5.0 Each | Dosage Change | | | |
| | | 403182 | | | | | | | |
| | | | 08/05/2004 | 1,035 | 102.0 | L | | L1 | 2 |
| | | | SULFADIMETHIZINE | | 5.0 Each | Dosage Change | | | |

Report 5.0 User: LEX

FIGURE 111

Inventory Variance

| Name/ Unit | Beginning Units/Value | Received Units/Value | Usage Units/Value | Adjustments Units/Value | Ending Units/Value | Physical Count | Variance |
|---|---|---|---|---|---|---|---|
| 7 WAY | 162.0 | 0.0 | 0.0 | 0.0 | 162.0 | 165.0 | 3.0 |
| Dose | $3.73 | $0.00 | $0.00 | $0.00 | $3.73 | $3.80 | $0.07 |
| A180 | 381.0 | 0.0 | 0.0 | 0.0 | 381.0 | 370.0 | -11.0 |
| CC | $340.54 | $0.00 | $0.00 | $0.00 | $340.54 | $330.71 | -$9.83 |
| SULFADIMETHIZINE | 9.0 | 0.0 | 0.0 | 0.0 | 9.0 | 9.5 | 0.5 |
| Each | $11.85 | $0.00 | $0.00 | $0.00 | $11.85 | $12.51 | $0.66 |
| Report Totals: | $356.12 | $0.00 | $0.00 | $0.00 | $356.12 | $347.01 | -$9.10 |

Report 6.0 User: LEX

FIGURE 112

Detail Billing Report
For Lot # ALL
For 8/1/2004 to 8/18/2004
Active Lots

Processing/Mass Treatments

| Fin Equiv | Drug Name | Units | Head Count | Total Units | Total Price |
|---|---|---|---|---|---|
| **Original Lot: 464** | | | | | |
| **Original Pen: 208** | | | | | |
| C EH | COMPONENT E-H | 1.0 DS | 101 | 101.0 | 130.0375 |
| C TH | COMPONENT T-H | 1.0 DS | 101 | 101.0 | 102.9897 |
| EAR | EAR TAG | 1.0 EA | 101 | 101.0 | 36.4105 |
| I PO | IVERMECTIN POUR ON | 38.1 CC | 101 | 3,850.1 | 221.7669 |
| PYR5 | PYRAMID 5 | 1.0 CC | 101 | 101.0 | 124.4017 |
| Animals currently in - lot 464 pen(s): 208 | | | | | |
| | | | | Pen Total | 615.6063 |
| | | | | Lot Total | 615.6063 |

| | |
|---|---|
| Total cost of processing for date range: | 615.6063 |
| Total head processed for date range: | 101 |
| Average cost of processing per head: | $6.10 |

Report 7.1 User: LEX

FIGURE 113

Detail Billing Report
For Lot # ALL
For 8/1/2004 to 8/18/2004
Active Lots

INDIVIDUAL TREATMENTS

| Date | Fin Equiv | Drug Name | Units | Price |
|---|---|---|---|---|
| Lot: 10 | | | | |
| Pen: 307 | | | | |
| Tag: 101449 | | | | |
| 08/08/2004 | A180 | A180 | 6.0 CC | 5.3628 |
| | BANA | BANAMINE | 6.0 CC | 1.6056 |
| Tag: 101518 | | | | |
| 08/01/2004 | A180 | A180 | 6.0 CC | 5.3628 |
| | BANA | BANAMINE | 6.0 CC | 1.6056 |
| 08/03/2004 | A180 | A180 | 6.0 CC | 5.3628 |
| | | | Pen Total | 19.2996 |
| | | | Lot Total | 19.2996 |
| Lot: 40 | | | | |
| Pen: 202 | | | | |
| Tag: 404 | | | | |
| 08/08/2004 | BANA | BANAMINE | 12.0 CC | 3.2112 |
| | NUFL | NUFLOR | 23.0 CC | 10.9158 |
| 08/10/2004 | NUFL | NUFLOR | 22.0 CC | 10.4412 |
| | | | Pen Total | 24.5682 |
| | | | Lot Total | 24.5682 |

Report 7.1

FIGURE 114

Quality Assurance Report
All Transactions for Lot464
Date Closed 08/18/2004

Processing/Mass Treatments

| Date | Drug Name | Head | Dosage | Total Amount |
|---|---|---|---|---|
| 08/05/2004 | COMPONENT E-H | 101 | 1.0 Dose | 101.0 Dose |
| | COMPONENT T-H | 101 | 1.0 Dose | 101.0 Dose |
| | EAR TAG | 101 | 1.0 Each | 101.0 Each |
| | IVERMECTIN POUR ON | 101 | 38.1 CC | 3,850.1 CC |
| | PYRAMID 5 | 101 | 1.0 CC | 101.0 CC |

Animals were processed in Lot 464 Pen 208
Animals currently in - lot 464 pen(s): 208

Individual Treatments

Pen: 208

| Tag # | Date | Drug Name | Amount |
|---|---|---|---|
| 464378 | 07/19/2004 | LIQUAMYCIN | 35.0 CC |
| | | ALBON-SR BOLUS | 3.0 Bolus |
| | | BANAMINE | 11.0 CC |
| 464379 | 07/19/2004 | LIQUAMYCIN | 40.0 CC |
| | | ALBON-SR BOLUS | 4.0 Bolus |
| | | BANAMINE | 12.0 CC |
| 464384 | 07/26/2004 | NUFLOR | 26.0 CC |
| | 07/28/2004 | NUFLOR | 27.0 CC |
| 464407 | 08/05/2004 | NUFLOR | 25.0 CC |
| | | BANAMINE | 13.0 CC |
| | 08/07/2004 | NUFLOR | 24.0 CC |

Report 8.0 User: LEX

FIGURE 115

Morbidity Report
Summary of Treatments, Diagnoses, Deads and Movements
For Treatment Date Range: 7/30/2004 to 8/7/2004
Active Lots

| Number of Animals | | % of Total | Average Days Treated | Average Days on Feed |
|---|---|---|---|---|
| **Treatments** | | | | |
| 27 | Animals Treated | | 2 | 90 |
| 21 | First Time Treats | | 2 | 92 |
| 6 | Retreats | | 4 | 82 |
| 3 | Treated More Than 3 Days | | 5 | 119 |
| **Diagnosis Breakdown** | | | | |
| 1 | BLOAT | 3.4% | 1 | 34 |
| 1 | C-SECTION | 3.4% | 1 | 160 |
| 1 | PINKEYE | 3.4% | 1 | 30 |
| 2 | ACUTE PNEUMONIA | 6.9% | 1 | 23 |
| 4 | FROTHY PNEUMONIA | 13.8% | 1 | 89 |
| 5 | FOOTROT | 17.2% | 1 | 119 |
| 15 | CHRONIC PNEUMONIA | 51.7% | 1 | 79 |
| **Deads** | | | | |
| 2 | Home Pen | 40.0% | 0 | 23 |
| 2 | Hospital | 40.0% | 2 | 98 |
| 1 | Recovery | 20.0% | 1 | 231 |

Movements

| From: \ To: | Buller | Chronic | Hospital | Pasture | Railer | Recovery | Regular |
|---|---|---|---|---|---|---|---|
| Buller | | | | | | | |
| Chronic | | | | | | | |
| Hospital | | | | | | 26 | |
| Pasture | | | | | | | |
| Railer | | | | | | | |
| Recovery | 4 | | 1 | | | | 46 |
| Regular | | | 27 | | | | |

Report 10.1

User: LEX

FIGURE 116

Morbidity Report
Disease/Treatments Summary
For Treatment Date Range: 7/30/2004 to 8/18/2004
Active Lots

| Diagnosis | Treatment | Day | Number of Treatments | Average Weight | Average Temp | Average Cost |
|---|---|---|---|---|---|---|
| ACUTE PNEUMONIA | A1 | 1 | 12 | 530 | 104.6 | $ 0.00 |
| | | 3 | 6 | 540 | 101.8 | $ 0.00 |
| BLOAT | H | 1 | 1 | 690 | 102.2 | $ 0.00 |
| CHRONIC PNEUMONIA | B1 | 1 | 19 | 823 | 104.5 | $ 0.00 |
| | | 3 | 18 | 741 | 101.4 | $ 0.00 |
| C-SECTION | Q1 | 1 | 1 | 345 | 102.5 | $ 0.00 |
| FOOTROT | L1 | 1 | 2 | 1,083 | 102.9 | $ 0.00 |
| | | 2 | 3 | 1,092 | 102.0 | $ 0.00 |
| | L3 | 1 | 2 | 833 | 103.3 | $ 0.00 |
| FROTHY PNEUMONIA | C1 | 1 | 3 | 1,017 | 102.6 | $ 0.00 |
| | C2 | 1 | 6 | 956 | 103.0 | $ 0.00 |

Report 10.2 User: LEX

FIGURE 117

Morbidity Report
Treatment Detail for Date by Origin
From 8/1/2004 to 8/18/2004
Lot # ALL
Active Lots

| | Diagnosis/Treatment | | Sev | Seq | Weight | Temp | Pen Rider |
|---|---|---|---|---|---|---|---|
| Origin: | | | | | | | |
| Lot: 10 | | | | | | | |
| Pen: 307 | | | | | | | |
| Tag: 101449 | ACUTE PNEUMONIA | | | 1 | 385 | 105.5 | |
| 8/8/2004 | A1 | A180 | | | | | 6.0 CC |
| | | BANAMINE | | | | | 6.0 CC |
| Tag: 101518 | ACUTE PNEUMONIA | | | 1 | 335 | 104.5 | |
| 8/1/2004 | A1 | A180 | | | | | 6.0 CC |
| | | BANAMINE | | | | | 6.0 CC |
| | ACUTE PNEUMONIA | | | 3 | 345 | 101.0 | |
| 8/3/2004 | A1 | A180 | | | | | 6.0 CC |
| Lot: 40 | | | | | | | |
| Pen: 202 | | | | | | | |
| Tag: 404 | CHRONIC PNEUMONIA | | | 1 | 740 | 105.3 | |
| 8/8/2004 | B1 | NUFLOR | | | | | 23.0 CC |
| | | BANAMINE | | | | | 12.0 CC |
| | CHRONIC PNEUMONIA | | | 3 | 730 | 102.3 | |
| 8/10/2004 | B1 | NUFLOR | | | | | 22.0 CC |

FIGURE 118

Mortality Summary Report
From 08/01/2004 to 08/18/2004
Active Lots
Lot # ALL

| Number of Animals | Average Days Treated | Average Days On Feed | Percentages |
|---|---|---|---|
| 5 Animals Dead for Period | 1 | 94 | 0.08% of 6,250 |
| 2 Deads in Home Pen | 0 | 23 | 40.00% of Deads |
| 2 Deads in Hospital | 2 | 98 | 40.00% of Deads |
| 1 Deads in Recovery | 1 | 231 | 20.00% of Deads |
| 0 Deads in pens treated previously | | | |
| **Diagnosis Breakdown** | | | |
| 1 BULLER | 1 | 231 | 0.00% in Hospital<br>0.00% in Home Pen<br>100.00% in Other |
| 3 CHRONIC PNEUMONIA | 0 | 26 | 33.33% in Hospital<br>66.67% in Home Pen<br>0.00% in Other |
| 1 FROTHY PNEUMONIA | 4 | 162 | 100.00% in Hospital<br>0.00% in Home Pen<br>0.00% in Other |

Report 11.1 User: LEX

FIGURE 119

Mortality Report
Deaths by Date Range with Treatment History
From 08/01/2004 to 08/18/2004
Active Lots
Lot # ALL

Lot: 10
Pen: 307
Tag: 101546

| Date | Diagnosis | Weight | Temp | Sev | Pen Rider | Origin | To Pen |
|---|---|---|---|---|---|---|---|
| | ** | | | | | | |

Died 08/04/2004 of CHRONIC PNEUMONIA in Home Pen
Days on feed: 28
Total price of treatments:

Lot: 416
Pen: 112
Tag: 41616

| Date | Diagnosis | Weight | Temp | Sev | Pen Rider | Origin | To Pen |
|---|---|---|---|---|---|---|---|
| 07/31/2004 | FROTHY PNEUMONIA | 908 | 103.2 | | | | H3 |
| | CEFTIOFUR SODIUM | | | 14.0 CC | | | |

Died 08/05/2004 of BULLER in Recovery
Days on feed: 231
Total price of treatments: $7.63

Comments: WATER BELLY??

Report 11.5 User: LEX

FIGURE 120

Death Notification Slip

08/18/2004

Home Lot #: 462N Home Pen #: 106

Tag Number: 4627

Date of Death: Monday, August 2, 2004

Reason for Death: CHRONIC PNEUMONIA

Location of Death: Hospital

Remarks
BLOAT

Signature of Feedlot Official ______________________________

FIGURE 121

Drugs
Active Items

| Short Name | Name | Type | Trans | Dose/ 100 Wt | Std Dose | Max Dose | Units | Round to Nearest |
|---|---|---|---|---|---|---|---|---|
| 7 WAY | 7 WAY | P | | 0.0 | 2.0 | | DS | 1.0 |
| 7WAY S | 7 WAY/SOMNUS | P | | | 5.0 | | DS | 1.0 |
| A180 | A180 | T | | 1.5 | | | CC | 1.0 |
| ADSPEC | ADSPEC | T | | 5.5 | | | CC | 1.0 |
| AGRI B | SULFADIMETHIZINE | T | | | 1.0 | | EA | 1.0 |
| ALBONB | ALBON-SR BOLUS | T | | 0.5 | 0.0 | 6.0 | BOL | 1.0 |
| ALBONI | SULFADIMETHOXINE | T | | 6.2 | | | CC | 1.0 |
| B COMP | VITAMIN B COMPLEX | T | | 2.0 | | | CC | 1.0 |
| B1 | VIT B1 | T | | 2.0 | | | CC | 1.0 |
| B100 | BAYTRIL 100 | T | | 4.0 | | | CC | 1.0 |
| B12 | CYANOCOBALAZIN | T | | | 5.0 | | DS | 1.0 |
| B4L5 | VAC 4 + LEPTO 5 | P | | | 2.0 | | DS | 1.0 |
| BANAMI | BANAMINE | T | | 1.5 | | | CC | 1.0 |
| BANDS | BANDING LOOPS | T | | | 1.0 | | EA | 1.0 |
| BATTLE | BATTLE DRENCH | T | | 1.0 | | | OZ | 1.0 |
| BLUE | BLUE LYTE | T | | | 1.0 | | EA | 1.0 |

User: LEX

T - Treatment Drug
P - Processing Drug
B - Treatment/Processing Drug

FIGURE 122

Lot Master Listing
Active Lots
For In-Date Range: 03/20/2003 to 08/18/2004

| In Date | DOF | Proj. Ship | Customer Name | Sex | In Wt. | Head Count | Deads |
|---|---|---|---|---|---|---|---|
| Lot: 0 | | | | | | | |
| Pen: 606 | | | | | | | |
| 10/02/2003 | 322 | | SUE<br>FRANK<br>JOHN<br>CUSTOMER 10 | M | 497 | 45 | 1 |
| | | | Total for lot 0 | | | 45 | 1 |
| Lot: 10 | | | | | | | |
| Pen: 307 | | | | | | | |
| 07/08/2004 | 42 | | JIM SMITH | H | 335 | 33 | 1 |
| | | | Total for lot 10 | | | 33 | 1 |
| Lot: 11 | | | | | | | |
| Pen: 304 | | | | | | | |
| 07/20/2004 | 30 | | SPEEDY | H | 772 | 73 | 0 |
| | | | Total for lot 11 | | | 73 | 0 |
| Lot: 13 | | | | | | | |
| Pen: 601 | | | | | | | |
| 07/30/2004 | 20 | | FEEDYARD 1 | C | 1,234 | 39 | 0 |
| | | | Total for lot 13 | | | 39 | 0 |
| Lot: 20 | | | | | | | |
| Pen: 309 | | | | | | | |
| 08/14/2003 | 371 | | JIM SMITH | H | 340 | 0 | 0 |
| Pen: 311 | | | | | | | |
| 08/07/2003 | 378 | | JIM SMITH | H | 340 | 22 | 0 |
| Pen: 312 | | | | | | | |
| 08/07/2003 | 378 | | JIM SMITH | H | 340 | 34 | 1 |
| Pen: 413 | | | | | | | |
| 08/07/2003 | 378 | | JIM SMITH | H | 340 | 27 | 0 |
| Pen: 511 | | | | | | | |
| 08/07/2003 | 378 | | JIM SMITH | H | 340 | 12 | 0 |
| Pen: 514 | | | | | | | |
| 08/07/2003 | 378 | | JIM SMITH | H | 340 | 2 | 0 |
| Pen: 612 | | | | | | | |
| 08/07/2003 | 378 | | JIM SMITH | H | 340 | 5 | 0 |
| | | | Total for lot 20 | | | 102 | 1 |

Report 12.3 User: LEX

FIGURE 123

Suggested Treatments
Active Treatments
For Diagnosis: ALL

| | | Drug | Dosage/100 | Std Dosage | Units |
|---|---|---|---|---|---|
| Diagnosis: A ACUTE PNEUMONIA | | | | | |
| Treatment: A0 | | | | | |
| | Day 1 | OBSRV | 0.00 | 0.00 | Each |
| Treatment: A1 | | | | | |
| | Day 1 | A180 | 1.50 | 0.00 | CC |
| | Day 3 | A180 | 1.50 | 0.00 | CC |
| Treatment: A2 | | | | | |
| | Day 1 | ALBONI | 6.20 | 0.00 | CC |
| | | TYLAN | 4.00 | 0.00 | CC |
| Treatment: A3 | | | | | |
| | Day 1 | NAX | 1.50 | 0.00 | CC |
| | Day 2 | NAX | 1.50 | 0.00 | CC |
| | Day 3 | NAX | 1.50 | 0.00 | CC |
| Treatment: A4 | | | | | |
| | Day 1 | MIC | 2.00 | 0.00 | CC |
| Treatment: A5 | | | | | |
| | Day 1 | ADSPEC | 5.50 | 0.00 | CC |
| Treatment: A6 | | | | | |
| | Day 1 | NAX | 1.50 | 0.00 | CC |
| | | POLY | 2.00 | 0.00 | CC |
| Treatment: A7 | | | | | |
| | Day 1 | BANAMI | 1.50 | 0.00 | CC |
| Diagnosis: B CHRONIC PNEUMONIA | | | | | |
| Treatment: B0 | | | | | |
| | Day 1 | OBSRV | 0.00 | 0.00 | Each |
| Treatment: B1 | | | | | |
| | Day 1 | NUFLOR | 3.00 | 0.00 | CC |
| | Day 3 | NUFLOR | 3.00 | 0.00 | CC |
| Treatment: B2 | | | | | |
| | Day 1 | BLUE | 0.00 | 1.00 | Each |
| | | NAX | 1.50 | 0.00 | CC |
| | | POLY | 2.00 | 0.00 | CC |
| Treatment: B3 | | | | | |
| | Day 1 | NAX | 1.50 | 0.00 | CC |
| | Day 2 | NAX | 1.50 | 0.00 | CC |
| | Day 3 | NAX | 1.50 | 0.00 | CC |

Report 12.4 User: LEX

FIGURE 124

Scheduled Processing Report
For Lot: All
For Dates: 08/18/2004 through 08/28/2004

| Due Date | Lot # / Pen # | Type | Pen Count | Out Date | Lot Count | DOF | Sex | Customer Name |
|---|---|---|---|---|---|---|---|---|
| 08/23/2004 | 447 / 123 | PROC1 | 114 | 12/1/04 | 114 | 104 | H | ANY FEEDYARD |
| 08/23/2004 | 448 / 602 | PROC1 | 37 | 12/1/04 | 37 | 104 | H | ANY FEEDYARD |
| 08/25/2004 | 40 / 202 | PROC1 | 130 | 1/16/05 | 130 | 99 | H | LEXTRON FEEDYARD |
| Comments: | Established via Bunk Reader | | | | | | | |

Report 12.6 User: LEX

FIGURE 125

Mass Treatment/Processing History
For Lot # ALL
Active Lots
From 07/01/2004 To 07/31/2004

Orig Lot: 426 Orig Pen: 203 Sex: H DOF: 79
In Date: 05/12/2004 Out Date: 11/05/2004 Treat Date: 07/29/2004 Average Weight: 965
Customer: CUSTOMER 8

| Drug | Head Cnt | Dosage | Usage | Serial Number |
|---|---|---|---|---|
| COMPONENT E-H | 81 | 1.0 Dose | 81.0 | |
| COMPONENT T-H | 81 | 1.0 Dose | 81.0 | |

Animals currently in - lot 426 pen(s): 203
Lot Comments:

Orig Lot: 427 Orig Pen: 308 Sex: M DOF: 78
In Date: 05/10/2004 Out Date: 11/01/2004 Treat Date: 07/26/2004 Average Weight: 919
Customer: SIFI

| Drug | Head Cnt | Dosage | Usage | Serial Number |
|---|---|---|---|---|
| COMPONENT E-H | 68 | 1.0 Dose | 68.0 | |
| COMPONENT T-H | 68 | 1.0 Dose | 68.0 | |
| IVERMECTIN POUR ON | 68 | 0.0 CC | 0.0 | |

Animals currently in - lot 427 pen(s): 308
Lot Comments: Established via Bunk Reader Report 12.7 User: LEX

FIGURE 126

Active Diagnosis Codes

| Diagnosis Code | Description | Financial System Death Code Equivalent | Diagnosis Class Code |
|---|---|---|---|
| A | ACUTE PNEUMONIA | | RESPIRATORY |
| B | CHRONIC PNEUMONIA | | RESPIRATORY |
| C | FROTHY PNEUMONIA | | RESPIRATORY |
| D | MISCELLANIOUS | | OTHER |
| E | DIPTHERIA/HONKER | | RESPIRATORY |
| F | HONKER | | RESPIRATORY |
| G | DIGESTIVE | | DIGESTIVE |
| H | BLOAT | | DIGESTIVE |
| I | ACIDOSIS | | DIGESTIVE |
| J | COCCIDIOSIS | | DIGESTIVE |
| K | BOWEL OBSTRUCTION | | OTHER |
| L | FOOTROT | | OTHER |
| M | ACUTE PNEUMONIA 2 | | RESPIRATORY |
| N | VAGINAL PROLAPSE | | OB/GYN |
| O | CALVER/ABORTION | | OB/GYN |
| OB | OBSERVE | | OTHER |
| P | RETAINED PLACENTA/METRI | | OB/GYN |
| PROC | PROCESSING | | OTHER |
| Q | C-SECTION | | OB/GYN |
| R | RETREAT | | OTHER |
| S | WATER BELLEY | | OTHER |
| T | LAMENESS/INJURY | | MUSCLE/SKELETAL |
| U | PINKEYE | | OTHER |
| V | NEUROLOGIC | | OTHER |
| W | BULLER | | OTHER |
| X | ABSCESS | | OTHER |
| Y | SOLE/HOOF SEP. (SBS) | | OTHER |
| Z | MISC. EYE PROBLEMS | | OTHER |

Report 12.14 User: LEX

FIGURE 127

Weight Gain Report
For Lot #
Active Lots
As Of 08/18/2004

| Lot | Pen | | Tag # | Weight Gain | Weight | Date Last Weighed |
|---|---|---|---|---|---|---|
| 20 | 311 | | 209346 | 0.000 | 340 | 05/28/2004 |
| | | | 209363 | 31.071 | 775 | 05/13/2004 |
| | Pen Averages: | Total Head Count= | 2 | | | |
| | | Average Weight= | 558 | | | |
| | | Average Weight Gain= | 15.536 | | | |
| | 312 | | 209379 | 6.667 | 900 | 06/28/2004 |
| | Pen Averages: | Total Head Count= | 1 | | | |
| | | Average Weight= | 900 | | | |
| | | Average Weight Gain= | 6.667 | | | |
| | Lot Averages: | Total Head Count= | 3 | | | |
| | | Average Weight= | 672 | | | |
| | | Average Weight Gain= | 12.579 | | | |

Report 12.15 User: LEX

FIGURE 128

Implant Status Codes

| Status Code | Description |
|---|---|
| ABS | ABCESS |
| BUNCH | BUNCHED |
| CRUSH | CRUSHED |
| IMPROP | IMPROPER LOCATION |
| INCART | IN CARTILAGE |
| MSABS | MISSING - ABCESS |
| MSUNK | MISSING - UNKNOWN |
| PART | PARTIALLY MISSING |
| PROP | PROPER |
| WALL | WALLING OFF |

Report 12.18 User: LEX

FIGURE 129

Railer Summary Report
From 08/01/2004 to 08/19/2004
Active Lots
Lot # ALL

| Number of Animals | | Average Days Treated | Average Days On Feed | Percents |
|---|---|---|---|---|
| 3 | Animals Railed for Period | 0 | 35 | 0.04% of 8096 |
| 1 | Railers Shipped | 0 | 35 | 33.33% of Railers |
| 0 | Railers Treated Previously | 0 | 0 | 0.00% of Railers |
| Diagnosis Breakdown | | | | |
| 1 | ACUTE PNEUMONIA | 0 | 35 | 0.00% Shipped<br>100.00% In Pens |
| 1 | MISCELLANIOUS | 0 | 35 | 100.00% Shipped<br>0.00% In Pens |
| 1 | DIGESTIVE | 0 | 35 | 0.00% Shipped<br>100.00% In Pens |

Report 13.1 User:LEX

FIGURE 130

Railer Analysis (Cause/DOF) Report
From 08/01/2004 to 08/19/2004
Active Lots
Lot # ALL

| Cause | | Days on Feed | | | | | | | | |
|---|---|---|---|---|---|---|---|---|---|---|
| | | 0-7 | 8-25 | 26-45 | 46-90 | 91-150 | 151+ | Total | Shipped | Rail Pen |
| A | ACUTE PNEUMONI | 0 | 0 | 1 | 0 | 0 | 0 | 1 | 0 | 1 |
| D | MISCELLANIOUS | 0 | 0 | 1 | 0 | 0 | 0 | 1 | 1 | 0 |
| G | DIGESTIVE | 0 | 0 | 1 | 0 | 0 | 0 | 1 | 0 | 1 |
|  Totals  | | 0 | 0 | 3 | 0 | 0 | 0 | 3 | 1 | 2 |

Report 13.2 User: LEX

FIGURE 131

Railer Notification Slip
For 8/1/2004 12:00:00AM to 8/19/2004 11:59:59PM
Lot # ALL

| | |
|---|---|
| Home Lot # 464 | Home Pen # 208 |
| Tag Number | 43213 |
| Rail Date | 08/19/2004 |
| Reason For Railer | DIGESTIVE |
| Location of Railer | 104 |

Signature of Feedlot Official ______________________________

Report 13.5 User: LEX

FIGURE 132

Cattle Activity - Receivings Report
For: 07/01/2004 to 07/31/2004
Active & Inactive Lots

| Date Rcvd. | Lot Number | Pen Number | Head Rcvd. |
|---|---|---|---|
| 07/01/2004 | | | |
| | 462N | 106 | 152 |
| | | Total For Date 07/01/2004 | 152 |
| 07/02/2004 | | | |
| | 99 | 119 | 75 |
| | | 119 | 150 |
| | | Total For Lot 99 | 225 |
| | | Total For Date 07/02/2004 | 225 |
| 07/03/2004 | | | |
| | 10 | 113 | 13 |
| | 10 | N1 | 13 |
| | | Total For Date 07/03/2004 | 26 |
| 07/14/2004 | | | |
| | 76 | 118 | 71 |
| | | Total For Date 07/14/2004 | 71 |
| 07/16/2004 | | | |
| | 443 | 127 | 88 |
| | 452 | 313 | 90 |
| | 463N | 418 | 62 |
| | 464 | 208 | 101 |
| | | Total For Date 07/16/2004 | 341 |
| 07/18/2004 | | | |
| | 10 | N1 | 21 |
| | 465N | 402 | 73 |
| | | Total For Date 07/18/2004 | 94 |

Report 39 User: LEX

FIGURE 133

Cattle Activity - Movements Report
For: 7/1/2004 to 7/31/2004
Active & Inactive Lots

| Date | From Pen | From Lot | To Pen | To Lot | Head |
|---|---|---|---|---|---|
| 07/01/2004 | | | | | |
| | 103 | 457 | H1 | | 1 |
| | 202 | 40 | H1 | | 1 |
| | 416 | 449 | *DEAD* | | 1 |
| | H1 | 70 | 417 | | 2 |
| | H3 | 422 | H5 | | 1 |
| | | | Total For | 07/01/2004 | 6 |
| 07/02/2004 | | | | | |
| | 102 | 419 | *DEAD* | | 1 |
| | 111 | 422 | 418 | | 1 |
| | 112 | 416 | H1 | | 1 |
| | 119 | 99 | 118 | | 150 |
| | 127 | 50 | 511 | | 20 |
| | 127 | 50 | 612 | | 17 |
| | 127 | 60 | 612 | | 71 |
| | 310 | 460 | H1 | | 1 |
| | 418 | 24 | 601 | | 1 |
| | 418 | 388 | 406 | | 1 |
| | 418 | 420 | 300 | | 1 |
| | 418 | 428 | 613 | | 3 |
| | 418 | 429 | 300 | | 1 |
| | 418 | 432 | 300 | | 1 |
| | 418 | 435 | 109 | | 1 |
| | 418 | 437 | 303 | | 1 |
| | 418 | 440 | 513 | | 2 |
| | 418 | 441 | 412 | | 1 |
| | 418 | 446 | 408 | | 5 |
| | 418 | 447 | 409 | | 1 |
| | 418 | 448 | 602 | | 1 |
| | 418 | 449 | 416 | | 2 |
| | 418 | 452 | 300 | | 1 |
| | 418 | 454 | 506 | | 1 |
| | 418 | 455 | 300 | | 1 |
| | 514 | 20 | 612 | | 32 |
| | 612 | 90 | 511 | | 10 |
| | H1 | 24 | H3 | | 1 |
| | H1 | 458 | 417 | | 1 |
| | H1 | 459N | 417 | | 1 |
| | H1 | 459N | H3 | | 1 |
| | H3 | 459N | 417 | | 1 |
| | N2 | 24 | 601 | | 1 |
| | | | Total For | 07/02/2004 | 335 |
| 07/03/2004 | | | | | |
| | 130 | 432 | H1 | | 1 |
| | 202 | 40 | H1 | | 1 |

FIGURE 134

Cattle Activity - Deads Report
For: 07/01/2004 to 07/12/2004
Active & Inactive Lots

| Death Date | Home Pen | Lot Number | Count | Death Loc. |
|---|---|---|---|---|
| 07/01/2004 | | | | |
| | 416 | 449 | 1 | HP |
| | | Total for 07/01/2004 | 1 | |
| 07/02/2004 | | | | |
| | 102 | 419 | 1 | HP |
| | | Total for 07/02/2004 | 1 | |
| 07/03/2004 | | | | |
| | 312 | 20 | 1 | HP |
| | H3 | 70 | 1 | H |
| | | Total for 07/03/2004 | 2 | |
| 07/08/2004 | | | | |
| | H5 | 12 | 1 | H |
| | | Total for 07/08/2004 | 1 | |
| 07/12/2004 | | | | |
| | H3 | 322S | 1 | H |
| | | Total for 07/12/2004 | 1 | |

Grand Total 5

Report 41 User: LEX

FIGURE 135

Cattle Activity - Shipments Report
For: 07/01/2004 to 07/13/2004
Active & Inactive Lots

| Date Shipped | Lot Number | Pen Number | Head Shipped |
|---|---|---|---|
| 07/05/2004 | 416 | 112 | 40 |
| | Total For Date 7/5/04 | | 40 |
| 07/06/2004 | 10 | 113 | 13 |
| | 420 | 105 | 43 |
| | Total For Date 7/6/04 | | 56 |
| 07/07/2004 | 422 | 111 | 45 |
| | 90 | 413 | 37 |
| | 99 | 118 | 75 |
| | Total For Date 7/7/04 | | 157 |
| 07/08/2004 | 439 | 302 | 1 |
| | Total For Date 7/8/04 | | 1 |
| 07/12/2004 | 417 | 307 | 45 |
| | 431 | 110 | 45 |
| | Total For Date 7/12/04 | | 90 |
| 07/13/2004 | 422 | 111 | 43 |
| | 99 | 118 | 75 |
| | Total For Date 7/13/04 | | 118 |

Report 42 User: LEX

FIGURE 136

Pen Master Listing
As Of : 08/18/2004
Pen Type :ALL Sex :ALL
Sorted By: PEN

| Pen | Pen Type | Sex | Delivery Zone/Seq | Call Zone/Seq | In Date | Projected Ship Date | Lot | Head In Pen | Not In Pen | Spcl Head |
|---|---|---|---|---|---|---|---|---|---|---|
| 102 | R | | /4 | /4 | | | | EMPTY | | |
| 103 | R | M | /5 | /5 | 05/27/2004 | 01/18/2005 | 457 | 87 | 2 | |
| 104 | R | | /6 | /6 | | | | EMPTY | | |
| 105 | R | S | /7 | /7 | 01/27/2004 | | 420 | 0 | 3 | |
| | | | | | 06/28/2004 | | 459N | 97 | 2 | |
| | | | | Pen Totals | | | | 97 | 5 | |
| 106 | R | S | /8 | /8 | 07/01/2004 | | 462N | 144 | 7 | |
| 107 | R | | /9 | /9 | | | | EMPTY | | |
| 108 | R | | /10 | /10 | | | | EMPTY | | |
| 109 | R | H | /11 | /11 | 03/18/2004 | 08/15/2004 | 435 | 70 | 0 | |
| 110 | R | H | /12 | /12 | 03/16/2004 | 07/10/2004 | 431 | 0 | 1 | |
| 111 | R | S | /13 | /13 | 02/13/2004 | | 422 | 0 | 2 | |
| 112 | R | S | /14 | /14 | 12/19/2003 | 07/15/2004 | 416 | 20 | 1 | |
| 113 | R | | /15 | /15 | | | | EMPTY | | |

Report 49.1 User: LEX

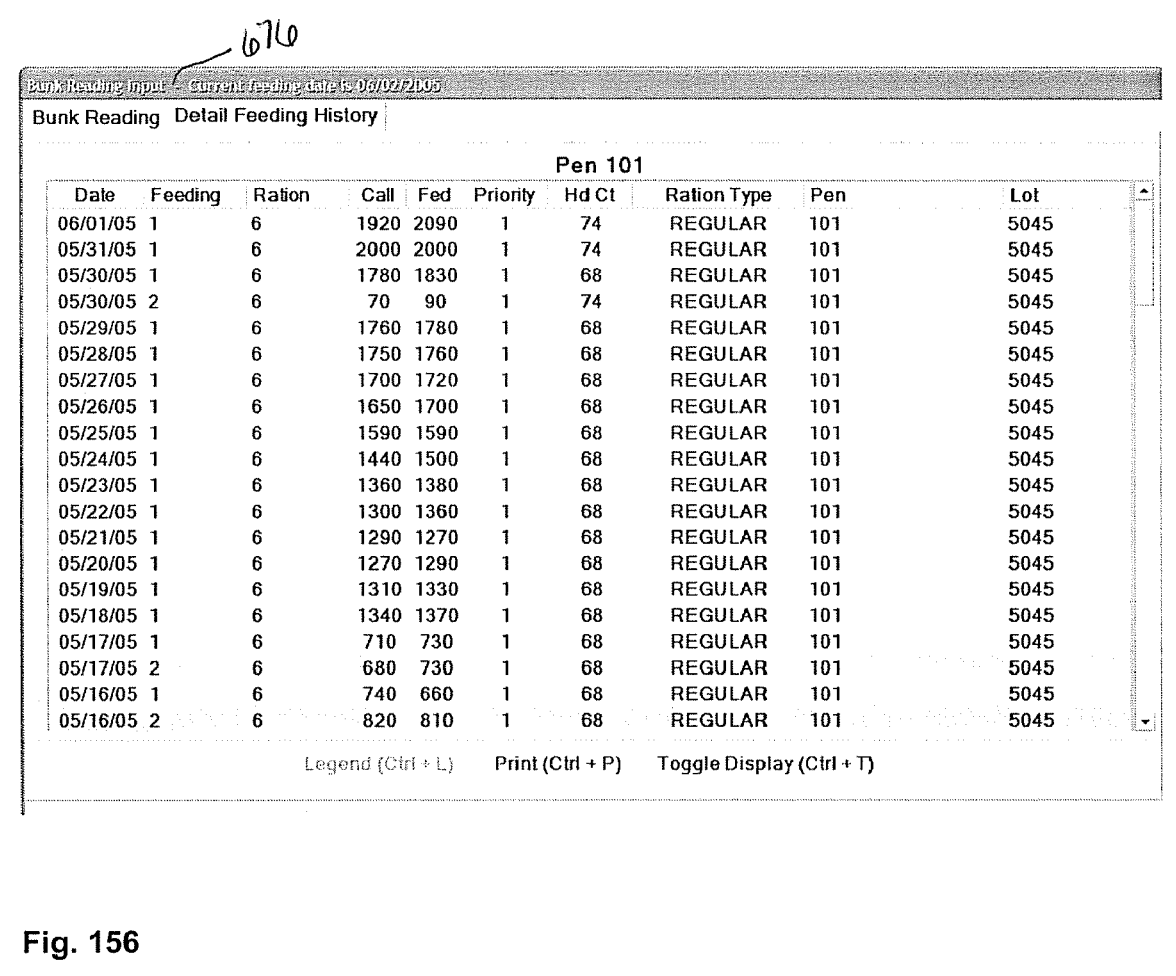

Bunk Reading Input – Current feeding date is 06/02/2005

Bunk Reading | Detail Feeding History

Pen 101

| Date | Feeding | Ration | Call | Fed | Priority | Hd Ct | Ration Type | Pen | Lot |
|---|---|---|---|---|---|---|---|---|---|
| 06/01/05 | 1 | 6 | 1920 | 2090 | 1 | 74 | REGULAR | 101 | 5045 |
| 05/31/05 | 1 | 6 | 2000 | 2000 | 1 | 74 | REGULAR | 101 | 5045 |
| 05/30/05 | 1 | 6 | 1780 | 1830 | 1 | 68 | REGULAR | 101 | 5045 |
| 05/30/05 | 2 | 6 | 70 | 90 | 1 | 74 | REGULAR | 101 | 5045 |
| 05/29/05 | 1 | 6 | 1760 | 1780 | 1 | 68 | REGULAR | 101 | 5045 |
| 05/28/05 | 1 | 6 | 1750 | 1760 | 1 | 68 | REGULAR | 101 | 5045 |
| 05/27/05 | 1 | 6 | 1700 | 1720 | 1 | 68 | REGULAR | 101 | 5045 |
| 05/26/05 | 1 | 6 | 1650 | 1700 | 1 | 68 | REGULAR | 101 | 5045 |
| 05/25/05 | 1 | 6 | 1590 | 1590 | 1 | 68 | REGULAR | 101 | 5045 |
| 05/24/05 | 1 | 6 | 1440 | 1500 | 1 | 68 | REGULAR | 101 | 5045 |
| 05/23/05 | 1 | 6 | 1360 | 1380 | 1 | 68 | REGULAR | 101 | 5045 |
| 05/22/05 | 1 | 6 | 1300 | 1360 | 1 | 68 | REGULAR | 101 | 5045 |
| 05/21/05 | 1 | 6 | 1290 | 1270 | 1 | 68 | REGULAR | 101 | 5045 |
| 05/20/05 | 1 | 6 | 1270 | 1290 | 1 | 68 | REGULAR | 101 | 5045 |
| 05/19/05 | 1 | 6 | 1310 | 1330 | 1 | 68 | REGULAR | 101 | 5045 |
| 05/18/05 | 1 | 6 | 1340 | 1370 | 1 | 68 | REGULAR | 101 | 5045 |
| 05/17/05 | 1 | 6 | 710 | 730 | 1 | 68 | REGULAR | 101 | 5045 |
| 05/17/05 | 2 | 6 | 680 | 730 | 1 | 68 | REGULAR | 101 | 5045 |
| 05/16/05 | 1 | 6 | 740 | 660 | 1 | 68 | REGULAR | 101 | 5045 |
| 05/16/05 | 2 | 6 | 820 | 810 | 1 | 68 | REGULAR | 101 | 5045 |

Legend (Ctrl + L) Print (Ctrl + P) Toggle Display (Ctrl + T)

Fig. 156

| Ration Code | Feeding | Amount |
|---|---|---|
| 1 | 1 | 41,100 |
| | Total for Ration 1 | 41,100 |
| 10 | 2 | 4,330 |
| | Total for Ration 10 | 4,330 |
| 2 | 1 | 52,670 |
| | Total for Ration 2 | 52,670 |
| 23 | 1 | 10,000 |
| | Total for Ration 23 | 10,000 |
| 24 | 1 | 9,210 |
| | Total for Ration 24 | 9,210 |
| 24G | 1 | 26,680 |
| | Total for Ration 24G | 26,680 |
| 3 | 1 | 260 |
| | Total for Ration 3 | 260 |
| 4 | 2 | 162,400 |
| | Total for Ration 4 | 162,400 |
| 5 | 1 | 254,400 |
| | 2 | 91,930 |
| | Total for Ration 5 | 346,330 |
| | Total All Rations | 652,980 |

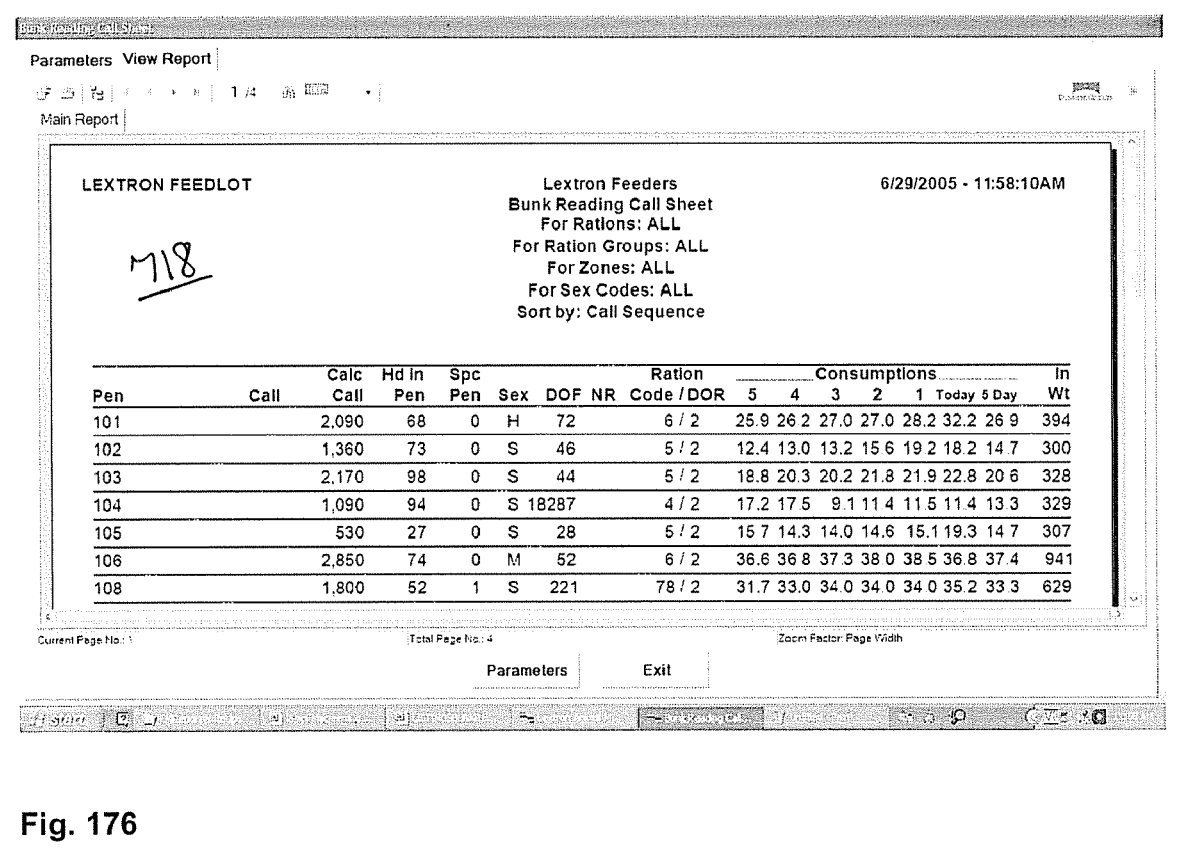

Bunk Reading Call Sheet

Parameters View Report

1 /4

Main Report

LEXTRON FEEDLOT

Lextron Feeders
Bunk Reading Call Sheet
For Rations: ALL
For Ration Groups: ALL
For Zones: ALL
For Sex Codes: ALL
Sort by: Call Sequence

6/29/2005 - 11:58:10AM

718

| | | Calc | Hd in | Spc | | | | Ration | Consumptions | | | | | | | In |
|---|---|---|---|---|---|---|---|---|---|---|---|---|---|---|---|---|
| Pen | Call | Call | Pen | Pen | Sex | DOF | NR | Code / DOR | 5 | 4 | 3 | 2 | 1 | Today | 5 Day | Wt |
| 101 | | 2,090 | 68 | 0 | H | 72 | | 6 / 2 | 25.9 | 26 2 | 27.0 | 27.0 | 28.2 | 32.2 | 26 9 | 394 |
| 102 | | 1,360 | 73 | 0 | S | 46 | | 5 / 2 | 12.4 | 13.0 | 13.2 | 15 6 | 19 2 | 18.2 | 14 7 | 300 |
| 103 | | 2,170 | 98 | 0 | S | 44 | | 5 / 2 | 18.8 | 20.3 | 20.2 | 21.8 | 21.9 | 22.8 | 20 6 | 328 |
| 104 | | 1,090 | 94 | 0 | S | 18287 | | 4 / 2 | 17.2 | 17 5 | 9.1 | 11 4 | 11 5 | 11.4 | 13.3 | 329 |
| 105 | | 530 | 27 | 0 | S | 28 | | 5 / 2 | 15 7 | 14.3 | 14.0 | 14.6 | 15.1 | 19.3 | 14 7 | 307 |
| 106 | | 2,850 | 74 | 0 | M | 52 | | 6 / 2 | 36.6 | 36 8 | 37.3 | 38 0 | 38 5 | 36.8 | 37.4 | 941 |
| 108 | | 1,800 | 52 | 1 | S | 221 | | 78 / 2 | 31.7 | 33.0 | 34.0 | 34.0 | 34 0 | 35.2 | 33.3 | 629 |

Current Page No.: 1 Total Page No.: 4 Zoom Factor: Page Width

Parameters Exit

Fig. 176

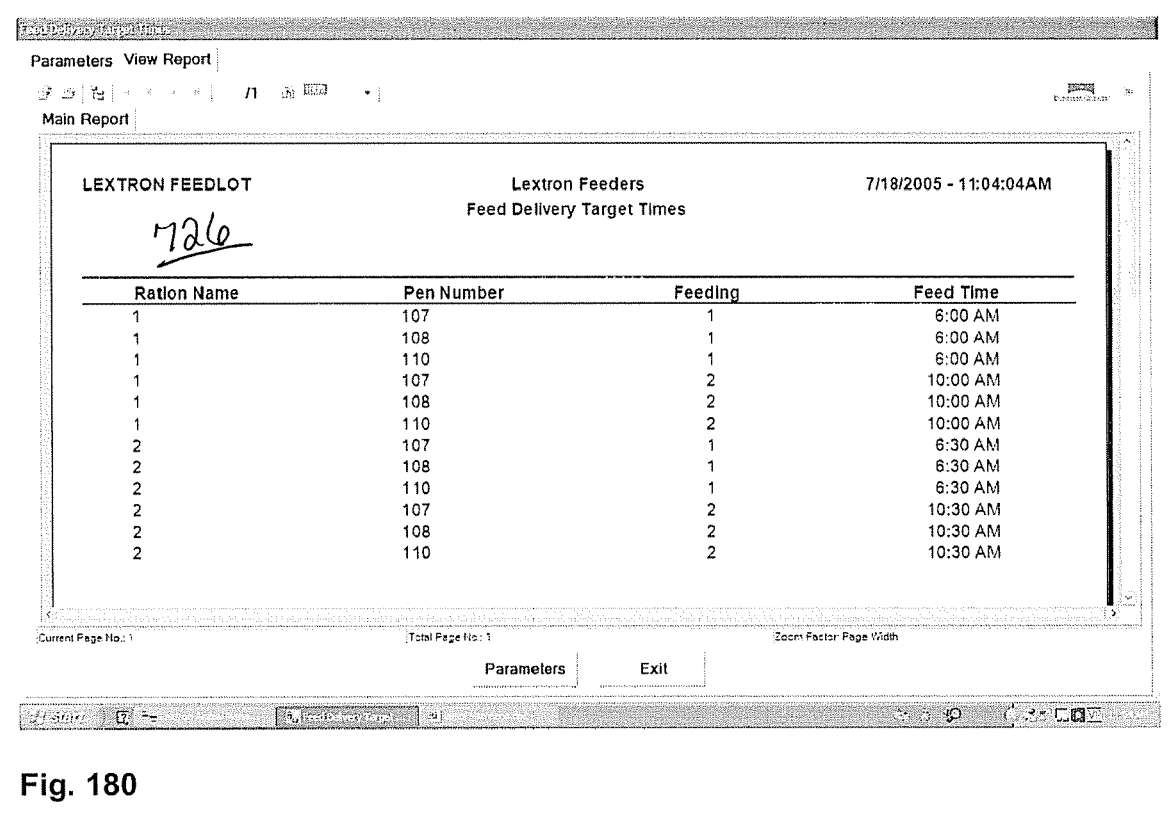

Parameters View Report

Main Report

LEXTRON FEEDLOT

Lextron Feeders

Feed Delivery Target Times

7/18/2005 - 11:04:04AM

726

| Ration Name | Pen Number | Feeding | Feed Time |
|---|---|---|---|
| 1 | 107 | 1 | 6:00 AM |
| 1 | 108 | 1 | 6:00 AM |
| 1 | 110 | 1 | 6:00 AM |
| 1 | 107 | 2 | 10:00 AM |
| 1 | 108 | 2 | 10:00 AM |
| 1 | 110 | 2 | 10:00 AM |
| 2 | 107 | 1 | 6:30 AM |
| 2 | 108 | 1 | 6:30 AM |
| 2 | 110 | 1 | 6:30 AM |
| 2 | 107 | 2 | 10:30 AM |
| 2 | 108 | 2 | 10:30 AM |
| 2 | 110 | 2 | 10:30 AM |

Current Page No.: 1 Total Page No.: 1 Zoom Factor Page Width

Parameters Exit

Fig. 180

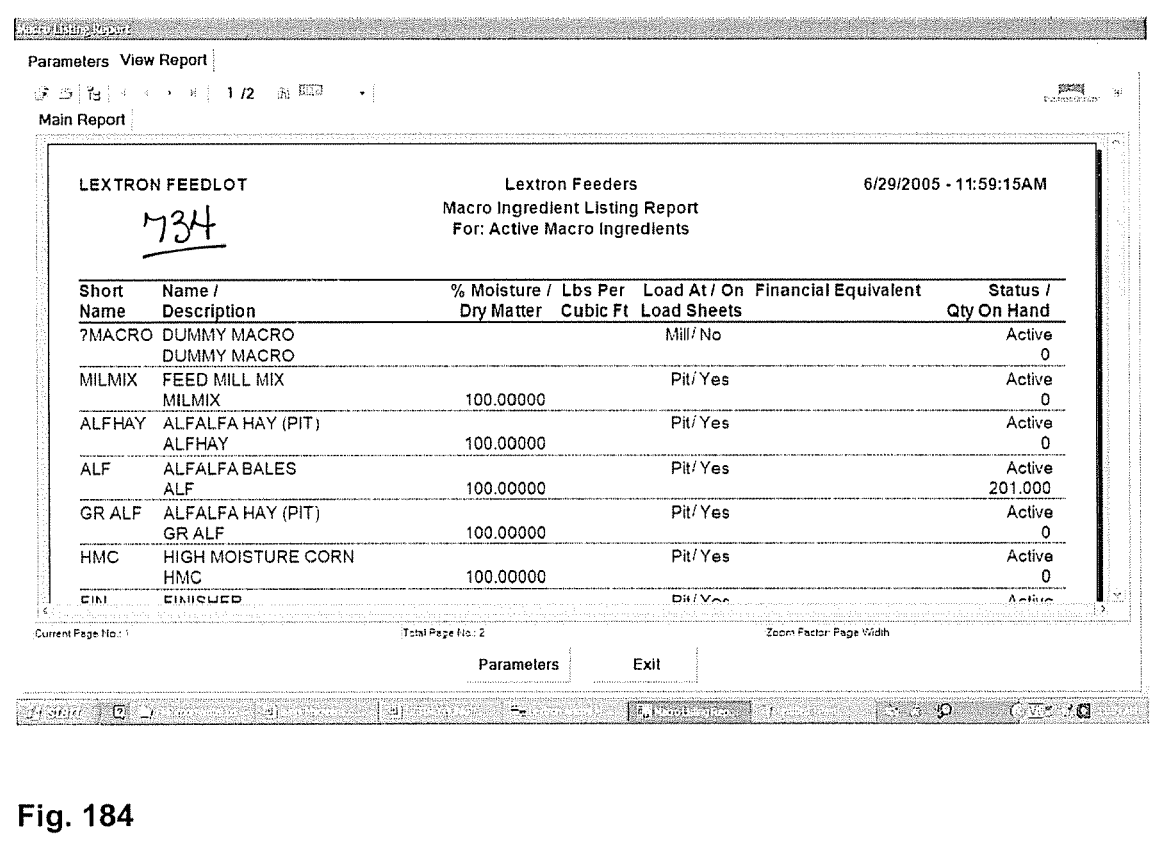

Macro Listing Report

Parameters View Report

1 /2

Main Report

LEXTRON FEEDLOT

734

Lextron Feeders
Macro Ingredient Listing Report
For: Active Macro Ingredients

6/29/2005 - 11:59:15AM

| Short Name | Name / Description | % Moisture / Dry Matter | Lbs Per Cubic Ft | Load At / On Load Sheets | Financial Equivalent | Status / Qty On Hand |
|---|---|---|---|---|---|---|
| ?MACRO | DUMMY MACRO<br>DUMMY MACRO | | | Mill / No | | Active<br>0 |
| MILMIX | FEED MILL MIX<br>MILMIX | 100.00000 | | Pit / Yes | | Active<br>0 |
| ALFHAY | ALFALFA HAY (PIT)<br>ALFHAY | 100.00000 | | Pit / Yes | | Active<br>0 |
| ALF | ALFALFA BALES<br>ALF | 100.00000 | | Pit / Yes | | Active<br>201.000 |
| GR ALF | ALFALFA HAY (PIT)<br>GR ALF | 100.00000 | | Pit / Yes | | Active<br>0 |
| HMC | HIGH MOISTURE CORN<br>HMC | 100.00000 | | Pit / Yes | | Active<br>0 |
| FIN | FINISHER | | | Pit / Yes | | Active |

Current Page No.: 1 Total Page No.: 2 Zoom Factor: Page Width

Parameters Exit

Fig. 184

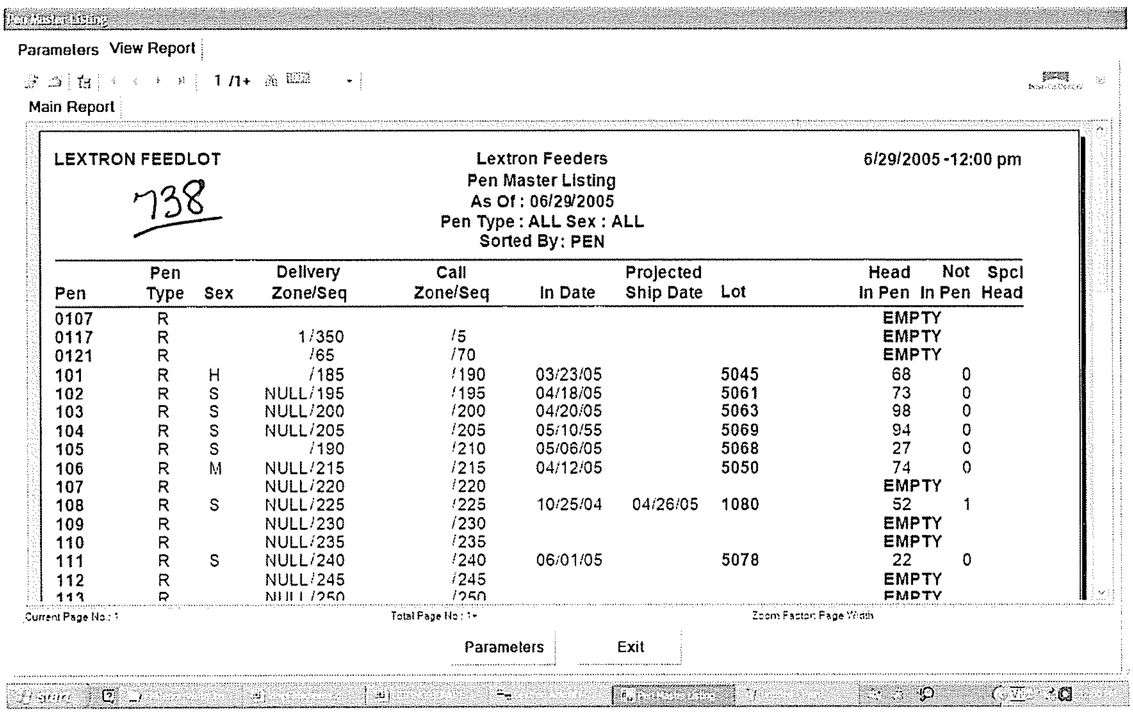
Parameters View Report
1 /1+
Main Report

LEXTRON FEEDLOT

738

Lextron Feeders
Pen Master Listing
As Of : 06/29/2005
Pen Type : ALL Sex : ALL
Sorted By: PEN 6/29/2005 -12:00 pm

| Pen | Pen Type | Sex | Delivery Zone/Seq | Call Zone/Seq | In Date | Projected Ship Date | Lot | Head In Pen | Not In Pen | Spcl Head |
|---|---|---|---|---|---|---|---|---|---|---|
| 0107 | R | | | | | | | EMPTY | | |
| 0117 | R | | 1/350 | /5 | | | | EMPTY | | |
| 0121 | R | | /65 | /70 | | | | EMPTY | | |
| 101 | R | H | /185 | /190 | 03/23/05 | | 5045 | 68 | 0 | |
| 102 | R | S | NULL/195 | /195 | 04/18/05 | | 5061 | 73 | 0 | |
| 103 | R | S | NULL/200 | /200 | 04/20/05 | | 5063 | 98 | 0 | |
| 104 | R | S | NULL/205 | /205 | 05/10/55 | | 5069 | 94 | 0 | |
| 105 | R | S | /190 | /210 | 05/06/05 | | 5068 | 27 | 0 | |
| 106 | R | M | NULL/215 | /215 | 04/12/05 | | 5050 | 74 | 0 | |
| 107 | R | | NULL/220 | /220 | | | | EMPTY | | |
| 108 | R | S | NULL/225 | /225 | 10/25/04 | 04/26/05 | 1080 | 52 | 1 | |
| 109 | R | | NULL/230 | /230 | | | | EMPTY | | |
| 110 | R | | NULL/235 | /235 | | | | EMPTY | | |
| 111 | R | S | NULL/240 | /240 | 06/01/05 | | 5078 | 22 | 0 | |
| 112 | R | | NULL/245 | /245 | | | | EMPTY | | |
| 113 | R | | NULL/250 | /250 | | | | EMPTY | | |

Current Page No.: 1 Total Page No.: 1+ Zoom Factor: Page Width

Parameters Exit

Fig. 186

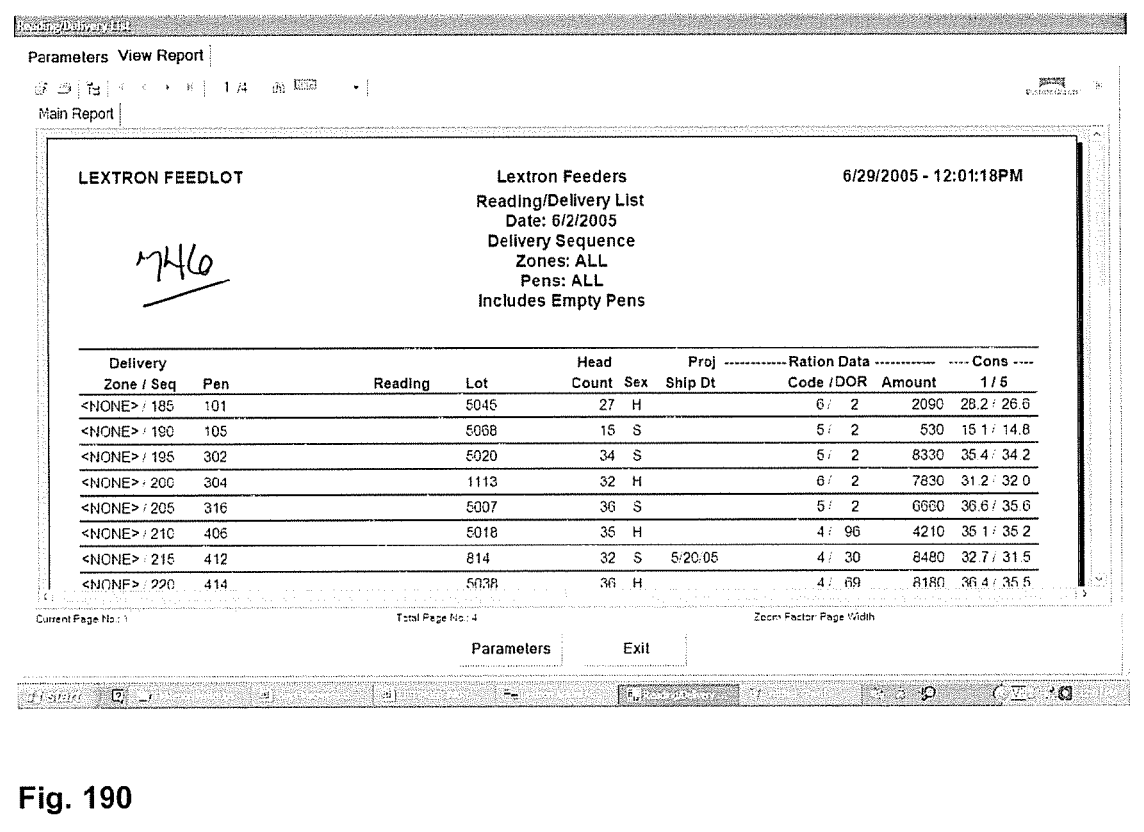

Reading/Delivery List

Parameters View Report

1 /4

Main Report

LEXTRON FEEDLOT

Lextron Feeders
Reading/Delivery List
Date: 6/2/2005
Delivery Sequence
Zones: ALL
Pens: ALL
Includes Empty Pens

6/29/2005 - 12:01:18PM

| Delivery Zone / Seq | Pen | Reading | Lot | Head Count | Sex | Proj Ship Dt | Ration Data Code / DOR | Ration Data Amount | Cons 1 / 5 |
|---|---|---|---|---|---|---|---|---|---|
| <NONE> / 185 | 101 | | 5045 | 27 | H | | 6 / 2 | 2090 | 28.2 / 26.6 |
| <NONE> / 190 | 105 | | 5068 | 15 | S | | 5 / 2 | 530 | 15 1 / 14.8 |
| <NONE> / 195 | 302 | | 5020 | 34 | S | | 5 / 2 | 8330 | 35.4 / 34.2 |
| <NONE> / 200 | 304 | | 1113 | 32 | H | | 6 / 2 | 7830 | 31.2 / 32 0 |
| <NONE> / 205 | 316 | | 5007 | 36 | S | | 5 / 2 | 6660 | 36.6 / 35.6 |
| <NONE> / 210 | 406 | | 5018 | 35 | H | | 4 / 96 | 4210 | 35 1 / 35 2 |
| <NONE> / 215 | 412 | | 814 | 32 | S | 5/20/05 | 4 / 30 | 8480 | 32.7 / 31.5 |
| <NONE> / 220 | 414 | | 5038 | 36 | H | | 4 / 69 | 8180 | 36.4 / 35.5 |

Current Page No.: 1 Total Page No.: 4 Zoom Factor: Page Width

Parameters Exit

Fig. 190

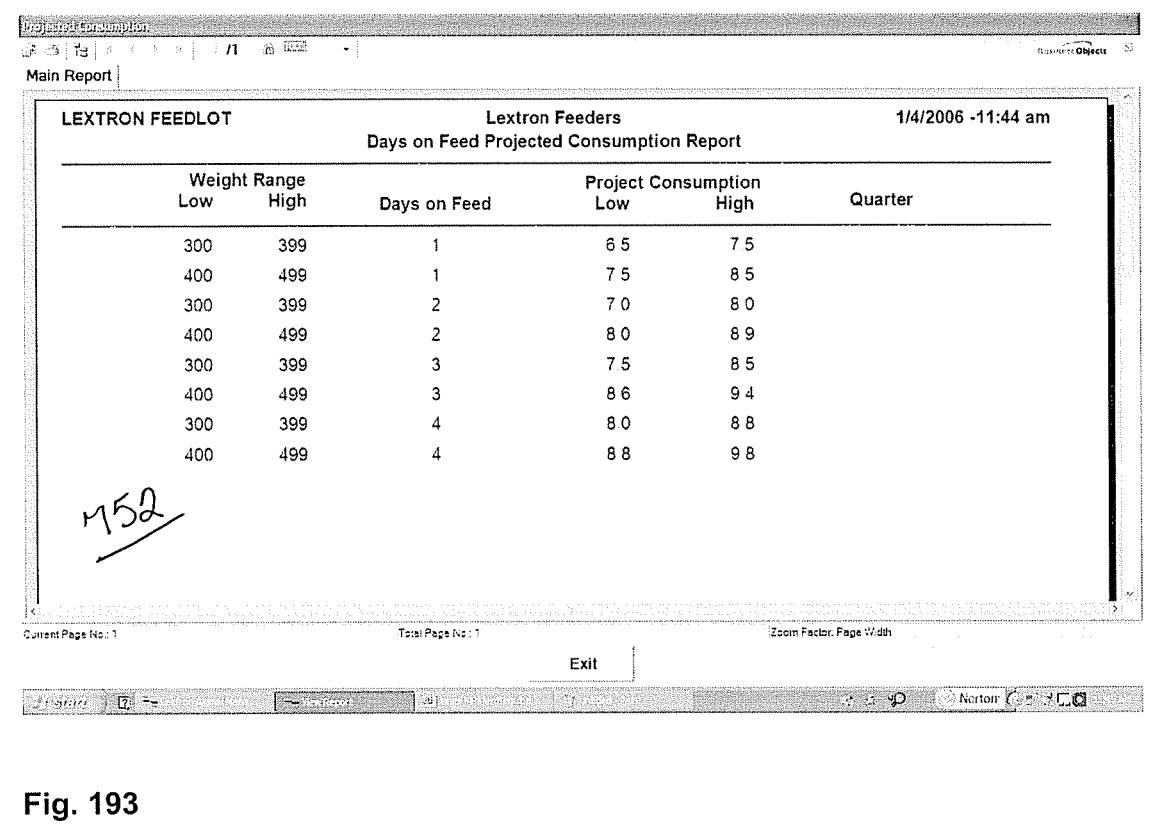

Projected Consumption

Main Report

LEXTRON FEEDLOT

Lextron Feeders

Days on Feed Projected Consumption Report

1/4/2006 -11:44 am

| Weight Range Low | Weight Range High | Days on Feed | Project Consumption Low | Project Consumption High | Quarter |
|---|---|---|---|---|---|
| 300 | 399 | 1 | 6.5 | 7.5 | |
| 400 | 499 | 1 | 7.5 | 8.5 | |
| 300 | 399 | 2 | 7.0 | 8.0 | |
| 400 | 499 | 2 | 8.0 | 8.9 | |
| 300 | 399 | 3 | 7.5 | 8.5 | |
| 400 | 499 | 3 | 8.6 | 9.4 | |
| 300 | 399 | 4 | 8.0 | 8.8 | |
| 400 | 499 | 4 | 8.8 | 9.8 | |

752

Current Page No.: 1 Total Page No.: 1 Zoom Factor: Page Width

Exit

Fig. 193

LEXTRON FEEDLOT

Lextron Feeders
Bunk Activity Report
For Date: 6/5/2005
Show pens with bunk activity
Show held pens
Sort by: Delivery Zone/Sequence

7/18/2005 - 11:48:23AM

| Pen Number | Action | Before Feeding | Call Zone / Sequence | Delivery Zone / Sequence |
|---|---|---|---|---|
| 101 | S | 1 | / 190 | / 185 |
| 105 | * Held for feeding 1 * | | / 210 | / 190 |
| 102 | C | 1 | / 195 | NULL / 195 |
| 103 | C | 1 | / 200 | NULL / 200 |
| 104 | * Held for feeding 1 * | | / 205 | NULL / 205 |
| 106 | S | 1 | / 215 | NULL / 215 |
| 108 | C | 1 | / 225 | NULL / 225 |
| 111 | S | 1 | / 240 | NULL / 240 |

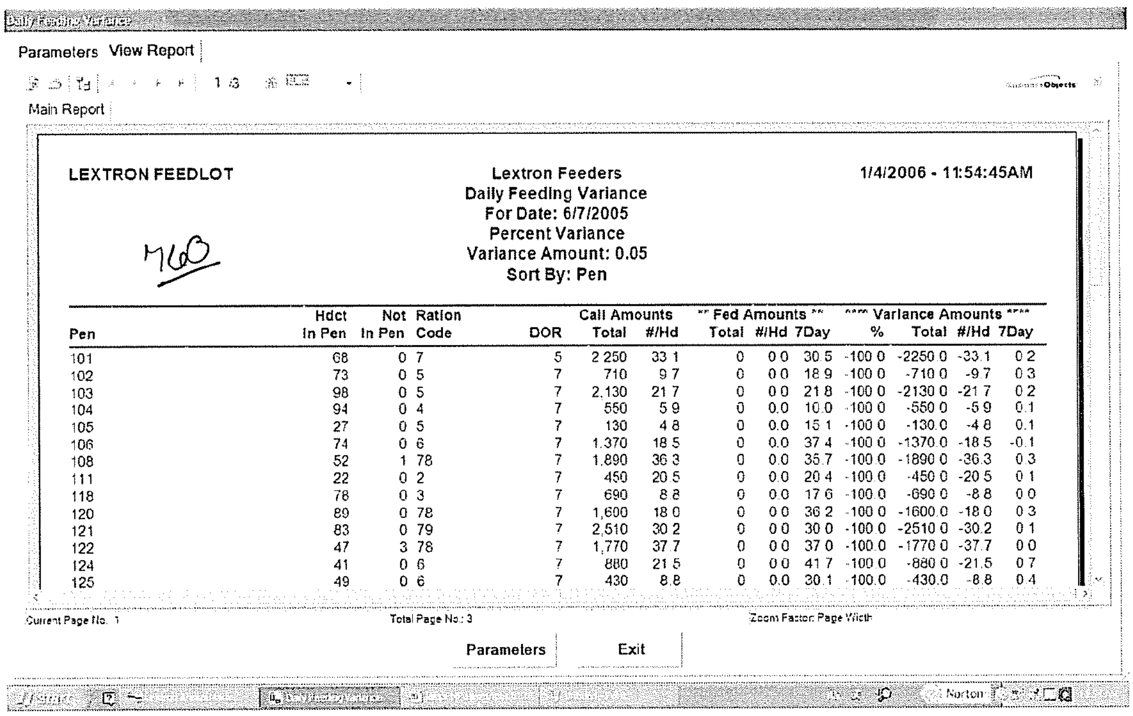

Daily Feeding Variance

Parameters View Report

Main Report

LEXTRON FEEDLOT

Lextron Feeders
Daily Feeding Variance
For Date: 6/7/2005
Percent Variance
Variance Amount: 0.05
Sort By: Pen

1/4/2006 - 11:54:45AM

760

| Pen | Hdct In Pen | Not In Pen | Ration Code | DOR | Call Amounts Total | Call Amounts #/Hd | ** Fed Amounts ** Total | ** Fed Amounts ** #/Hd | ** Fed Amounts ** 7Day | **** Variance Amounts **** % | **** Variance Amounts **** Total | **** Variance Amounts **** #/Hd | **** Variance Amounts **** 7Day |
|---|---|---|---|---|---|---|---|---|---|---|---|---|---|
| 101 | 68 | 0 | 7 | 5 | 2 250 | 33 1 | 0 | 0 0 | 30.5 | -100 0 | -2250.0 | -33.1 | 0 2 |
| 102 | 73 | 0 | 5 | 7 | 710 | 9 7 | 0 | 0 0 | 18 9 | -100 0 | -710 0 | -9.7 | 0 3 |
| 103 | 98 | 0 | 5 | 7 | 2,130 | 21 7 | 0 | 0 0 | 21 8 | -100 0 | -2130 0 | -21 7 | 0 2 |
| 104 | 94 | 0 | 4 | 7 | 550 | 5 9 | 0 | 0.0 | 10.0 | -100 0 | -550 0 | -5 9 | 0.1 |
| 105 | 27 | 0 | 5 | 7 | 130 | 4 8 | 0 | 0.0 | 15 1 | -100 0 | -130.0 | -4 8 | 0.1 |
| 106 | 74 | 0 | 6 | 7 | 1,370 | 18 5 | 0 | 0.0 | 37 4 | -100 0 | -1370.0 | -18 5 | -0.1 |
| 108 | 52 | 1 | 78 | 7 | 1,890 | 36 3 | 0 | 0.0 | 35.7 | -100.0 | -1890 0 | -36.3 | 0.3 |
| 111 | 22 | 0 | 2 | 7 | 450 | 20.5 | 0 | 0.0 | 20 4 | -100.0 | -450 0 | -20 5 | 0 1 |
| 118 | 78 | 0 | 3 | 7 | 690 | 8 8 | 0 | 0.0 | 17 6 | -100.0 | -690 0 | -8 8 | 0 0 |
| 120 | 89 | 0 | 78 | 7 | 1,600 | 18 0 | 0 | 0 0 | 36 2 | -100 0 | -1600.0 | -18 0 | 0 3 |
| 121 | 83 | 0 | 79 | 7 | 2,510 | 30 2 | 0 | 0 0 | 30 0 | -100.0 | -2510 0 | -30.2 | 0 1 |
| 122 | 47 | 3 | 78 | 7 | 1,770 | 37.7 | 0 | 0 0 | 37 0 | -100.0 | -1770 0 | -37.7 | 0 0 |
| 124 | 41 | 0 | 6 | 7 | 880 | 21 5 | 0 | 0 0 | 41 7 | -100.0 | -880 0 | -21.5 | 0 7 |
| 125 | 49 | 0 | 6 | 7 | 430 | 8.8 | 0 | 0.0 | 30.1 | -100.0 | -430.0 | -8.8 | 0.4 |

Current Page No. 1 Total Page No.: 3 Zoom Factor: Page Width

Parameters Exit

Fig. 197

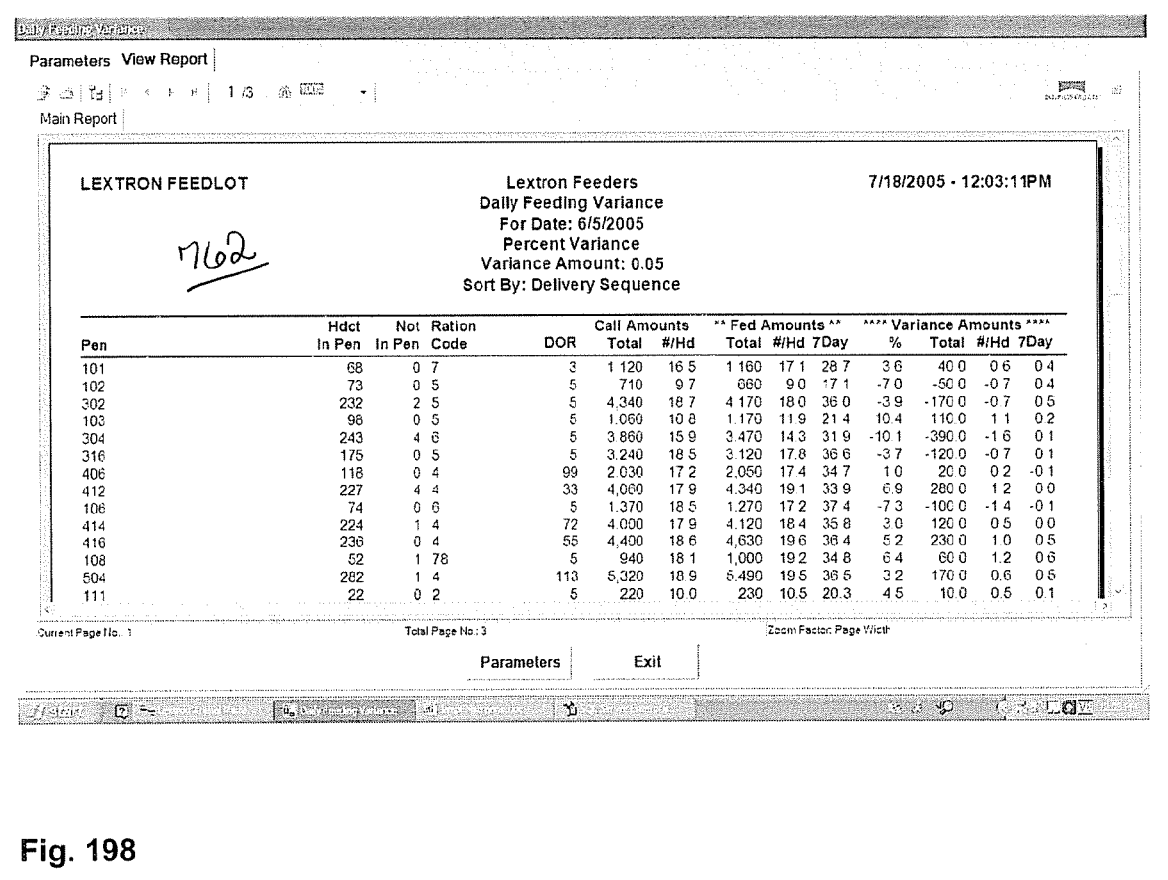

Daily Feeding Variance

Parameters View Report

1 /3

Main Report

LEXTRON FEEDLOT

Lextron Feeders
Daily Feeding Variance
For Date: 6/5/2005
Percent Variance
Variance Amount: 0.05
Sort By: Delivery Sequence

7/18/2005 - 12:03:11PM

762

| Pen | Hdct In Pen | Not In Pen | Ration Code | DOR | Call Amounts Total | Call Amounts #/Hd | ** Fed Amounts ** Total | Fed Amounts #/Hd | Fed Amounts 7Day | **** Variance Amounts **** % | Variance Amounts Total | Variance Amounts #/Hd | Variance Amounts 7Day |
|---|---|---|---|---|---|---|---|---|---|---|---|---|---|
| 101 | 68 | 0 | 7 | 3 | 1 120 | 16 5 | 1 160 | 17 1 | 28 7 | 3 6 | 40 0 | 0 6 | 0 4 |
| 102 | 73 | 0 | 5 | 5 | 710 | 9 7 | 660 | 9 0 | 17 1 | -7 0 | -50 0 | -0 7 | 0 4 |
| 302 | 232 | 2 | 5 | 5 | 4,340 | 18 7 | 4 170 | 18 0 | 36 0 | -3 9 | -170 0 | -0.7 | 0 5 |
| 103 | 98 | 0 | 5 | 5 | 1.060 | 10 8 | 1.170 | 11.9 | 21 4 | 10.4 | 110.0 | 1 1 | 0.2 |
| 304 | 243 | 4 | 6 | 5 | 3.860 | 15 9 | 3.470 | 14.3 | 31 9 | -10.1 | -390.0 | -1 6 | 0 1 |
| 316 | 175 | 0 | 5 | 5 | 3.240 | 18 5 | 3.120 | 17.8 | 36 6 | -3 7 | -120.0 | -0 7 | 0 1 |
| 406 | 118 | 0 | 4 | 99 | 2.030 | 17 2 | 2,050 | 17.4 | 34 7 | 1 0 | 20.0 | 0 2 | -0 1 |
| 412 | 227 | 4 | 4 | 33 | 4,060 | 17 9 | 4.340 | 19.1 | 33 9 | 6.9 | 280 0 | 1 2 | 0 0 |
| 106 | 74 | 0 | 6 | 5 | 1.370 | 18 5 | 1.270 | 17 2 | 37 4 | -7 3 | -100 0 | -1 4 | -0 1 |
| 414 | 224 | 1 | 4 | 72 | 4.000 | 17 9 | 4.120 | 18 4 | 35 8 | 3.0 | 120 0 | 0 5 | 0 0 |
| 416 | 236 | 0 | 4 | 55 | 4,400 | 18 6 | 4,630 | 19 6 | 36 4 | 5 2 | 230 0 | 1.0 | 0 5 |
| 108 | 52 | 1 | 78 | 5 | 940 | 18 1 | 1,000 | 19 2 | 34 8 | 6 4 | 60 0 | 1.2 | 0 6 |
| 504 | 282 | 1 | 4 | 113 | 5,320 | 18.9 | 5.490 | 19 5 | 36 5 | 3 2 | 170 0 | 0.6 | 0 5 |
| 111 | 22 | 0 | 2 | 5 | 220 | 10.0 | 230 | 10.5 | 20.3 | 4 5 | 10.0 | 0.5 | 0.1 |

Current Page No.: 1 Total Page No.: 3 Zoom Factor: Page Width

Parameters Exit

Fig. 198

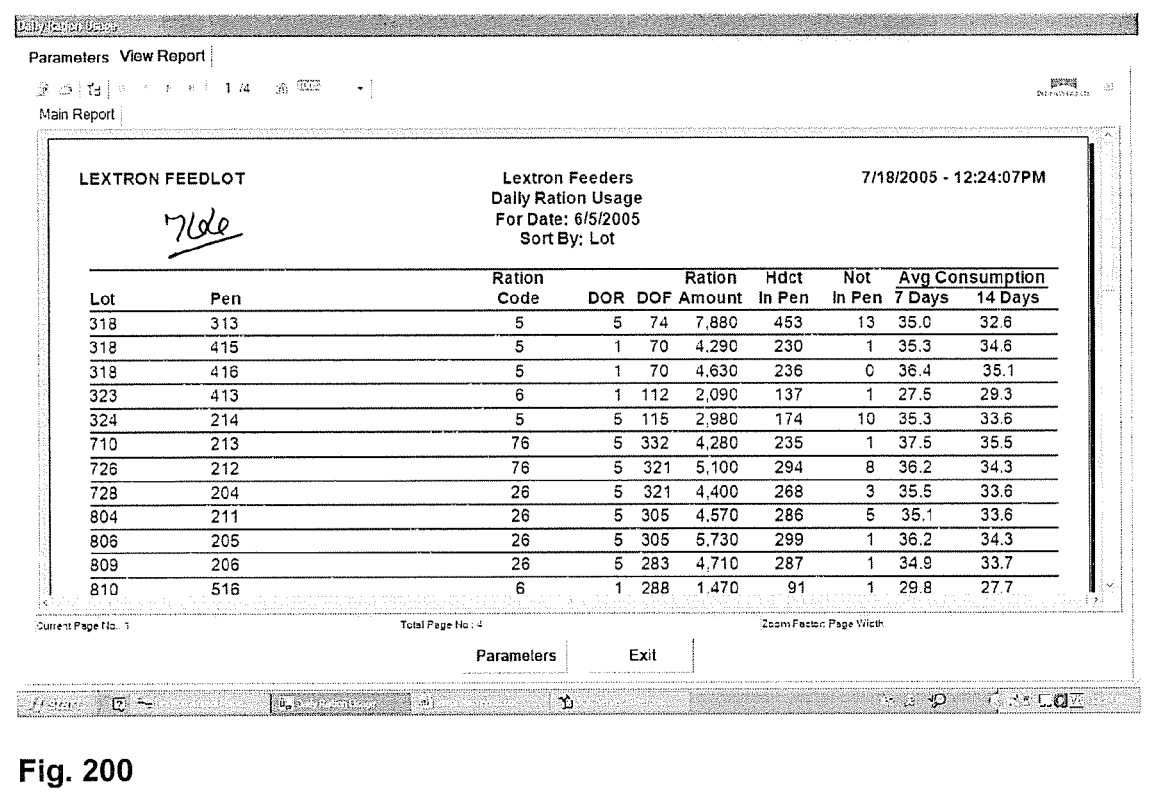

Daily Ration Usage

Parameters View Report

1 /4

Main Report

LEXTRON FEEDLOT

Lextron Feeders
Daily Ration Usage
For Date: 6/5/2005
Sort By: Lot

7/18/2005 - 12:24:07PM

| Lot | Pen | Ration Code | DOR | DOF | Ration Amount | Hdct In Pen | Not In Pen | Avg Consumption 7 Days | 14 Days |
|---|---|---|---|---|---|---|---|---|---|
| 318 | 313 | 5 | 5 | 74 | 7,880 | 453 | 13 | 35.0 | 32.6 |
| 318 | 415 | 5 | 1 | 70 | 4,290 | 230 | 1 | 35.3 | 34.6 |
| 318 | 416 | 5 | 1 | 70 | 4,630 | 236 | 0 | 36.4 | 35.1 |
| 323 | 413 | 6 | 1 | 112 | 2,090 | 137 | 1 | 27.5 | 29.3 |
| 324 | 214 | 5 | 5 | 115 | 2,980 | 174 | 10 | 35.3 | 33.6 |
| 710 | 213 | 76 | 5 | 332 | 4,280 | 235 | 1 | 37.5 | 35.5 |
| 726 | 212 | 76 | 5 | 321 | 5,100 | 294 | 8 | 36.2 | 34.3 |
| 728 | 204 | 26 | 5 | 321 | 4,400 | 268 | 3 | 35.5 | 33.6 |
| 804 | 211 | 26 | 5 | 305 | 4,570 | 286 | 5 | 35.1 | 33.6 |
| 806 | 205 | 26 | 5 | 305 | 5,730 | 299 | 1 | 36.2 | 34.3 |
| 809 | 206 | 26 | 5 | 283 | 4,710 | 287 | 1 | 34.9 | 33.7 |
| 810 | 516 | 6 | 1 | 288 | 1,470 | 91 | 1 | 29.8 | 27.7 |

Current Page No.: 1 Total Page No.: 4 Zoom Factor: Page Width

Parameters Exit

Fig. 200

Daily Yard Report
For Date: 6/5/2005
For Rations: ALL
For Ration Groups: ALL
For Sex Codes: ALL

| Pen | Lot | Hdct In Pen | Not In Pen | Sex | NR | DOF | Ration Code/DOR | Consumptions 5 | 4 | 3 | 2 | 1 | Today | 5 Day | Dry 5 Day |
|---|---|---|---|---|---|---|---|---|---|---|---|---|---|---|---|
| 814 | 5017 | 571 | 7 | M | | 115 | 25 / 49 | 27.9 | 27.9 | 30.1 | 30.1 | 30.1 | 30.8 | 29.2 | 11.5 |
| 816 | 5031 | 573 | 14 | S | | 101 | 25 / 49 | 24.4 | 24.4 | 25.3 | 25.3 | 25.3 | 26.2 | 24.9 | 9.6 |
| 818 | 5030 | 253 | 2 | S | | 101 | 25 / 49 | 24.5 | 25.1 | 25.4 | 25.4 | 25.4 | 26.6 | 25.1 | 9.7 |
| 901 | 5033 | 288 | 4 | S | | 101 | 25 / 49 | 24.2 | 24.8 | 26.0 | 26.0 | 26.0 | 25.1 | 25.4 | 9.8 |
| 902 | 5032 | 580 | 15 | S | | 101 | 25 / 49 | 24.2 | 24.7 | 25.8 | 25.8 | 25.8 | 27.0 | 25.2 | 9.7 |
| 904 | 5057 | 581 | 16 | S | | 52 | 4 / 33 | 22.0 | 23.1 | 23.9 | 23.9 | 23.9 | 22.8 | 23.3 | 9.1 |
| 906 | 5055 5056 | 566 | 4 | S | | 60 | 4 / 36 | 24.5 | 24.6 | 24.3 | 24.3 | 24.3 | 24.0 | 24.4 | 9.4 |
| 908 | 5051 5052 | 577 | 6 | S | | 65 | 4 / 42 | 25.5 | 26.0 | 25.3 | 25.3 | 25.3 | 26.2 | 25.5 | 9.8 |
| 910 | 5023 | 65 | 0 | S | | 117 | 14 / 29 | 32.2 | 33.3 | 31.8 | 31.8 | 31.8 | 30.6 | 32.2 | 13.5 |
| 911 | 5024 | 68 | 2 | H | | 118 | 14 / 29 | 31.3 | 31.4 | 33.5 | 33.5 | 33.5 | 34.0 | 32.7 | 14.0 |
| 912 | 5024 | 68 | 0 | H | | 118 | 14 / 29 | 32.9 | 32.3 | 33.2 | 33.2 | 33.2 | 32.9 | 33.0 | 13.9 |
| 913 | 5021 | 113 | 0 | H | | 117 | 4 / 84 | 32.6 | 33.9 | 33.0 | 33.0 | 33.0 | 32.7 | 33.1 | 12.7 |
| 914 | 1274 | 96 | 1 | S | | 185 | 4 / 64 | 36.9 | 56.3 | 58.3 | 58.3 | 58.3 | 57.5 | 53.6 | 22.4 |
| 915 | 1274 | 114 | 0 | S | | 135 | 4 / 84 | 32.9 | 34.6 | 34.4 | 34.4 | 34.4 | 34.6 | 34.1 | 13.2 |
| 916 | 1283 | 69 | 0 | H | | 148 | 4 / 65 | 30.7 | 32.1 | 34.5 | 34.5 | 34.5 | 34.2 | 33.2 | 13.0 |

LEXTRON FEEDLOT

774

Lextron Feeders

Ingredient Usage for Rations Fed

From 6/1/2005 to 6/5/2005

7/18/2005 - 1:16:00PM

| Ingredient | Quantity Called | Quantity Loaded | Difference |
|---|---|---|---|
| ALFALFA HAY (PIT) | 21,416 | 21,416 | 0 |
| BREWERS GRAIN 33% DM | 46,523 | 46,523 | 0 |
| CORN SILAGE | 70,433 | 70,433 | 0 |
| FLAKED CORN | 207,817 | 207,817 | 0 |
| HIGH MOISTURE CORN | 46 661 | 46,661 | 0 |
| LIQUID FINISHER | 20,312 | 20,312 | 0 |
| MICRO INGREDIENTS | 4,628 | 4,628 | 0 |
| MIX-30 | 21,981 | 21,981 | 0 |
| STARTER | 552 | 552 | 0 |
| Wheat Midds | 22,517 | 22,517 | 0 |
| Grand Total: | 462,840 | 462,840 | 0 |

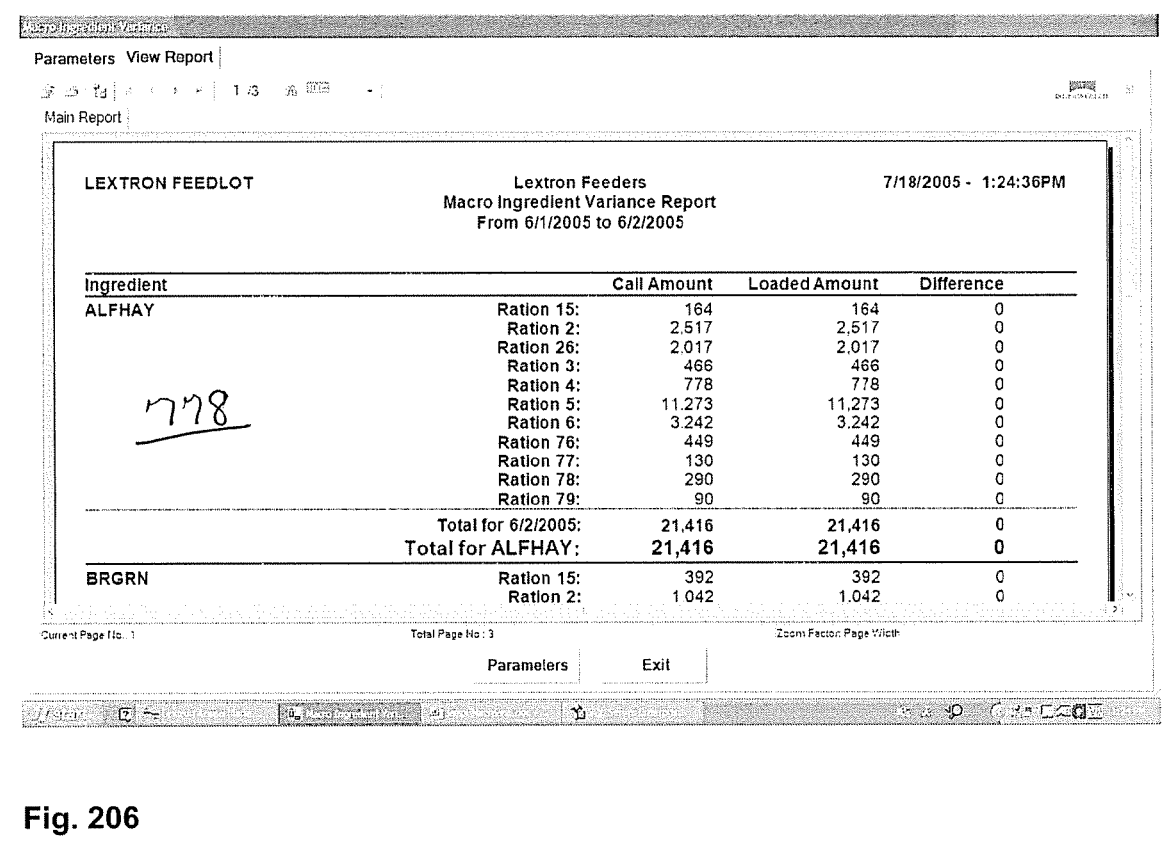

Macro Ingredient Variance

Parameters View Report

1 /3

Main Report

LEXTRON FEEDLOT

Lextron Feeders
Macro Ingredient Variance Report
From 6/1/2005 to 6/2/2005

7/18/2005 - 1:24:36PM

| Ingredient | | Call Amount | Loaded Amount | Difference |
|---|---|---|---|---|
| ALFHAY | Ration 15: | 164 | 164 | 0 |
| | Ration 2: | 2,517 | 2,517 | 0 |
| | Ration 26: | 2,017 | 2,017 | 0 |
| | Ration 3: | 466 | 466 | 0 |
| | Ration 4: | 778 | 778 | 0 |
| 778 | Ration 5: | 11,273 | 11,273 | 0 |
| | Ration 6: | 3,242 | 3,242 | 0 |
| | Ration 76: | 449 | 449 | 0 |
| | Ration 77: | 130 | 130 | 0 |
| | Ration 78: | 290 | 290 | 0 |
| | Ration 79: | 90 | 90 | 0 |
| | Total for 6/2/2005: | 21,416 | 21,416 | 0 |
| | **Total for ALFHAY:** | **21,416** | **21,416** | **0** |
| BRGRN | Ration 15: | 392 | 392 | 0 |
| | Ration 2: | 1,042 | 1,042 | 0 |

Current Page No.: 1 Total Page No: 3 Zoom Factor: Page Width

Parameters Exit

Fig. 206

LEXTRON FEEDLOT

Lextron Feeders
Night Reading Report
For Date: 6/5/2005
For Rations: ALL
For Ration Groups: ALL
For Zones: ALL
For Sex Codes: ALL
Sort by: Call Sequence

7/18/2005 - 2:16:34PM

782

| Pen | Night Read | Prev. Night Read | Lot | Head In Pen | Not In Pen | Ration Code/DOR/DOF | Call Amount | Indate | Ship Date |
|---|---|---|---|---|---|---|---|---|---|
| 108 | | | 1080 | 52 | 1 | 78/ 5/ 224 | 940 | 10/25/04 | 04/26/05 |
| 111 | | | 5078 | 22 | 0 | 2/ 5/ 5 | 220 | 06/01/05 | |
| 116 | | | --- | 41 | 0 | 3/ 5/ | 0 | | |
| 118 | | | 5075 | 78 | 0 | 3/ 5/ 12 | 690 | 05/25/05 | |
| 120 | | | 5015 | 89 | 0 | 78/ 5/ 119 | 1.600 | 02/07/05 | |
| 121 | | | 5016 | 83 | 0 | 79/ 5/ 123 | 1.260 | 02/03/05 | |
| 124 | | | 5014 | 41 | 0 | 6/ 5/ 123 | 880 | 02/03/05 | |

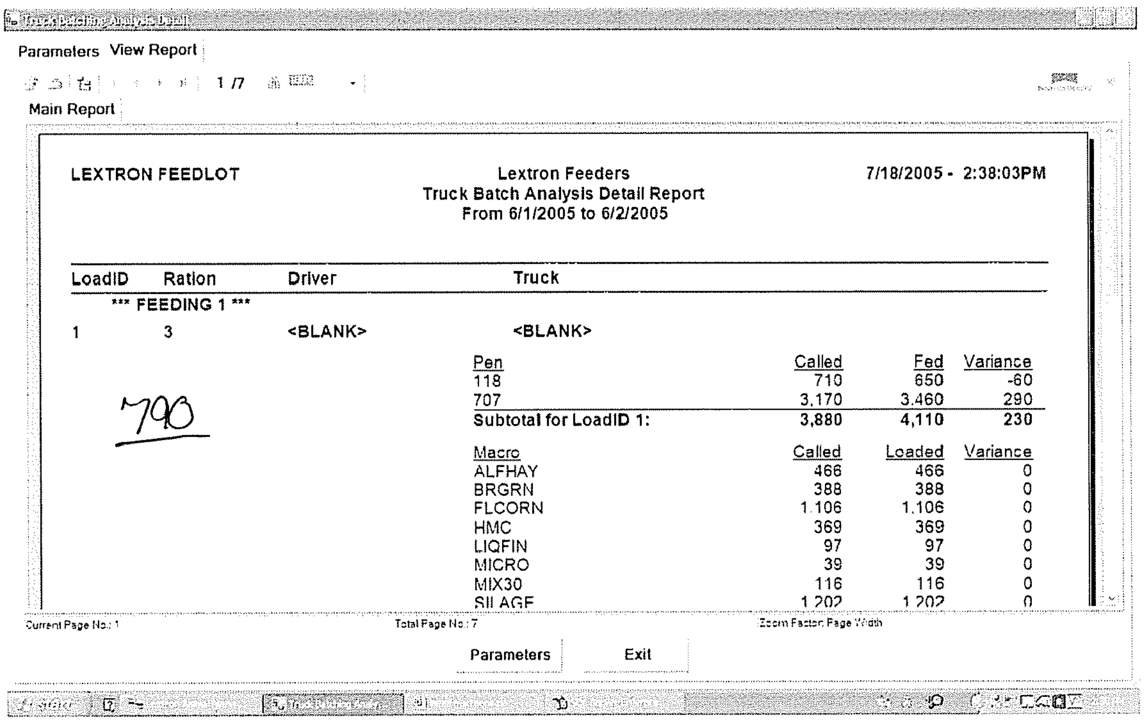

Truck Batching Analysis Detail

Parameters View Report

1 /7

Main Report

LEXTRON FEEDLOT

Lextron Feeders
Truck Batch Analysis Detail Report
From 6/1/2005 to 6/2/2005

7/18/2005 - 2:38:03PM

| LoadID | Ration | Driver | Truck |
|---|---|---|---|
| *** FEEDING 1 *** | | | |
| 1 | 3 | <BLANK> | <BLANK> |

790

| Pen | Called | Fed | Variance |
|---|---|---|---|
| 118 | 710 | 650 | -60 |
| 707 | 3,170 | 3,460 | 290 |
| Subtotal for LoadID 1: | 3,880 | 4,110 | 230 |

| Macro | Called | Loaded | Variance |
|---|---|---|---|
| ALFHAY | 466 | 466 | 0 |
| BRGRN | 388 | 388 | 0 |
| FLCORN | 1,106 | 1,106 | 0 |
| HMC | 369 | 369 | 0 |
| LIQFIN | 97 | 97 | 0 |
| MICRO | 39 | 39 | 0 |
| MIX30 | 116 | 116 | 0 |
| SILAGE | 1,202 | 1,202 | 0 |

Current Page No.: 1 Total Page No.: 7 Zoom Factor: Page Width

Parameters Exit

Fig. 212

LEXTRON FEEDLOT

Lextron Feeders
User Defined Fields Status Report
For Date: 6/5/2005

7/18/2005 - 2:51:27PM

| AI | Pens | Headcount In Pen | Headcount Not In Pen |
|---|---|---|---|
| 1 | 101 | 68 | 0 |
| | 1 Pen(s) - 33.3% of 3.00 Total Pens | | |
| 2 | 102 | 73 | 0 |
| | 103 | 98 | 0 |
| | 2 Pen(s) - 66.7% of 3.00 Total Pens | | |

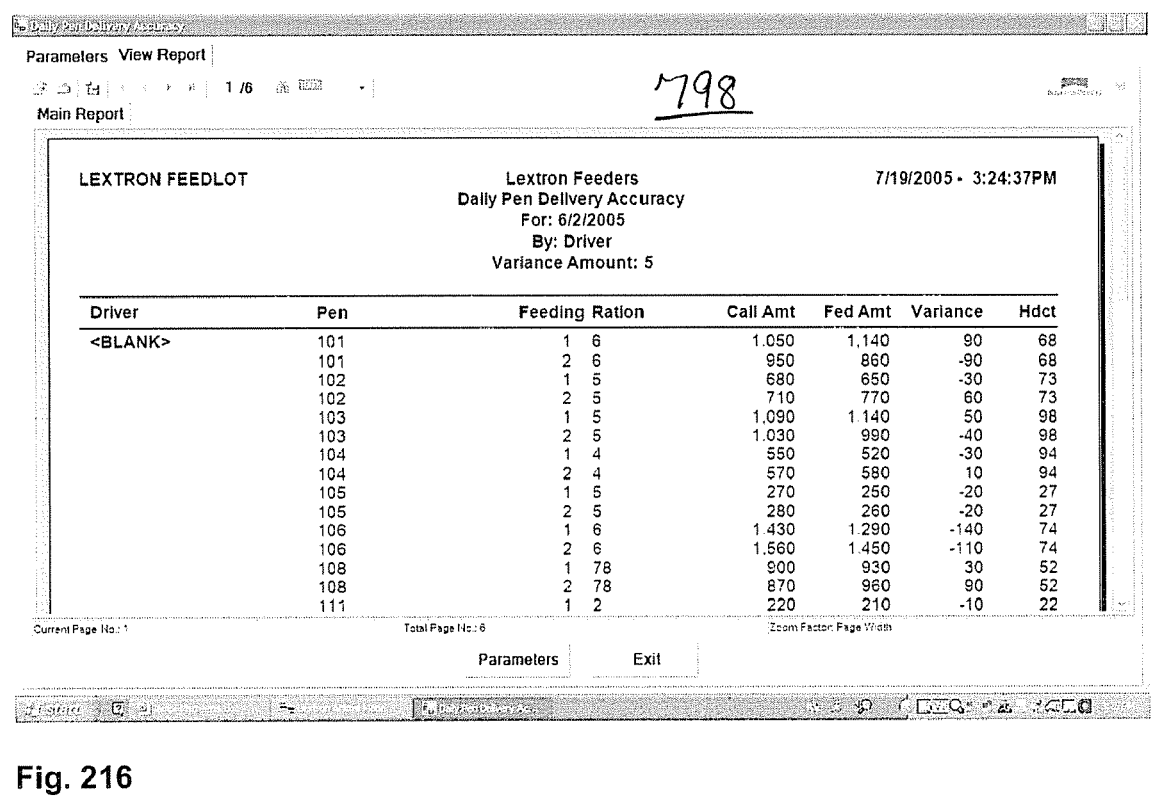

Daily Pen Delivery Accuracy

Parameters View Report

1 /6

798

Main Report

LEXTRON FEEDLOT

7/19/2005 - 3:24:37PM

Lextron Feeders
Daily Pen Delivery Accuracy
For: 6/2/2005
By: Driver
Variance Amount: 5

| Driver | Pen | Feeding | Ration | Call Amt | Fed Amt | Variance | Hdct |
|---|---|---|---|---|---|---|---|
| <BLANK> | 101 | 1 | 6 | 1,050 | 1,140 | 90 | 68 |
| | 101 | 2 | 6 | 950 | 860 | -90 | 68 |
| | 102 | 1 | 5 | 680 | 650 | -30 | 73 |
| | 102 | 2 | 5 | 710 | 770 | 60 | 73 |
| | 103 | 1 | 5 | 1,090 | 1,140 | 50 | 98 |
| | 103 | 2 | 5 | 1,030 | 990 | -40 | 98 |
| | 104 | 1 | 4 | 550 | 520 | -30 | 94 |
| | 104 | 2 | 4 | 570 | 580 | 10 | 94 |
| | 105 | 1 | 5 | 270 | 250 | -20 | 27 |
| | 105 | 2 | 5 | 280 | 260 | -20 | 27 |
| | 106 | 1 | 6 | 1,430 | 1,290 | -140 | 74 |
| | 106 | 2 | 6 | 1,560 | 1,450 | -110 | 74 |
| | 108 | 1 | 78 | 900 | 930 | 30 | 52 |
| | 108 | 2 | 78 | 870 | 960 | 90 | 52 |
| | 111 | 1 | 2 | 220 | 210 | -10 | 22 |

Current Page No.: 1 Total Page No.: 6 Zoom Factor: Page Width

Parameters Exit

Fig. 216

LEXTRON FEEDLOT

Lextron Feeders
Detail Feeding History
From 6/1/2005 to 6/2/2005
Pens: ALL
Active Lots
Sort By: Call Sequence

7/19/2005 - 3:32:57PM

| Pen | Lot | Headcount In Pen | NIP | Sex |  Change  /Hd | Tot | Cons | Date | Feed # | ***** Called *** Ration | Amt | ***** Fed ******* Ration | Amt |
|---|---|---|---|---|---|---|---|---|---|---|---|---|---|
| 101 | 5045 | 74 | 0 | H | 2 3 | 170 | 28 2 | 06/01/05 | 1 | 6 | 1,920 | 6 | 2,090 |
| | 5045 | 68 | 0 | H | -1 3 | -90 | 29 4 | 06/02/05 | 1 | 6 | 1 040 | 6 | 1 140 |
| | 5045 | | | | | | | 06/02/05 | 2 | 6 | 1 050 | 6 | 860 |
| | | | | | | | | | Total for Pen: | | 4,010 | | 4,090 |
| 102 | 5061 | 71 | 0 | S | 1 3 | 90 | 19 2 | 06/01/05 | 1 | 5 | 1,270 | 5 | 1,360 |
| | 5061 | 73 | 0 | S | 0 8 | 60 | 19 5 | 06/02/05 | 1 | 5 | 680 | 5 | 650 |
| | 5061 | | | | | | | 06/02/05 | 2 | 5 | 680 | 5 | 770 |
| | | | | | | | | | Total for Pen: | | 2,630 | | 2,780 |
| 103 | 5063 | 99 | 0 | S | 0 1 | 10 | 21 9 | 06/01/05 | 1 | 5 | 2 160 | 5 | 2 170 |
| | 5063 | 98 | 0 | S | -0 4 | -40 | 21 7 | 06/02/05 | 1 | 5 | 1 080 | 5 | 1,140 |
| | 5063 | | | | | | | 06/02/05 | 2 | 5 | 1 090 | 5 | 990 |
| | | | | | | | | | Total for Pen: | | 4,330 | | 4,300 |
| 104 | 5069 | 95 | 0 | S | 0 1 | 10 | 11 5 | 06/01/05 | 1 | 4 | 1 080 | 4 | 1 090 |

| Driver | Total Pens Delivered | Total Delivered Feed Amount | Total Called Amount | Difference |
|---|---|---|---|---|
| <BLANK> | 516 | 1.851.160 | 1.841.680 | 9.480 |
| Total: | 516 | 1 851 160 | 1.841.680 | 9.480 |

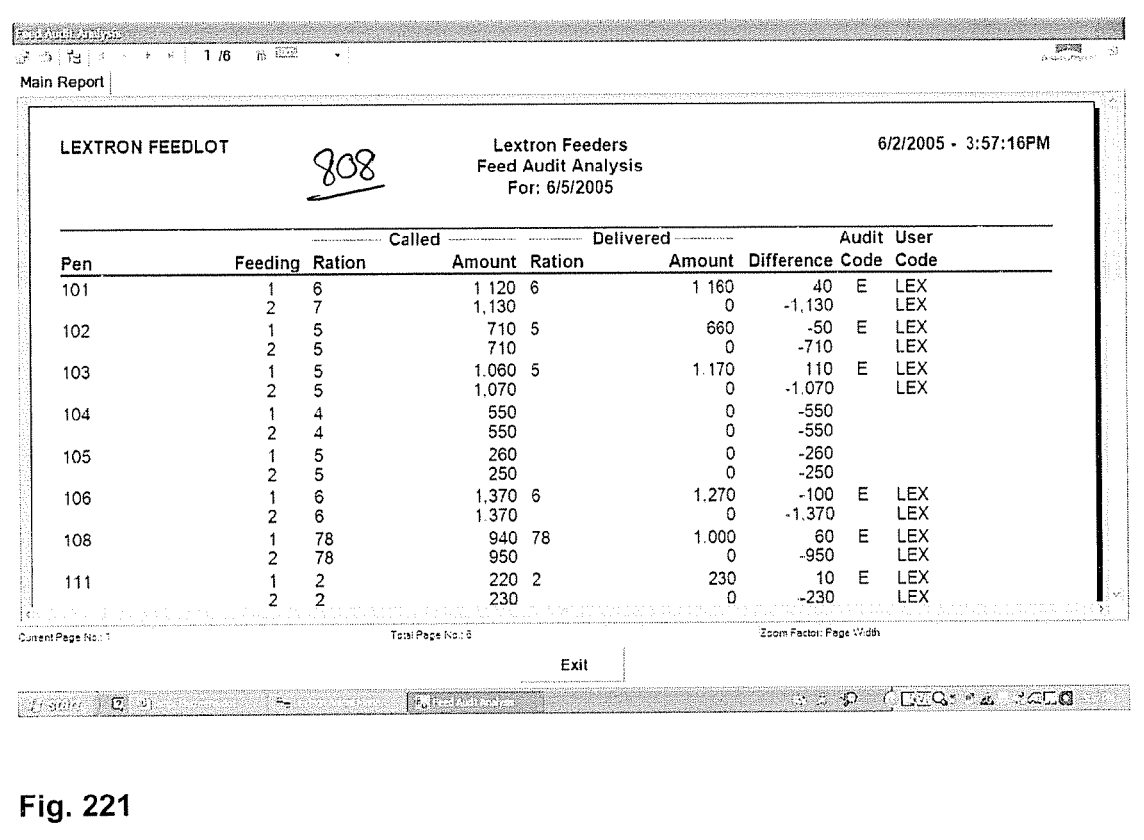

Feed Audit Analysis

1 /6

Main Report

LEXTRON FEEDLOT 808

Lextron Feeders
Feed Audit Analysis
For: 6/5/2005

6/2/2005 - 3:57:16PM

| Pen | Feeding | Called Ration | Called Amount | Delivered Ration | Delivered Amount | Difference | Audit Code | User Code |
|---|---|---|---|---|---|---|---|---|
| 101 | 1 | 6 | 1 120 | 6 | 1 160 | 40 | E | LEX |
| | 2 | 7 | 1,130 | | 0 | -1,130 | | LEX |
| 102 | 1 | 5 | 710 | 5 | 660 | -50 | E | LEX |
| | 2 | 5 | 710 | | 0 | -710 | | LEX |
| 103 | 1 | 5 | 1.060 | 5 | 1.170 | 110 | E | LEX |
| | 2 | 5 | 1,070 | | 0 | -1.070 | | LEX |
| 104 | 1 | 4 | 550 | | 0 | -550 | | |
| | 2 | 4 | 550 | | 0 | -550 | | |
| 105 | 1 | 5 | 260 | | 0 | -260 | | |
| | 2 | 5 | 250 | | 0 | -250 | | |
| 106 | 1 | 6 | 1,370 | 6 | 1,270 | -100 | E | LEX |
| | 2 | 6 | 1.370 | | 0 | -1.370 | | LEX |
| 108 | 1 | 78 | 940 | 78 | 1.000 | 60 | E | LEX |
| | 2 | 78 | 950 | | 0 | -950 | | LEX |
| 111 | 1 | 2 | 220 | 2 | 230 | 10 | E | LEX |
| | 2 | 2 | 230 | | 0 | -230 | | LEX |

Current Page No.: 1 Total Page No.: 6 Zoom Factor: Page Width

Exit

Fig. 221

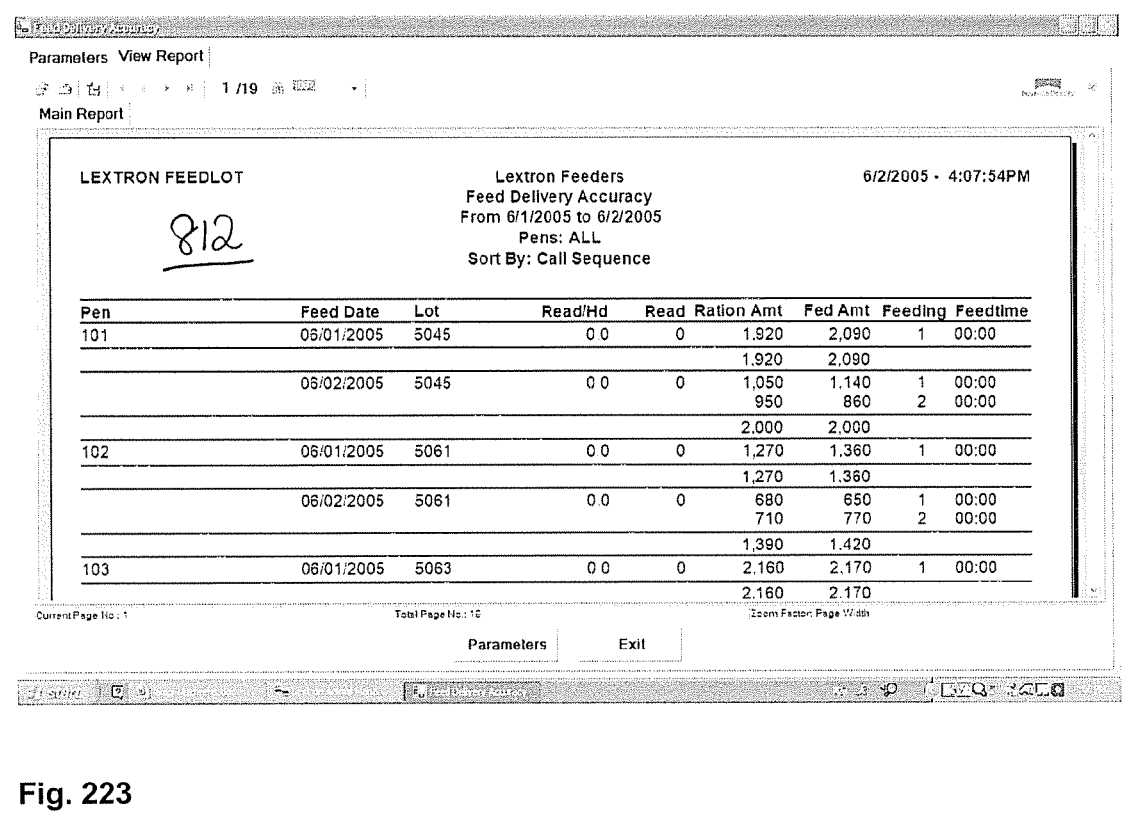

Feed Delivery Accuracy

Parameters View Report

1 /19

Main Report

LEXTRON FEEDLOT

812

Lextron Feeders
Feed Delivery Accuracy
From 6/1/2005 to 6/2/2005
Pens: ALL
Sort By: Call Sequence

6/2/2005 - 4:07:54PM

| Pen | Feed Date | Lot | Read/Hd | Read | Ration Amt | Fed Amt | Feeding | Feedtime |
|---|---|---|---|---|---|---|---|---|
| 101 | 06/01/2005 | 5045 | 0.0 | 0 | 1,920 | 2,090 | 1 | 00:00 |
| | | | | | 1,920 | 2,090 | | |
| | 06/02/2005 | 5045 | 0.0 | 0 | 1,050 | 1,140 | 1 | 00:00 |
| | | | | | 950 | 860 | 2 | 00:00 |
| | | | | | 2,000 | 2,000 | | |
| 102 | 06/01/2005 | 5061 | 0.0 | 0 | 1,270 | 1,360 | 1 | 00:00 |
| | | | | | 1,270 | 1,360 | | |
| | 06/02/2005 | 5061 | 0.0 | 0 | 680 | 650 | 1 | 00:00 |
| | | | | | 710 | 770 | 2 | 00:00 |
| | | | | | 1,390 | 1,420 | | |
| 103 | 06/01/2005 | 5063 | 0.0 | 0 | 2,160 | 2,170 | 1 | 00:00 |
| | | | | | 2,160 | 2,170 | | |

Current Page No.: 1 Total Page No.: 19 Zoom Factor: Page Width

Parameters Exit

Fig. 223

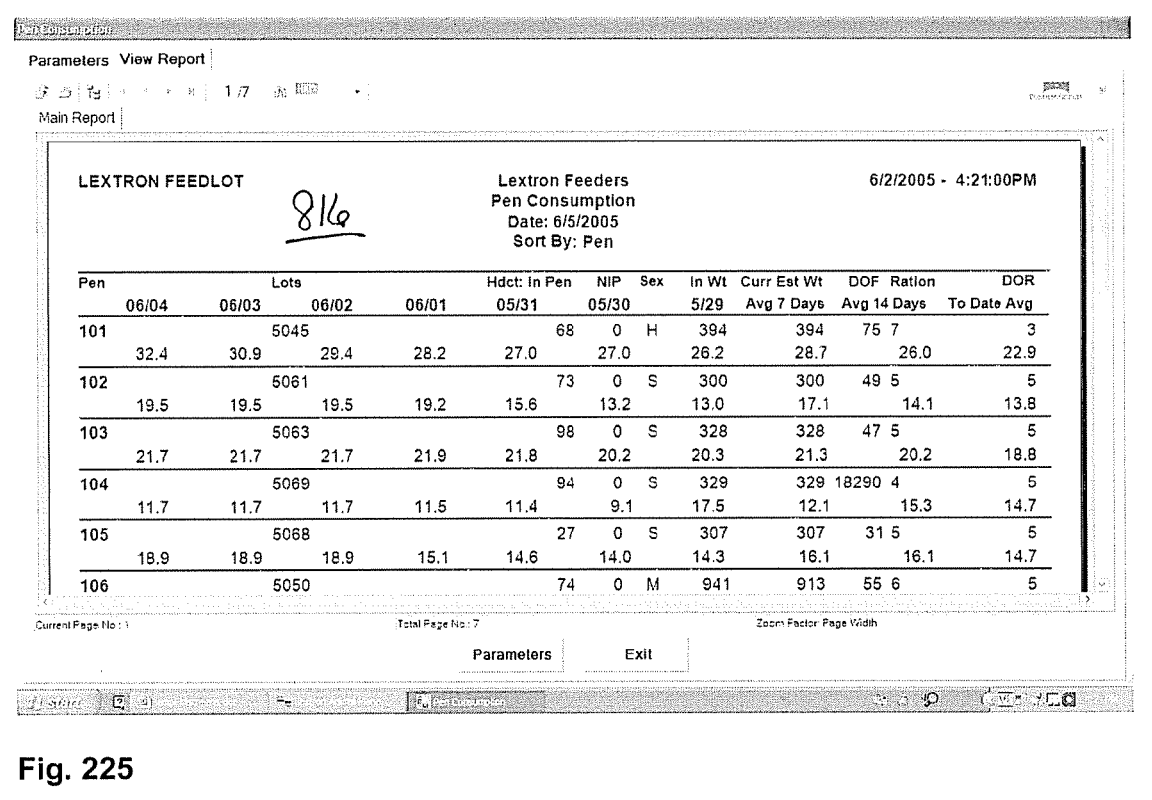

Pen Consumption

Parameters View Report

1 /7

Main Report

LEXTRON FEEDLOT

816

Lextron Feeders
Pen Consumption
Date: 6/5/2005
Sort By: Pen

6/2/2005 - 4:21:00PM

| Pen | | Lots | | | Hdct: In Pen | NIP | Sex | In Wt | Curr Est Wt | DOF Ration | DOR |
|---|---|---|---|---|---|---|---|---|---|---|---|
| | 06/04 | 06/03 | 06/02 | 06/01 | 05/31 | 05/30 | | 5/29 | Avg 7 Days | Avg 14 Days | To Date Avg |
| 101 | | | 5045 | | 68 | 0 | H | 394 | 394 | 75 7 | 3 |
| | 32.4 | 30.9 | 29.4 | 28.2 | 27.0 | 27.0 | | 26.2 | 28.7 | 26.0 | 22.9 |
| 102 | | | 5061 | | 73 | 0 | S | 300 | 300 | 49 5 | 5 |
| | 19.5 | 19.5 | 19.5 | 19.2 | 15.6 | 13.2 | | 13.0 | 17.1 | 14.1 | 13.8 |
| 103 | | | 5063 | | 98 | 0 | S | 328 | 328 | 47 5 | 5 |
| | 21.7 | 21.7 | 21.7 | 21.9 | 21.8 | 20.2 | | 20.3 | 21.3 | 20.2 | 18.8 |
| 104 | | | 5069 | | 94 | 0 | S | 329 | 329 | 18290 4 | 5 |
| | 11.7 | 11.7 | 11.7 | 11.5 | 11.4 | 9.1 | | 17.5 | 12.1 | 15.3 | 14.7 |
| 105 | | | 5068 | | 27 | 0 | S | 307 | 307 | 31 5 | 5 |
| | 18.9 | 18.9 | 18.9 | 15.1 | 14.6 | 14.0 | | 14.3 | 16.1 | 16.1 | 14.7 |
| 106 | | | 5050 | | 74 | 0 | M | 941 | 913 | 55 6 | 5 |

Current Page No : 1 Total Page No : 7 Zoom Factor Page Width

Parameters Exit

Fig. 225

| Driver | | All Pens | 0 | 0-10 | 10-20 | 20-30 | 30-40 | 40-50 | 50-60 | 60-100 | 100+ |
|---|---|---|---|---|---|---|---|---|---|---|---|
| <BLANK> | | | 2 80 | 2 80 | 4 20 | 4 90 | 2 80 | 3 50 | 2.80 | 13 99 | 62 24 |
| | Totals: | 143 | 4 | 4 | 6 | 7 | 4 | 5 | 4 | 20 | 89 |

Parameters View Report

Main Report

LEXTRON FEEDLOT

Lextron Feeders
Slick Time Analysis
From 6/4/2005 to 6/5/2005

7/20/2005 - 9:00:46AM

| | Total | Not | Pens Slick Times / Percent of Total Pens | | | | | | | | | | | | |
|---|---|---|---|---|---|---|---|---|---|---|---|---|---|---|---|
| Date | Pens | Slick | 18 | 19 | 20 | 21 | 22 | 23 | 24 | 1 | 2 | 3 | 4 | 5 | 6 |
| 6/04 | 142 | 0 | 0 | 0 | 0 | 0 | 0 | 0 | 0 | 0 | 0 | 0 | 0 | 0 | 0 |
| 6/05 | 142 | 0 | 0 | 0 | 0 | 0 | 0 | 0 | 0 | 0 | 0 | 0 | 0 | 0 | 0 |

824

Current Page No.: 1 Total Page No.: 1 Zoom Factor: Page Width

Parameters Exit

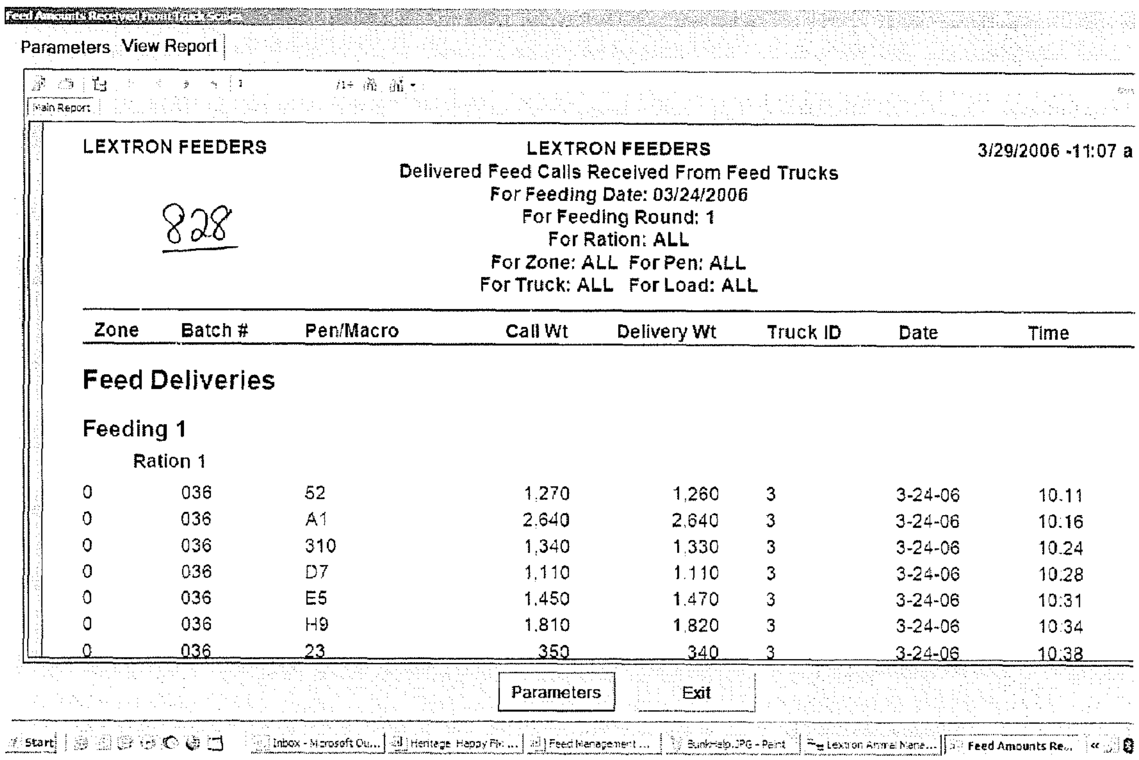

Feed Amounts Received From Truck Scales

Parameters View Report

Main Report

LEXTRON FEEDERS

828

LEXTRON FEEDERS
Delivered Feed Calls Received From Feed Trucks
For Feeding Date: 03/24/2006
For Feeding Round: 1
For Ration: ALL
For Zone: ALL For Pen: ALL
For Truck: ALL For Load: ALL 3/29/2006 -11:07 a

| Zone | Batch # | Pen/Macro | Call Wt | Delivery Wt | Truck ID | Date | Time |
|---|---|---|---|---|---|---|---|

Feed Deliveries

Feeding 1

Ration 1

| Zone | Batch # | Pen/Macro | Call Wt | Delivery Wt | Truck ID | Date | Time |
|---|---|---|---|---|---|---|---|
| 0 | 036 | 52 | 1,270 | 1,260 | 3 | 3-24-06 | 10.11 |
| 0 | 036 | A1 | 2,640 | 2,640 | 3 | 3-24-06 | 10:16 |
| 0 | 036 | 310 | 1,340 | 1,330 | 3 | 3-24-06 | 10:24 |
| 0 | 036 | D7 | 1,110 | 1,110 | 3 | 3-24-06 | 10:28 |
| 0 | 036 | E5 | 1,450 | 1,470 | 3 | 3-24-06 | 10:31 |
| 0 | 036 | H9 | 1,810 | 1,820 | 3 | 3-24-06 | 10:34 |
| 0 | 036 | 23 | 350 | 340 | 3 | 3-24-06 | 10:38 |

Parameters Exit

Start Inbox - Microsoft Ou... Heritage Happy Fk ... Feed Management ... Bunkhelp.JPG - Paint Lextron Animal Mana... Feed Amounts Re...

Fig. 231

| Zone | Pen # | DOF | Head Count | Ration Amount | Delivery Audit Information |
|---|---|---|---|---|---|
| | 101 | 76 | 68 | 450 | |
| | 105 | 32 | 27 | 130 | |
| | 302 | 129 | 230 | 4,340 | |
| NULL | 102 | 50 | 73 | 710 | |
| NULL | 103 | 48 | 98 | 1,070 | |
| | 304 | 201 | 239 | 3,860 | |
| NULL | 104 | 16291 | 94 | 270 | |
| | 316 | 146 | 175 | 3,250 | |
| | 406 | 123 | 118 | 2,030 | |
| | 412 | 284 | 223 | 4,060 | |
| NULL | 106 | 56 | 74 | 1,370 | |
| | 414 | 91 | 223 | 4,000 | |
| | 416 | 71 | 236 | 4,410 | |
| NULL | 108 | 225 | 51 | 950 | |
| | 504 | 147 | 281 | 5,330 | |

836

Parameters View Report

Main Report

LEXTRON FEEDLOT

Lextron Feeders
Projected Production
For Date: 6/6/2005
For Feedings: ALL
For Rations: ALL
For Rtn Groups: ALL
For Zones: ALL
For Sex: ALL 7/20/2005 - 9:15 am

| Ration Code | Feeding | Amount |
|---|---|---|
| 15 | 1 | 3,300 |
| | 2 | 3,310 |
| | Total for Ration 15 | 6,610 |
| 2 | 1 | 8,750 |
| | 2 | 8,730 |
| | Total for Ration 2 | 17,480 |
| 26 | 1 | 49,480 |
| | 2 | 49,490 |
| | Total for Ration 26 | 98,970 |
| 3 | 1 | 3,760 |
| | 2 | 3,760 |

Current Page No.: 1 Total Page No.: 1 Zoom Factor: Page Width

Parameters Exit

CATTLE MANAGEMENT SYSTEM AND METHOD

CROSS-REFERENCE TO RELATED APPLICATION

This Application is a continuation-in-part application of U.S. patent application Ser. No. 11/228,020, filed on Sep. 14, 2005, entitled "Cattle Management System and Method", which claims the priority of U.S. Provisional Application No. 60/609,914 filed on Sep. 14, 2004, the entire disclosures of which are hereby incorporated by reference.

FIELD OF THE INVENTION

The present invention relates to the management of animals such as cattle during the production life cycle of the cattle, and more particularly, to processes and data management systems that allow management of cattle on an individual basis from the time an animal is born until the animal is slaughtered.

BACKGROUND OF THE INVENTION

Automation in the cattle industry has been established by various cattle management systems that track cattle at various stages within a production cycle. These systems have been developed in response to economic factors in the industry demanding more efficient and cost effective cattle management. In these systems, data is gathered and processed to allow cattle industry personnel to improve their return on investment.

One prior art example of a cattle management system is disclosed ill the U.S. Pat. No. 5,673,647. This reference specifically discloses an automation system for individual animal electronic identification, measurement and value based management of cattle in a feed lot operation. The invention utilizes a computer system integrated with automatic individual animal identification, multiple measurement and remeasurement systems, and a cattle handling and sorting system. Animals are individually identified and measured by weight, and external dimensions and characteristics of internal body tissue are taken. This information is coupled with animal physiological characteristics and historical data allowing the calculation of an optimum slaughter weight, economic endpoint, and marketing date for shipment to a packing plant. After measurement, individual animals are sorted in response to calculations from the measurements. The computer system also calculates each animal's share of total feed intake for the animal's feed group. The computer system stores individual animal measurement, performance and location data, which is used by feed lot management to select animals for shipment from the feed lot for slaughter at the optimum time. Following an animal shipment to a slaughter facility, the identification in the computer system is used to correlate live animal physical characteristics and performance data to the measured and evaluated carcass characteristics data obtained through the slaughter process. Accordingly, a database can be built to more accurately identify and measure value based characteristics and subsequent animals produced and fed for more effective value based selection and management of the animals.

While this reference may disclose a cattle management system for a feed lot operation, the feed lot operation is but just one operation which is included within the overall production life cycle of cattle. More broadly, the cattle industry can be conceptually broken down into two major components, namely, producers and feed lots. The cattle producers include ranch operations that maintain cow herds. The herds produce calves that are raised and typically fed on pasture grazing land. The calves are allowed to reach a certain maturity, and the next phase in cultivation of the cattle is transfer to a feed lot where they are fed on grain and other products until they reach an optimum size for slaughter. Prior to transfer to a feed lot, cattle may also be transported to grower operations where the cattle undergo intensive management for achieving desired growth. The feed lot can be considered a final processing phase prior to slaughter where not only do the animals achieve optimum size for slaughter, but also are closely monitored for diseases or other physical ailments which would prevent them from being timely slaughtered.

Recently, proposed reporting requirements have been developed in the form of a federal unique animal identification and premise identification program. Although this program has not become formalized in federal or state regulations, it is anticipated that the proposed federal program will require that each animal be individually identified by a unique animal identifier which will be used to track each animal from farm to market and market to slaughter. Additionally, identification programs may require a premise identifier for purposes of identifying the premise of origin wherein each production unit (e.g., each ranch operation) would be assigned a unique identifier. Accordingly, the premise number and animal number could be used to record and track all aspects of a production cycle for each animal. This nationwide animal identification system has been primarily prompted by a concern over increased animal disease outbreaks around the globe and public interest in developing an identification program for protecting animal health.

Therefore, a need has developed for a comprehensive data management system where data can be gathered and processed concerning not only the economic factors important to determining return on investment, but also for complying with proposed regulations concerning animal health. More specifically, in order for compliance to be achieved with respect to a national unique animal identification reporting program, a system must exist that provides absolute certainty in identifying an animal during any stage of its production life cycle, thereby necessitating that animal identification be achieved without loss of identification through a tagging device that becomes inadvertently separated from the animal. There are many cattle tagging systems in existence that rely on external or internal tagging devices that can be verified visually or by an electronic reading device. For example, an RFID tag may be attached externally or internally to an animal; however, this type of tagging device can become separated from the animal thereby resulting in the inability to continuously monitor the particular animal.

There is also a need for an integrated data processing system that is based upon centralized storage of information about animals to be monitored, thereby allowing various personnel in the cattle industry to more easily access, transfer and process the data. Currently, many prior art systems incorporate data gathering at various levels in the production cycle of an animal. Data transfer is made more difficult in these systems since data is generated and stored at many different locations and in many different formats. In other words, information gathering and processing is currently very compartmentalized wherein each feed lot, grower, or producer may have their own identification system that does not allow for easy import or export of data.

SUMMARY OF THE INVENTION

In accordance with the present invention, a data processing system is provided that allows for data gathering, transfer and processing throughout the entire production cycle of individual animals. Some significant functionality of the present system includes the ability to track the location of each individual animal by utilizing unique identification data for each animal, recording all monitored events that take place at each location during the animal's production cycle, and reporting the events and locations as required to government entities, financial institutions, and other entities within the cattle industry. Additional functionality of the present system includes the ability to send and receive location and event data concerning each animal between the data processing system of the present invention and external data processing systems at any phase during an animal production cycle. The ability to achieve the above functionality is enhanced by incorporating storage of information either at feedlot locations, or at a single central database. For example, the location history, treatment history, processing history, and any other significant events that are experienced by the animal can be recorded by the present invention and stored either at feedlot locations or at a central database to accommodate necessary data transfer or manipulation.

The data entered into the system can be achieved on a multiple facility basis, and unique reports can be generated at each level or facility based upon parameters chosen for reporting.

The data processing of the present invention includes a computer software program that can be conceptually broken down into two main modules or sections. The first module is referred to herein as the cow/calf module or ranch module, and the second module is referred to as the grower/feed lot operation module. The grower/feed lot module can be further broken down into various sub-modules including animal health, feed management, animal inventory, drug/commodity inventory, data file maintenance, data interfaces, and data reporting.

Although the present invention contemplates various known methods for tagging an animal, the preferred method is to incorporate retinal imaging identification. As understood by those skilled in the art, retinal imaging systems exist that provide reliable identification through retinal scanning as each animal has a unique retinal pattern serving the basis for absolute identification. One company that provides retinal imaging solutions for the cattle industry is Optibrand Ltd., LLC of Fort Collins, Colo.

In the cow/calf module of the present invention as discussed further below, data is generated, stored, manipulated and transferred based on basic activities occurring at a cow/calf operation. Each of these activities involves actions of an individual animal or groups of animals. These activities can be summarized as follows:

a. Cattle receiving—This term refers to animals being brought into a particular cow/calf operation periodically for various reasons such as to increase a particular herd, modify particular characteristics of a herd, etc.

b. Inventory receiving—This term refers to the receipt of various supplies including medication, equipment, and the like that are used in a cow/calf operation. Receipt and use of these supplies at least requires an inventory function, and may also require tracking of how the supplies are administered to cattle, particularly with respect to medications.

c. Processing—This term refers generally to the standard or routine actions that take place with respect to introduction of an animal to the herd either through a new birth, or transfer of cattle into an existing herd. Examples of standard actions that occur within processing include installation of an animal marker (such as a visual tag, RFID tag, retinal scanning, etc.), separation of animals into herds, and initial physical exams.

d. Treating—This term refers to preventive or remedial actions taken to return an animal to normal health. Accordingly, treatment would include administration of various medications, procedures performed by a veterinarian, etc.

e. Moving—This term refers to the sorting of cattle within a particular pen or pasture that occurs over time to group and separate animals as necessary based upon growth progress, health, and other factors.

f. Birthing—This term refers to a birth of calves.

g. Pregnancy checks—This term is self explanatory and although can be considered a subset of treating, pregnancy checks are a standard procedure that can be distinguished from treating.

h. Breeding—This term is self explanatory and generally refers to actions taken with respect to preparing animals for, and conducting breeding.

i. Feeding—This term refers to all activities associated with feeding the animals to include monitoring inventory for feed provided to animals, and the types of feed provided to animals.

j. Shipping—This term refers to the actions taken to move an animal from a cow/calf operation to a grower/feed lot operation.

With respect to the grower/feed lot module of the present invention as also discussed further below, there are also certain general actions/activities that occur for which data is generated, stored, manipulated and transferred. These activities are summarized as follows:

a. Cattle receiving—This term refers also to animals being brought to a particular feed lot or grower after the animal has been shipped from a cow/calf operation. Detailed data entries occur for this activity to record the type of animal received, its weight, the owner, and other pertinent data.

b. Inventory receiving—This term refers also to the receipt of various supplies including medications, equipment, tagging devices, and other materials that are used at a grower or feedlot. Receipt and use of these supplies requires an inventory function, to include recordation of how and when particular medications are administered to cattle.

c. Processing—This term refers generally to the standard or routine actions that take place with respect to introduction of the animal into a particular pen or lot within the grower/feedlot. One standard action that occurs within processing here is an initial physical examination and tagging the animal with another identifier.

d. Treating—This term again refers to preventive or remedial actions taken to return an animal to normal health.

e. Calling—This term refers to the act of requesting a certain amount and type of feed to be delivered to a particular bunk or location within the grower/feed lot. This calling function can be generated by an existing bunk reader system that generates a feed order based upon the number and type of animals within a particular pen and lot.

f. Batching—This term refers to the act of preparing feed and feed additives, medications, and other nutritional supplements to be delivered in response to a call.

g. Feeding—This term refers to all activities associated with feeding animals to include monitoring inventory for feed provided to the animals, and types and amounts of feed provided to the animals, among other information. This term may overlap with the functions of calling and batching.

h. Shipping—This term refers to the act of moving cattle from the particular grower/feed lot location to a slaughter house.

BRIEF DESCRIPTION OF THE DRAWINGS

FIG. 7 is a table providing examples of preassigned criteria;

FIGS. 93-137 illustrate example reports that may be generated from data recorded in the data processing system and particularly pertaining to the animal health sub-module and animal inventory sub-module.

FIG. 141 is a user screen for selecting macro ingredients to be displayed on load cards/feed sheets;

FIGS. 155 and 156 illustrate the detailed feeding history tabs form the bunk reading input screens;

FIG. 164 is a post feed by pens screen allowing a user to manually post fed amounts to committed feed calls;

FIG. 165 is a global feeding change screen allowing a user to globally change a selected group of feedings;

FIG. 166 is a bunk reading night screen allowing a user to enter slick times;

FIG. 167 is a bunk reading action assignments screen allowing a user to set designated actions to be scheduled for selected pens;

FIG. 168 is a supplemental ration assignment screen allowing a user to call a supplemental feed ration;

FIG. 169 is a mass ration change screen enabling a user to globally change a called ration code;

FIG. 170 is a post feed by loads screen allowing a user to manually post delivered feed amounts and loaded feed amounts for each load delivered;

FIG. 171 is a user screen for notifying a user that a ration change has been scheduled which may affect a calculated withdrawal time;

FIG. 172 is a user screen showing another notification to a user that a ration change has been scheduled;

FIG. 173 is a user screen showing a general notification on a bunk reading input screen regarding use of a ration with a withdrawal requirement;

FIG. 174 is a cattle shipments screen showing a warning to the user that selected cattle cannot be shipped as scheduled because of a withdrawal requirement;

FIGS. 175-194 illustrate various parameter selection screens and reports generated from the selected parameters relating to table values used in the feed management submodule;

FIGS. 195-214 illustrate various parameter selection screens and reports generated from the selected parameters relating to feed delivery functions;

FIGS. 215-229 show additional parameter selection screens and feed management reports generated from the selected parameters including various feed analysis reports that assist management in the analysis of animal performance and the effectiveness of the feed delivery process;

FIGS. 230-236 show yet additional parameter selection screens and reports generated form the selected parameters including other reports that detail information associated with delivery of feed to pens at a selected facility.

DETAILED DESCRIPTION

I. System Overview

Figure 1:
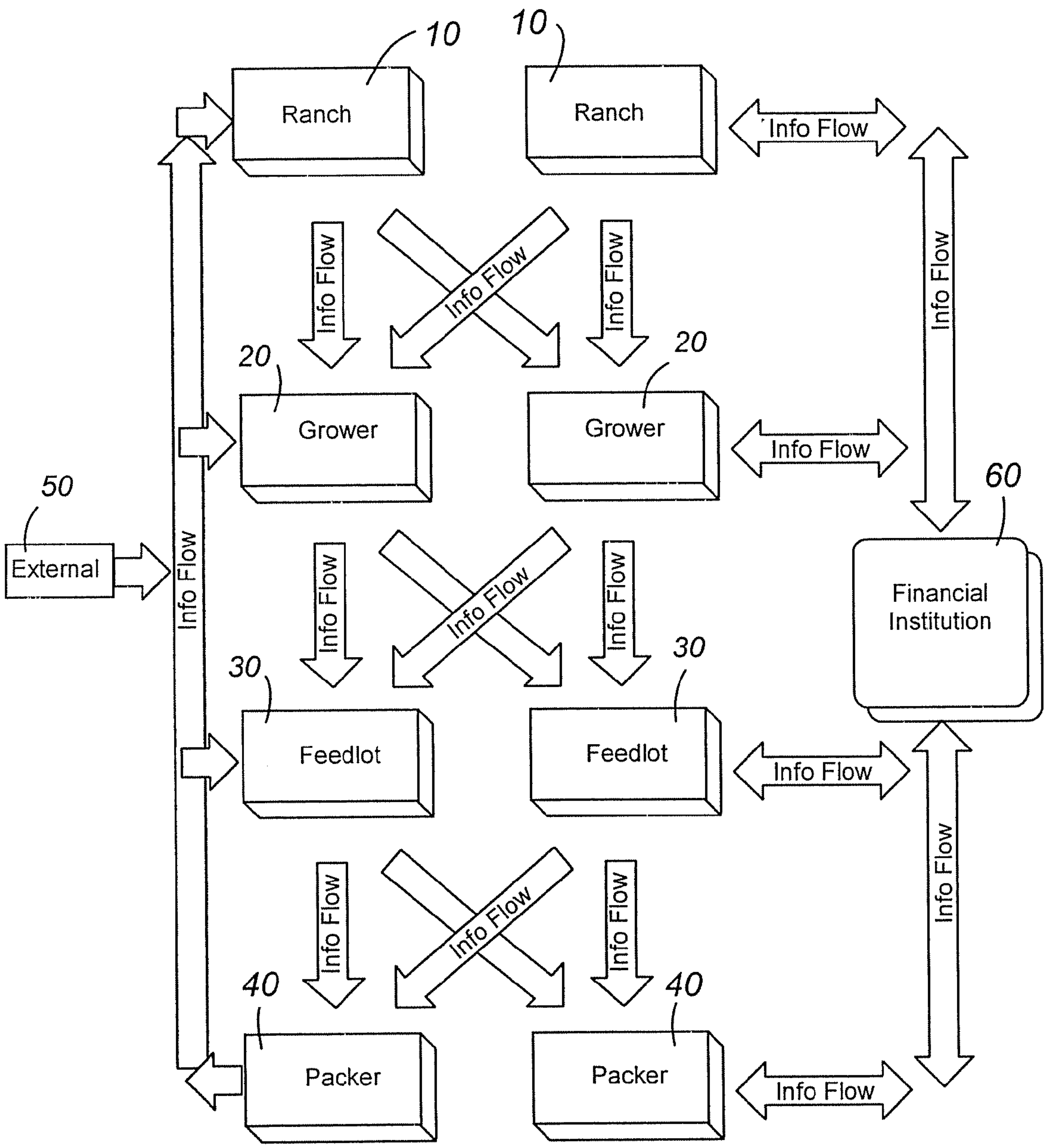
FIG. 1 is an information flow diagram illustrating basic flow of information within the data processing system of the present invention.

FIG. 1 is an information flow diagram showing the basic flow of information within the data processing system, and the organizations that generate, transfer and receive information. Beginning with a ranch or cow/calf operation 10, information is generated and may be transferred to one or more intermediate grower operations 20. The growers generate and transfer information to the feedlots 30. The feedlots 30 generate and transmit information to the packers 40. Information may also be generated and transferred from external sources 50 and integrated within the information that is created, stored, and transferred in each level between the ranch operation and the packers. For example, the external source 50 could generate information regarding new animals brought into a particular herd from a third party source. As also shown in FIG. 1, information transferred between ranchers, growers, feed lots and packers does not necessarily travel between exclusive associations or relationships; rather, ranchers will periodically transact business with various growers, growers will transact business with various feed lots, and feed lots will transact business with various packers. As also shown in FIG. 1, a corporate entity 60 is shown which may have an interest in receiving and transmitting data to the various organizations. A corporate entity could include those which track performances of feed lots or ranches, or the corporate entity could be a financial institution that calculates return on investment for a particular feed lot, grower or packer.

Figure 2:
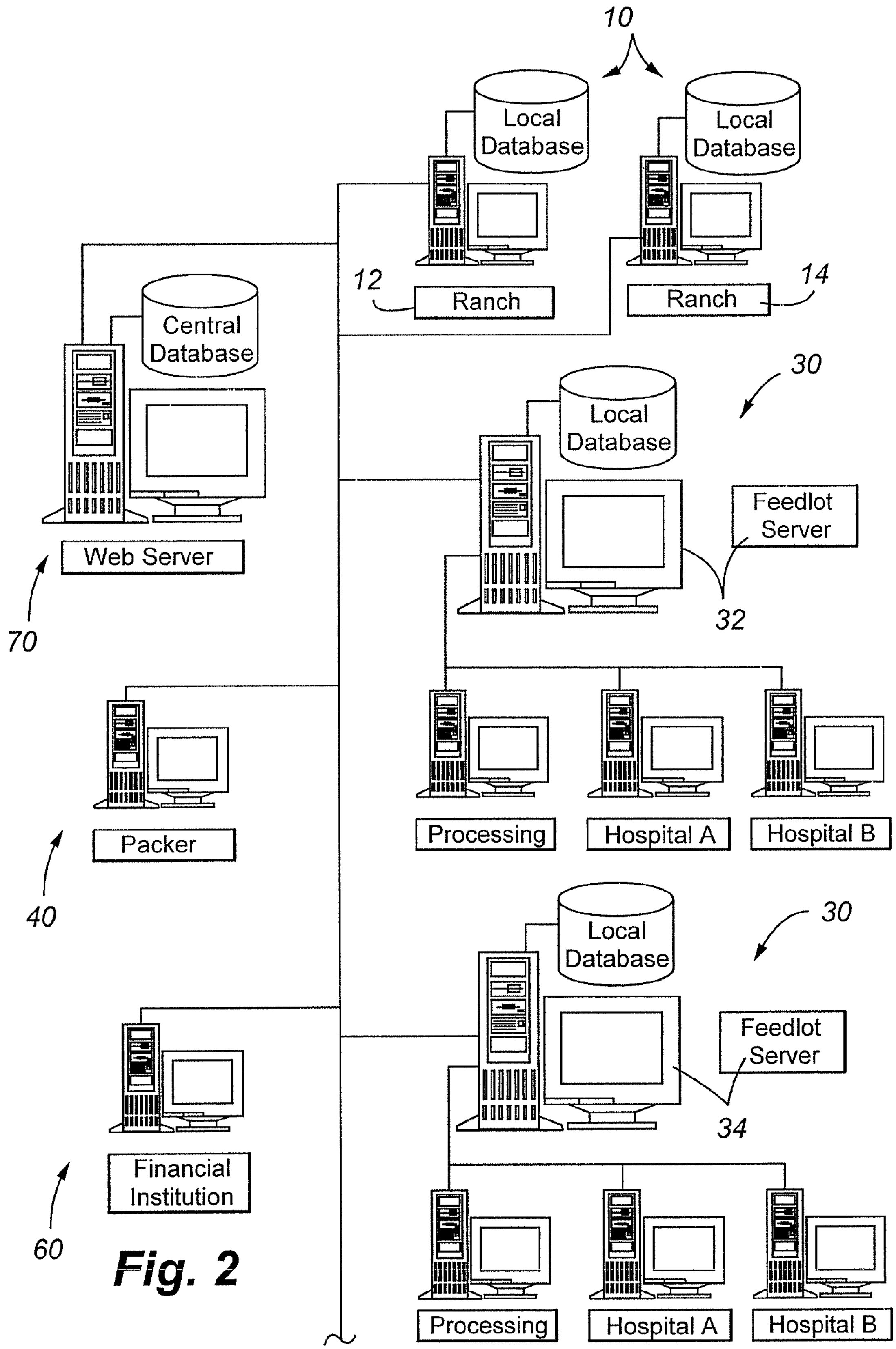
FIG. 2 is a simplified schematic diagram illustrating an example of implementation of the data processing system of the present invention within various organizations.

FIG. 2 is a simplified schematic diagram illustrating one example of how the data processing system of the present invention may be incorporated within various organizations of the system. Two ranch operations 10 are illustrated, namely, ranch 12 and ranch 14. Each of the ranches would have a sufficiently powerful computer and local databases for running of the cow/calf module. As discussed further below, the cow/calf module is specifically designed to collect all data associated with breeding, birth and processing operations at a ranch location. The cow/calf module can be considered a stand alone herd management tool, and the cow/calf module can be interfaced with the grower/feed lot module. Two feed lot operations 30 are illustrated, namely, feed lot 32 and feed lot 34. Each of the feed lots may include their own server and local database(s) for storage of data generated in the grower/feed lot module. Within the feed lots, various other computers may be found which input data directly into the database(s) at the local servers. For example, each of the feed lots 32 and 34 are shown as including discrete work stations within the feed lot which directly input information to the local database. These workstations include a processing station, hospital A and hospital B. These stations would not have their own databases, but rather would directly update the local database found at the local server. FIG. 2 also illustrates other organizations within the system to include a packer 40 and a financial institution 60. These organizations are also shown without databases since they would simply request data from the local servers at the feed lots, or transfer data to the local servers.

FIG. 2 also illustrates the use of a web server 70 which includes its own central database. It may also be desirable to have a web server with a central database which would ultimately serve as the single repository for storage of data within the system. Thus, if a web server was used, the local servers at the feedlots could temporarily store data until it was transferred to the central database. Accordingly, each of the organizations within the system would then access data from the central database as opposed to accessing data at each of the separate local servers. In some circumstances, incorporating a central database at a web server may better facilitate the ability to more efficiently store and update system information, as well as enhance the ability to transfer data to multiple organizations.

Referring again to FIG. 2, in lieu of the web server 70 being a central repository for storage of data, the web server 70 could simply act as a secure Internet FTP server which would provide a secure means of data transfer between organizations in the system, and transferred data is only resident on the server 70 while being transferred between the systems and then removed when the data transfer is complete. Thus, the web server 70 could simply be an Internet FTP site.

Figure 3:
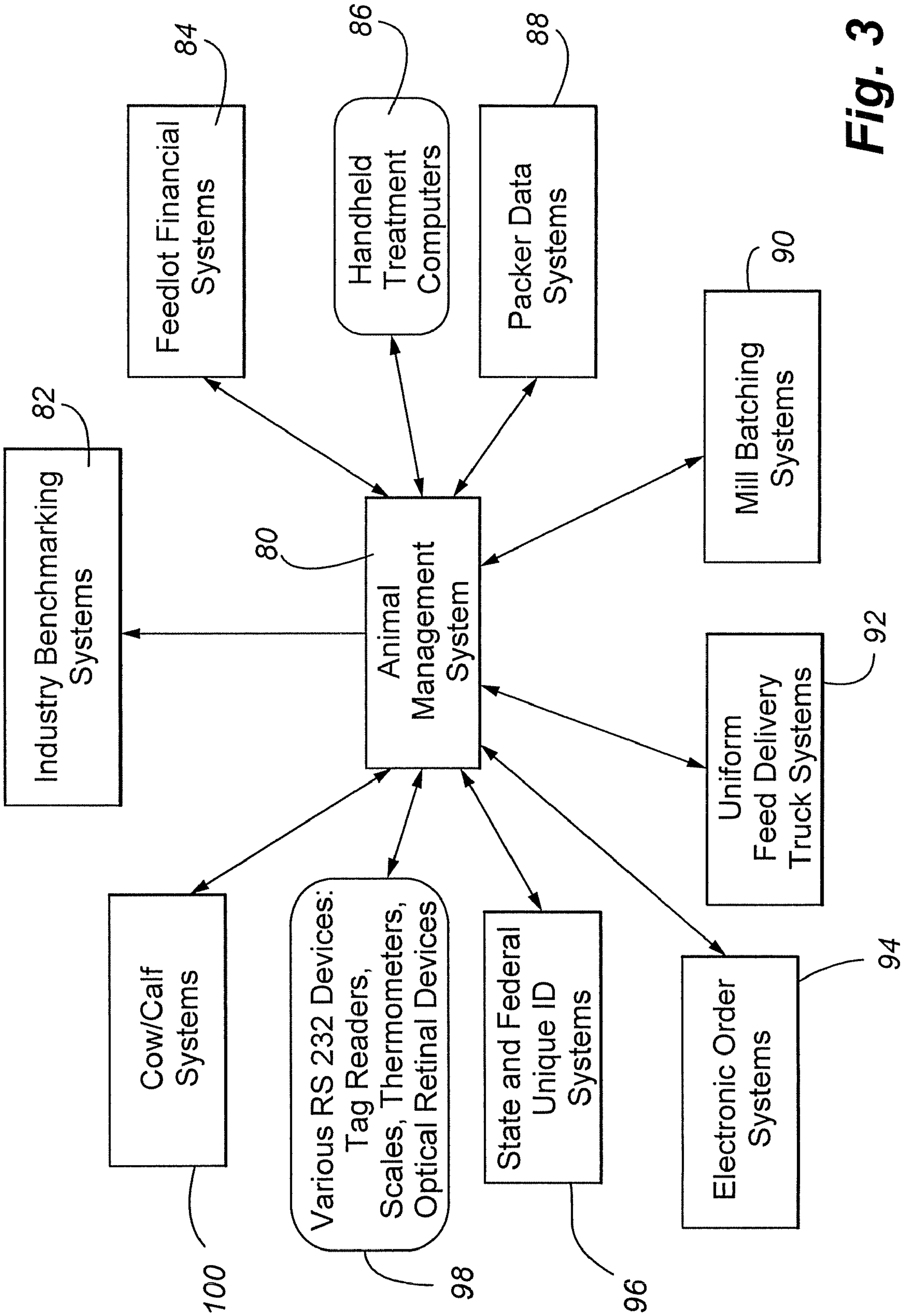
FIG. 3 is a schematic diagram illustrating external information systems that may interface with the data processing system of the present invention.

Another important aspect of the present invention is its ability to interface with various other information systems and data acquisition equipment for data entry into the system. Referring now to FIG. 3, a schematic diagram is provided to illustrate some example external information systems that may interface with the data processing system of the present invention. System 80 of the present invention is described as an animal management system which interfaces with a great number of external information systems to include industry bench marking systems 82, feed lot financial systems 84, hand held treatment devices 86, packer data systems 88, mill batching systems 90, uniform feed delivery truck systems 92, electronic ordering systems 94, state and federal unique ID systems 96, various RS 232 devices 98, and cow/calf systems 100. The methods of data transfer between the animal management system 80 and the outside systems can be recording media (such as CD's, diskettes, etc.), Internet FTP, Intranet, and various network configurations such as wide area and local networks as further discussed below.

Cow/calf systems 100 refers to third party cow/calf systems which may be similar to the cow/calf module of the present invention, specifically designed for animal management at a ranch location. Typically, cow/calf systems 100 are stand alone computer systems that are installed and run at each separate ranch location. These systems record all sire and dam data along with recording all calves born at the ranch location. These systems also record all treatment of calves while at the ranch location. These systems also may be designed to analyze herd data and assist ranch management in detailed herd management functions. The herd management function may be designed to receive data associated with feeding, treatment and packer production from other systems and supply reporting that will assist ranch management in fine-tuning its breeding programs for better return on investment. Typical interface methods for a cow/calf system may include recording media or transfer by Internet FTP. With all interfaces incorporated within the present invention, the preferred method of transfer is a secure Internet FTP server. For most cow/calf systems, the secondary method of transfer would likely be recording media such as optical disks, magnetic disks, or other similar mass storage devices. In terms of a data format during transfer, one convenient protocol would be for storage of the data in a flat ASCII file format. The data can then be reconfigured within the feedlot servers or web server as desired based upon the type of resident databases which may be found in each location.

A uniform feed delivery truck system 92 includes those truck based computer systems that control the uniform delivery of feed to a feed bunk. These systems control the amount and rate the feed is dispensed from the feed truck based upon a previous call from each feed bunk. The animal management system of the present invention can send data to the delivery truck system to include information such as ration codes, ration call amounts, bunk locations, and other bunk specifications which dictate the delivery of feed to the feed bunks. The feed truck systems in turn record the actual amounts of ration delivered to the feed bunk to include truck identification and driver identification. The preferred method of data transfer between the system of the present invention and the feed delivery truck systems would be through a radio frequency connection that utilized a network or radio modem. Secondary methods of data transfer could be use of any type of recording media.

A hand held treatment device 86 is a remote device that is designed to record certain transactions associated with the animal health module of the present invention without a direct connection to the database of the system while recording the transaction. These types of hand held computers record individual animal treatments, processing and individual animal receipt transactions. Data validation tables along with active animal identification data are downloaded to these hand held computers prior to use, and then recorded transactions will be uploaded to the database of the present invention and posted to the database. The preferred method of data transfer between the invention and the hand held computer would be through a network protocol utilizing a radio frequency connection, a Blue Tooth protocol or a cable connection. The cable connection could be a number of known connections such as RS232/USB connections. A secondary method of transfer could include use of recording media.

Mill batching systems 90 are computer systems that control ration mixing equipment located at a feed mill. These systems select ration formulas and batch sizes to be mixed by the mill equipment. The present system can transfer data to the mill batching systems in summary or detailed levels. A summary level would simply transfer a particular ration code and total call amount to the batching system, and the batching system would comply with batching amounts in the size and content as requested. The actual batch content for each ration would be transferred back to the system from the batch control system. At a more detailed level, transfer could be obtained for truck batch identification numbers, batch sizes, pens to deliver and batch ingredient content to the mill batching systems, and the actual batch ingredient amounts along with batch identification would be returned to the system. The preferred method of data transfer between the present system and the batching system would be through network protocol utilizing a radio frequency connection or a cable connection. A secondary method of transfer could be use of any recording media.

Feedlot financial systems 84 refer to the various industry specific financial control computer systems. The data processing of the present invention sends data associated with cattle inventory, animal healthcare data and animal feeding data to these financial control systems. The data processing system then can receive certain selected data elements associated with groups of cattle and individual animals from these financial control systems. The preferred method of data transfer would be through network protocol utilizing a radio frequency connection or a cable connection. Secondary methods of data transfer could be use of any recording media.

Packer data systems 88 refer to packer production data files from packers in the form of files that contain production data identified by the unique animal identification numbers. The present system posts this production data to individual animal records in the databases of the present invention. This production data can in turn be used to analyze individual animals or groups of animals for return on investment, producer evaluation, and buyer evaluation or can be interfaced back to a cow/calf system to assist the ranch manager with herd evaluation or return on investment. The preferred method of data transfer or packer data systems would be through a secure Internet FTP server. A secondary method of transfer could be use of any type of recording media.

State and federal unique ID systems 96 refer to data transfer between the present system and those federal and state entities which may require unique animal identification data and unique premise data. The present invention would have the capability to transfer unique animal ID's along with premise ID's, as well as certain activities associate with each animal to the various state and federal agencies requesting information on individual animals and individual locations. The preferred method of data transfer between the present invention and the various state and federal agencies would be through a secure Internet FTP server. The secondary method of transfer could be any recording media.

For industry benchmarking systems 82, the present invention has the capability to send individual animal data that contains treatment, feeding and production data to the various industry benchmarking systems. Industry benchmarking systems 92 refer to those which analyze data from feed lots to determine basic productivity/profitability of organizations within the industry. The preferred method of data transfer between the benchmarking systems and the present invention would be through a secure Internet FTP server. A secondary method of transfer could be any type of recording media.

The electronic order systems 94 refer to those outside ordering systems which allow automatic generation of supply orders to fulfill the supply needs of a particular location such as a ranch or feed lot. The present invention would automatically transfer data to the electronic ordering systems based upon current inventory, projected usage, preset order levels, reorder points, and any other criteria set for required stockage of any supplies. The preferred method of data transfer would be through a secure Internet FTP server. The secondary method of transfer could be faxing of generated order documents to a particular order processing group that handles customer orders.

The various RS232 devices 98 refer to field devices such as scales, tag readers, temperature measuring devices, and retinal scanning devices. These devices can be connected to the present data processing system via cables, radio frequency connections, or other connections. The data being recorded by these devices can be passed from a particular terminal location or work station directly into the database(s) of the present invention.

Figure 4:
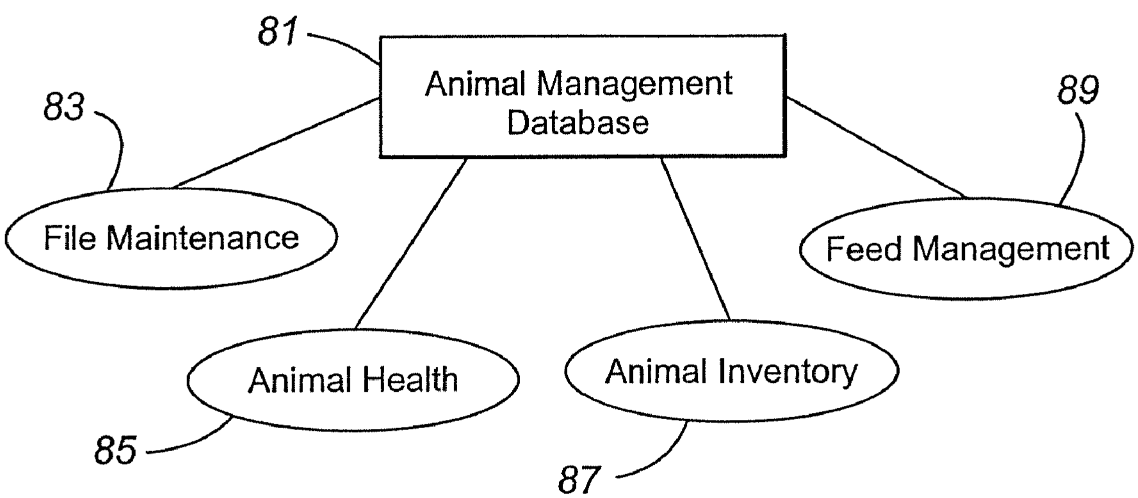
FIG. 4 is a schematic diagram illustrating a central database, and various functional modules that communicate with the central database for data storage, retrieval, transfer, and other functions of the modules.

FIG. 4 illustrates another schematic diagram illustrating one example of how a central database is incorporated within the present invention. As mentioned above, with respect to the web server 70, this central database may reside at the web server, or any of the other local servers of the system that transfer data to and from the various other servers. More specifically, this central database can be incorporated within any one or all of the modules allowing a user to provide data inputs that are then accessible for all functions of the system. In the example, the single or central database is represented as animal management database 81 for the grower feedlot module. Four primary functions of the grower feedlot module are illustrated as being associated with the animal management database, namely, file maintenance 83, animal health 85, animal inventory 87, and feed management 89. All data relating to these four primary functions are stored within the animal management database 81. By use of the single central database, multiple data entries for the same event or data entry is eliminated, and a single data entry can potentially affect any number of module functions assuming the module functions require the data in one or more data fields of the function. For example, when an individual animal is treated in the animal health module and is moved to a hospital pen, a data entry is made which records the animal as being moved to the hospital pen. This data entry can be created in any number of different manners to include an RFID transponder that interrogates the animal's tag and then the transponder communicates with the system for data input of the tag ID. A feed management module feed calculation for the animal's home pen is then affected by the removal of the animal to the hospital pen. That is, the feed calculation is reduced an appropriate amount to account for the absence of the animal at the home pen. The feed calculation function incorporates an algorithm or mathematical expression that requires a daily head count, and the daily head count is determined by analysis of data entries corresponding to the pen locations of the animals. The feed management module feed calculation for the hospital pen is also affected to account for transfer of the animal to the hospital pen, wherein the feed call is increased an appropriate amount to account for the animal arriving at the hospital pen. Accordingly, all cattle activity movements to include full pen or partial pen movements by a single data entry recording the move results in the automatic adjustment of the feed call functions for both the gaining and losing pens.

In order to better understand the present data processing system, a number of user interface displays or screens are provided to show the functionality of the system as it applies to the various tasks which create data entries, transfer data and manipulate data, and which therefore result in the ability to track, monitor, and report on animal management. These displays would typically be provided on a user screen of a computer monitor. The terms "user screen" or "user interface screen" shall be understood to encompass any visual display of data and system information provided to the user.

A conventional user ID and password convention can be incorporated thereby providing each user in the system with specified access to various functions of the data processing system. Therefore, the present invention specifically contemplates preconfiguration of the overall data processing system wherein users at a particular premise location may only have limited access to data generated from other locations. System access is discussed in further detail with reference to FIGS. 76 and 77.

Figure 5:
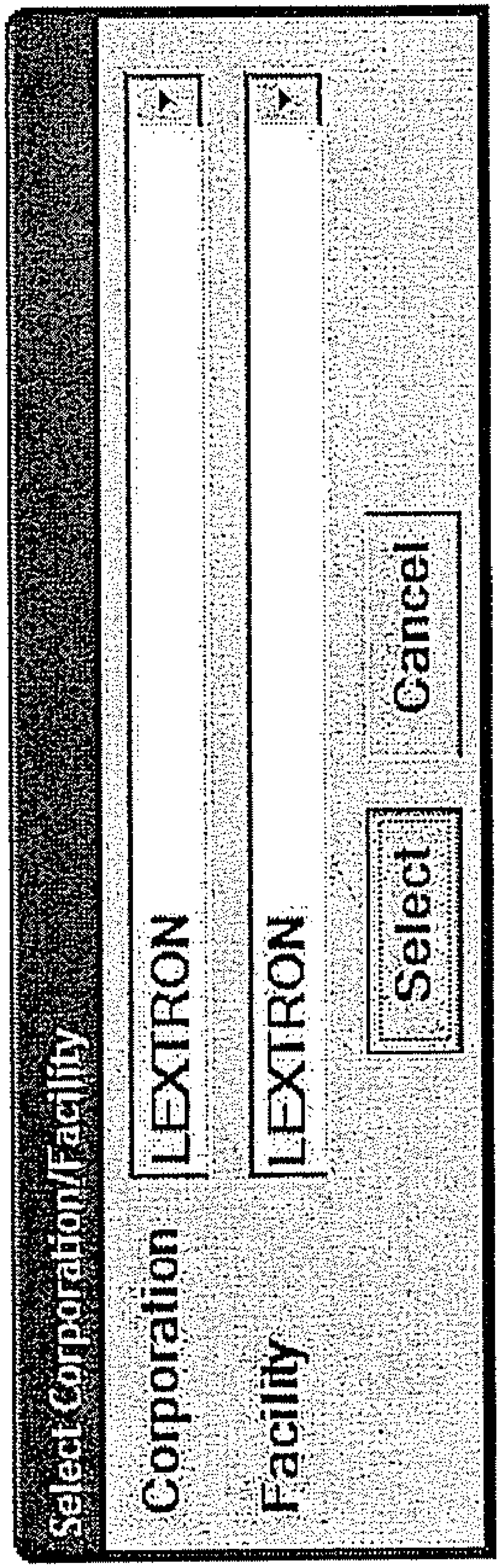
FIG. 5 illustrates a user login screen.

FIG. 5 illustrates a simplified login screen that allows a user to select a particular entity/organization that is going to be addressed and a particular facility within the organization. By selection of a particular organization and facility, the user identifies the particular database to access.

Figure 6:
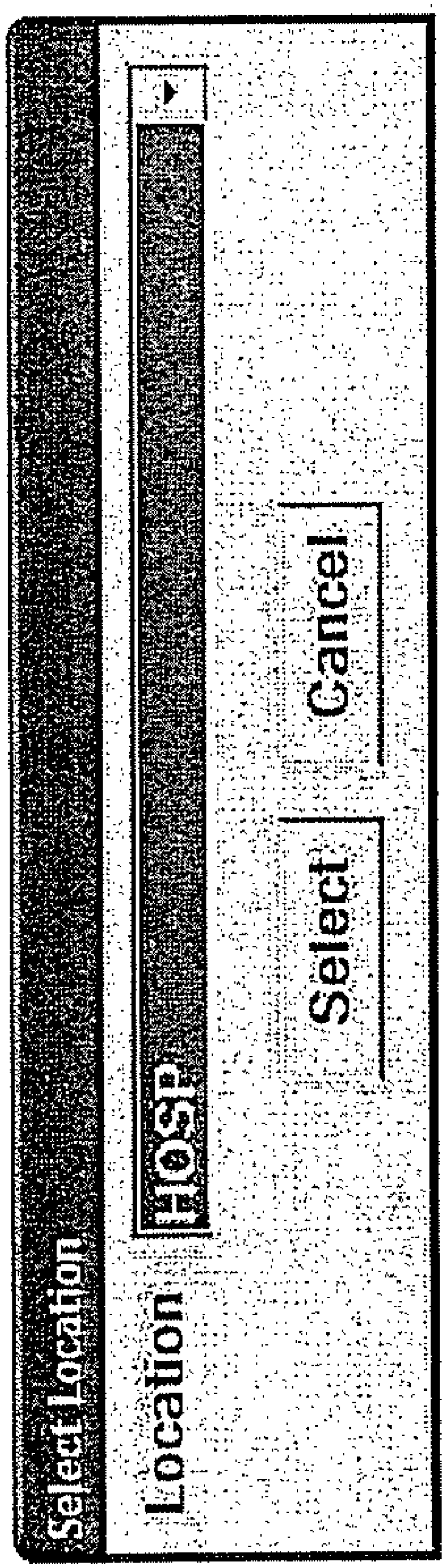
FIG. 6 illustrates a user screen for a particular location within a facility for system access.

FIG. 6 is another screen that allows a user to select the particular location within a facility for system access. There may be multiple locations assigned to a particular facility, each having limited data entry capabilities or system access. For example, a particular location within a feedlot could be a processing station having a weigh scale and a tag reader. This station would therefore have the capability to enter, weigh and tag data. FIG. 6 specifically shows a hospital location.

As mentioned above, it shall be understood that there are many ways in which data can be entered and transferred. One common method is simply an Internet connection from a particular work station/location that communicates with the web server or local servers. However, some locations may have the need to incorporate intermediate data gathering through devices which do not directly interface with a server. For example, with respect to retinal scanning of animals once they enter an inventory, the retinal scanning device may incorporate a hand held unit which creates a digital image of an animal's retina, and then the image is temporarily stored on the hand held device until the image can be downloaded to a nearby work station.

A user can choose to enter data according to preconfigured pull-down menus. Alternatively, the user can choose to manually enter data by keyboard entry. Data can also be entered through integration of remote processing devices, such as the RS 232 devices mentioned above. As a further example, RFID tags are interrogated by a scanner, and the scanner can be interfaced with the present system to allow direct entry of data by the scanner.

One particularly important aspect of the present invention is the ability to manage cattle by production of recommended management actions prompted by previously established logical relationships between data gathered and desired end results. Once a particular relationship is satisfied between the gathered data and the desired end result, the recommended management action can be adopted by the user simply complying with the recommendation action. The recommended action is some form of an instruction such as a message produced for the user to view on a user interface screen, or a message appearing on a printed management report. Thus, the present invention has an active predictive feature that allows cattle managers to proactively manage cattle as opposed to managing only in a reactive manner. For example, within the grower feedlot module, four basic cattle management functions are provided with detailed capabilities, namely, (1) which treatments should be administered to an animal, (2) when the ration assigned to a pen of cattle should be changed, (3) how the assigned ration for a pen of cattle should be distributed during the feeding schedule, that is, when and how the ration should be distributed to the pen of cattle based upon a prescribed feeding schedule and (4) sorting cattle based upon like or similar characteristics among the cattle. These four functions can be conceptually viewed as subroutines within the module. One or more criteria are established which correspond to categories of animal characteristics or other data gathered about an animal or groups of animals for management purposes. The criteria can be stored as a selected list of preassigned criteria. The criteria are used within user defined logic such as algorithms or mathematical expressions. The numerical values of the algorithms/expressions correspond to one or more recommended actions, such as a proposed treatment or a proposed feed ration. Data entered and stored concerning a particular animal is then matched with the pre-assigned criteria, and then a recommended action is provided to the user. Thus, the user-defined logic allows the user to customize the functionality of the system without the need to modify actual computer source code in a software program application. Additionally, the user may modify the list of pre-assigned criteria in order to provide additional options for building needed logic relationships to thereby establish recommended management actions.

FIG. 7 provides an example table of pre-assigned criteria that corresponds to basic characteristics of an animal and other information recorded that may be valuable for purposes of managing cattle. These criteria are used as the variables in building the algorithms/expressions. The criteria may include discrete data elements concerning an animal such as animal weight, and may include algorithms/mathematical relationships applied to data to create custom criteria.

Figure 8:
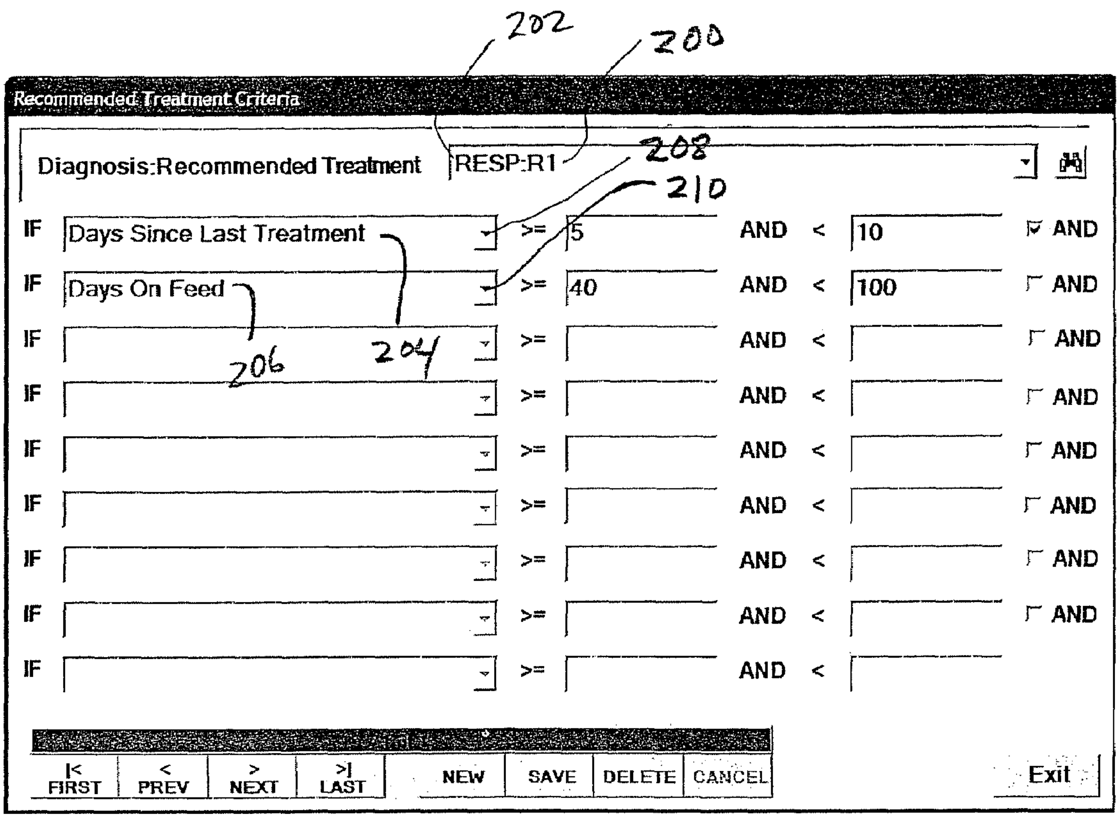
FIG. 8 is a user screen for creation of a recommended treatment based upon one or more criteria.

The ability of a user to set up, modify, and implement the four core functions set forth above is now further explained with respect to FIGS. 8-12. Referring to FIG. 8, a user interface screen is illustrated wherein the user can create a recommended treatment based upon one or more criteria. In the example of FIG. 8, the recommended treatment is designated as R1200. The recommended treatment corresponds to a diagnosis 202 by the attending veterinarian, for example, a respiratory ailment denoted as "Resp". The recommended treatment "R1" 200 is based upon two criteria, namely, the number of days since the last treatment, shown at entry 204, and the number of days on a particular feed ration, shown at entry 206. Pull down menus may be activated by clicking on buttons 208 and 210. The menus then display the available criteria for building the treatment. In the example of FIG. 8, for entry 204, if the number of days since the last treatment is greater than or equal to five and are less than 10, then this particular criteria is met. Additionally, if the number of days on feed is greater than or equal to 40 and less than 100, then this criteria also is met and therefore the recommended treatment is "R1". The system will preload the treatment, and the user can then view details of the treatment. The recommended treatment may include an explanation of how the animal should be treated, along with recommended assigned drugs and dosages. The user can view details of the treatment as necessary on a treatment screen or printed report. The entries 204 and 206 are stored in the central database and are evaluated every time that an animal is treated for a diagnosis of "Resp." Accordingly, since data regarding treatment detail is already stored on the system, the user does not have to reenter treatment details each time the animal is diagnosed. Also, creation of the recommended treatment also assists yard management with standardizing treatments administered to like animals.

Figure 9:
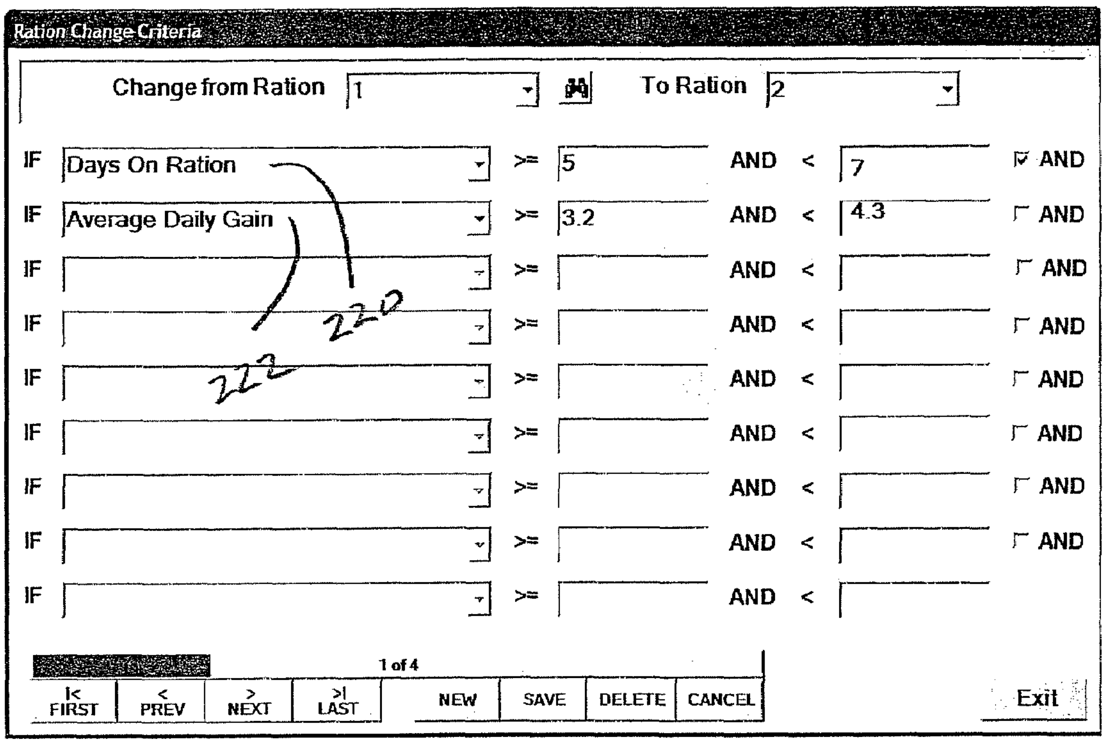
FIG. 9 is a user screen for determining when a ration should be changed based upon one or more criteria.

Referring to FIG. 9, a ration change criteria user interface screen is provided which allows a user to establish recommendations for when a ration should be changed. In the example of FIG. 9, there are two data entries or criteria used to build a rule resulting in a recommended ration change from ration 1 to ration 2. More specifically, data entry 220 corresponds to the number of days on a particular ration, and data entry 222 corresponds to the average daily gain, that is, the average daily gain in weight of the animal. If the two criteria are met, then a recommendation is made to change the ration of the particular animal. Each time that a pen or lot data is displayed on feed call screens or is printed in a report, the recommended changes appear in an alert message that recommends the change. This ration change criteria screen therefore assists yard management in standardizing ration changes based upon similarly performing animals, thereby maximizing potential amount of weight gain for each animal.

Figure 10:
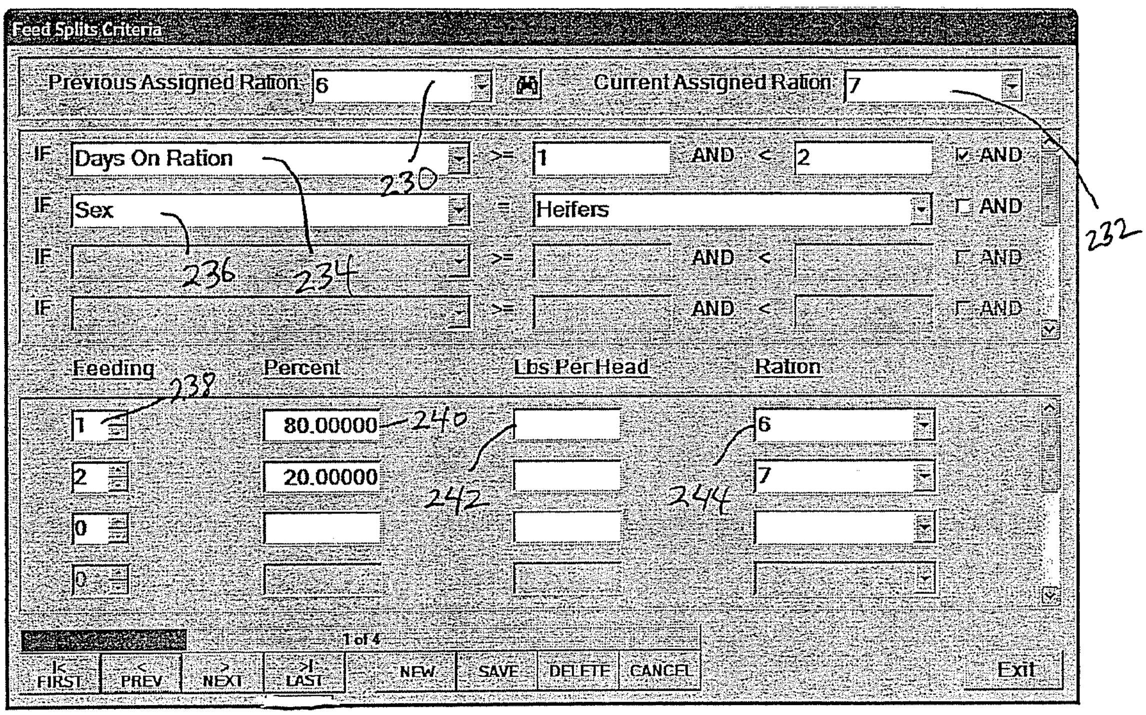
FIG. 10 is a user interface screen for determining how a ration should be fed to one or more animals over a period of time based upon one or more criteria.

Now referring to FIG. 10, a ration change feeding method screen is provided allowing a user to create rules or recommendations regarding how an assigned ration is fed to a group of animals over a period of time. On the upper portion of the screen the previous ration code is provided at block 230 (Change from ration 6), and the new ration code is displayed at block 232 (To Ration 7). If the ration type/code has not changed, then the change from and to rations would show the same ration code. Blocks 234 and 236 are shown as criteria chosen for determining the feed method of a particular animal or group of animals. In the example, the first criteria at block 234 is days on ration, and the second criteria is the sex of the animal. If these criteria are met, then on the first day of the ration change, the recommended feeding method is to feed 80% of the total daily feed in the first feeding of the day, and the remaining portion of the daily feed (20%) in the second feeding of the day. Accordingly, block 238 denotes the particular feeding of the day, and block 240 denotes how much of the total daily feed should be fed at the designated feeding. Block 242 denotes how many pounds of feed should be fed per head, and block 244 indicates which particular type of ration should be fed at which feeding. It is noted that in the first feeding of the day, the old ration (ration code 6) is fed and then in the second feed of the day, the new ration (ration code 7) is fed. On the next day, the proportionate amount of the ration codes could then change to feed more of the new ration code and less of the old ration code. Thus, the feed ration can be tailored to allow a transition period for changing the type of ration. Accordingly, blocks 238, 240, 242, and 244 represent the variables that can be modified in order to establish a recommended feed method corresponding to one or more criteria.

Figure 11:
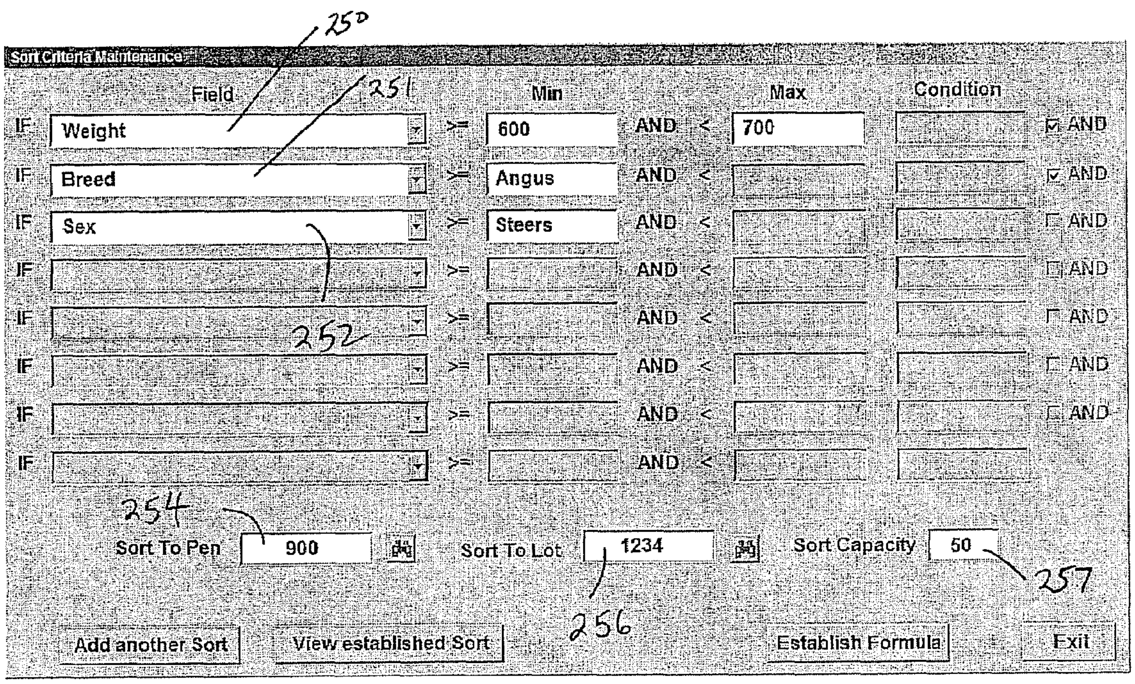
FIG. 11 is a user screen for determining how animals should be sorted based upon one or more criteria.

Referring to FIG. 11, another user interface screen is provided for establishing rules or recommendations for how animals should be sorted. Periodically, a group of cattle are reviewed for how the cattle should be regrouped based upon their most recent performance. In a cattle-sorting operation, it is advantageous to have accurate history on the performance of the animal. With the sort criteria function of the present invention, preset rules or recommendations are provided to a user for sorting like cattle. In the example of FIG. 11, three data entries or criteria 250, 251, and 252 are shown. Criteria 250 is the weight of the animal and if the weight is between 600 and 700 pounds, the first criteria is met. The second criteria 251 is the breed (Angus), and the third criteria 252 is the sex (steers). As each animal is processed through a chute for tag reading purposes or otherwise the animal's tag is read, the system compares the animal's data to the criteria, and if the animal's data matches the algorithms/relationships for the criteria, the system assigns the animal to a new lot and pen. The new pen location is shown at box 254 and the new lot location is shown at box 256. Accordingly, sorting in this manner ensures that animals of like performance will be grouped together thereby easing management of the cattle during their critical growth period. Although a new grouping may be recommended for one or more cattle during the sorting process, original data for each animal is maintained to provide necessary historical data on the particular animal. For example, the original load identification assigned to an animal when they are received into a particular yard is still stored in the system to ensure that identity of each animal can be traced back to the original receiving group of cattle. Block 257 provides a count of how many cattle are sorted to a particular pen and lot versus the actual capacity of the pen/lot location. If the recommended sort count exceeds the capacity, a warning message is provided to the user indicating that the sort criteria should be re-evaluated.

Figure 12:
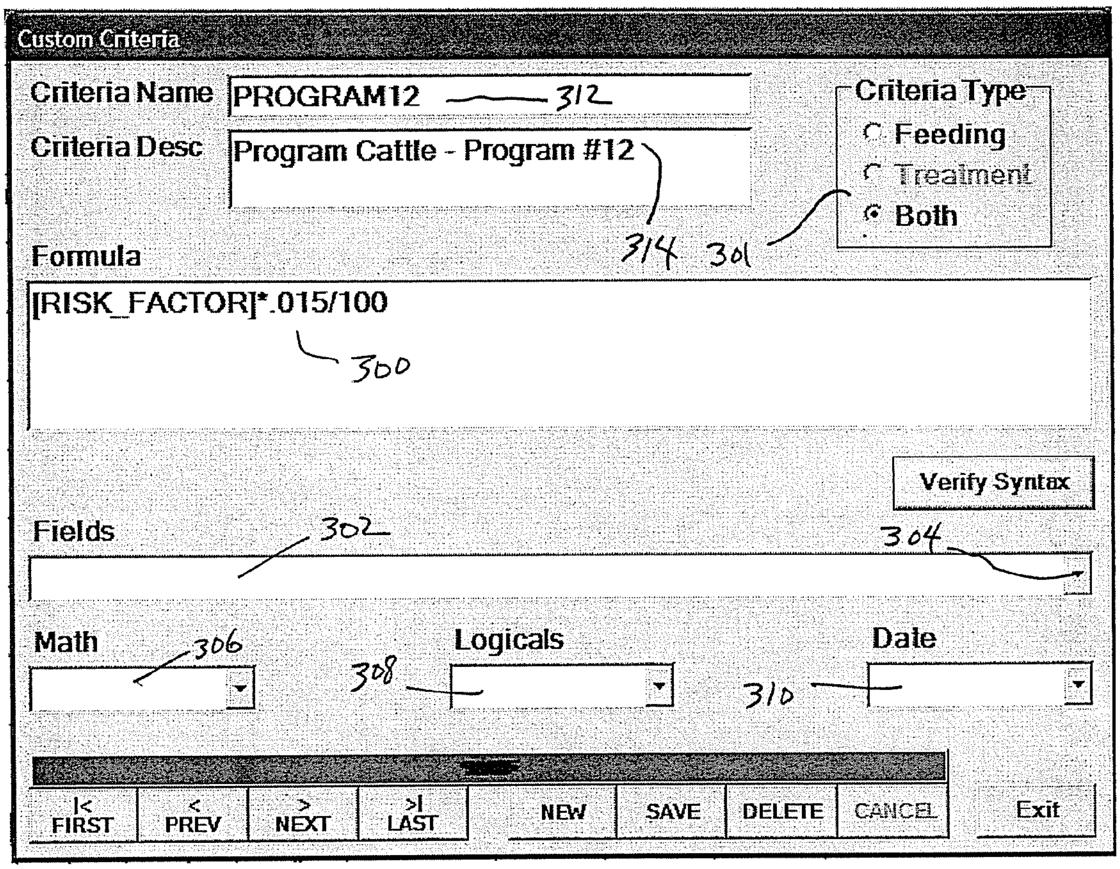
FIG. 12 is a user screen for establishing custom criteria associated with any desired management function to include feeding, treatment, and sorting.

Referring to FIG. 12, a custom criteria user interface screen is provided that allows the user to build a formula/algorithm for any particular criteria associated with feeding, treatment and sorting. Custom criteria created may then be added to the available listing of criteria and used in building the rules to generate recommended actions for feeding, treating, and sorting. The completed formula appears in block 300. The criteria type is designated in block 301. The user can develop the formula based on the available field listing in block 302. The user activates the pull down menu by clicking on button 304 and chooses the fields for insertion in the formula. The fields may include some of the same criteria listed in FIG. 7 as well as any available recorded data elements stored in the central database. Various math and logical operations are chosen to build the particular formula, as shown at blocks 306 and 308. The criteria name is entered in block 312, and a short criteria description can be provided in block 314.

II. Cow/Calf Module

The first module of the present invention to be discussed is the cow/calf module. This module is intended to be a stand-alone data processing system designed to operate on a computer system located at a cow/calf operation. The module collects all animal data associated with breeding, birth, processing and treatment. In addition to being a stand-alone data processing system, particularly advantageous for use as a herd management tool, it could also be interfaced with the other modules of the present invention so that data may be passed between the cow/calf module and the other modules of the present invention. For example, the cow/calf module can be interfaced with any one of the local servers residing at feedlot locations, or the web server, if a web server exists.

Figure 13:
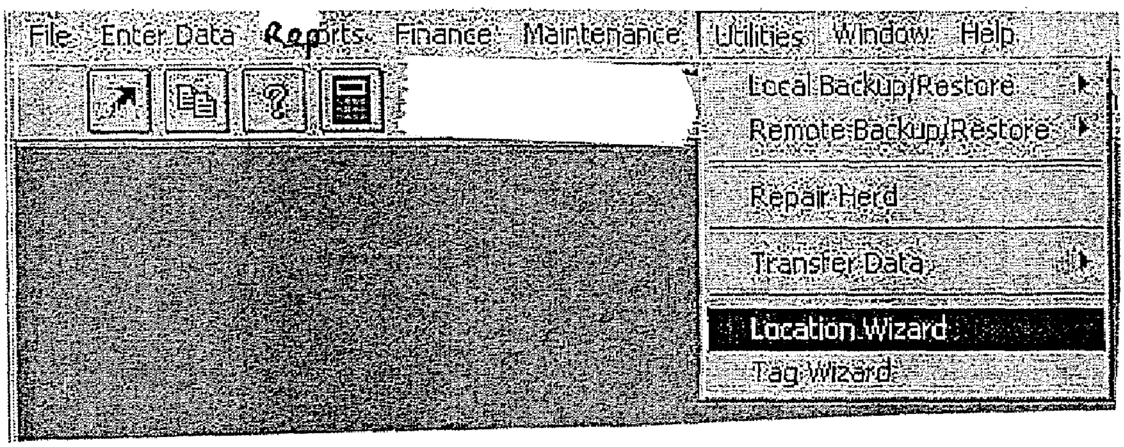
FIG. 13 illustrates a pull-down menu for entering new animals into the cow/calf module or for transferring data in or out of the module.

FIG. 13 illustrates a pull-down menu for entering new animals into the cow/calf module or for transferring data in or out of the module. For example, it may be necessary to retrieve data from a feed lot module and send it to a cow/calf module, or vise versa.

Figure 14:
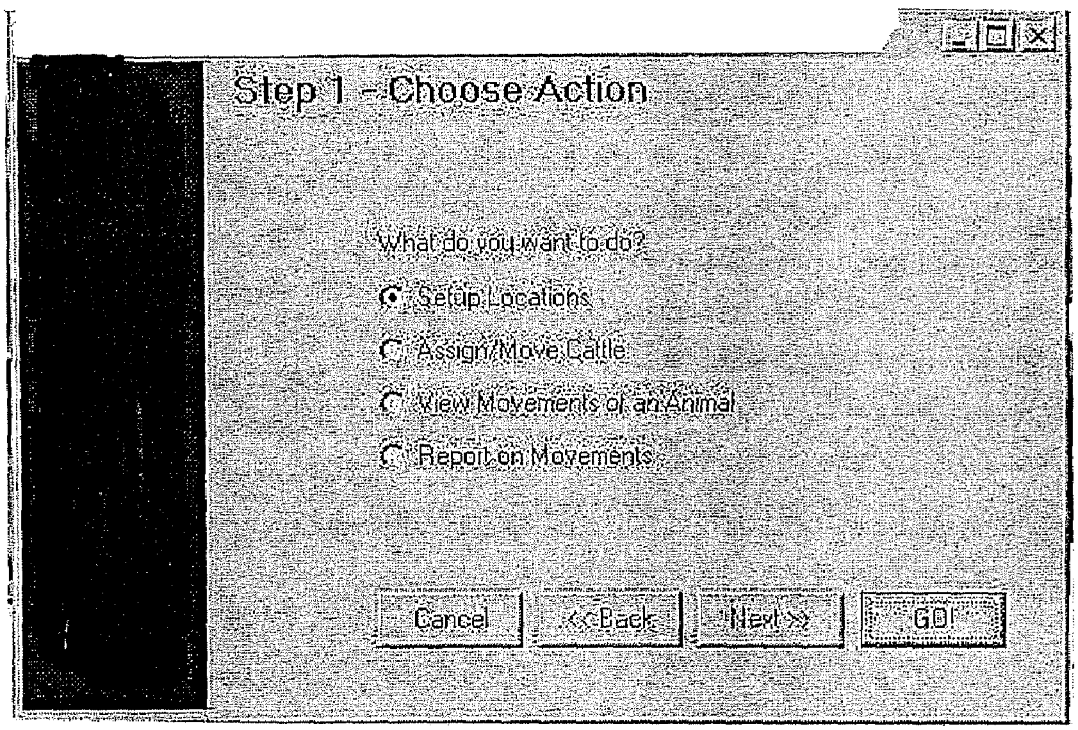
FIG. 14 illustrates a user screen for selection of the location wizard option from the pull-down menu of FIG. 13.

FIG. 14 illustrates a screen for selection of the location wizard option from the pull-down menu of FIG. 13, wherein the user is allowed to set up particular locations that can be assigned a unique premise ID. Assuming a national identification program is required by federal or state authorities, unique premise numbers may be required. In particular, a premise ID could correspond to a particular plot of land such as a pasture in a cow/calf operation, and a particular feed lot pen in a feed lot operation. One technique which may simplify the ultimate assignment of premise location numbers to various cattle operations would be to incorporate global positioning satellite (GPS) technology wherein a particular premise ID corresponds to a geographic coordinate recorded within a GPS system. Those skilled in the art can appreciate other ways in which a particular cattle operation location could be assigned unique premise IDs.

Figure 15:
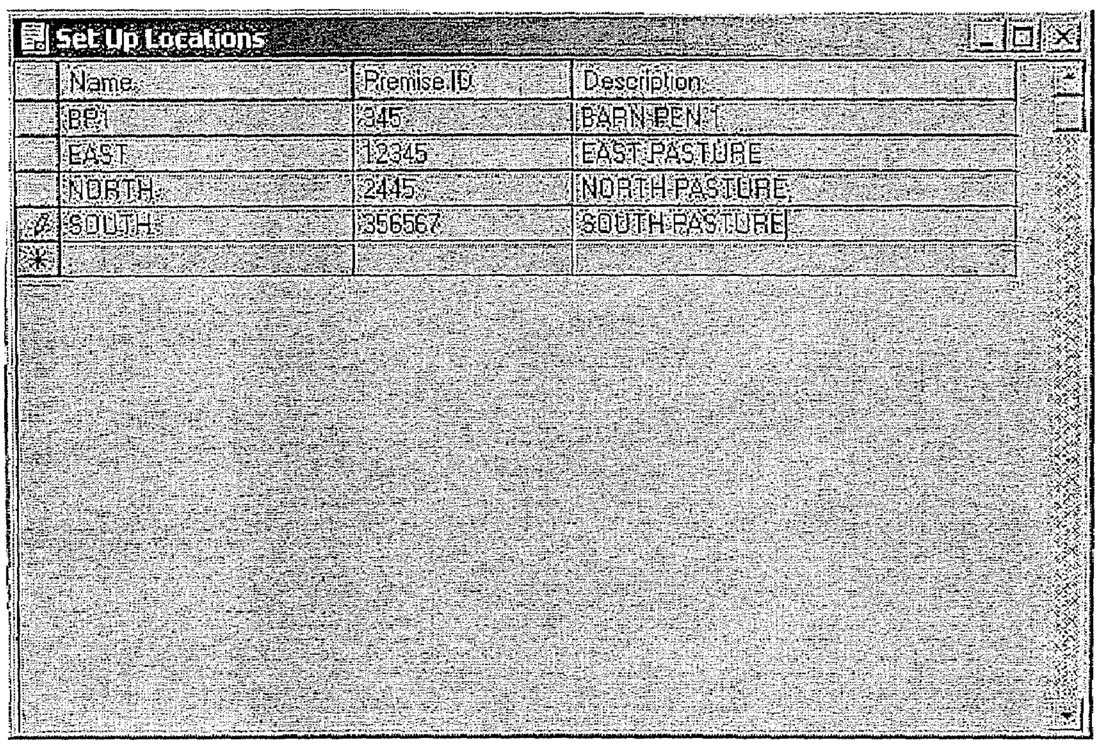
FIG. 15 illustrates a user screen for data entry of particular premise locations.

FIG. 15 illustrates a screen for data entry of particular premise locations, corresponding premise IDs, and a short description of the particular premise location.

FIGS. 16-27 are example user interface screens found in the cow/calf module. Each are explained in more detail below.

Figure 16:
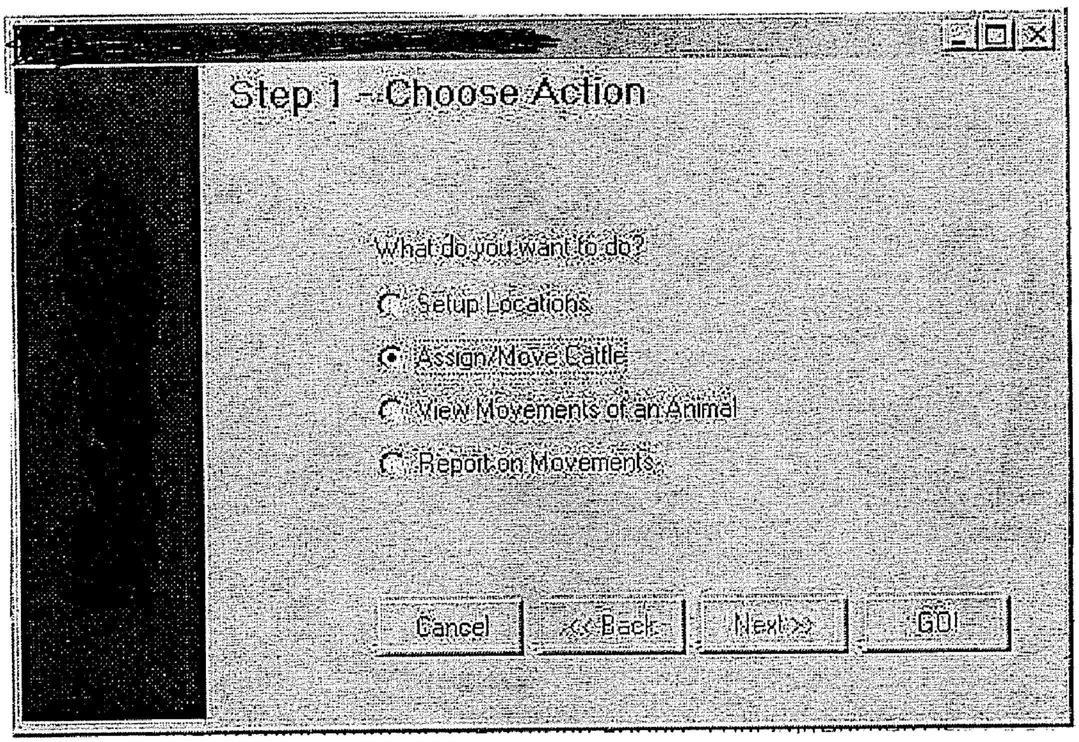
FIG. 16 illustrates a user screen for recording movement of cattle.

FIG. 16 illustrates a user selection screen that allows a user to record the movement of cattle between locations at a cow/calf operation.

Figure 17:
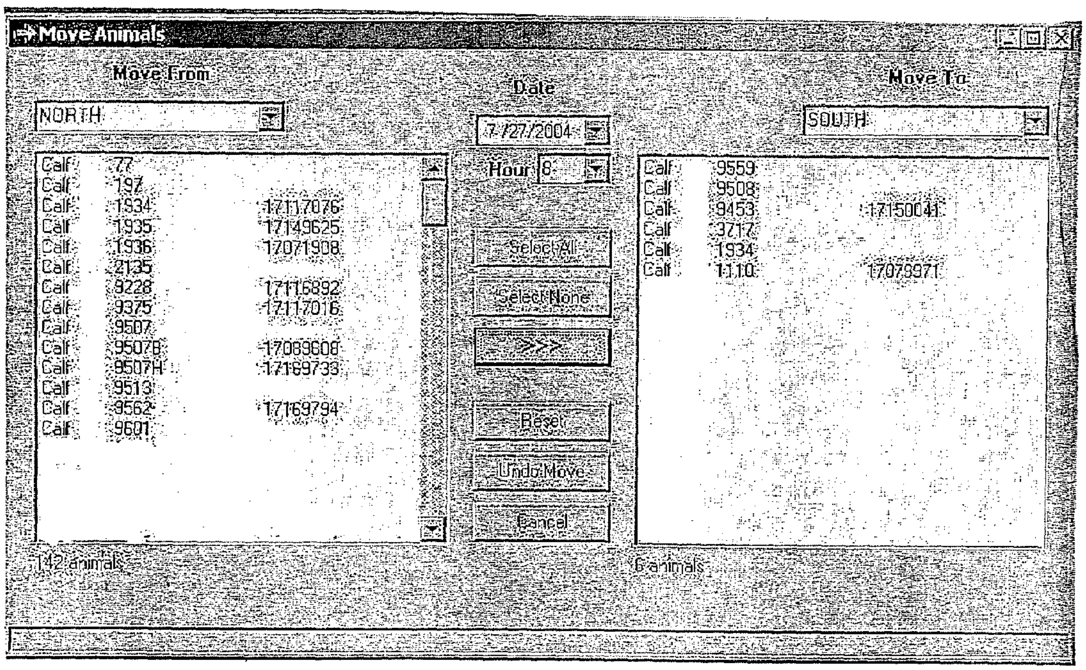
FIG. 17 illustrates a user screen for selecting individual cattle for movement from one location to another location.

FIG. 17 illustrates a user screen that allows a user to select individual cattle for recording movement from one location to another location. As shown in the example, the name of the premise location from which cattle are to be moved is the "north" location and the cattle are to be recorded as being moved to the "south" location. This screen also shows that there are 142 animals currently in the north location and six animals are in the south location. Each of the cattle are identified as to their general category (calf), and some corresponding identification means. The first column identifier could represent a visual tag number, and the second column could represent an RFID tag number. Depending upon how animals are received into the cow/calf operation, and based upon how a particular ranch desires to identify animals, the cattle may have one or more tags. As mentioned above, the preferred method of identifying animals would be through a retinal scan wherein a unique number would be assigned to each digital image of an animal's retina. Therefore, the numbers shown in FIG. 17 could also represent a digital file corresponding to a retinal image of a particular animal. FIG. 17 also shows other features to include the ability to select all of the animals within the north location for transfer, undo a move, or reset. To select one or several animals for transfer, a user would click the cursor on a particular animal(s) and then drag to the listing of animals within the south location. Of course, the transfer of animals from the north to the south location would only occur once an order had been fulfilled by a worker in the field who had actually transferred the animals, and confirmed that the animals had been moved.

Figure 18:
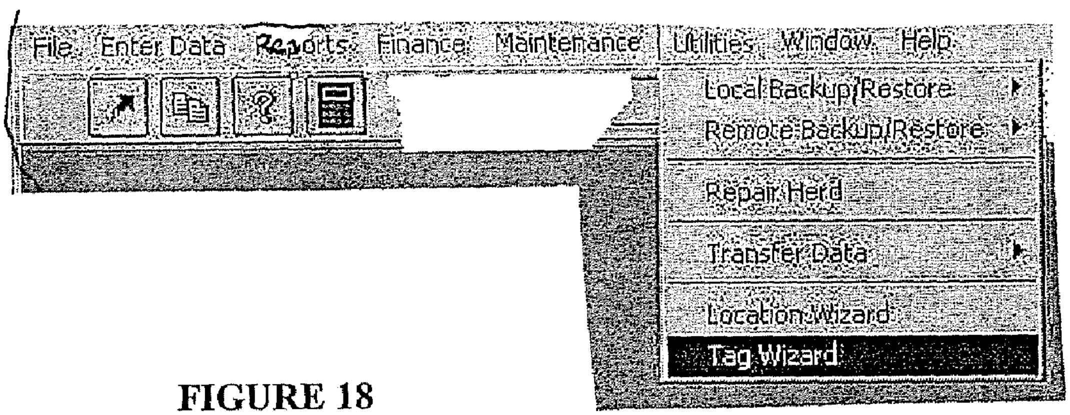
FIG. 18 illustrates another pull-down menu for entry of unique tag identifiers for each animal.

FIG. 18 illustrates another user screen in the form of a pull-down menu that allows the user to utilize a tag wizard function to enter unique tag identifiers to be assigned to each animal.

Figure 19:
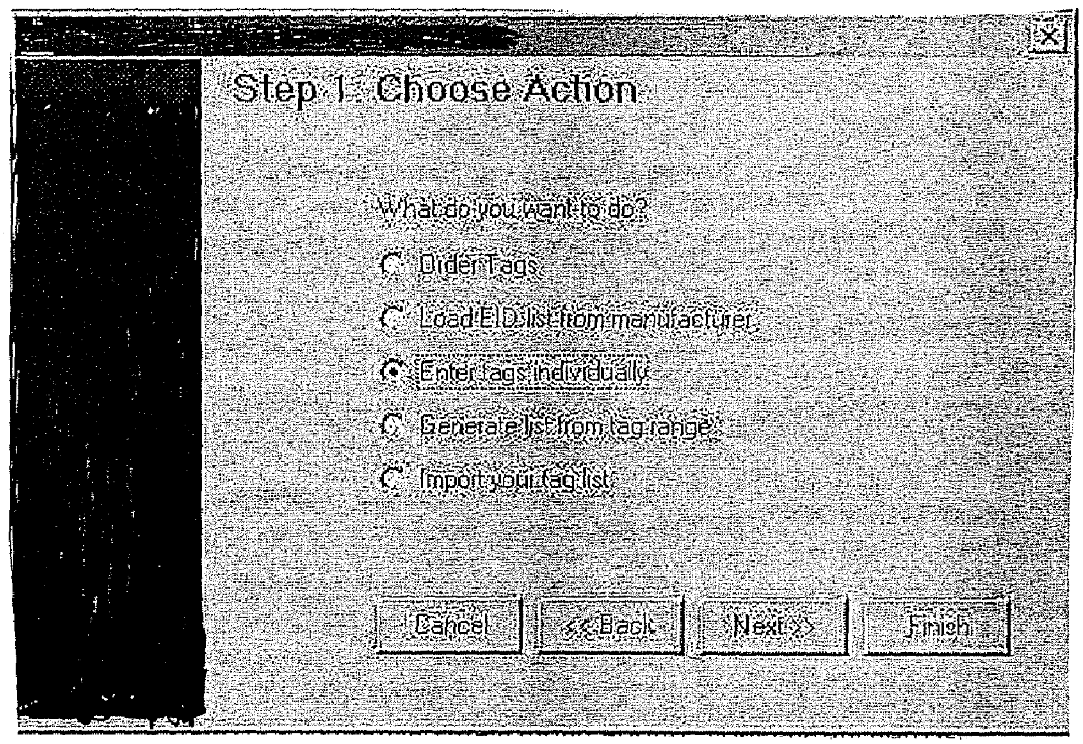
FIG. 19 illustrates a user screen for selecting various options to include ordering tags, loading tag information from a manufacturer, generating a tag range, importing tag listings, and entering individual tag information.

FIG. 19 illustrates a user selection screen where a user may select various options to include the ability to order tags, load tag information from a manufacturer such as predetermined set of tag numbers corresponding to a particular type of tag. This screen also allows the user to enter tag information into the database, generate a tag listing from a tag range which has been preconfigured for a designated location, or to import a tag list from yet another source such as from a third party who has already generated a tag list.

Figure 20:
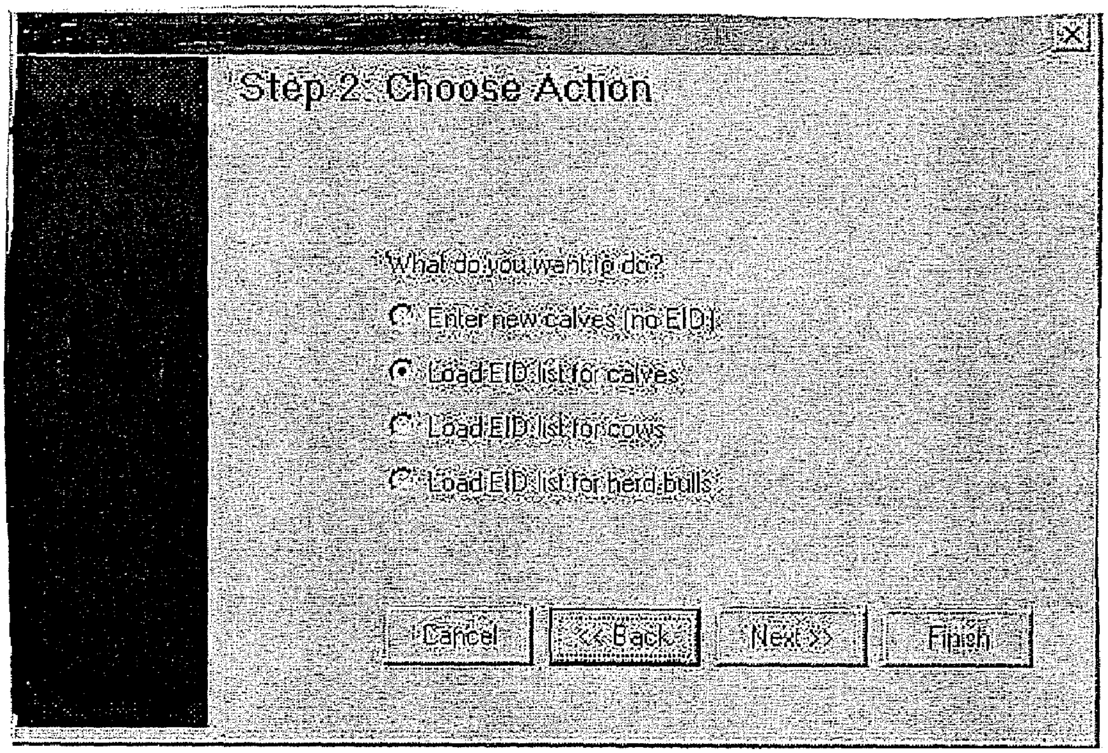
FIG. 20 illustrates a user screen for data entry of new tags to include various electronic identification information.

FIG. 20 shows the next selection screen if tags were chosen to be entered into the system individually. More specifically, FIG. 20 shows that the user can enter new calves, load an EID list for cows, or load an EID list for herd bulls.

Figure 21:
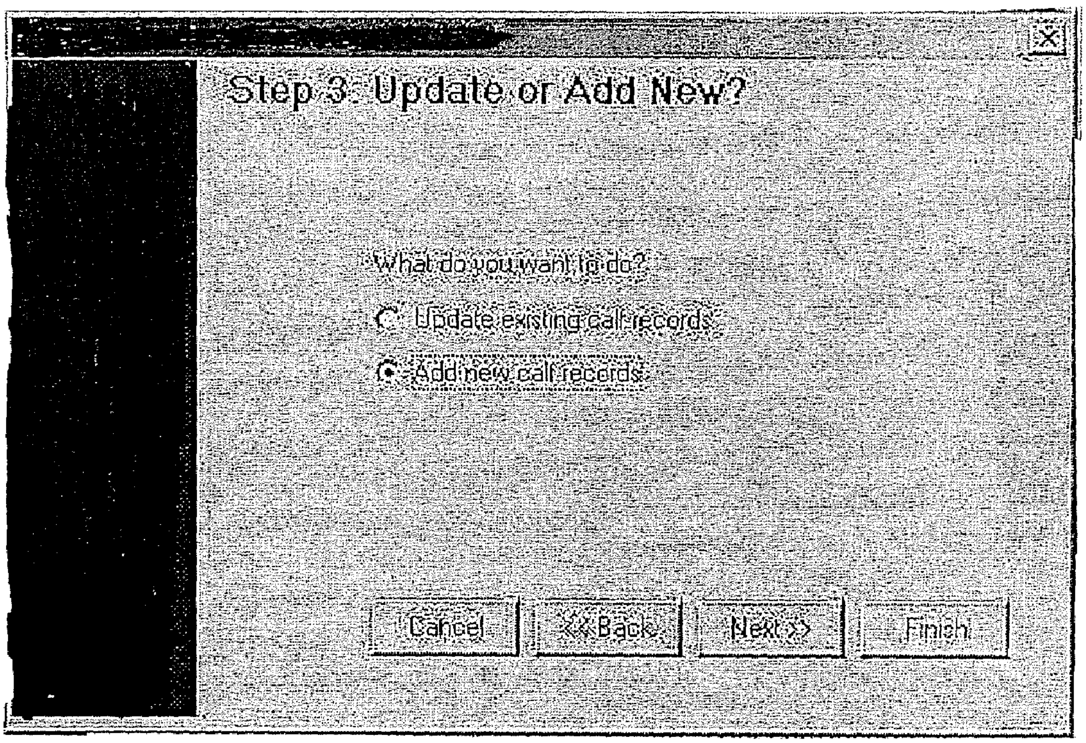
FIG. 21 illustrates a user screen for choosing whether to add a new calf record or to update an existing calf record.

FIG. 21 illustrates a selection screen if the "load EID list for calves" option was chosen from FIG. 20. This screen allows a user to choose whether to add a new calf record or to update an existing calf record.

Figure 22:
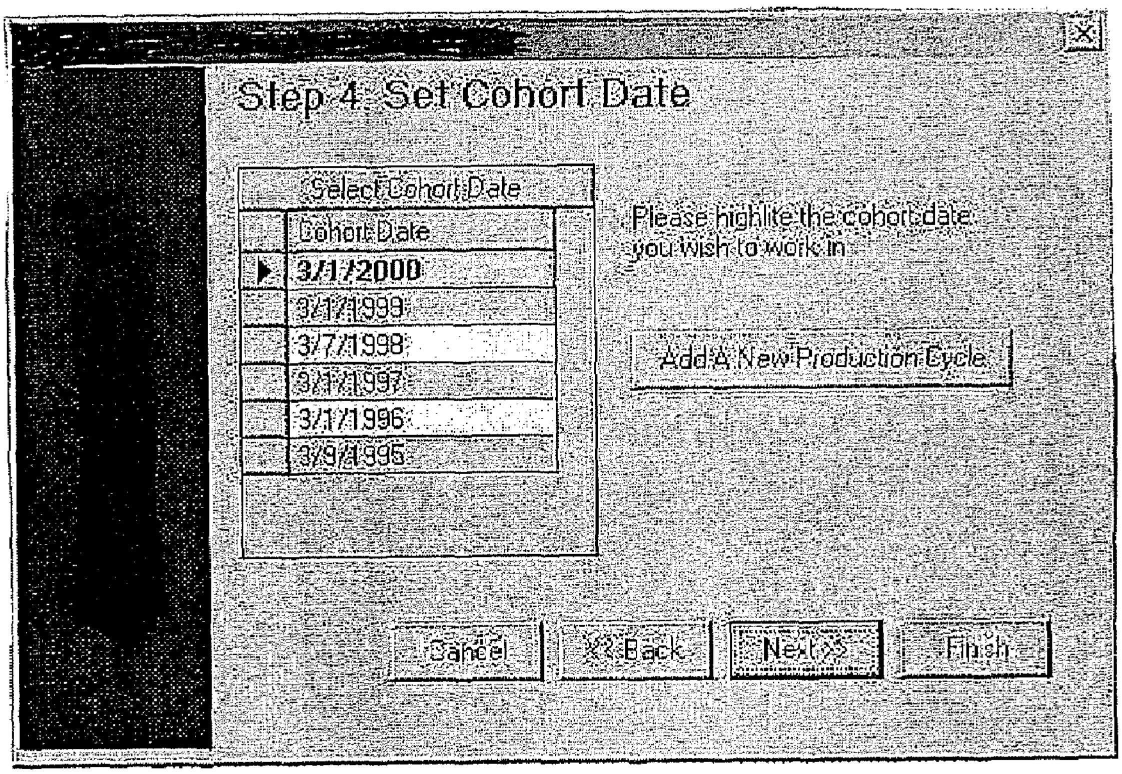
FIG. 22 illustrates a user screen for entering information on a particular animal into the system wherein a user sets a cohort date.

FIG. 22 illustrates the next user screen obtained once the user requests a new calf record to be added to the system. More specifically, FIG. 22 illustrates a data entry screen for entry of a particular animal into the system wherein a user sets a cohort date. The cohort date is simply an originating date for the animal and is either the actual birth date of the animal, or an estimated birth date.

Figure 23:
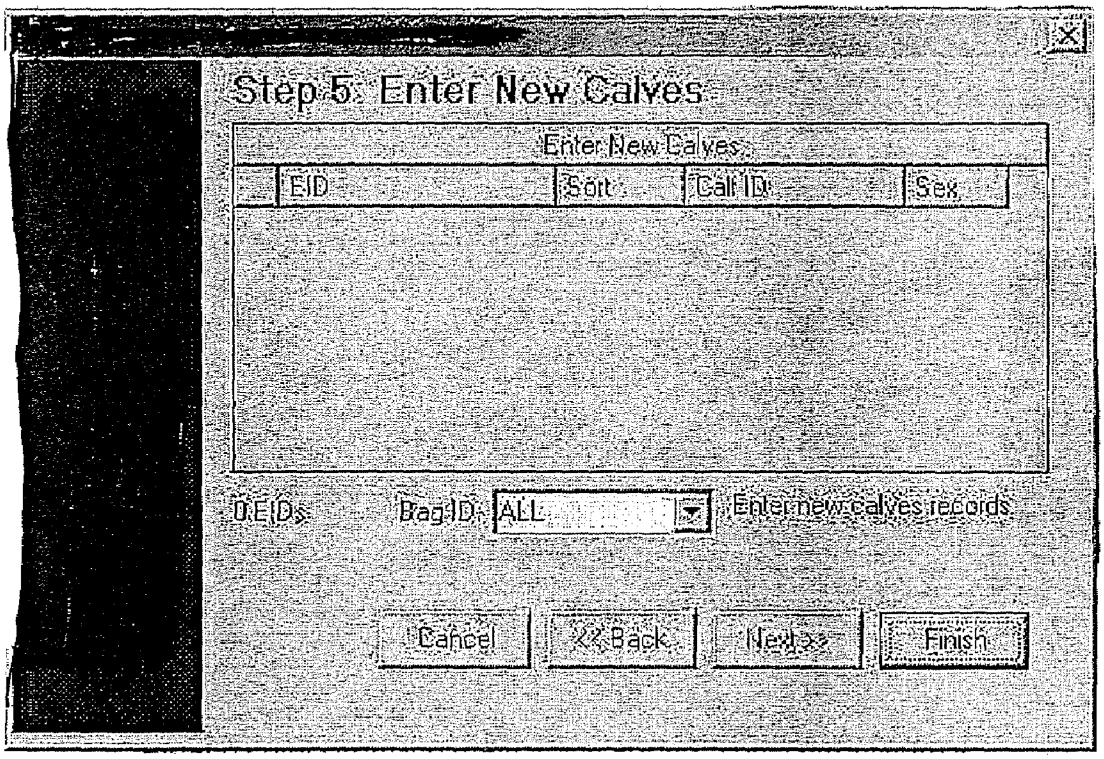
FIG. 23 is a user screen for assigning unique animal identification information such as an electronic identification number.

FIG. 23 is the next user screen provided once that particular cohort date is chosen wherein a calf is assigned a unique tag number such as an EID number, a sort identification corresponding to a particular grouping of animals, another identification means in the form of a separate calf ID, and identification of the sex of the animal. After data has been entered for each animal by completion of the data entry within the screen shown in FIG. 23, a particular animal has been uniquely identified and can be monitored by the system.

Figure 24:
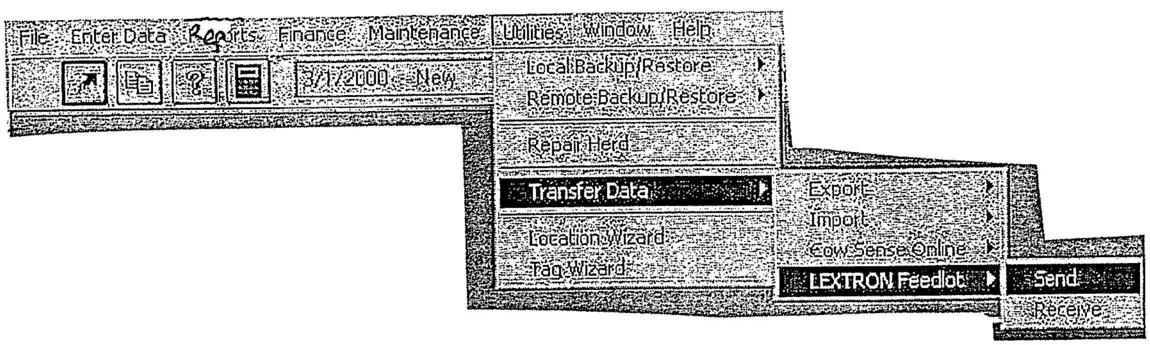
FIG. 24 illustrates another pull-down menu option from a user screen for enabling data transfer.

FIG. 24 illustrates a screen for another option from the pull-down menu which is a transfer data function allowing the user to export data, import data, review data records online, and to choose one or more particular operations such as a feed lot to send data to, or to receive data from.

Figure 25:
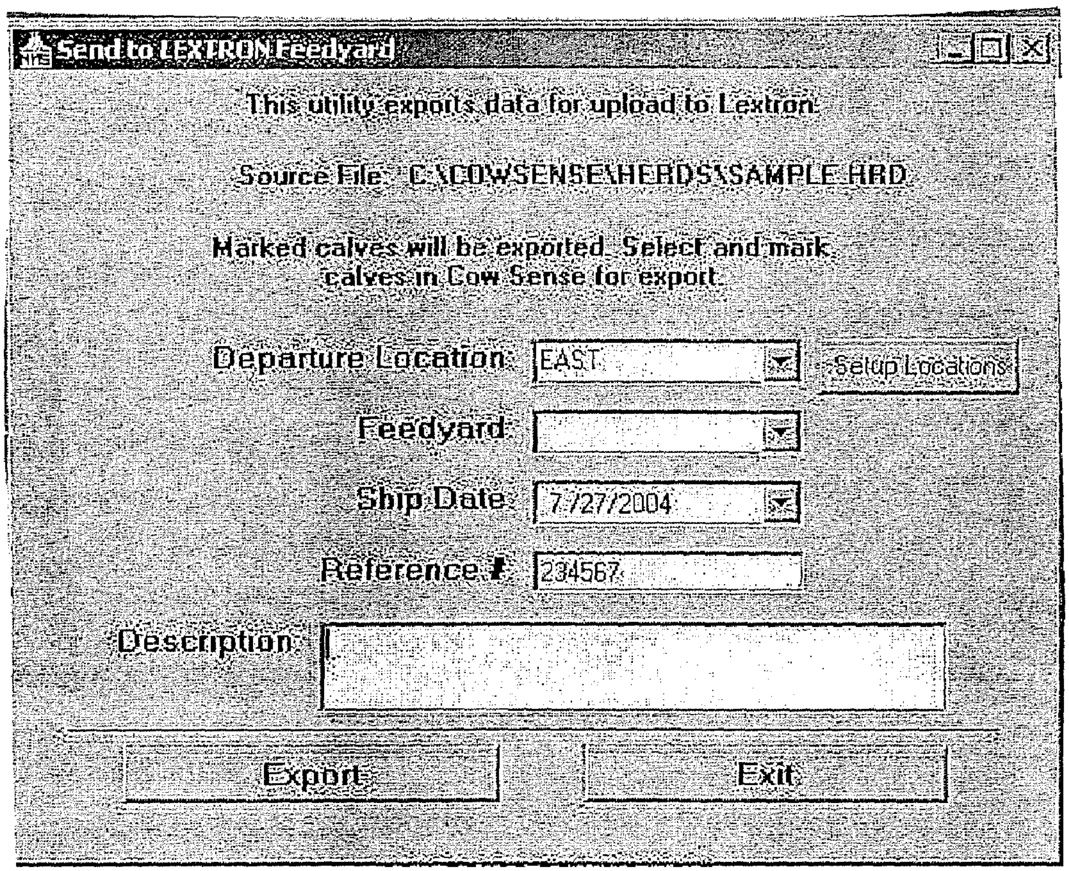
FIG. 25 is a user screen for sending data to a particular selected location.

FIG. 25 illustrates a user screen that allows the user to send data to a particular location for selected animals; for example, transfer of data from a cow/calf operation to a feedlot. This function is selected when, for example, it is desired to transfer animals from a cow/calf operation to a feedlot which must be prepared for receiving the animals. Typically, a group of animals is selected at a cow/calf operation for transfer to a feedlot, each animal being listed by their particular tag or identification number. By the export function shown in FIG. 25, not only is a simple listing of all the animals to be transferred sent to the particular feed yard chosen, but also other corresponding data that has been gathered about the animals which would include information such as medical treatment history, weight, sex, and owner.

Figure 26:
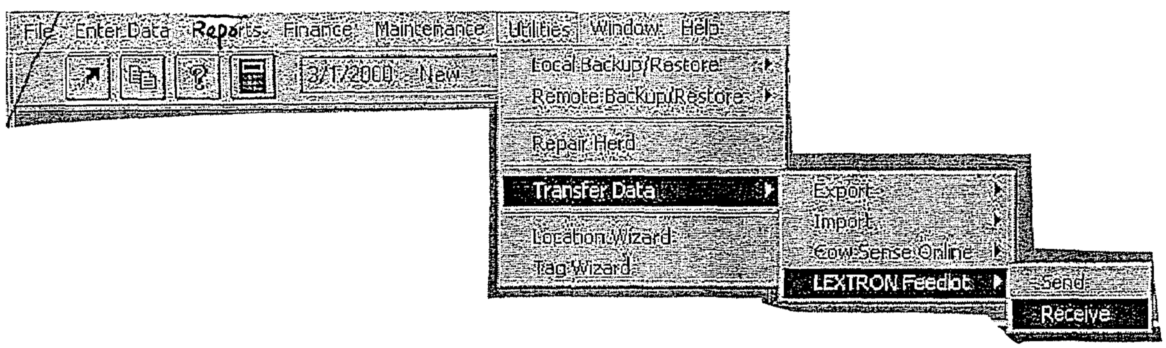
FIG. 26 is another pull-down menu from a user screen for receiving data from another location.

FIG. 26 is a user selection screen indicating that the user has chosen from the pull down menu to now receive data from another location. Data that a rancher may be interested in receiving from a feedlot would include growth rates and animal weights upon shipment to a packer.

Figure 27:
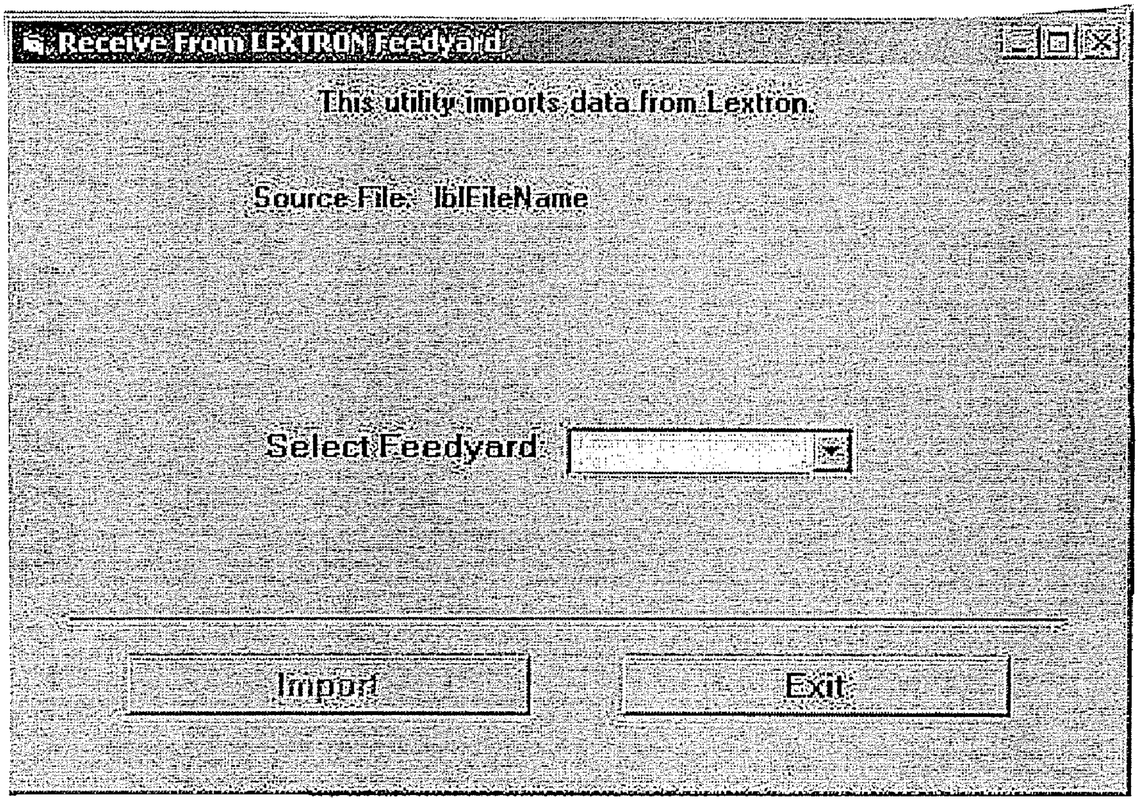
FIG. 27 illustrates a user screen for selecting a particular location for importing data.

FIG. 27 simply illustrates a screen that allows the user to select a particular feed yard for importing data.

As can be seen from the preceding discussion with respect to the cow/calf module, each animal which is received into a particular cow/calf operation is uniquely identified, is monitored as to the movements between locations/premises within a particular cow/calf operation, and data may be exported to other operations, and imported from other operations.

III. Grower/Feedlot Module

A. Animal Health Sub-Module

The first sub-module discussed below is an animal health function allowing a user to record and analyze all treatment and processing events for each individual animal while the animal resides at a particular grower/feedlot location. The term "feedlot" as used below also may describe grower operations; therefore, the following discussed functionality is applicable to grower operations as well.

Figure 28:
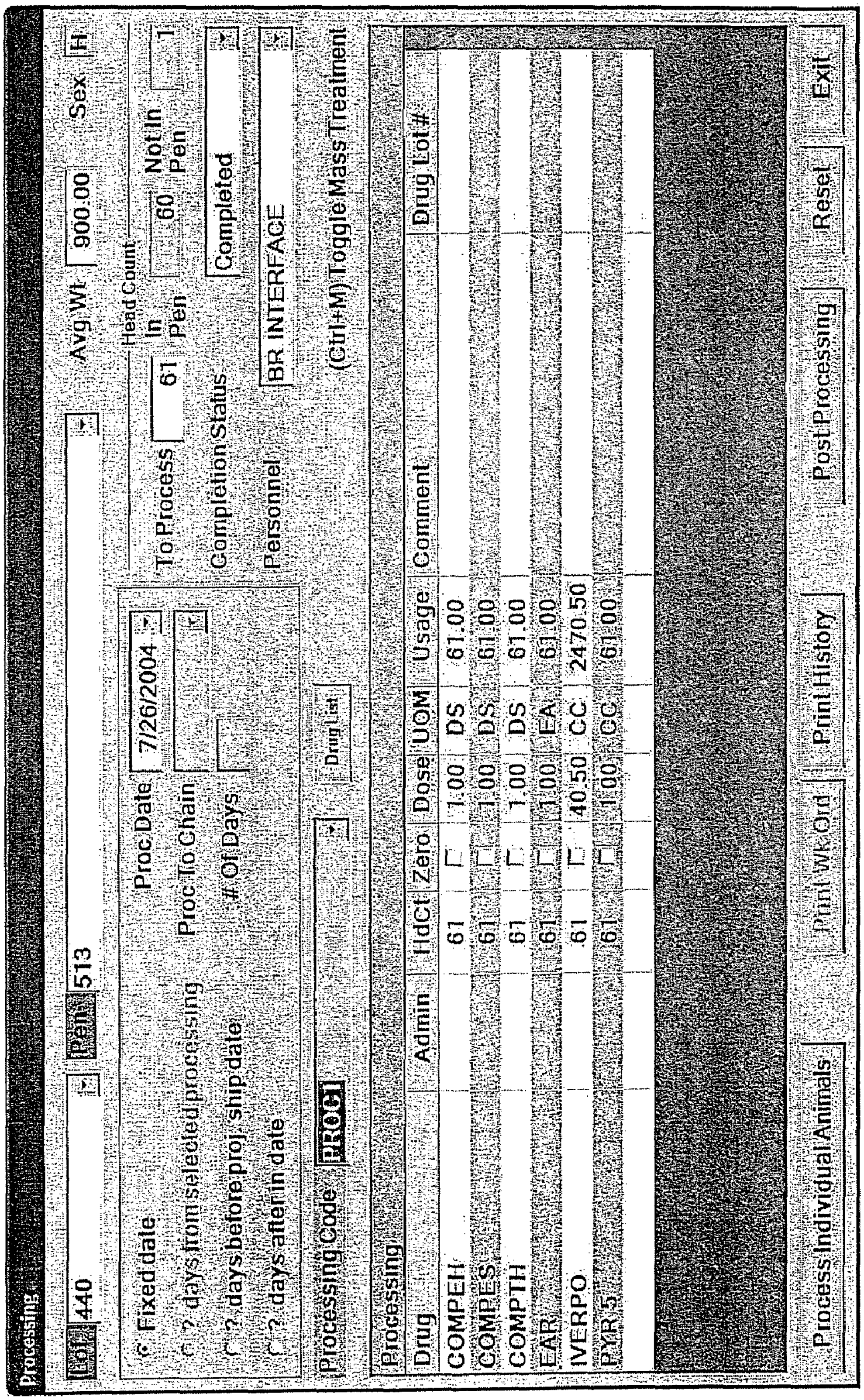
FIG. 28 illustrates a user screen for data entry for initial processing of animals as they are received into a feedlot.

FIG. 28 illustrates a user screen allowing data entry for initial processing of animals as they are received into the feedlot. More specifically, FIG. 28 allows data entry for recordation of medications administered to animals located at a particular lot and pen number. The animals located at a particular lot and pen number are a known group of animals that are each individually identifiable by their corresponding tags. FIG. 28 indicates that each of the animals are to be recorded as receiving the specified listing of drugs. The user has an option of printing the screen in the form of a work order so that a feedlot worker can then administer the drugs. Once the work order has been completed, the user can then select the "Post Processing" button which will record that each of the animals within the particular lot and pen number have received the drugs. Because each animal within the pen and lot numbers are known, each one of the individual animal records in the local database or central database is updated to reflect that the animal has received the drugs. A particular listing of drugs to be administered can be chosen from preselected or preconfigured processing codes that represent either standard protocol treatments, or tailored treatments can be created by the user. Therefore, the user can select from the processing code listing the various treatments to be completed and posted to the system database(s). It is also possible to individually process animals by selecting the "Process Individual Animals" button. Thus another user screen would be shown allowing a user to select a particular animal, and the user again could chose treatment from a processing code, or the user could create a tailored treatment.

Figure 29:
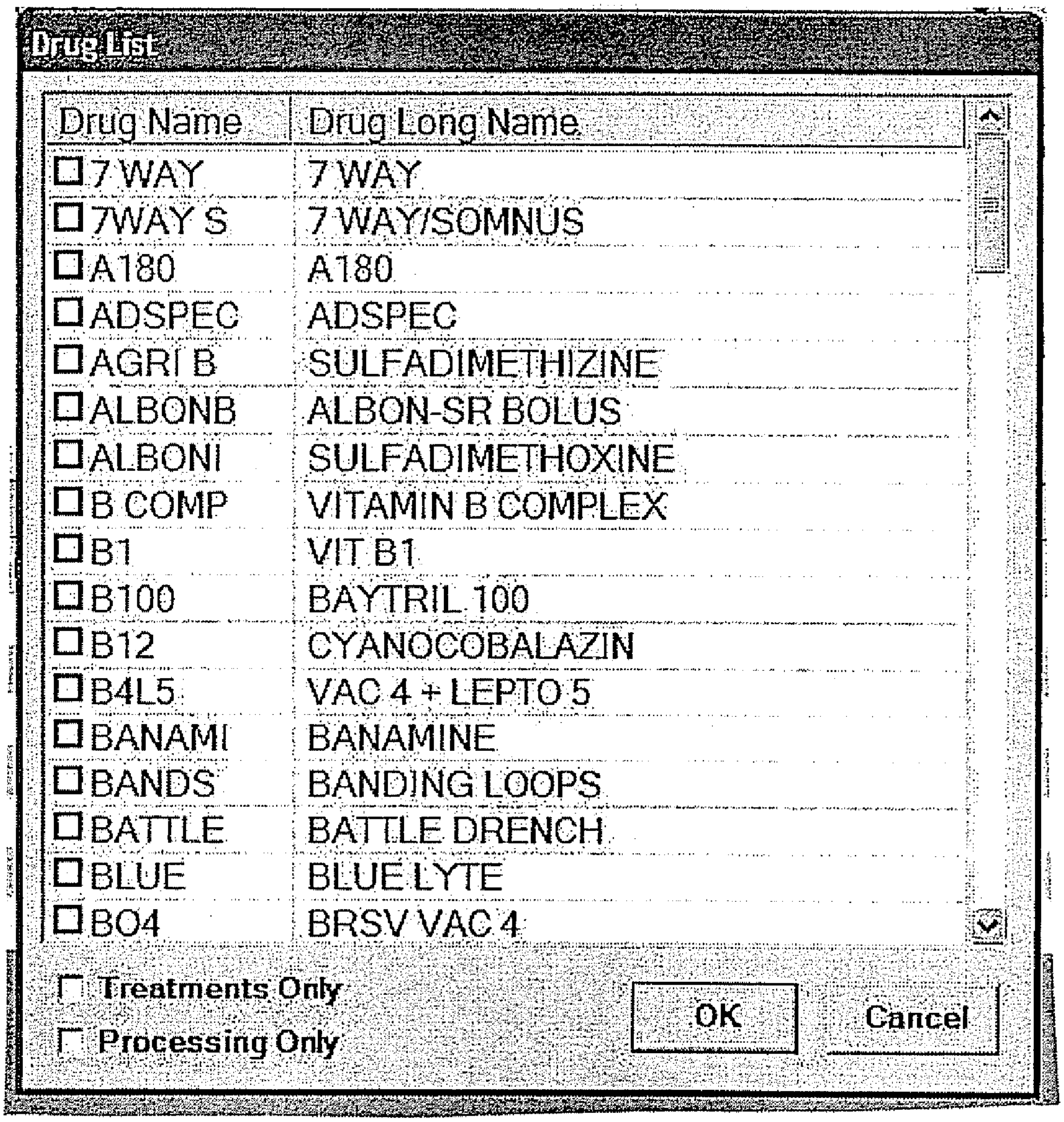
FIG. 29 illustrates a user screen including a listing of drugs from the drug list button of FIG. 28 for modifying an existing drug, such as adding or deleting a particular drug from an available listing of drugs.

FIG. 29 illustrates a sample listing of drugs from the drug list button of FIG. 28 that allows the user to add or delete a particular drug to the available listing of drugs. Therefore, it is evident that the standard treatment protocols as well as tailored treatments can be modified by the user if required.

Figure 30:
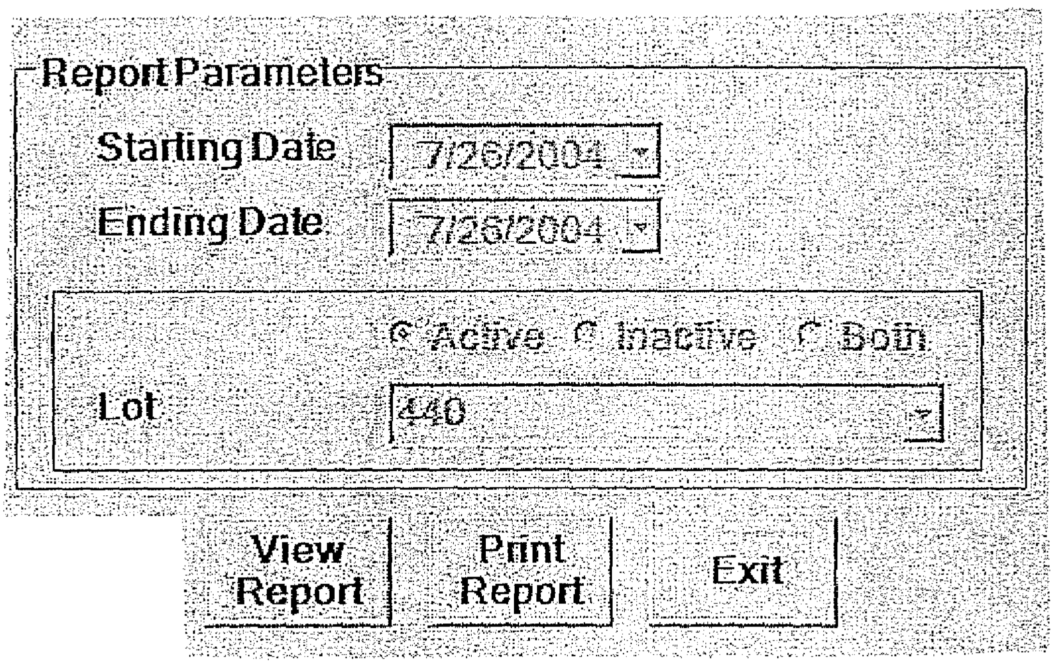
FIG. 30 is a user screen for selecting report showing the processing history of the particular animal or group of animals.

FIG. 30 illustrates a user screen that allows a user to select a report showing the processing history of a particular animal or a group of animals.

Figure 31:
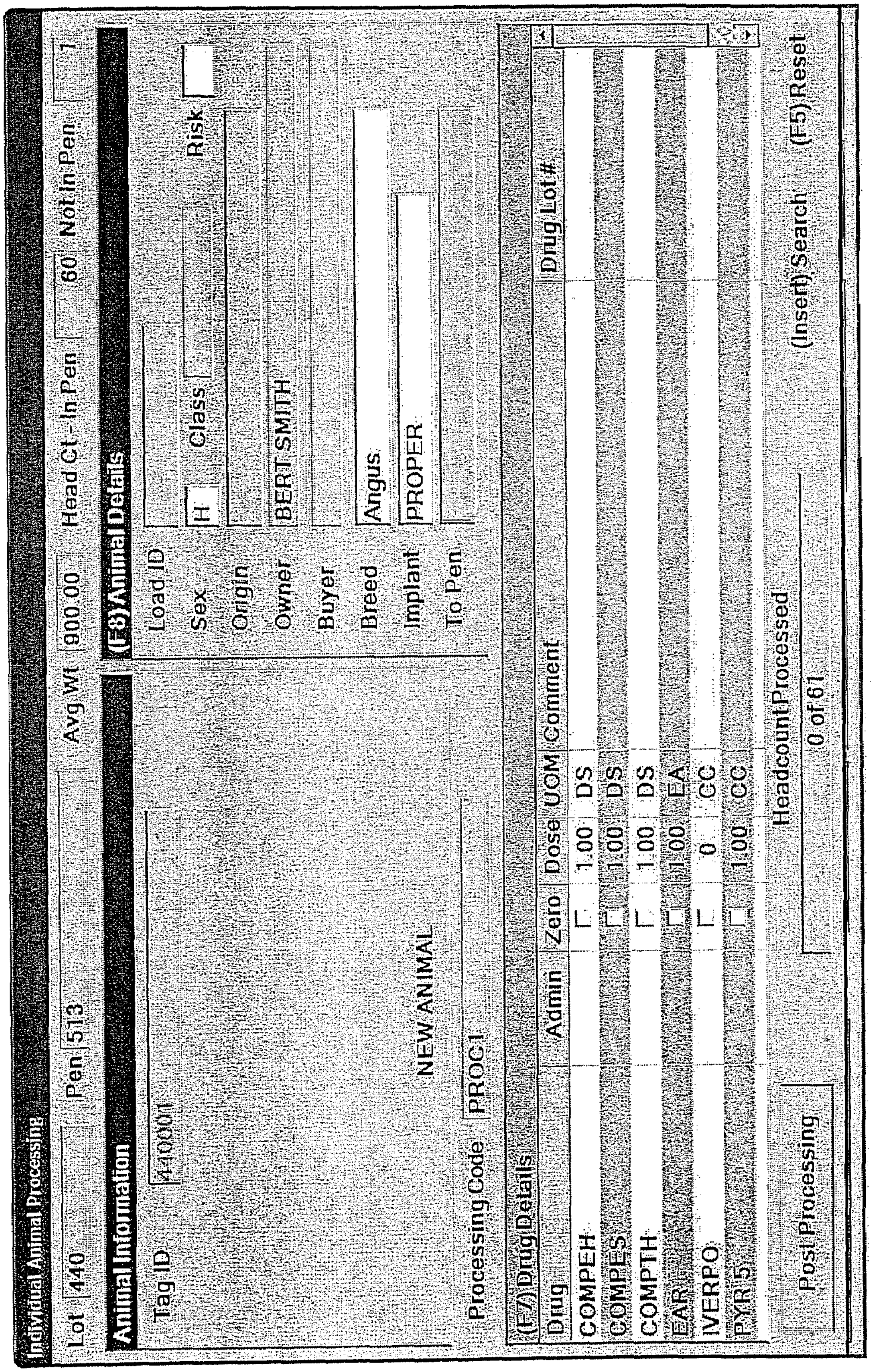
FIG. 31 is a user screen for individual animal processing.

FIG. 31 is another user screen for individual animal processing where instead of processing animals by a particular pen and lot number as initially described above with respect to FIG. 28, the user also has the ability to individually process animals. As shown, a unique tag ID for a particular animal chosen appears on the screen as well as the current location of the animal at the corresponding pen and lot number. The processing to be recorded is shown in the form of the administration of one or more drugs to the animal according to a particular processing code chosen. FIG. 31 also illustrates that within the particular lot and pen, there are sixty animals present within the pen and one animal not present in the pen, which could account for a particular animal being at a hospital location, or some other location at the feedlot. As treatment for each animal is posted, the head count processed as shown at the bottom of the screen would automatically update. A user could confirm that all the animals within the pen have been treated once the head count reach the total number of animals assigned to the particular pen. The posting of a record indicating that an animal was treated in accordance with the screen in FIG. 31 is preferably done at chute side. Thus, once an animal had been treated, the user would simply click on the "Post Processing" button which would then post that particular information to the database thereby indicating that the animal had been treated with the listed drugs. Alternatively, a report could be printed for each animal and a feedlot worker would then use the printout as a work order. The worker would complete the treatments, and then would return to the work station to report that the processing had been completed. Then, the user would post each of the records to the database.

Figure 32:
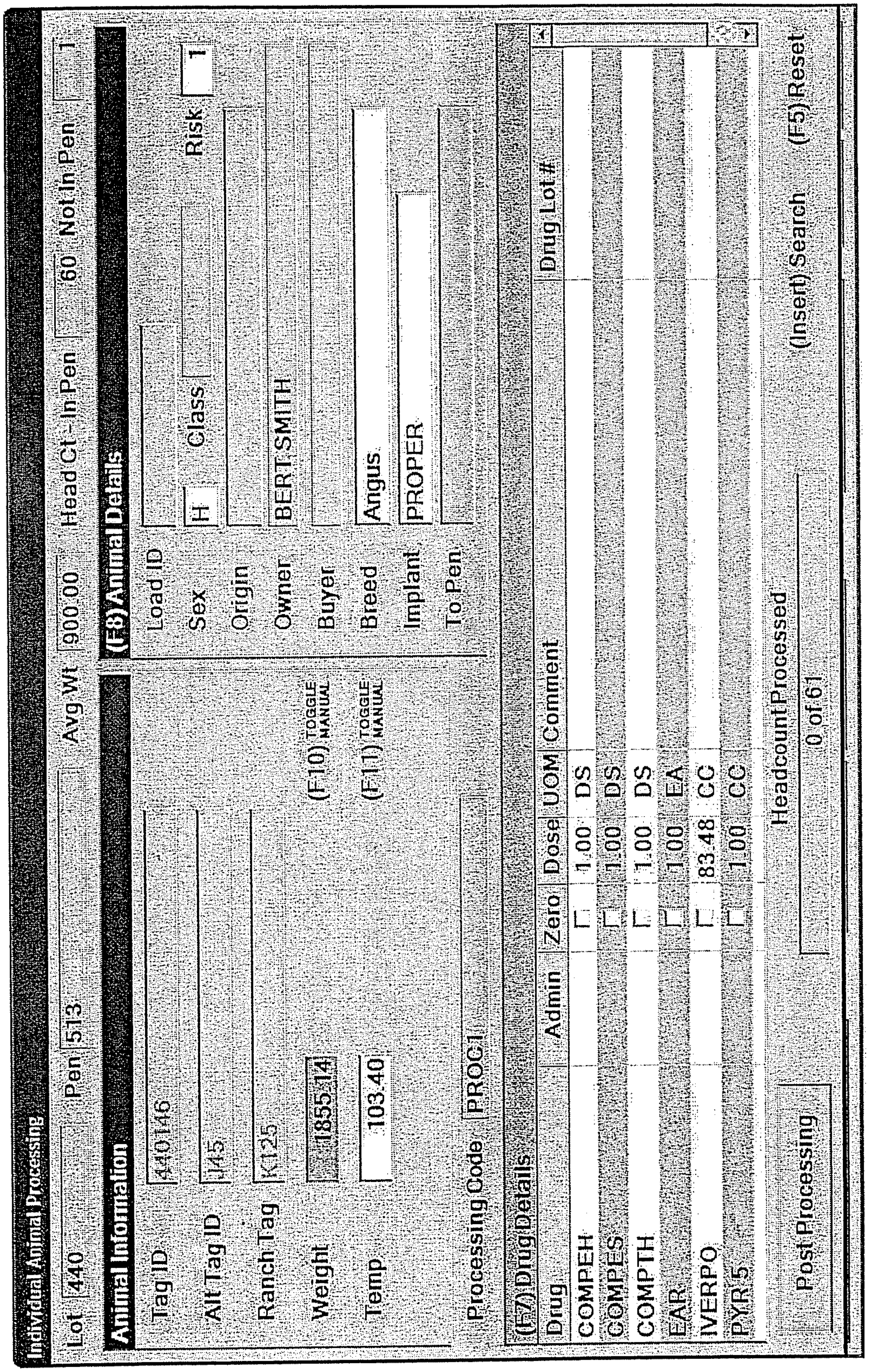
FIG. 32 is a user screen for further entering data about an animal as it is being processed.

FIG. 32 is another example of an individual animal processing screen that allows the user to enter data about the animal as it is being processed. More specifically, FIG. 32 illustrates that the user could enter a weight and temperature, as well as information about the owner of the animal. Of course, for all the data entry screens, a user cannot randomly assign a new or different identification to a particular animal, nor create fictitious animals within the system. Thus, once an animal has been initially identified and is recorded as being an active animal within the particular feedlot location, the identification numbers that have been assigned to the animal cannot be altered or changed. In exceptional circumstances, it may be necessary for a user having administrator level privileges to make a change to one or more identification numbers; therefore, some override could be provided within the system that allows correction or modification to existing identification records.

Figure 33:
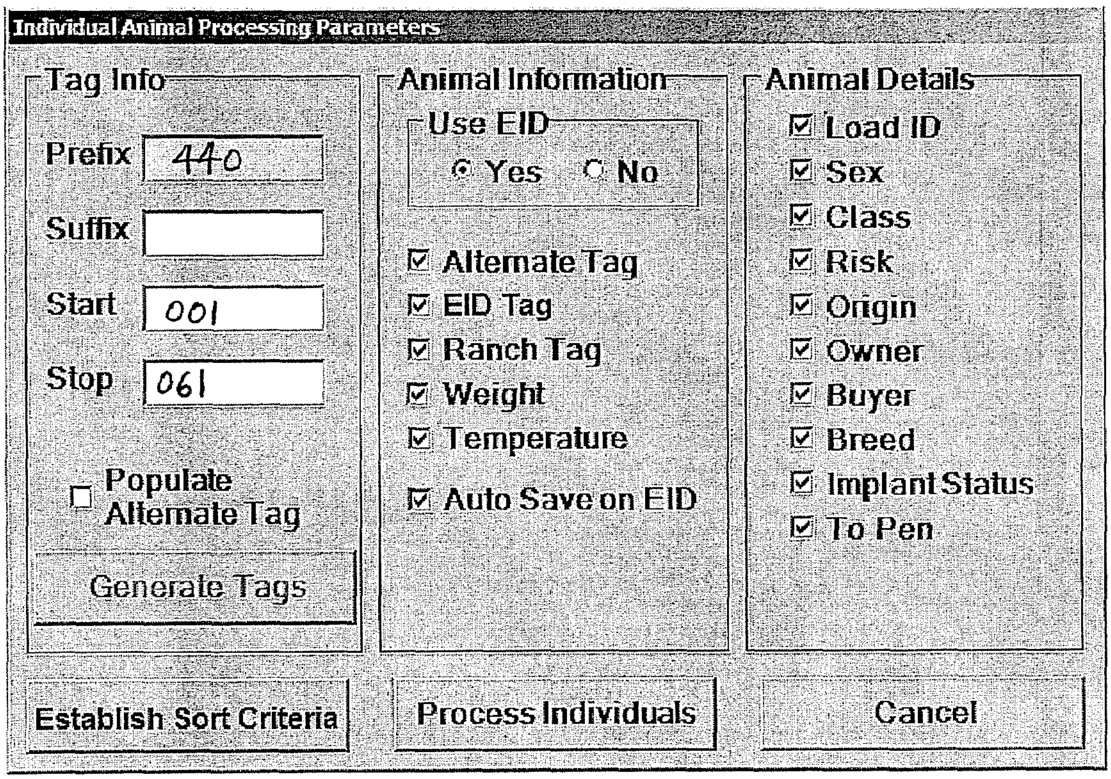
FIG. 33 is a user screen for selecting particular animal processing parameters to be entered and recorded.

FIG. 33 is another user screen that allows the user to select particular individual animal processing parameters to be entered and recorded. This screen also allows the user to generate special feedlot tags that can be used for supplementary identification purposes while the animals are in the feedlot. It should be understood that the initial identification of an animal in a cow/calf operation in terms of identifying each animal by a unique identification number is not reentered at the feedlot; rather, additional identification means may be provided at the feedlot that allows a feedlot to move, treat, or ship the animals. Ultimately, a single data record is available for each individual animal that allows one to view a complete medical treatment history for each animal, as well as locations where the animal was located on specific dates.

Figure 34:
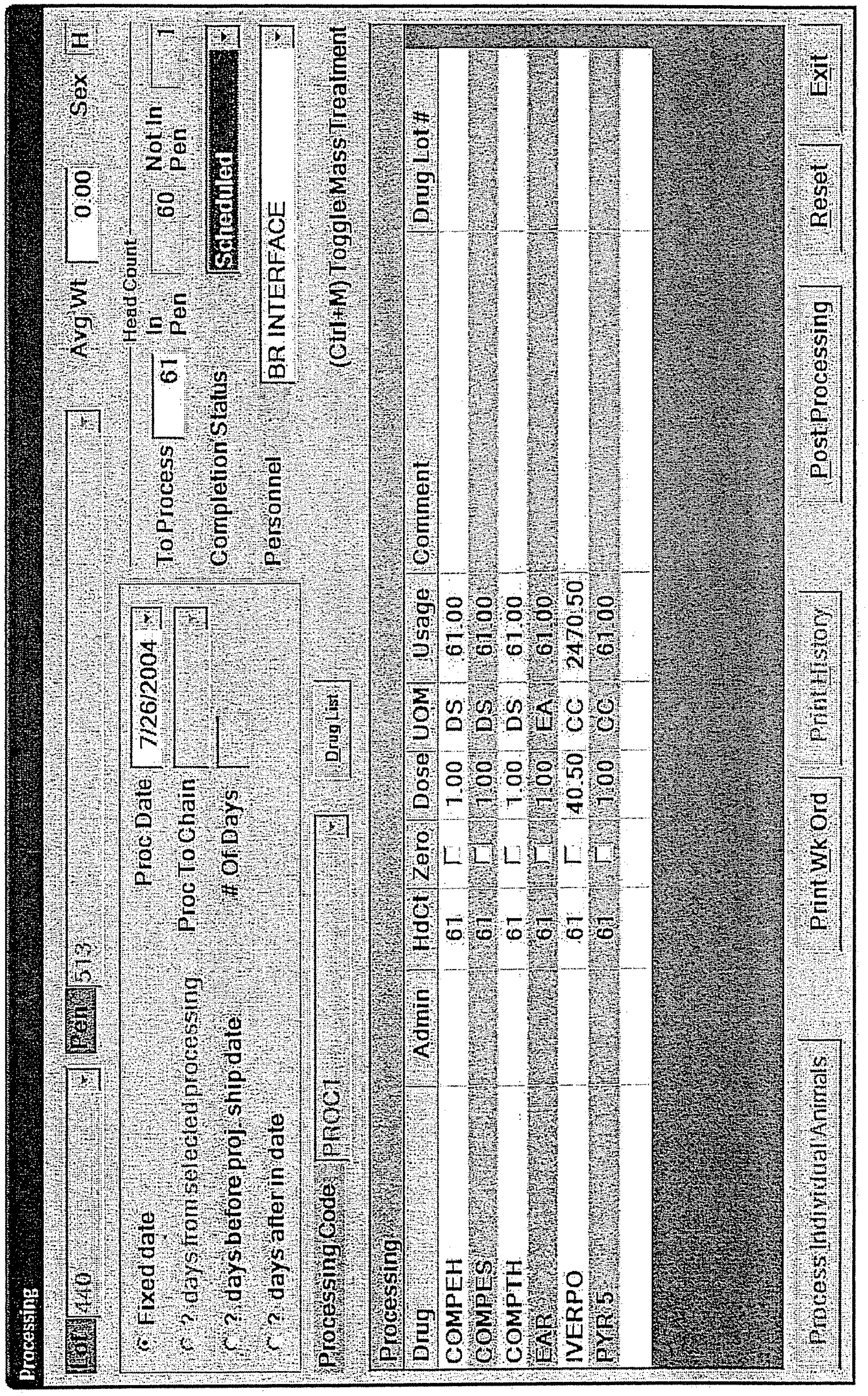
FIG. 34 is a user screen for scheduling treatments of animals.

FIG. 34 is another user screen that may be used to schedule treatments of individual animals or groups of animals. In the example shown in FIG. 27, the user desired to set Jul. 26, 2004 as the fixed date to complete processing of Processing Code 1 (PROC 1) for the 61 animals that have been assigned to Lot 440 and Pen 513.

Figure 35:
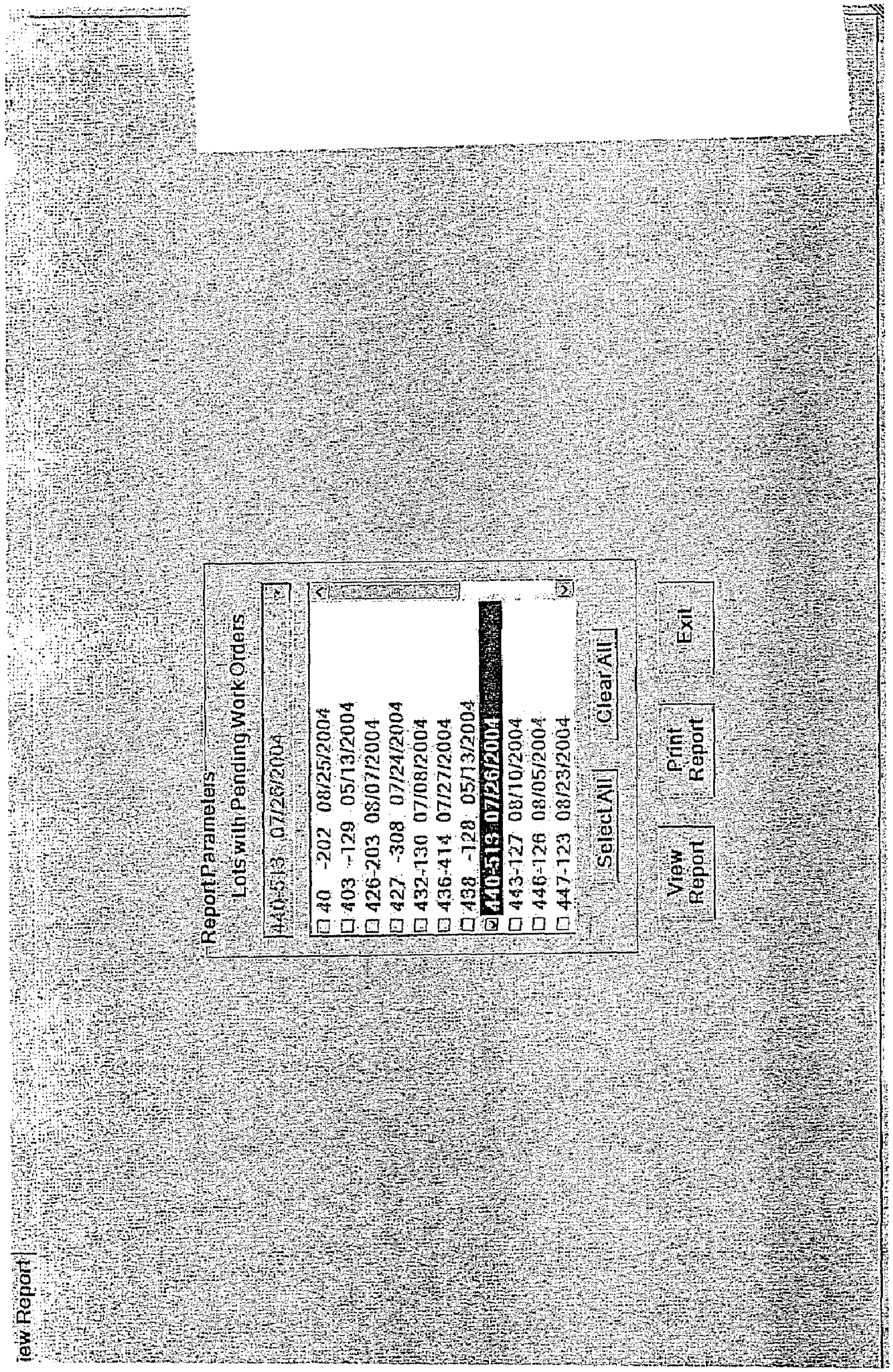
FIG. 35 is a user screen for indicating pending work orders.

FIG. 35 is another user screen that indicates pending work orders, allowing the user to select a particular work order for viewing. Accordingly, the user in FIG. 28 has chosen to view the scheduled processing for Lot 440 Pen 513 on Jul. 26, 2004. The user could then view or print the report to determine what had been scheduled.

Figure 36:
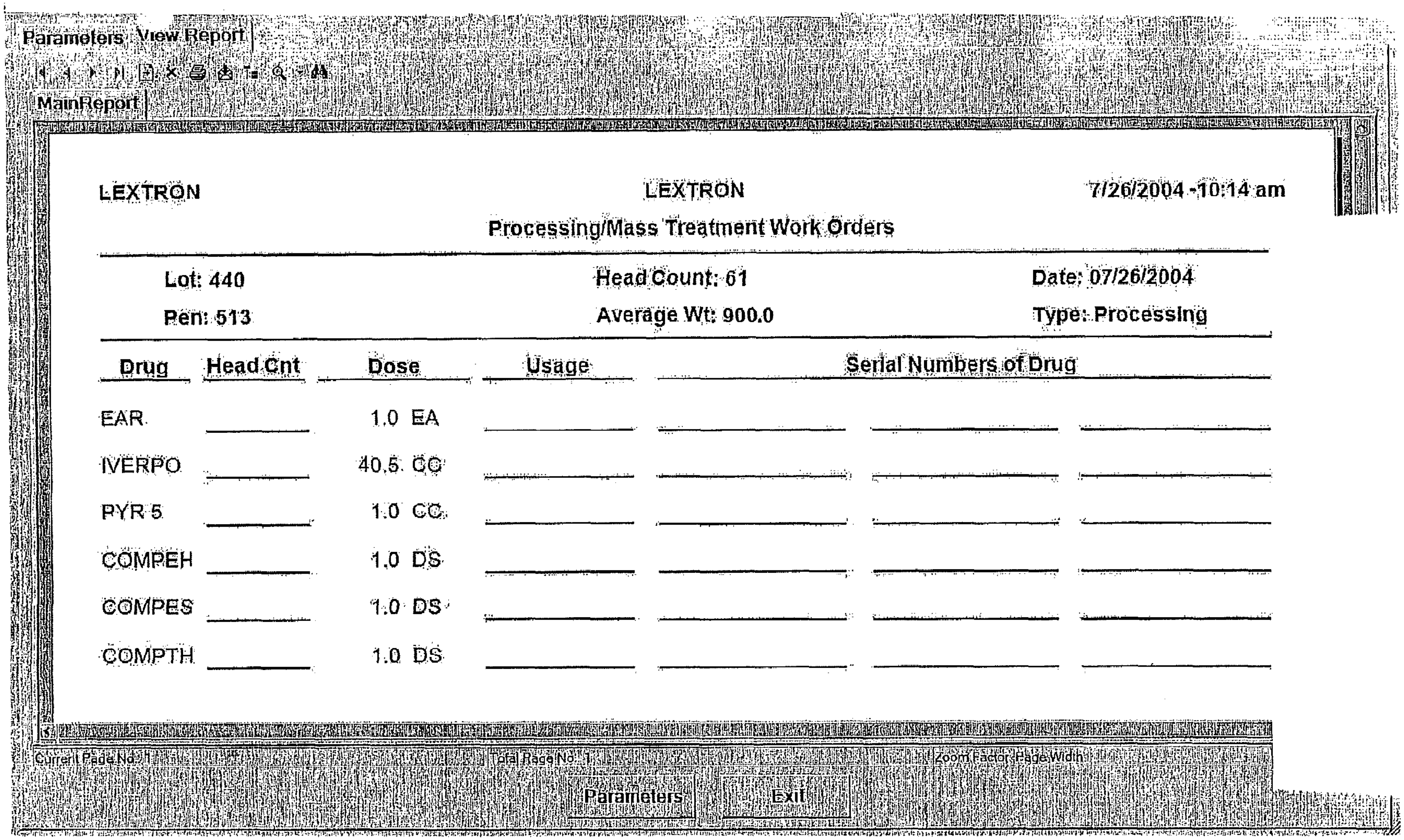
FIG. 36 is a user screen showing a sample report corresponding to the pending work order chosen from FIG. 35.

FIG. 36 is a user screen showing a sample report corresponding to the pending work order chosen from FIG. 35. The report lists a head count, lot, pen, and explanation of particular processing to be completed, namely, the administration of various drugs to each of the animals.

Figure 37:
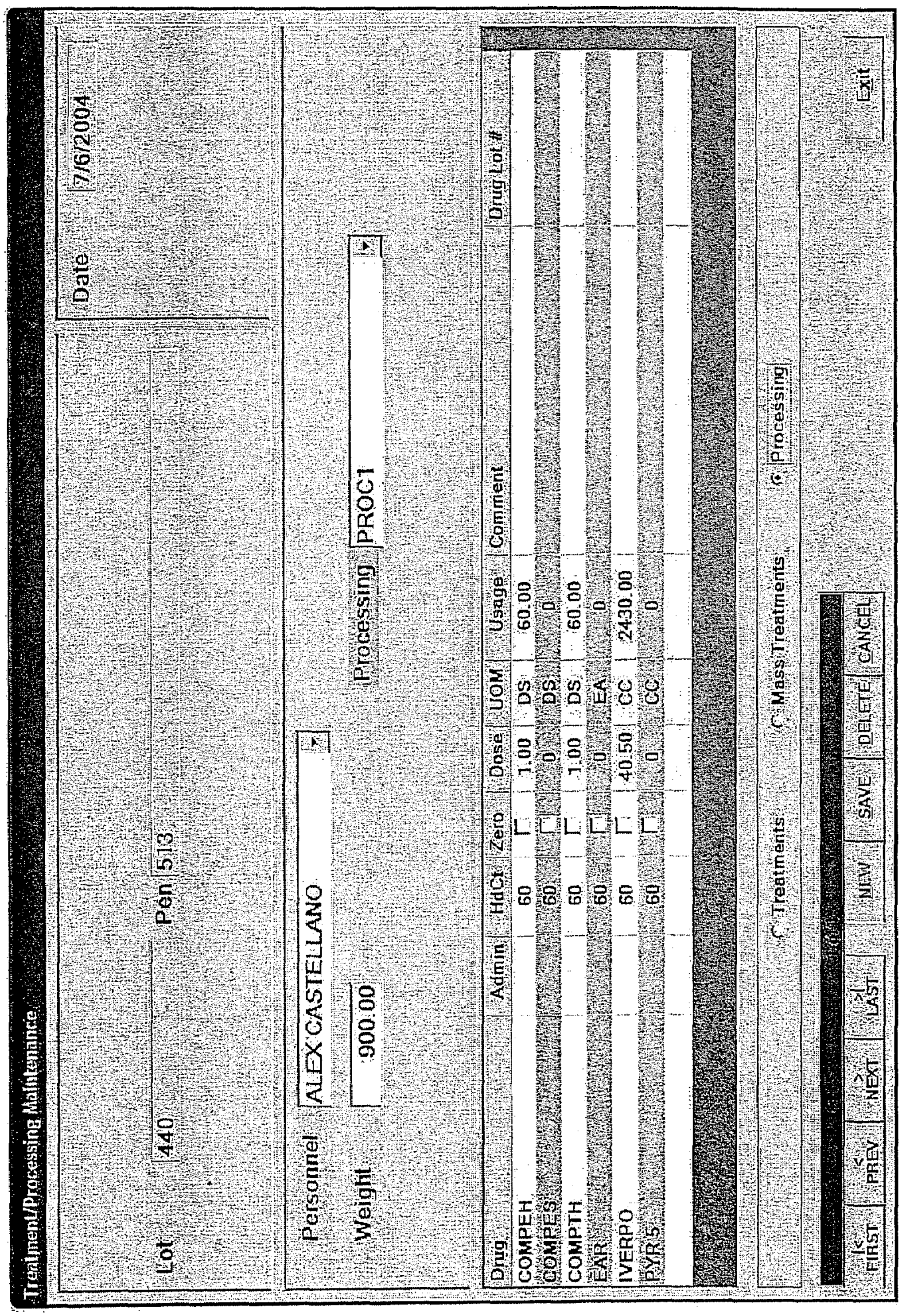
FIG. 37 is a user screen for modifying previously entered data regarding processing for animals.

FIG. 37 is another user screen which can be used to modify previously entered data regarding a particular processing that has been already posted for a group of animals. For example, it may be found later that although a particular work order had instructed the administration of a particular amount of a drug, the actual amount of a drug administered was different than ordered. The screen shows the name of the person who originally completed the processing. The user could reenter data such as dose or usage and then add a comment as to why data was reentered.

Figure 38:
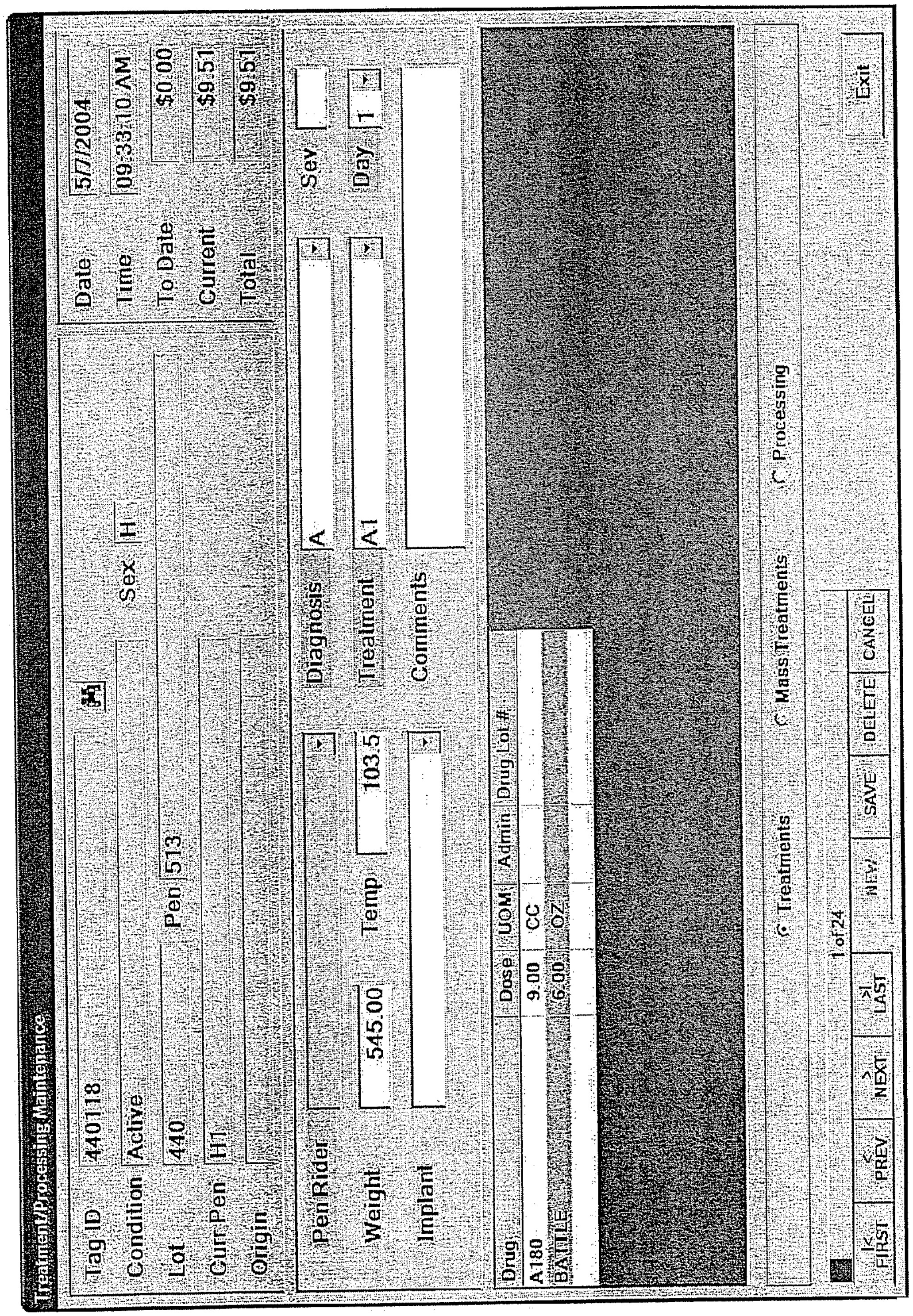
FIG. 38 is another user screen for modifying previously entered data regarding treatment/processing of a specific animal.

FIG. 38 is another user screen that can be used to modify previously entered data regarding treatment/processing of a specific animal. As with FIG. 37, the user could use the screen shown in FIG. 38 to modify data that had been previously entered, such as dose.

Figure 39:
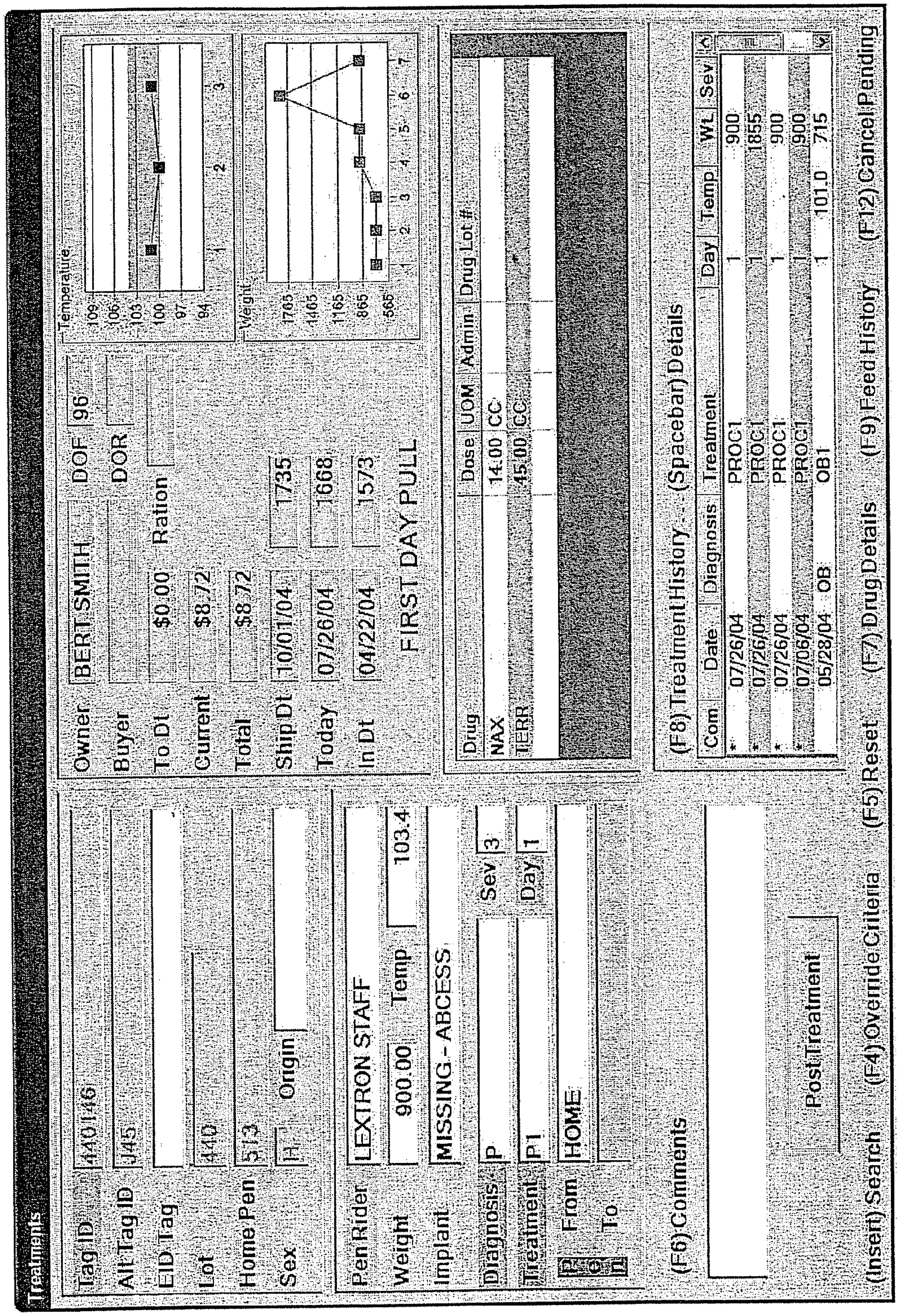
FIG. 39 illustrates a user screen for review of treatment history and for data entry of new treatment.

FIG. 39 illustrates another user screen allowing data entry for treatment. FIG. 39 also shows additional information about the particular animal such as temperature and weight graph, owner information, and treatment history of the animal. In the example shown in FIG. 39, an animal is to be administered two specific drugs identified by the abbreviations "NAX" and "TERR." The user would again preferably be located at chute side as the treatment occurs, and then once the treatment was completed, the user would click on the "Post Treatment" button to record the treatment.

Figure 40:
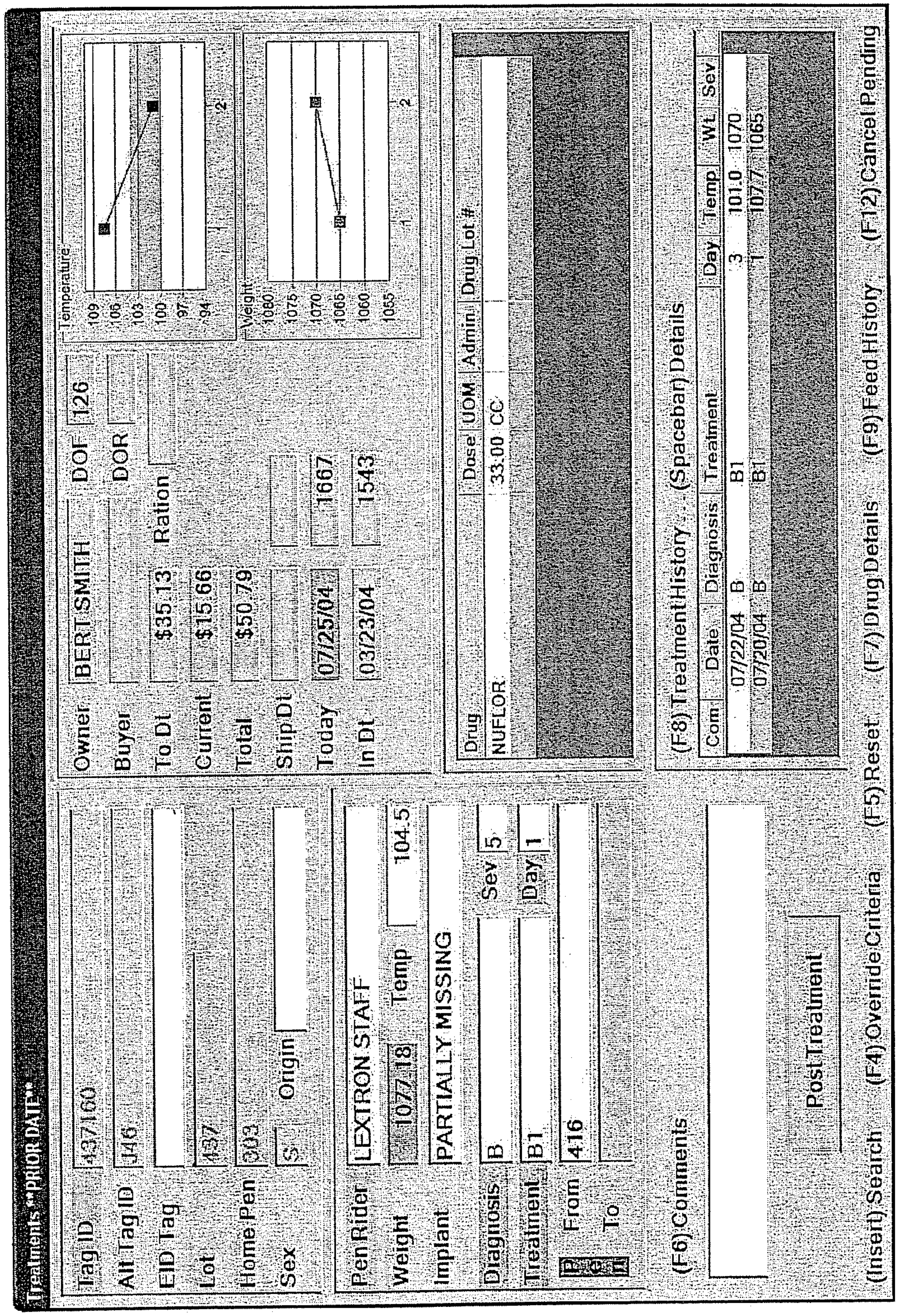
FIG. 40 is a user screen for modifying treatment data or for entering additional treatment data completed on a prior date.

FIG. 40 is another user screen indicating that data for a particular treatment is now being entered for a treatment that was actually completed on a prior date. For example, if a user is unable to be located chute side when treatment occurs, confirmation that a treatment has occurred may not be forwarded to the user for some time after the treatment has taken place. Therefore, this particular screen simply alerts the user to the fact that they are now entering data regarding a treatment that has previously occurred. In the example of FIG. 40, the date of the treatment was Jul. 25, 2004 (the date shown in the "Today" block), and the date that the user is posting treatment would be some day subsequent to Jul. 25, 2004.

Figure 41:
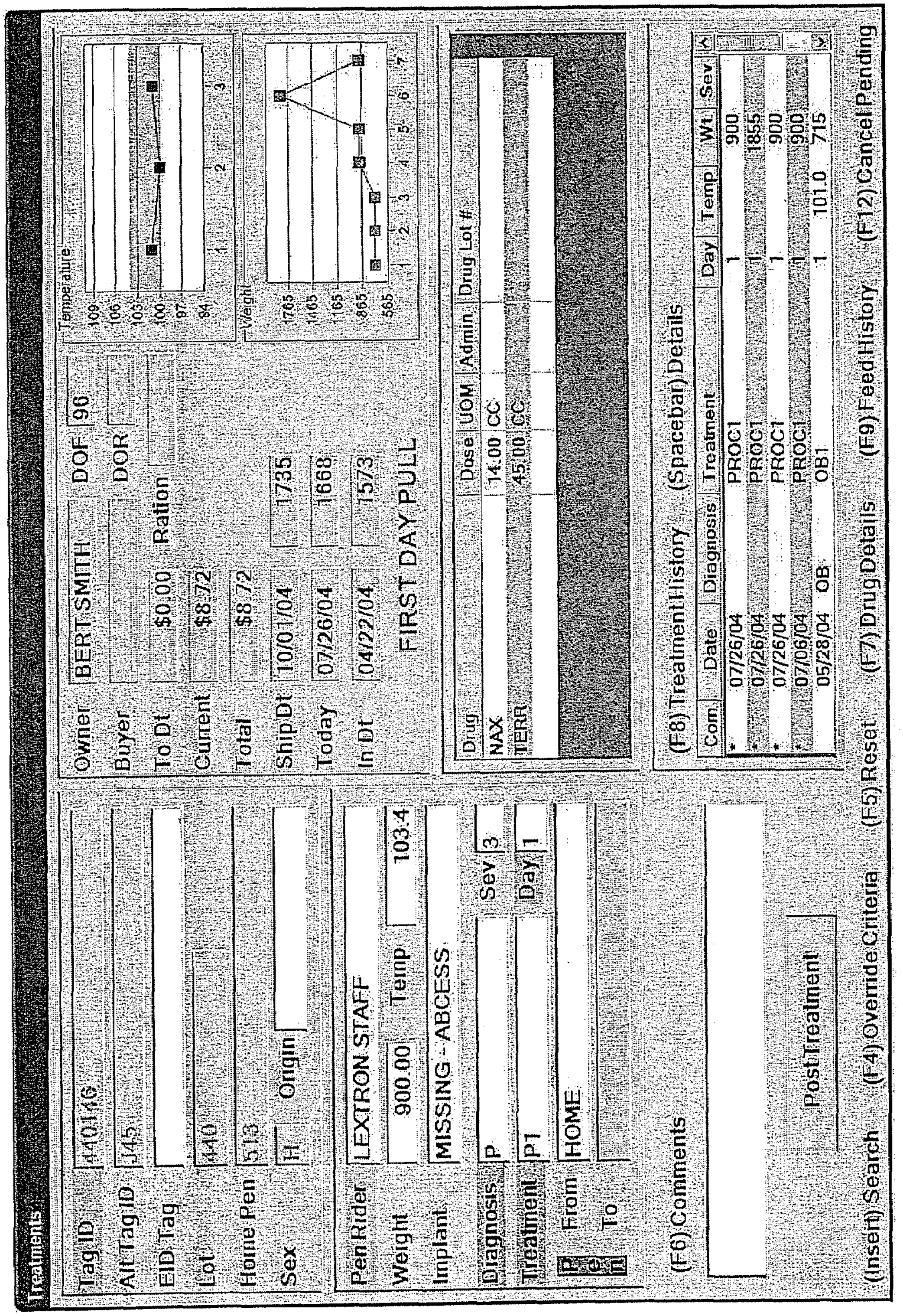
FIG. 41 illustrates a user screen where a user has selected from a treatment history listing for a particular treatment date.

FIG. 41 illustrates another user screen where a user has selected from the treatment history listing a particular treatment date. Once selecting a particular treatment date, another window opens listing the drugs that were administered during that treatment. A user can review a summary of a treatment-by-treatment code, and can also review a specific listing of each of the drugs that were administered during the treatment.

Figure 42:
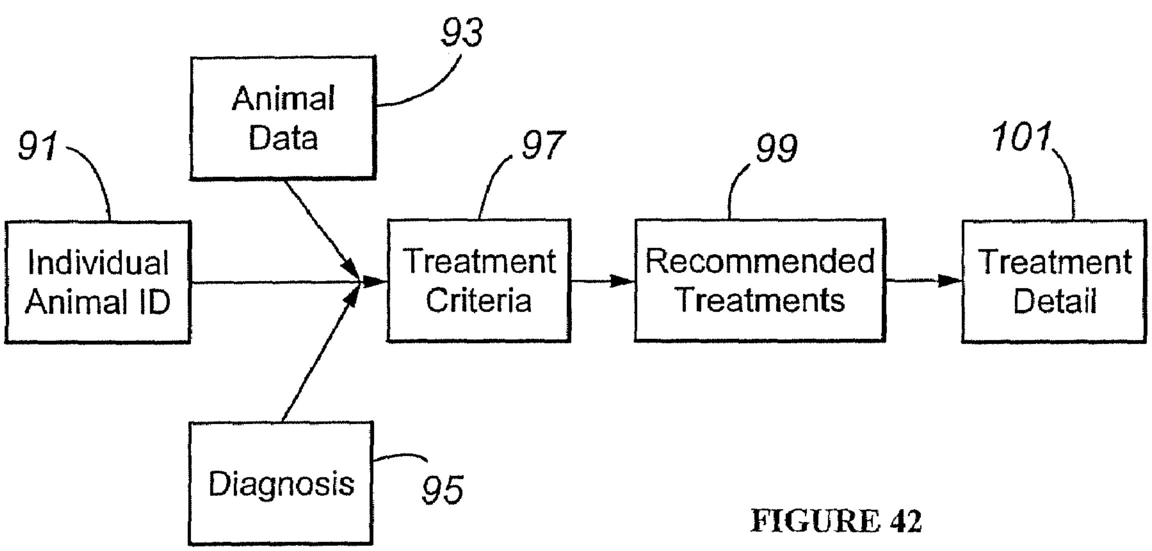
FIG. 42 is a schematic diagram depicting an automated recommended treatment selection process.

Referring to FIG. 42, the schematic diagram depicts an automated recommended treatment selection process. First, the individual animal identification is entered into a treatment screen as by manual entry (typing in the tag ID) or through use of an EID tag reader, as shown at Block 91. Once the animal ID has been entered, the system then locates all animal data stored in the central database or any other peripheral databases associated with this particular individual animal ID. This animal data located is represented at Block 93. The user will next enter an identifying diagnosis code, shown at Block 95, based on the evaluation of the animal. The diagnosis code matches a particular symptom or symptoms of the animal based upon knowledge of the treating veterinarian. The combination of the animal data with the diagnosis is compared with the treatment criteria, as shown at Block 97. The treatment criteria can comprise a listing of animal characteristics or other recorded data about the animal, as well as criteria that is defined by its own formula/algorithm. If the animal data matches the rules set for the criteria, a recommended treatment is produced, as shown at block 99. For example, if the particular animal is recorded as having a fever and respiratory problems, those data entries may match a set of criteria wherein an alogorithm/mathematical relationship is applied to the criteria results in a recommended treatment for pneumonia. The recommended treatment appears on a user interface screen or printed report to include an explanation of how to treat the animal. If the recommended treatment is accepted by the user, then the system next retrieves the associated drugs, drug dosages, administration site, and any other treatment detail associated or assigned with the particular treatment, shown at Block 101. If the treatment is executed, the user inputs data to reflect which treatment was conducted, and the detailed treatment data then becomes additional animal data 93 that is stored for the particular animal. Although a treatment criteria and recommended treatment may be established, it shall be understood that the treating veterinarian may also decide to adopt another treatment that is not recommended and in such case, the particular treatment data is also entered into for the particular animal data, to include a record of any drugs or therapeutic agents provided to the animal.

B. Animal Inventory Sub-Module

FIGS. 43-58 disclose an animal inventory sub-module that is used to control, record, and report on all transactions that effect the inventory of animals that are entered into the data processing system. Basic functionality within the animal inventory module includes detailed management of receiving, movements, shipments, deads, railers, and realizers. The entries for each of these functions enable the data processing system to assign a location to each individual animal to ensure that the status of an animal is updated within the system. For example, once an animal is shipped from the feedlot to a packer, no further data can be entered concerning that particular animal at the feedlot location unless corrections are being made to previously entered data. Thus, data from another animal cannot mistakenly be entered for a shipped animal, and vice versa.

Figure 43:
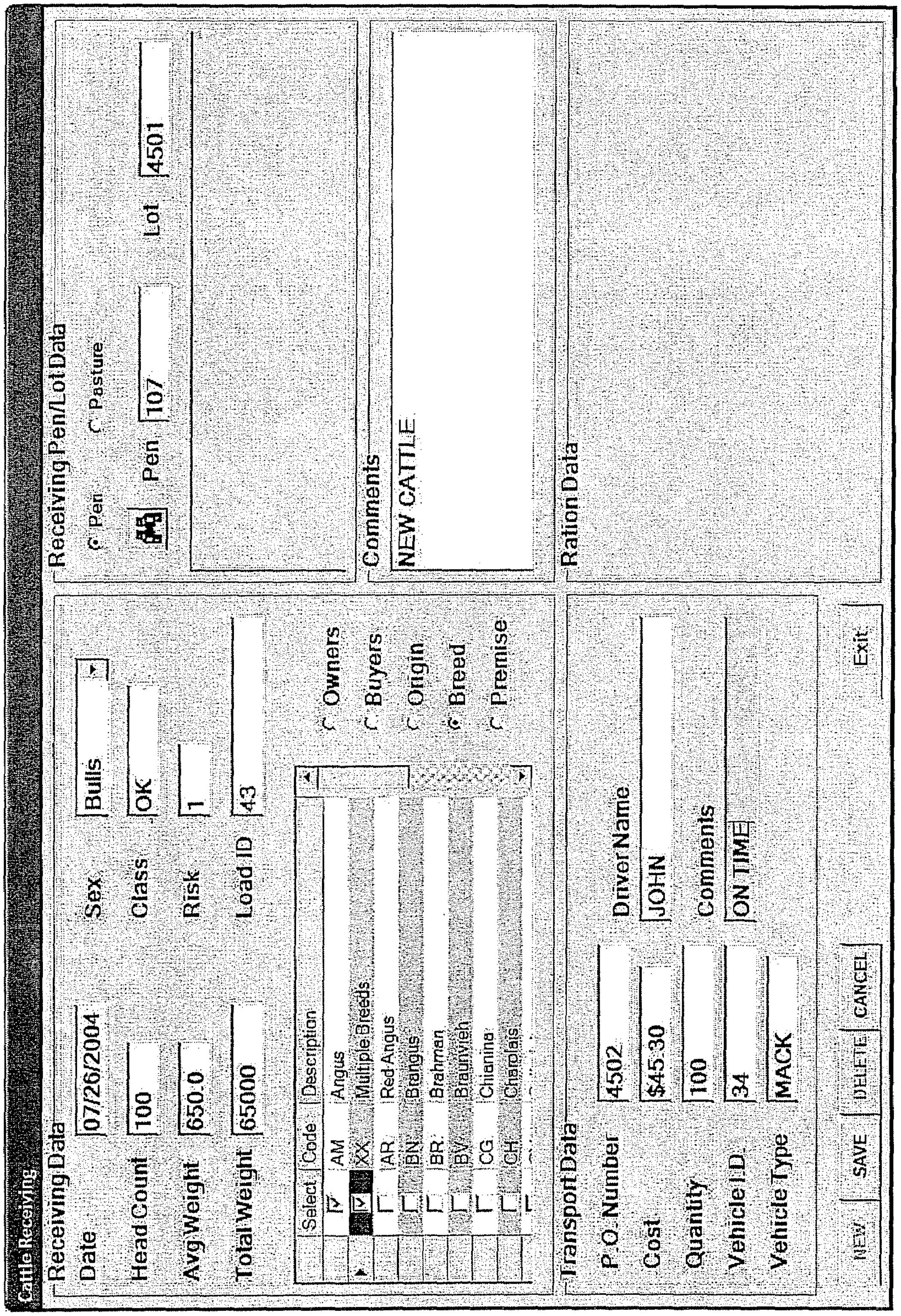
FIG. 43 is a user screen illustrating data entry to record receipt of animals that are being received from another location.

FIG. 43 is a user screen illustrating data entry to record receipt of animals that are being received from another location such as a ranch or grower operation, and wherein a specified group of animals are to be initially assigned to a single pen and lot. As shown in the example of FIG. 43, a head count of 100 cattle were received on Jul. 26, 2004, the group having multiple breeds, the transport data indicating that the 100 cattle were received on Purchase Order Number 4502. The user would enter all of the appropriate information as shown in FIG. 43 and assign the group of incoming cattle to the desired pen/lot or pasture. The data entry would be completed by pressing the "Save" button.

Figure 44:
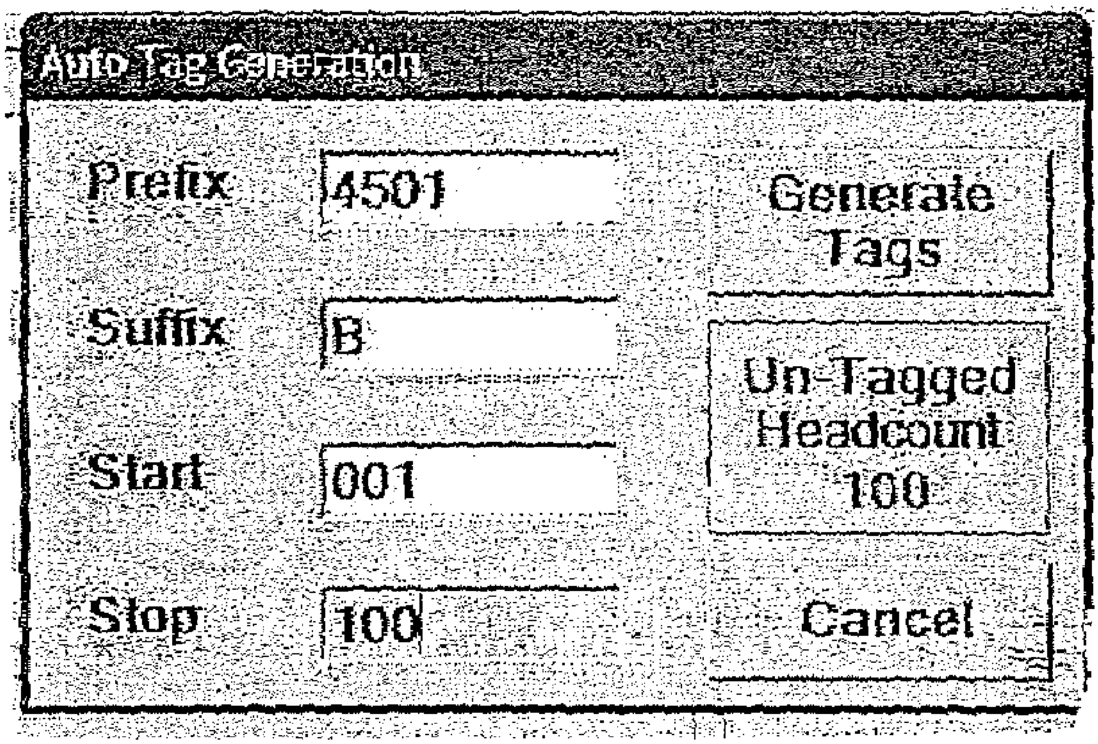
FIG. 44 illustrates a user screen for generating a feedlot tag.

FIG. 44 illustrates a user screen wherein the user can generate a feedlot tag to be assigned to each of the incoming cattle. Accordingly, the "Auto Tag Generation" option is illustrated wherein the user identifies the group of tags by prefix and suffix, and a total number of tags to be generated.

Figure 45:
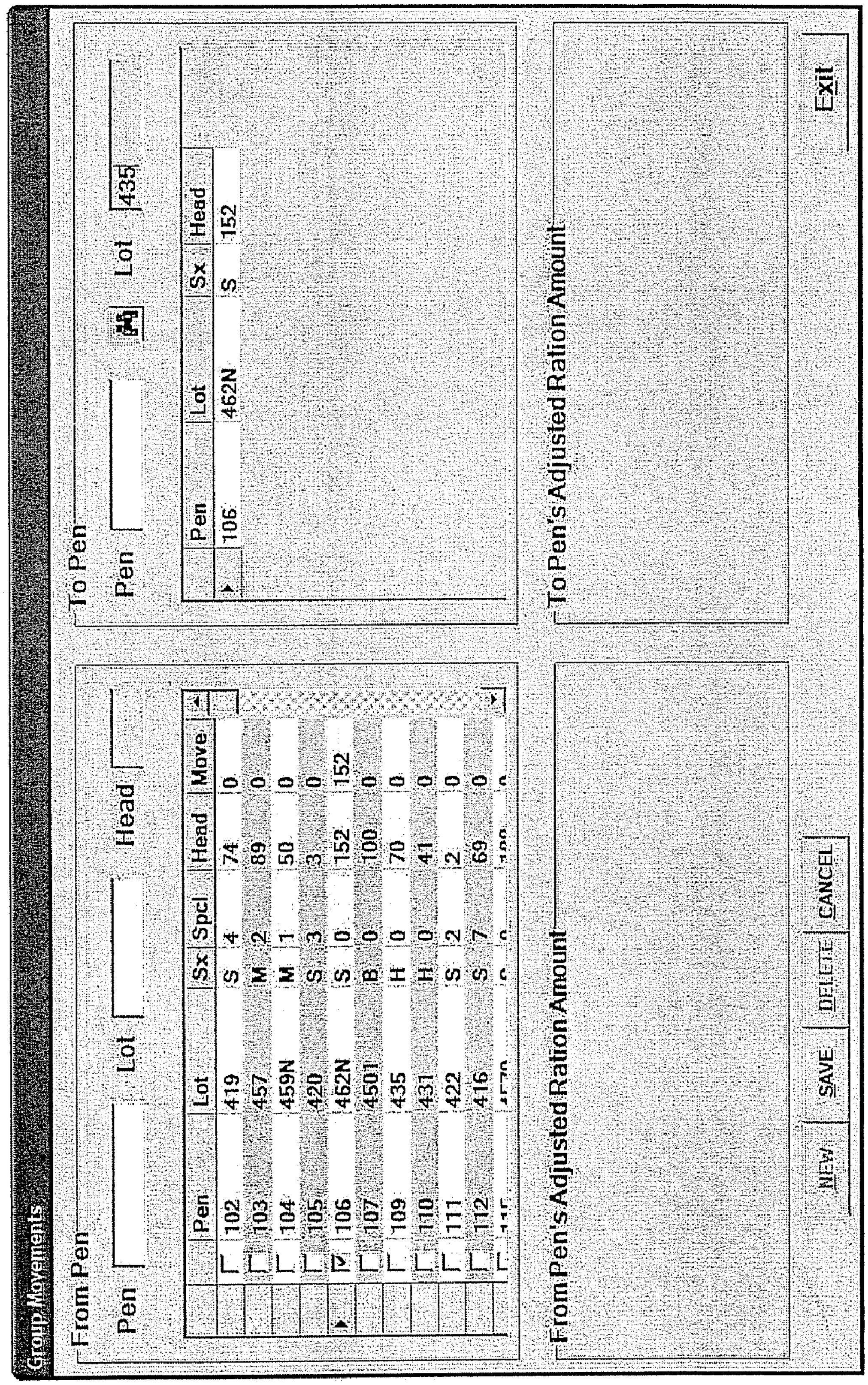
FIG. 45 is a user screen for recording group animal movements.

FIG. 45 is a user screen illustrating how to record group movements of animals. In the example of this figure, all of the animals residing in Pen 106 Lot 462N are to be transferred to Lot 435. Accordingly, the user would check the appropriate block for Pen 106 Lot 462N on the left side of the screen, and then would enter Lot 435 on the right side of the screen as the desired location to which the animals are to be recorded as being transferred to. Also, the screen will show the adjusted ration amounts after the transfer has been saved/posted. If there are any animals left within the pen and lot losing animals in the transfer, a lesser amount of ration would be shown in that losing pen and lot. Accordingly, a gain in the amount of ration would be listed for the gaining pen and lot based upon the number of animals being added to that location. An algorithm is provided in the system which automatically calculates the adjusted ration amounts in both the losing and gaining locations. This algorithm is updated continuously based upon the number of cattle in each location, the identified individual animals in each of the locations, and the prescribed rations for each animal.

It should also be understood that based upon the organization of a particular feedlot location, the pen number could correspond either to a more general or more specific location, and the particular lot number could also correspond to either a more general or more specific location. In other words, there could be a number of lot numbers assigned to a particular pen, or a number of pen numbers could be assigned to a particular lot. In the example screen shown in FIG. 45, the particular lot number is a subset of a particular pen. However, if a feedlot is arranged so that pens are subsets of lots, then transfers could be recorded as being between various lots. Of course, transfers could also be recorded between pens and lots even if the pens and lots are subsets of more general locations. As also discussed above, recordation of group movements would only occur after a work order had been fulfilled, and a feedlot worker was able to confirm that in fact the movement had taken place. Ideally, work stations would be set up within the feedlot at locations so the person recording the group movements could actually witness the movements.

Figure 46:
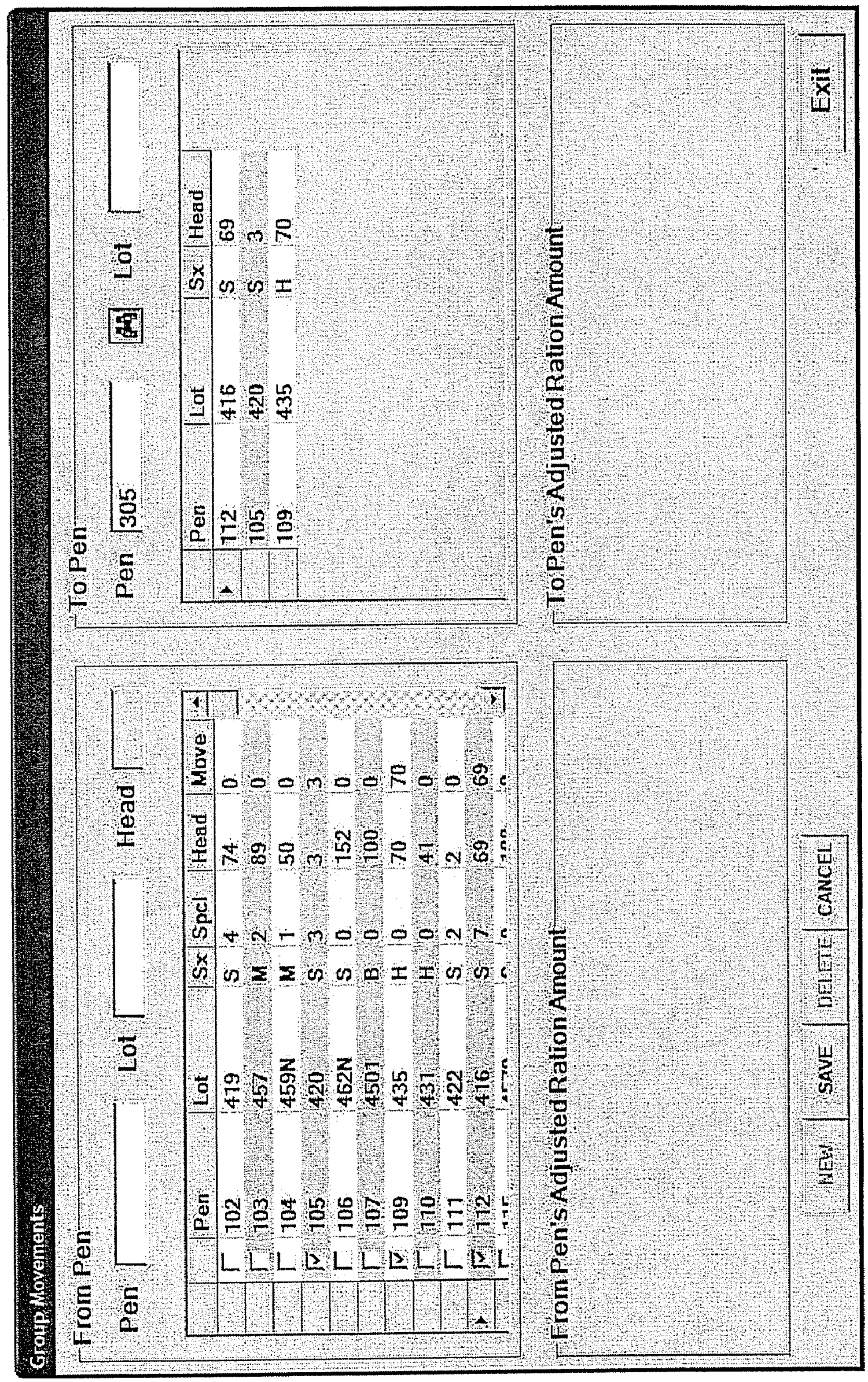
FIG. 46 is a user screen for recording group movement from multiple pens into a single pen.

FIG. 46 illustrates another group movement, but instead of the movement of just one group of animals from a particular pen, multiple pens are being transferred to another pen. In the example, Pens 105, 109 and 112 are being recorded as moved into Pen 305.

Figure 47:
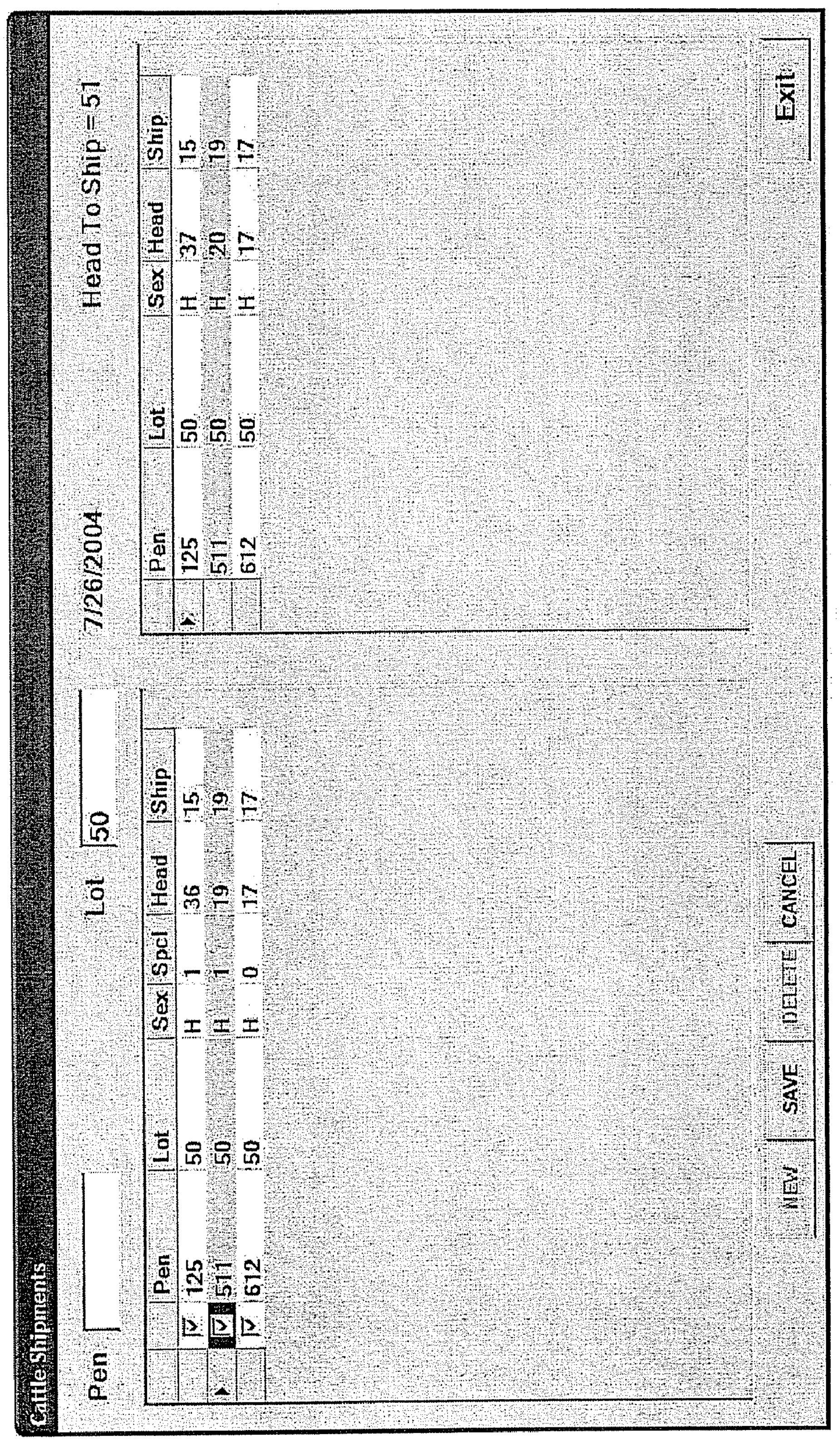
FIG. 47 is a user screen for recording shipment of animals.

FIG. 47 illustrates another user screen wherein cattle shipments can be recorded. More specifically, FIG. 39 illustrates a situation in which cattle found within various pens are ready for shipment to another location, such as another feedlot, or to a packer. In order to record this transfer, the user would simply check the box on a particular pen having animals that were shipped, and then click on the save button to enter the shipment. In the example of FIG. 47, 51 head of cattle were shipped from Pens 125, 511, and 612. Only selected animals were shipped from each pen as shown in the head count versus the ship count. Each animal to be shipped from each pen was previously identified by the user in another user screen which allows the user to select each individual animal to be shipped in a subsequent group shipment.

Figure 48:
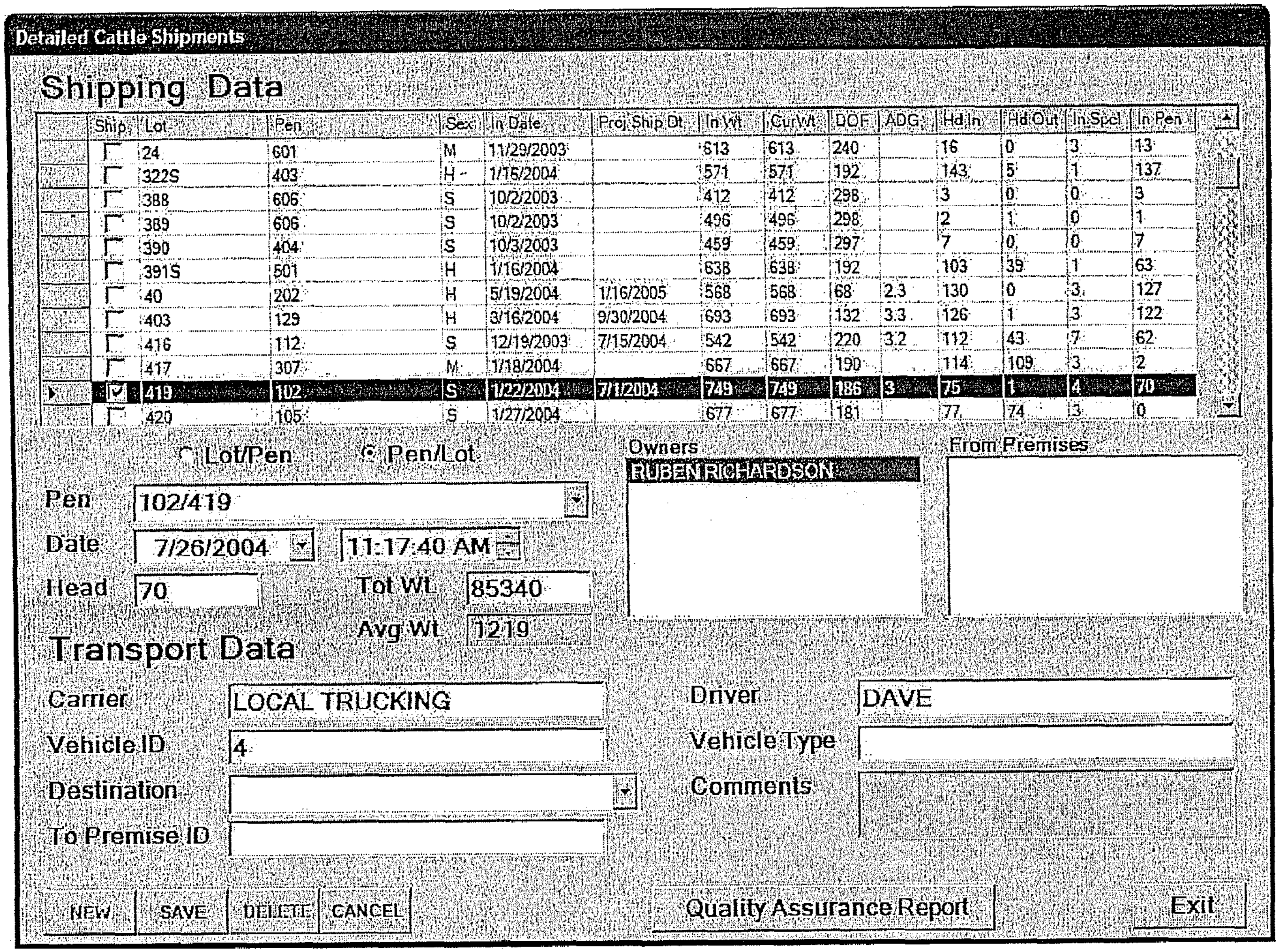
FIG. 48 is a user screen illustrating detailed information for recording shipment of a particular animal.

FIG. 48 is another user screen illustrating a more detailed listing of information for recordation of a particular animal shipment. A user would simply click on the lot and pen shipped by checking the appropriate box, and then complete the information as to the particular transport data, i.e., the carrier, vehicle ID, destination, and new premise ID. The shipment data can be entered by clicking on the Save button. Either individual lot/pen locations or multiple lots/pens may be recorded as shipped with the same transaction.

Figure 49:
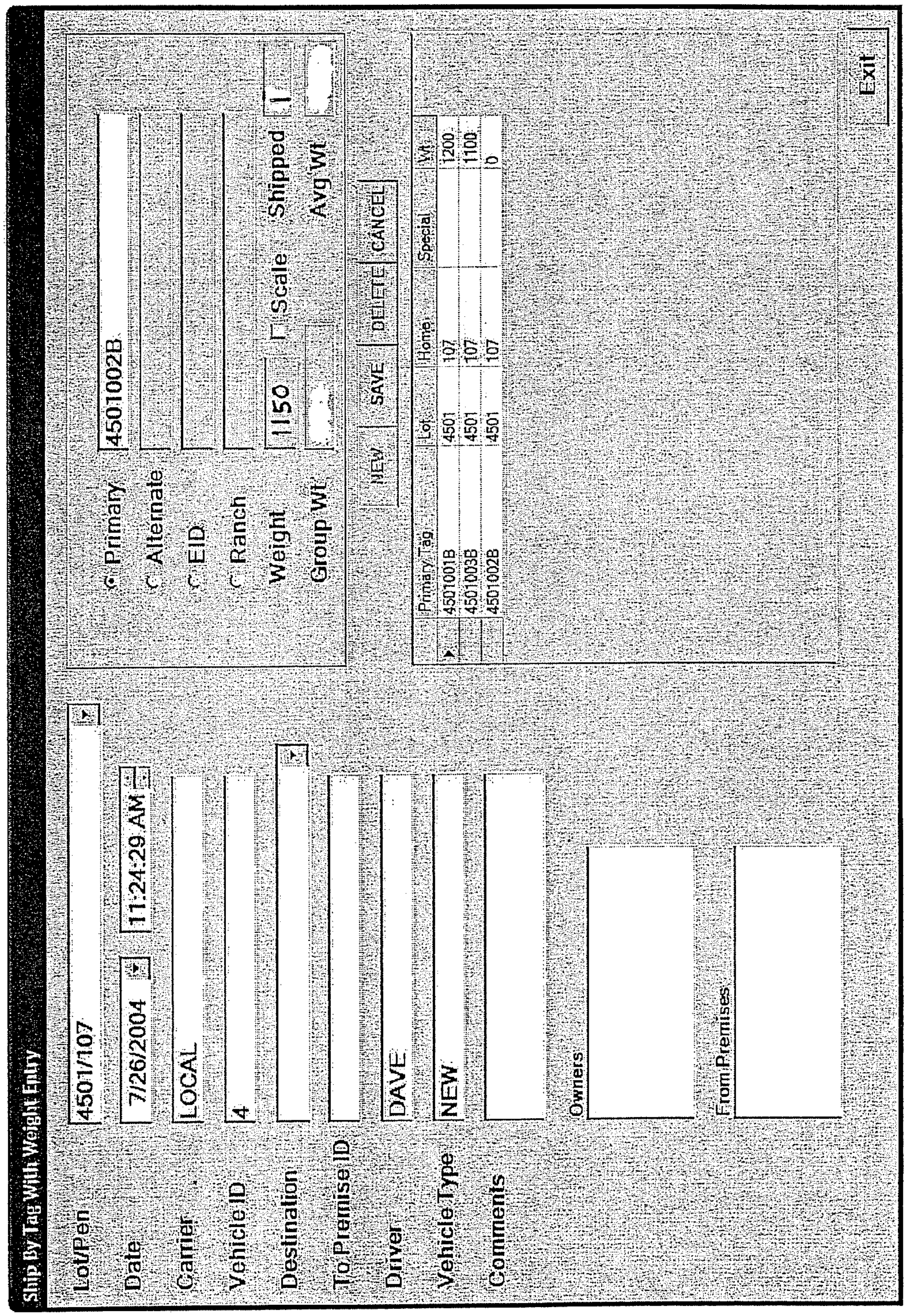
FIG. 49 is a user screen for recording shipment by individual animal as opposed to recording shipment of a group of animals.

FIG. 49 is another user screen illustrating capability to record shipment by individual animal as opposed to recording shipment of a group of animals found within a designated lot or pen. More specifically, FIG. 49 indicates that one particular animal is to be recorded as shipped from Lot 4501 Pen 107 on Jul. 26, 2004. The animal is identified by its primary tag number. Additionally, the weight of the animal is also shown upon shipping. In order to identify particular animals to be shipped, the operator would either manually enter the tag number on the screen or if the animal had an electronic tag, the animal would be "wanded" and the reading device would directly interface with the data processing system to enter the particular electronic tag number on the screen. The user would enter data which may include the carrier, vehicle ID, destination, and new premise ID to which the animal was being shipped. Accordingly, FIG. 41 illustrates that shipments can be recorded by selecting individual animals.

Figure 50:
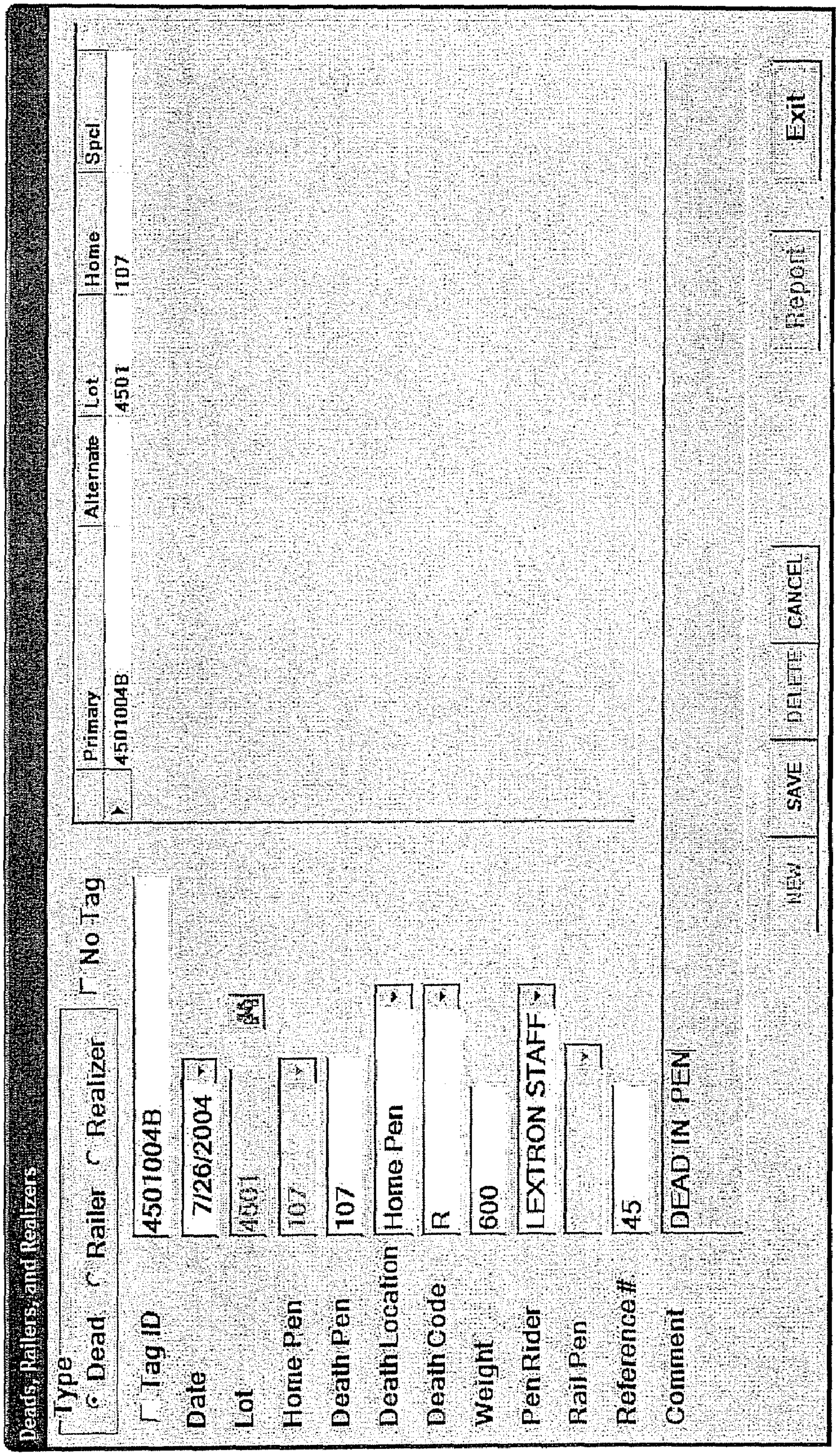
FIG. 50 is a user screen for entering data regarding a change in status of a particular animal.

FIG. 50 is another user screen available for entering data regarding a change in status of a particular animal. During the production cycle of an animal, the animal can unexpectedly die. Thus, recordation must be made of the death. Accordingly, as shown in FIG. 502, the user would enter the tag, date of death, location of death, death code, and comments as necessary. Once this data has been entered, this particular animal could not be scheduled for any further processing or treatment as a live animal. A "Railer" status indicates that a decision has been made to no longer maintain an animal in the feedlot any longer, with the intent to soon ship the animal away from the feedlot. For example, an animal may not be responding to treatment and the cost to conduct further treatment exceeds the market value of the animal. Therefore, by designating the animal as a "Railer", the animal will not be further scheduled for treatment. The "Realizer" status indicates that a decision has also been made to ship an animal for one or more reasons, and the specific reason being recorded on another data entry screen for the particular animal. Thus, FIG. 50 represents the ability for a user to individually select animals and to change their recorded status as necessary.

Figure 51:
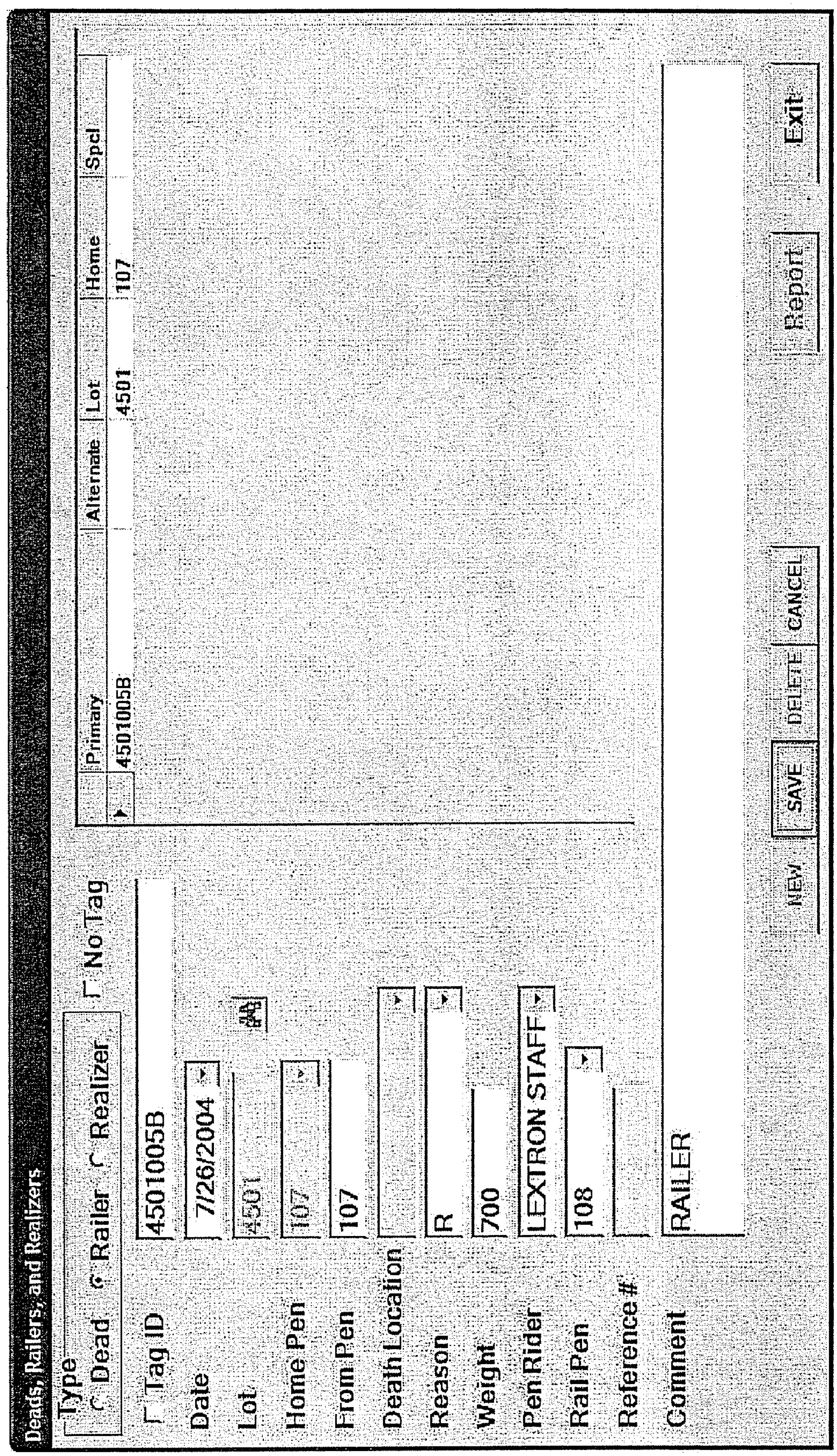
FIG. 51 is a user screen showing an example of an animal that has been designated as a railer.

FIG. 51 is another user screen showing an example of an animal that has been designated as a Railer.

Figure 52:
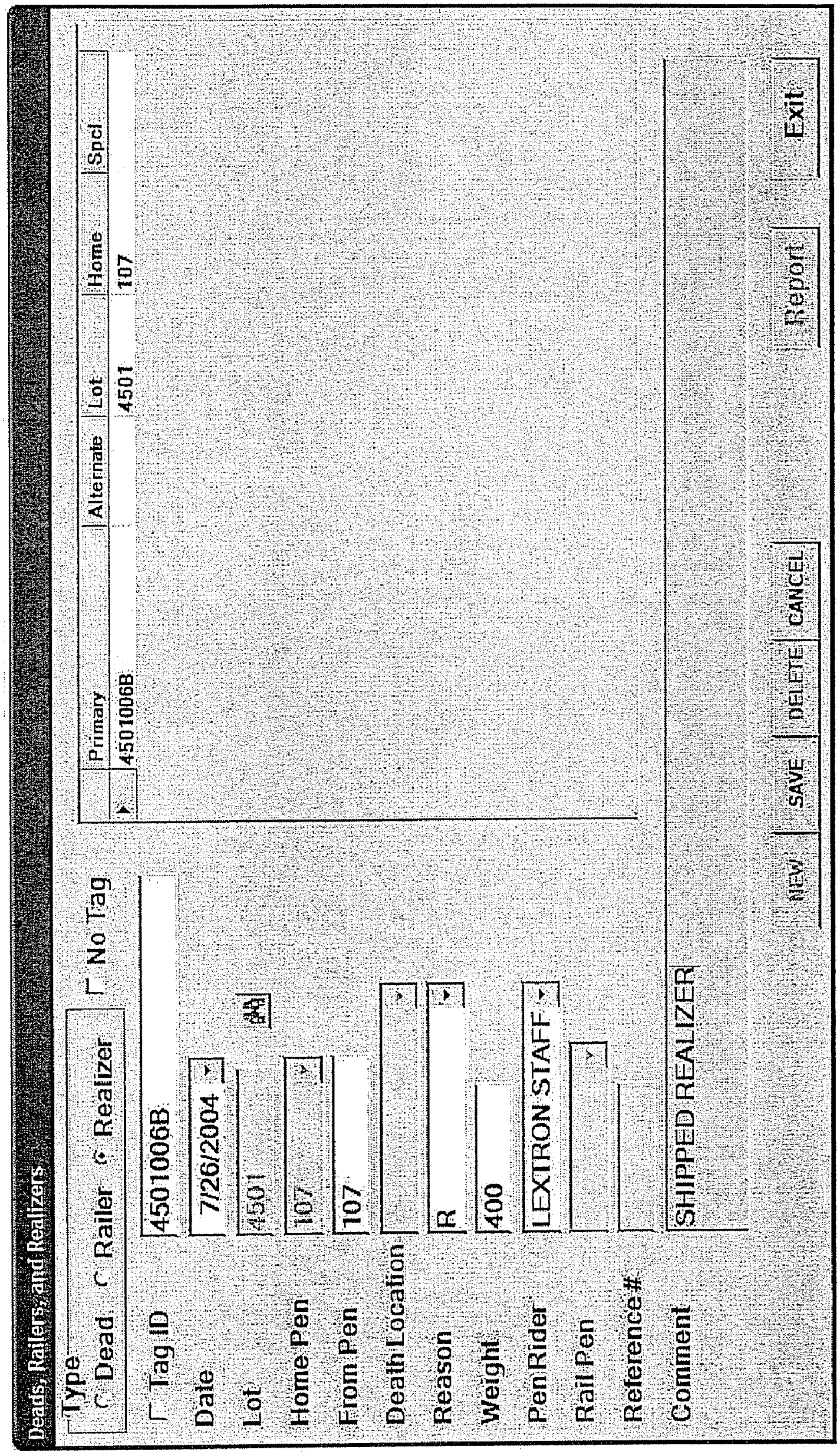
FIG. 52 is a user screen illustrating an example of an animal that has been designated as a realizer.

FIG. 52 is another user screen illustrating an example of an animal that has been designated as a Realizer.

Figure 53:
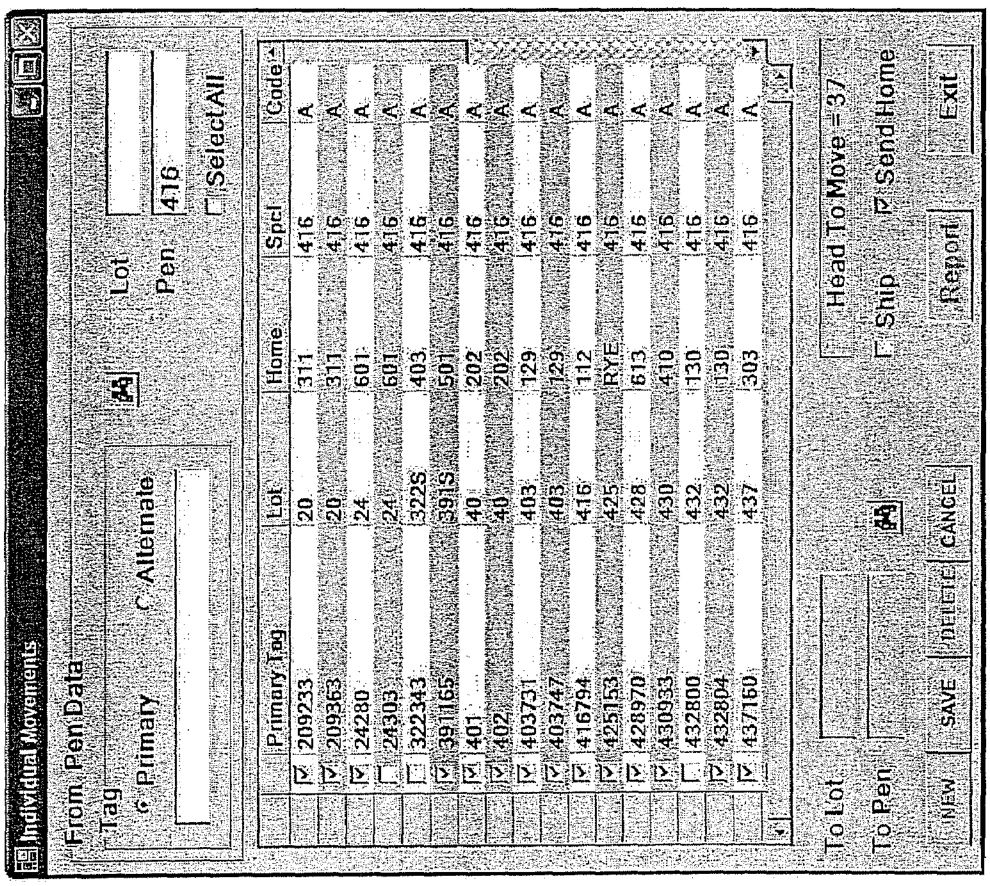
FIG. 53 illustrates a user screen allowing data entry for individual selection of animals to be recorded as being moved from one location to another.

FIG. 53 illustrates a data entry screen that allows individual selection of animals to be recorded as being moved from one location to another. More specifically, the user can select a particular pen or lot, and each of the animals within the pen or lot at that time would be shown by tag number. The user then checks on the particular animal(s) to be recorded as moved, and then enters the pen/lot number where the animals are to be moved. In the example of FIG. 53, Pen 416 was selected as the "from" location, and all of the animals within Pen 416 are listed by their primary tag numbers. Thirty-seven cattle have been selected for movement to Pen 450. Once the user clicks on the Save button, the transfer will be recorded and the selected animals will be shown as being found within Pen 450.

Figure 54:
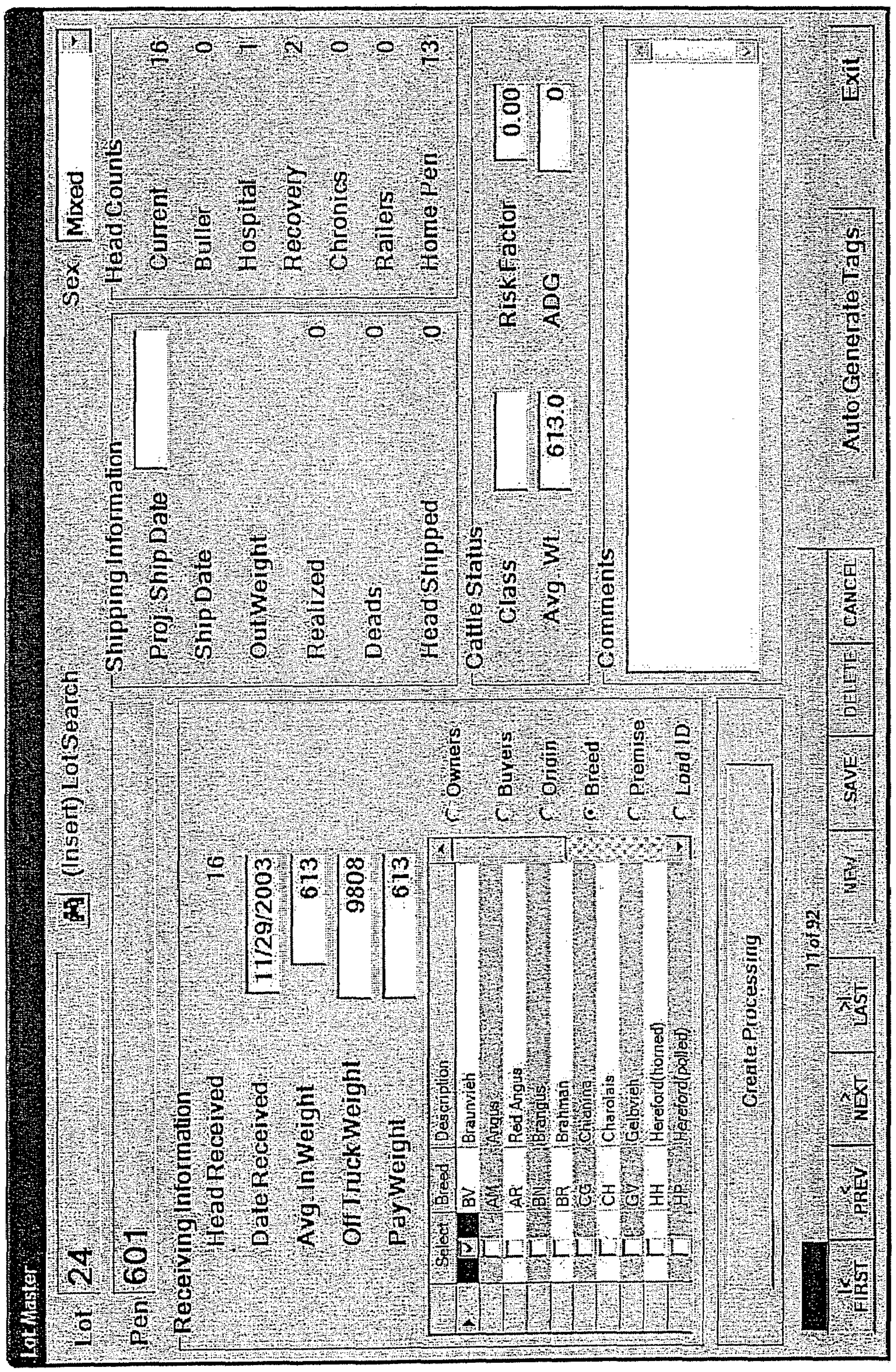
FIG. 54 is a user screen providing information regarding the location of animals at a designated time.

FIG. 54 is an informational screen that may be provided to a user regarding information where animals can be found at any particular time. In the example of FIG. 54, Lot 24, Pen 601 is selected. The screen indicates that there are 16 cattle that were received into this lot on Nov. 29, 2003. This screen also provides shipping information, head counts, cattle status, and comments. The user is not capable of changing head counts within this screen, but is able to add additional identifying information for the particular lot and pen such as the types of breeds, owners, buyers, etc. FIG. 54 more specifically shows that the user has selected to further identify animals within the particular lot by breed.

Figure 55:
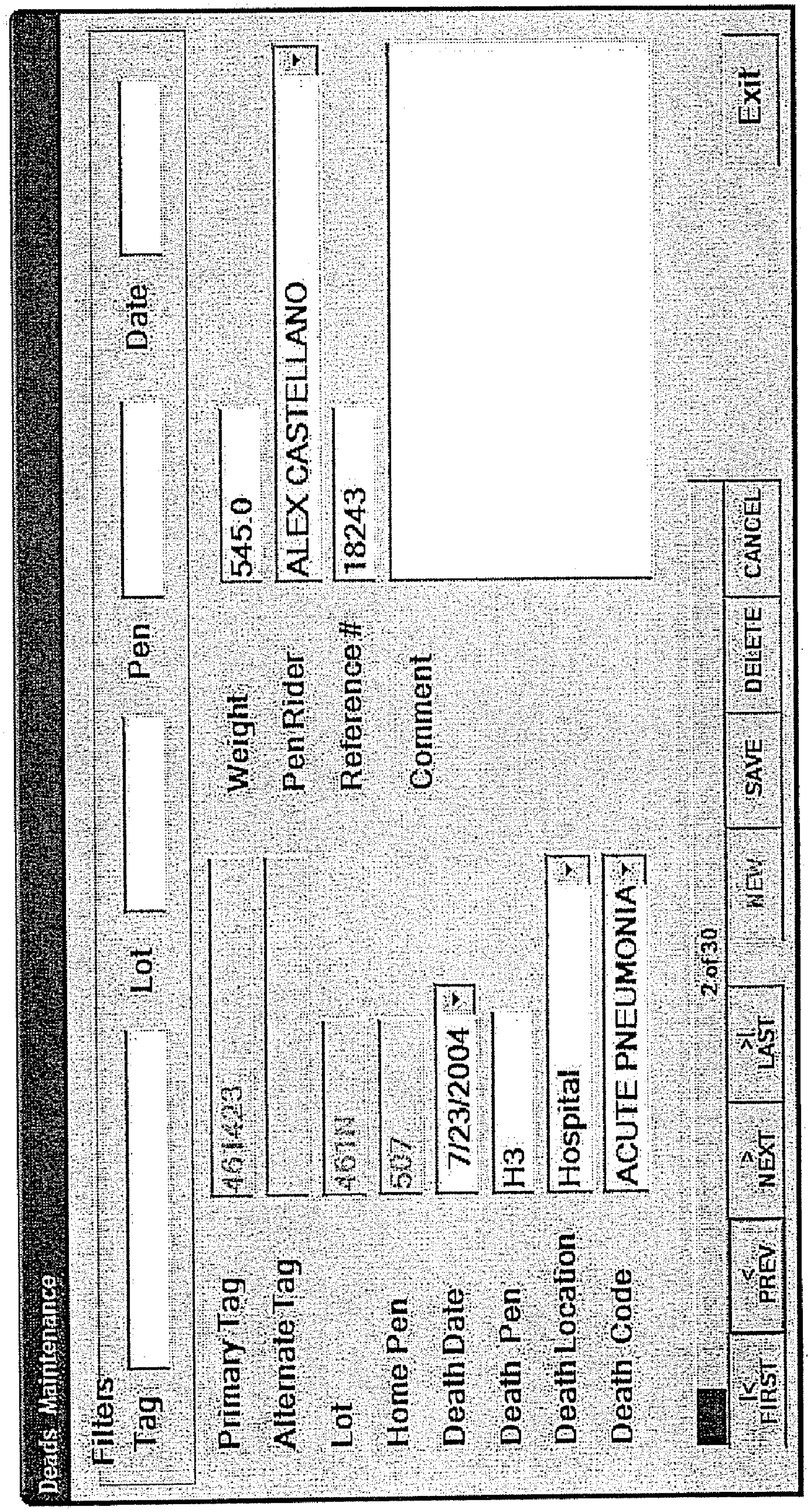
FIG. 55 is a user screen for modifying existing data regarding a dead animal.

FIG. 55 is a data entry screen that allows the user to modify existing data regarding a dead animal. This type of data entry screen can generally be referred to as a maintenance screen.

Figure 56:
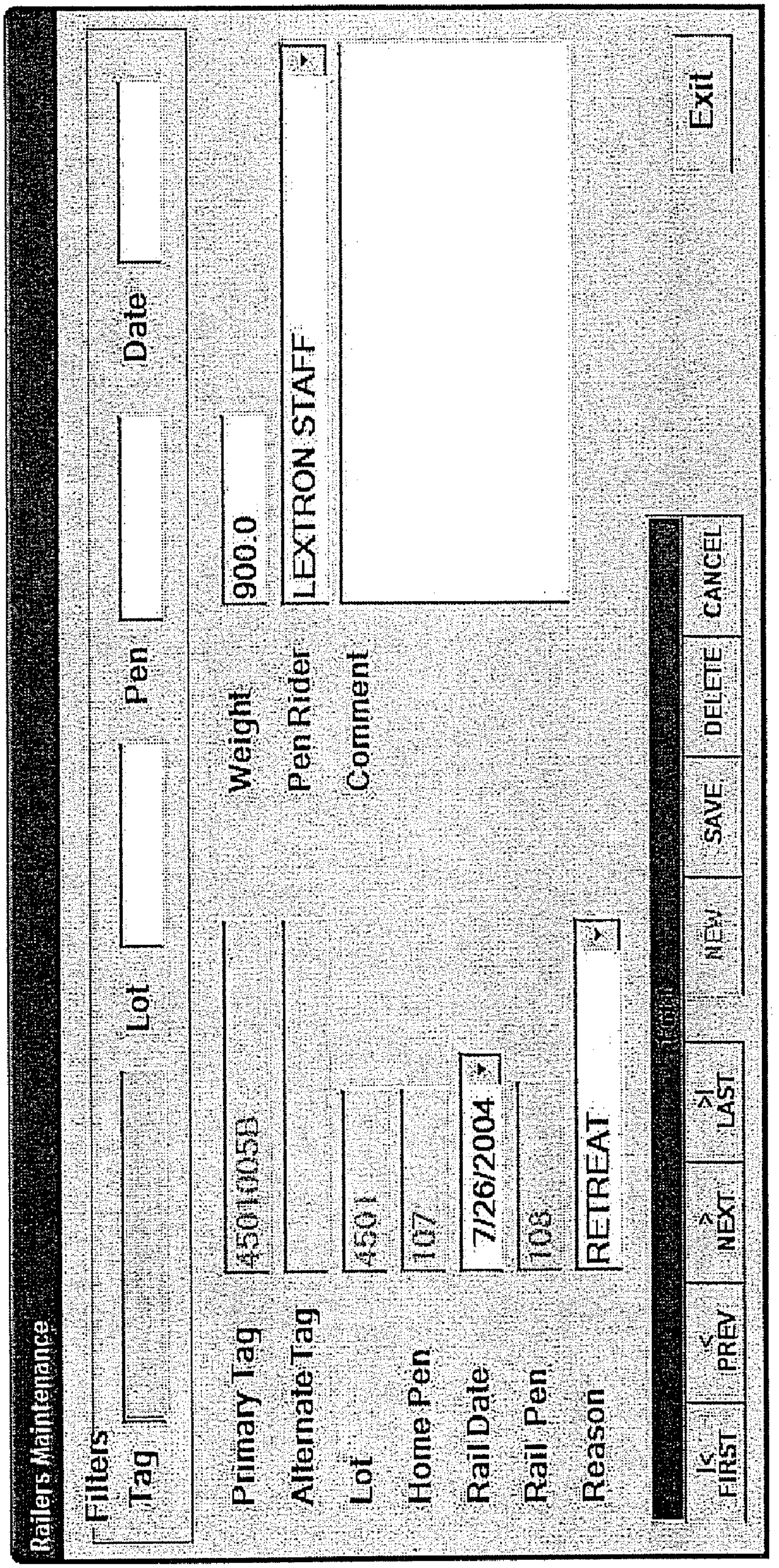
FIG. 56 is a user screen for modifying existing information of a railer record.

FIG. 56 is an example of a user screen allowing maintenance of a Railer record.

Figure 57:
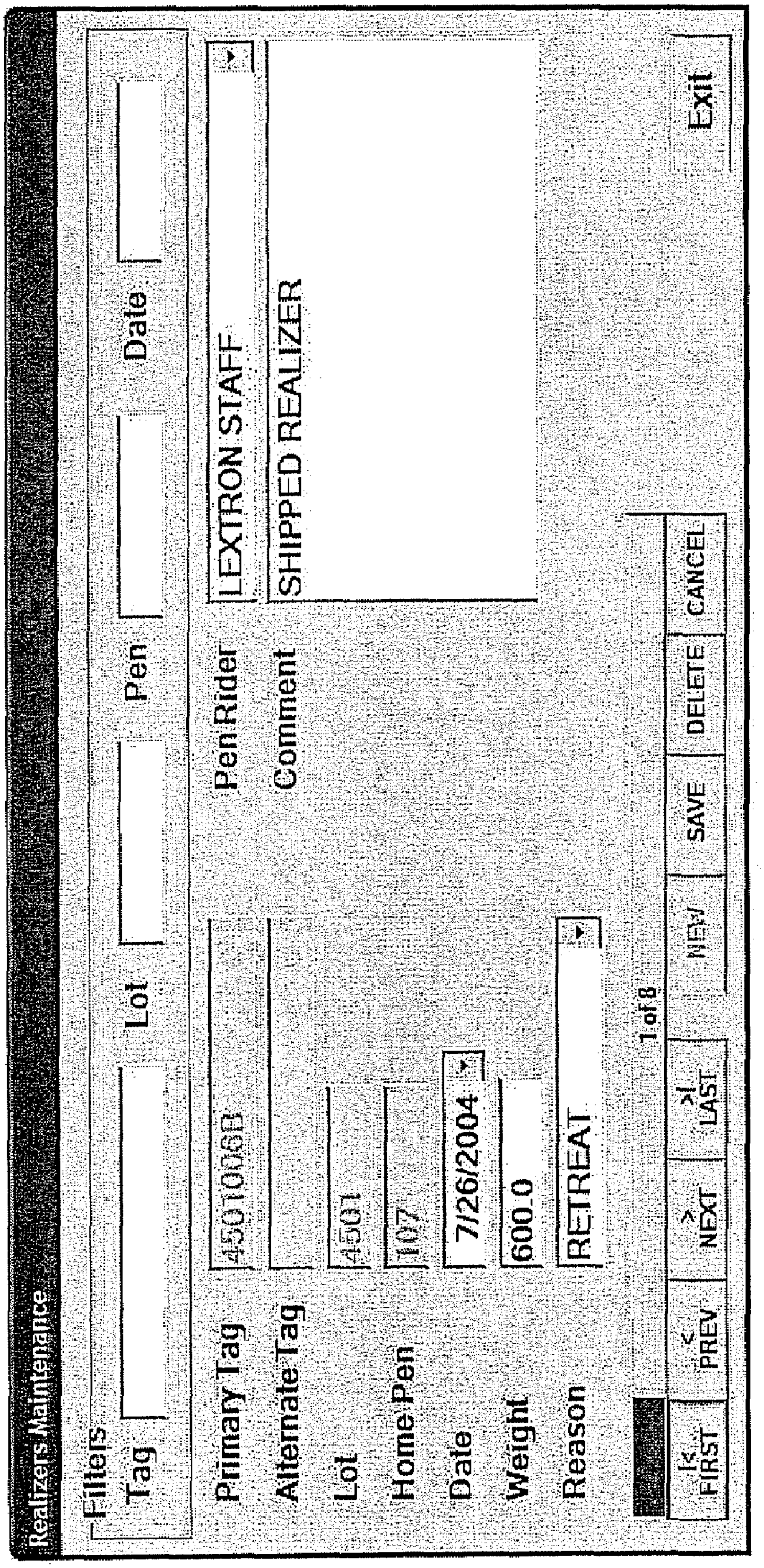
FIG. 57 is a user screen for modifying existing data regarding a realizer record.

FIG. 57 is an example of a user screen allowing maintenance of a Realizer record. An additional function covered under the animal inventory sub-module includes animal sorting. Animal sorting refers to the continual evaluation of a single animal or a group of animals, and sorting those animals periodically so that animals with similar characteristics are grouped together in order to ease overall management tasks. For example, one or more animals in a particular feed yard may not be responding to particular medications administered to return the animals to proper health. Because these animals may continue to carry an infection, they might infect other cattle within the pen or lot; therefore, it is desirable to isolate those animals from the others to prevent the spread of disease. Further for example, if there are one or more cattle who do not appropriately respond to the feed ration in order to gain a prescribed amount of weight, then those particular animals should also be segregated and treated separately, thereby simplifying the feed call for other animals who are properly responding to routine feed rations.

Figure 58:
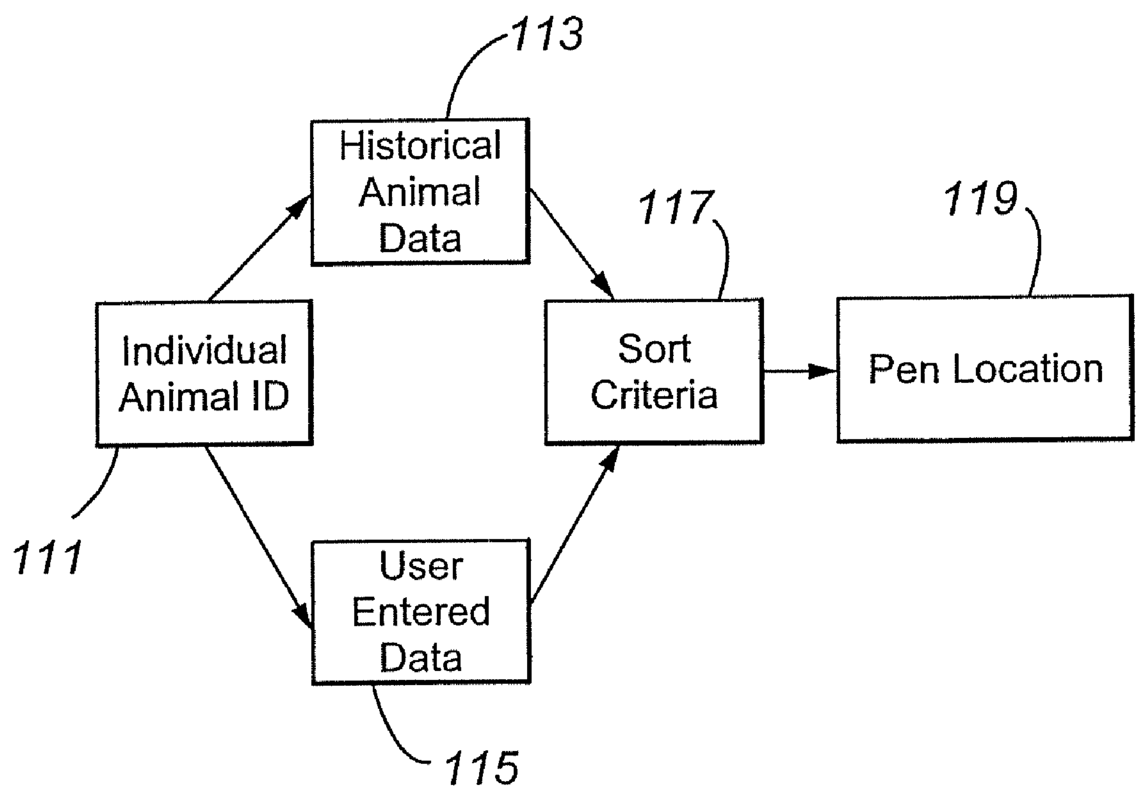
FIG. 58 is a schematic diagram illustrating an automated sorting criteria process of the present invention.

Referring now to FIG. 58, a simplified schematic diagram is provided to explain the automated sorting criteria process of the present invention. As shown in Block 111, first the individual animal ID is entered in a treatment screen via manual entry or through automated entry for example, an EID tag reader. Once this information is entered, the system then locates all animal data associated with the individual animal ID from the animal management database. This historical animal data is shown at Block 113. The user may then enter additional animal data, shown at block 115, to further describe the present state of the animal. For example, the animal could be weighed at that time. Based upon the recorded data concerning the particular animal, application of one or more rules/algorithms to the sort criteria 117 results in a recommended location for the animal by comparing the animal data to the sort criteria. The recommended location is typically another pen and lot location 119. The user can then initiate transfer of the animal to the recommended pen/lot location. Additionally, it shall be understood that while a particular location may be recommended by the sort criteria, the user also has the ability to manually select a particular location thus overriding the recommended location.

Figure 59:
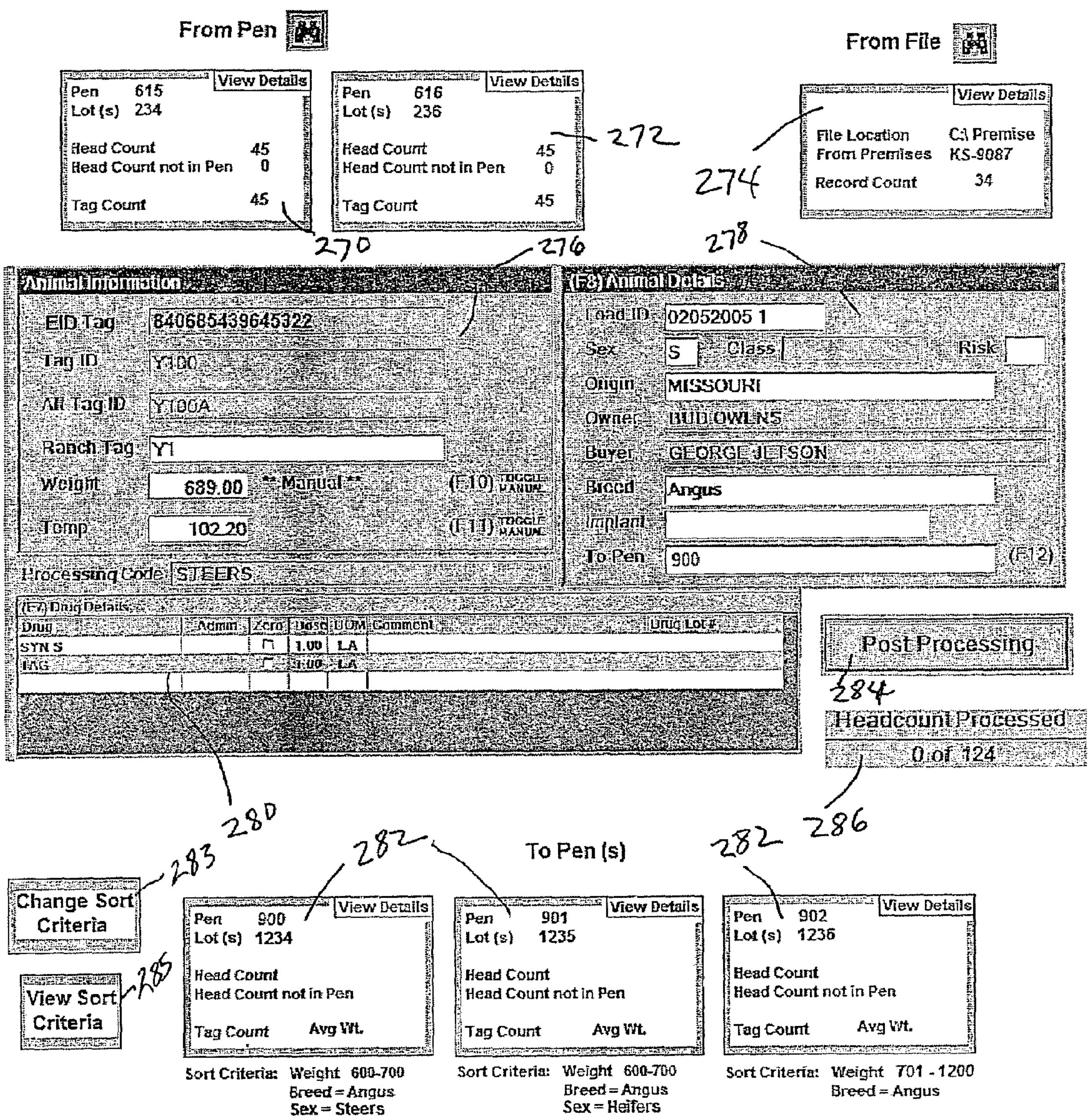
FIG. 59 is a user screen showing the manner in which cattle can be sorted wherein individual animal data appears on the user screen once an animal's tag is read, the screen further illustrating where the animal originates from and the location to where the animal is being transferred to in the sort operation.

Referring to FIG. 59, another user interface screen is provided to explain in greater detail the manner in which cattle can be sorted thereby allowing the user to assign a particular animal to a new group of animals within a facility. When it is desired to conduct a sorting operation, the user first obtains information on the particular pens that are to be sorted, which may include a new load of cattle that are being held in a receiving pen. In the example of FIG. 59, the user has chosen to sort two numbered pens and one receiving pen. More specifically, the upper portion of the user interface screen includes two small boxes containing information on cattle in two different pens of the feedlot, shown as boxes 270 and 272. The information displayed for these two pens includes the head count of the cattle present in the pen, the head count of the cattle not in the pen (for example cattle in a hospital pen), and a tag count. The tag count corresponds to the number of animals in the head count that have a tag that identifies the particular animals. In some cases, an animal may be received into a pen without a tag thereby accounting for the difference between the head count and the tag count. The animals to be sorted from the receiving pen are displayed in box 274 which provides a file location, identification of the premise/location where the animal has been received from such as from another feed yard (the "from premise"), and a count of the cattle in the receiving pen (the "record count"). The file location is the temporary location in the central database where information is stored about the group of received cattle. Next, the user will approach a particular pen and begin the sorting process. An animal is removed from the pen and guided through a chute or alley to identify the animal being processed. As discussed above, tag reading can be done automatically by a tag reader incorporated within the chute/alley, or alternatively by a hand-held tag reader, or the tag information can be manually entered. As the animal tag is read, the recorded animal data appears on the user screen. In the example of FIG. 59, the tag ID, alternate tag ID, ranch tag, weight and temperature of the animal is displayed in box 276. Box 278 illustrates additional animal detail such as the sex, origin and owner of the animal, and box 280 shows details of which particular drugs the animal is to receive. The user has also selected various sort criteria for sorting the selected pen/file locations. In the example of FIG. 59, the sort criteria chosen includes sort criteria for weight and breed. It shall be understood that any number of sort criteria can be chosen by the user depending upon the purpose of the sorting operation at that time, and the sort criteria available within the system. The location to which the animals are to be transferred to are illustrated at the lower portion of the screen. Three pens are identified as the locations to which the cattle are to be transferred to, and the information for these pens are shown in boxes 282. These pens are designated as the "to pens". The information for these to pens include the designated pen and lot numbers, as well as the current head count in the pens, the head count not in the pens (for example, cattle in a hospital pen), the tag count, and the average weight of the animals in the pens. After the user views the animal information in boxes 276, 278, and 280, the user can decide to sort the particular animal into the designated pen by clicking on the post processing button 284. Optionally, during set up of the sort operation, the user can choose to have all records automatically posted once each tag is read so that each animal record automatically posts to the proper pen location. The animal is sorted into the appropriate pen based upon the match of the animal data with the sorting criteria. As each animal is processed, a head count processed is provided in box 286 that provides a running total of animals processed versus the total number of animals to be processed. The total number of animals processed is a sum of the "from pen" and "from files" selected. Additionally, as each animal is processed, the head count in the losing or from pen will be decreased by one, and the gaining or to pen count will be increased by one. Thus, the user can also view the progress of the sorting operation as each animal is processed. Of course, as the location of each animal changes by moving the animal from one pen to another, the individual animal information is also updated to reflect the location of where the animal currently is. However, data is also maintained as to the animal's previous pen location, as necessary. Maintaining this historical location data will ensure that an animal can be traced back to the original receiving group of cattle for various evaluation purposes. The sorting screen in FIG. 59 can be accessed during processing or receiving functions within the data processing system. Additionally, a user may wish to change the sort criteria during the sort operation based upon the actual results of the sort operation. Accordingly, the user can click on either the change sort criteria button 283 or the view sort criteria button 285 to choose another criteria in the listing of available sort criteria, or to modify the chosen criteria.

C. File Maintenance Sub-Module

The file maintenance sub-module of the present data processing system refers to the sub-module that allows a user to add, delete, and modify items on the data verification tables, and operational parameter tables set up in the system. Many of these tables are preloaded/preconfigured with standard values and may be supplemented or modified by authorized users.

In order to ensure data integrity of the system, the verification tables and operational parameter tables are incorporated to ensure that any data entered can be validated against acceptable data values and parameters. For example, if a user manually enters a tag number and the tag number does not correspond to an available active record, then the attempt to make that data entry would result in the production of an error message to the user indicating that the tag number is not valid.

Additionally, the present system has the ability to set general rules and parameters for processing, treating and treatment of animals. For example, specific criteria may be set for both feeding and/or treatment protocols thus potentially avoiding improper feeding or treatment in terms of excessive use of supplies for an animal making it an unprofitable investment. More specifically, a particular mathematical relationship or algorithm can be defined to control available feeding or treatment protocols. The variables in the algorithms can be selected from data fields that can be especially configured.

Figure 60:
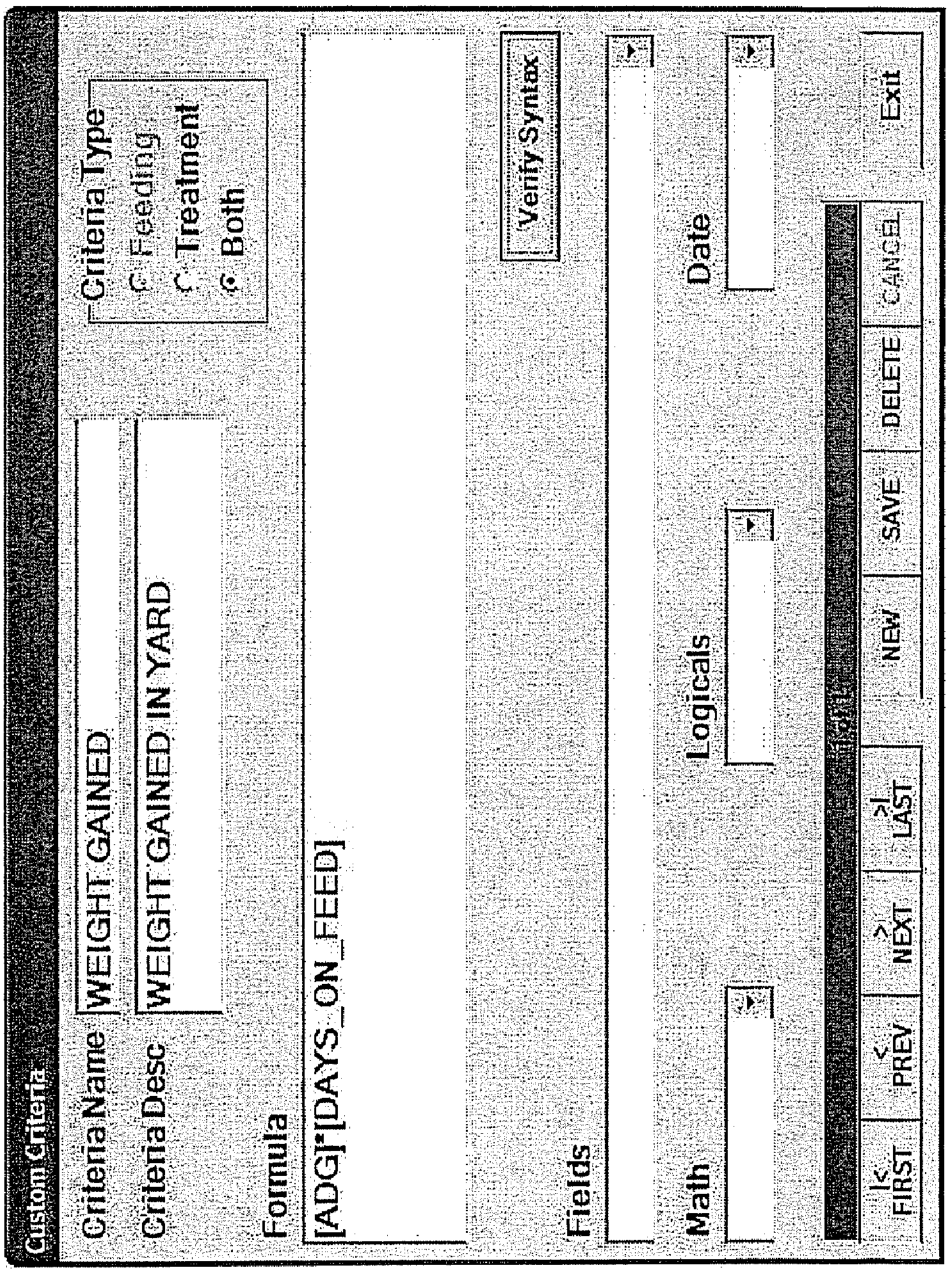
FIG. 60 is a user screen illustrating yet another example of a custom criteria that has been developed for both feeding and treatment criteria.

Referring now to FIG. 60, another example is shown for creating custom criteria. More specifically, FIG. 60 shows that the user decided to create both a feeding and treatment criteria given a criteria name of "Weight Gained". The criteria corresponds to the amount of weight gained by the animal while in the particular feedlot/yard. The amount of weight gained in the yard is calculated by a formula. In this case, the formula is ADG multiplied by the number of days on feed. ADG and days on feed are specific data fields that are recorded for each animal. Therefore, FIG. 60 simply represents another example of the ability to create criteria by naming particular criteria, and then assigning some type of mathematical relationship to that criteria. In another user screen, the "Weight Gained" criteria could be presented as a view option, and selecting this option would allow the user to view weight gain information for the animal to date.

Figure 61:
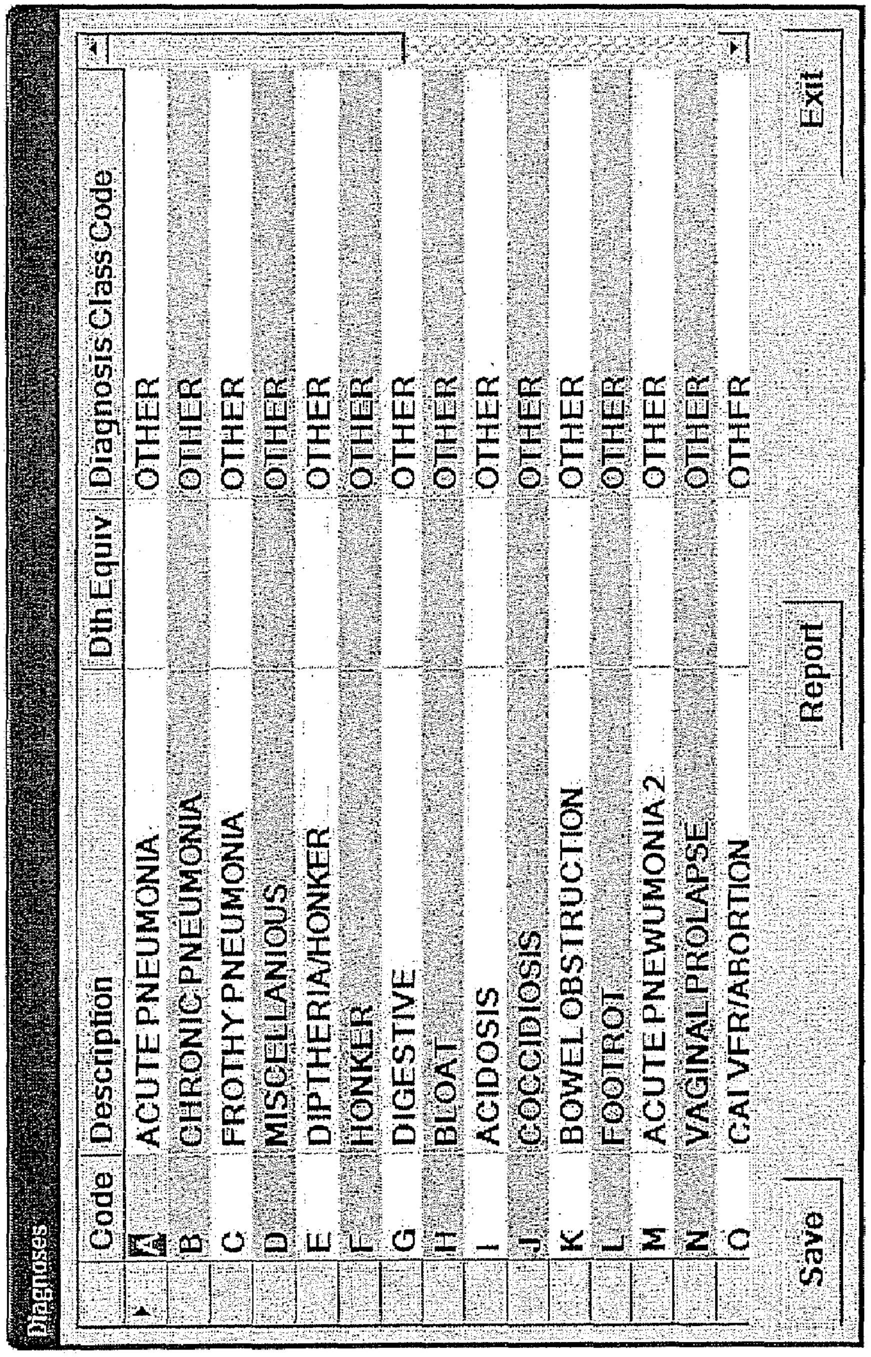
FIG. 61 is a user screen showing a listing of diagnosis codes corresponding to a particular ailment or condition.

FIG. 61 illustrates an example of a listing of diagnosis codes that correspond to a particular ailment or condition. The codes can be modified by a user, and diagnosis codes can be arranged or separated by facility as required. These diagnosis codes can then be used to build specific treatment protocols based on the diagnosis entered by the user.

Figure 62:
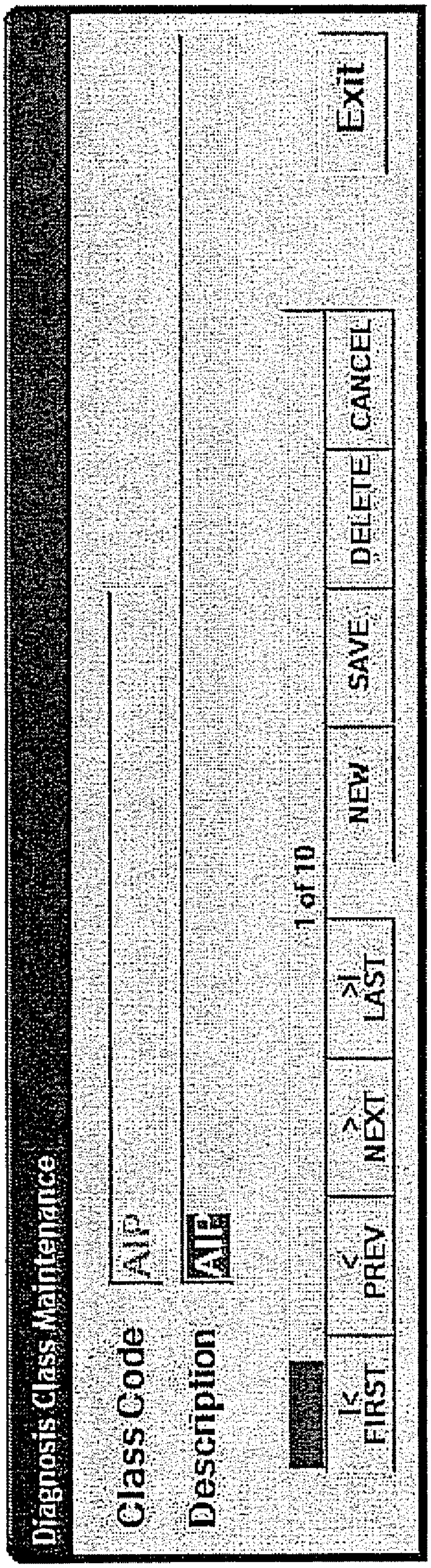
FIG. 62 illustrates a user screen for management of like groupings of criteria used across many different facilities to accommodate comparison and analysis of the facilities.

FIG. 62 illustrates a user screen for management of like groupings of criteria used across many different facilities to accommodate comparison and analysis of the facilities, even though each uses different particular criteria names. For example, FIG. 62 would allow a financial institution to analyze different feedlots by assigning a class diagnosis or "super-classification" to each of the different named criteria that may exist at the different facility locations. More specifically, one feedlot may code respiratory diseases as RSP, R, or P. Another feedlot may choose to designate respiratory diseases as corresponding to some other criteria code. This screen allows a user to identify each of the different facility criteria that correspond to a general classification or condition so that when information is gathered from the various facilities, like data is categorized for each facility thus allowing for companion and analysis.

Figure 63:
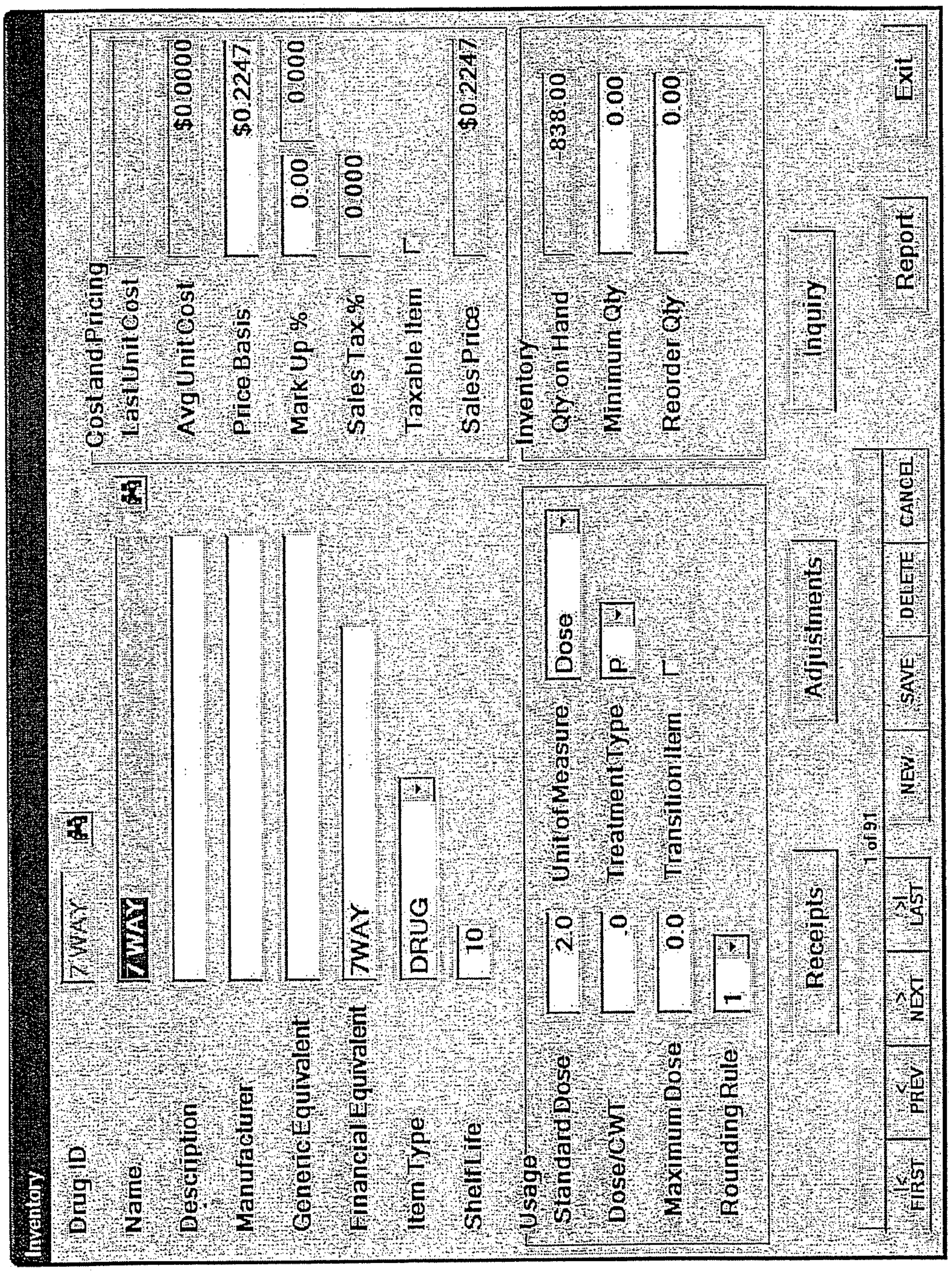
FIG. 63 is a user screen for viewing inventory to include items such as drugs, and allowing the user to modify such information as necessary.

FIG. 63 illustrates a screen allowing a user to view inventory such as drugs, and allowing the user to change certain information on the drug such as the name, manufacturer or standard dosage.

Figure 64:
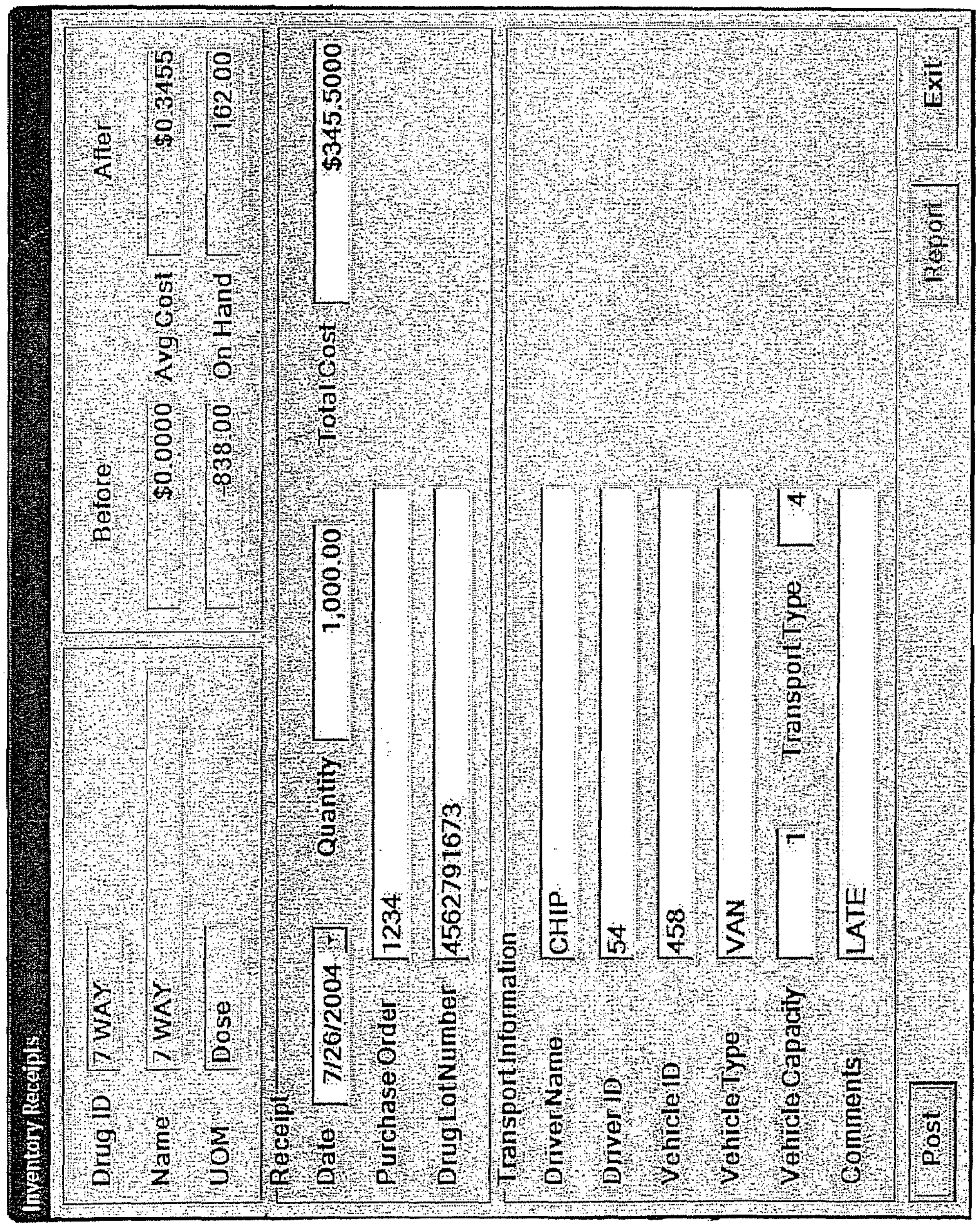
FIG. 64 is a user screen for recording inventory being received.

FIG. 64 illustrates a user screen that allows a user to record inventory being received. As supplies arrive, such as drugs, the user would enter the arrival of the drugs into the inventory by completing the information on the screen. Once quantity and cost data is entered, the actual inventory is automatically adjusted to show a "Before" and "After" state for the particular drug. Drugs are entered on a drug by drug basis; therefore, if a particular facility received a number of different drugs on a particular day, the user would separately enter the receipt of each drug by completing an inventory receipt screen for each.

Figure 65:
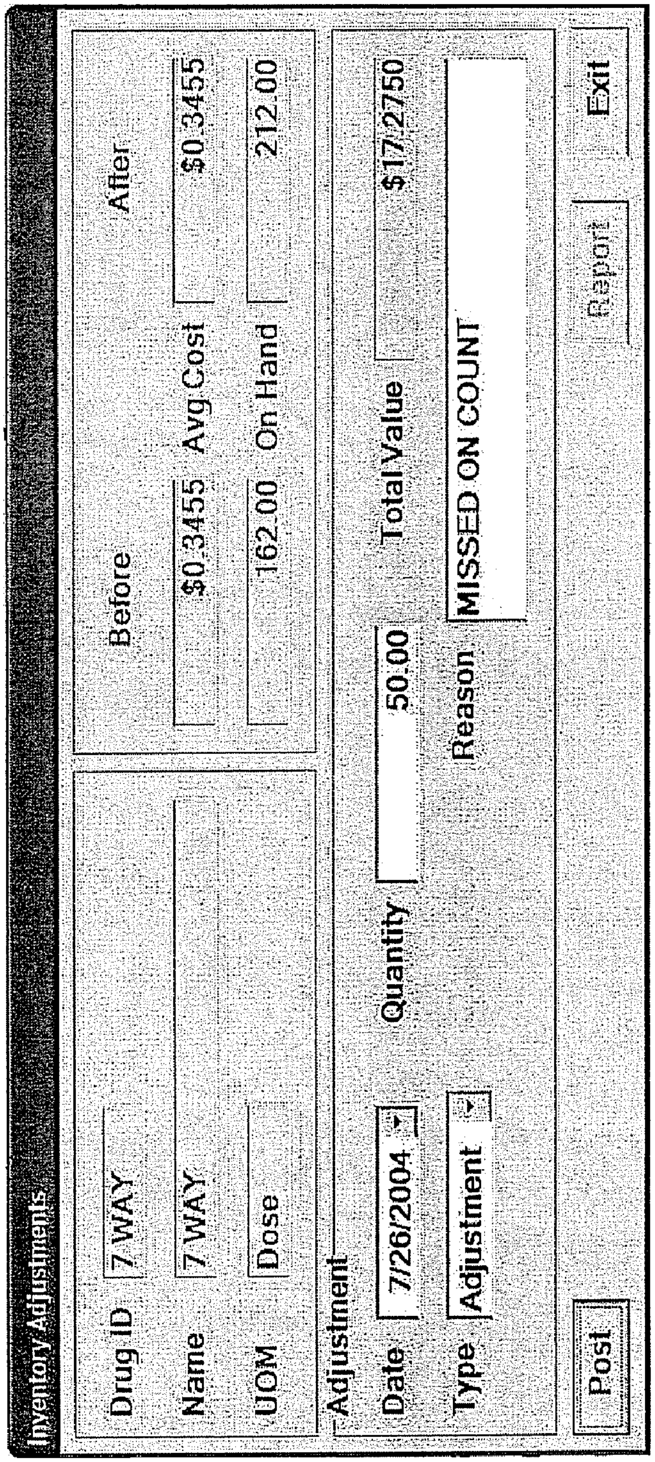
FIG. 65 is a user screen for adjusting inventory.

FIG. 65 illustrates a user screen allowing adjustments to inventory. For example, if a particular drug remains in inventory beyond expiration, or a drug is inadvertently lost or destroyed, then the screen at FIG. 65 allows user to adjust the inventory. In the specific example of FIG. 65, the reason for the adjustment was to correct an initial miscount of a particular drug when it was recorded as being received in inventory. Clicking on the "Adjustments" button from FIG. 63 brings up the inventory adjustments screen of FIG. 65.

Figure 66:
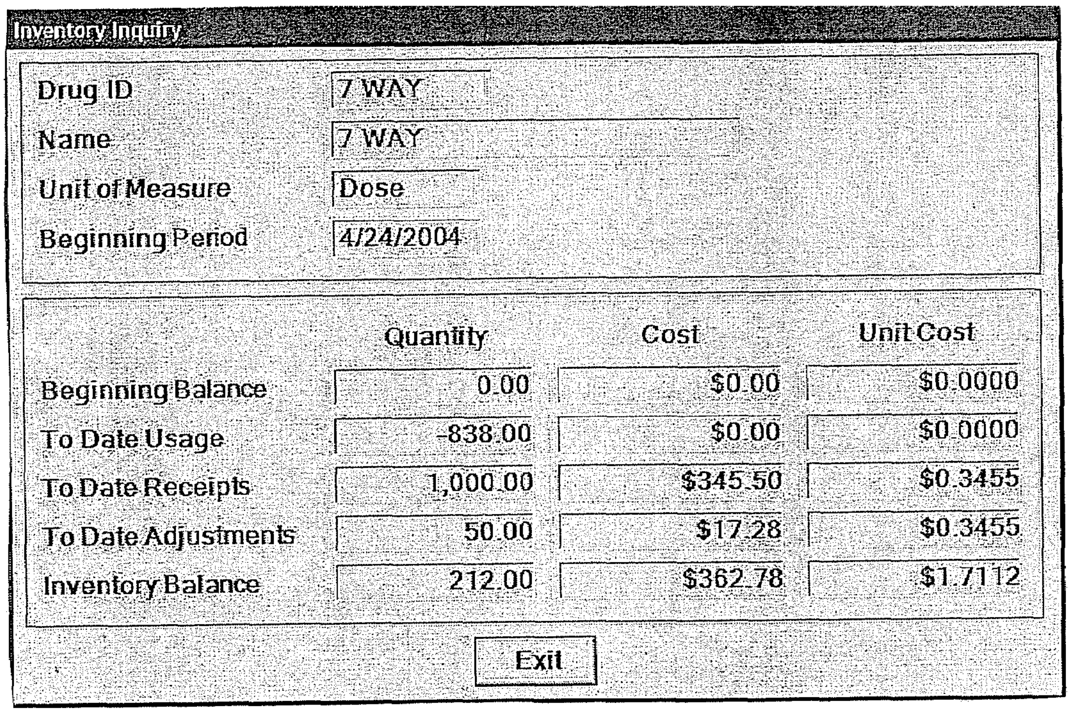
FIG. 66 is a user screen for checking inventory of a particular drug.

FIG. 66 is an inventory inquiry screen allowing the user to check the inventory for a particular drug. Clicking on the "Inquiry" button from the screen in FIG. 63 brings up the inventory inquiry screen of FIG. 66. The user simply enters in the drug name, or drug ID and the on-hand amount is then shown.

Figure 67:
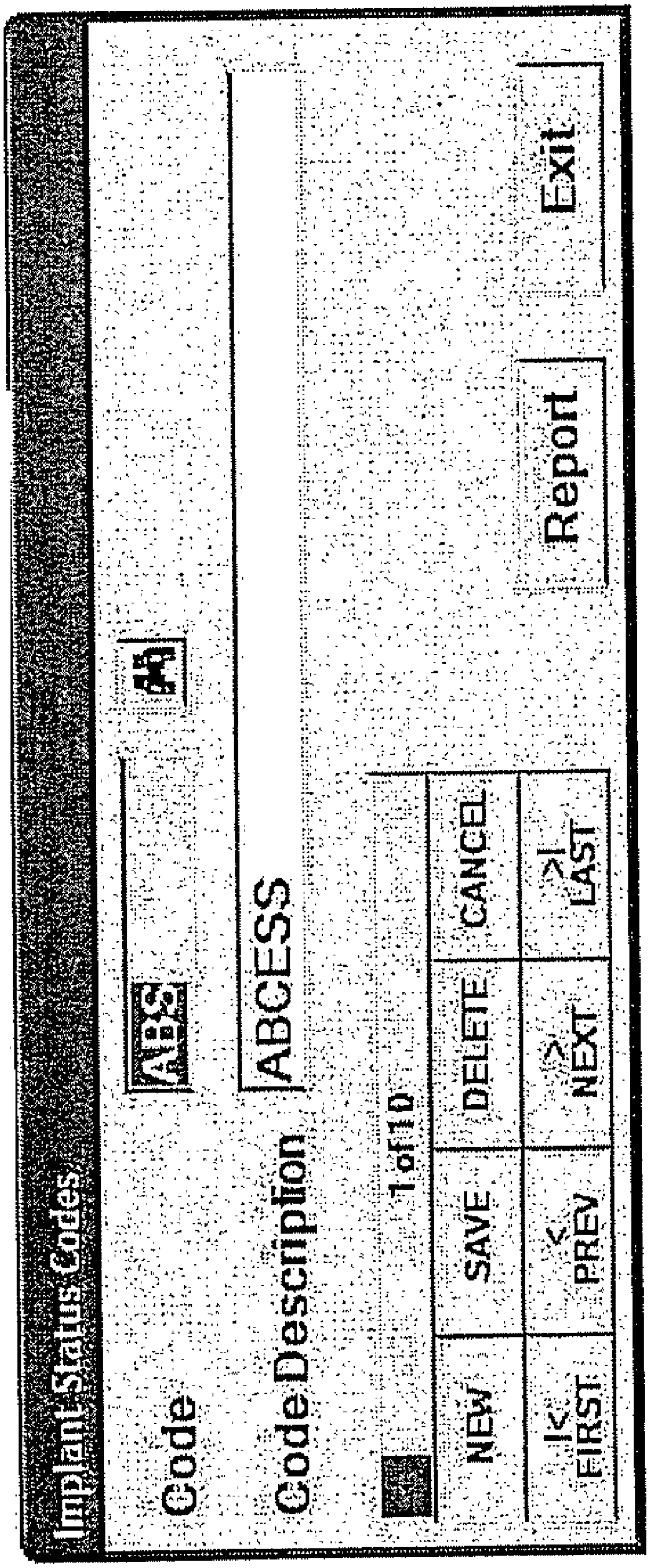
FIG. 67 is a user screen illustrating an implant status code that provides a preset listing of those implants installed for animal identification purposes.

FIG. 67 is an implant status code screen that provides a preset listing of implant status codes. The preset code listing can be modified as desired. An implant refers to a device implanted within the animal, such as an RFID tag, and it may be desirable to list the particular status of the implant during processing or treatment. In the example of FIG. 67, the code ABS indicates that an abscess has developed because of the implant, thus signaling some treatment should occur to heal the abscess.

Figure 68:
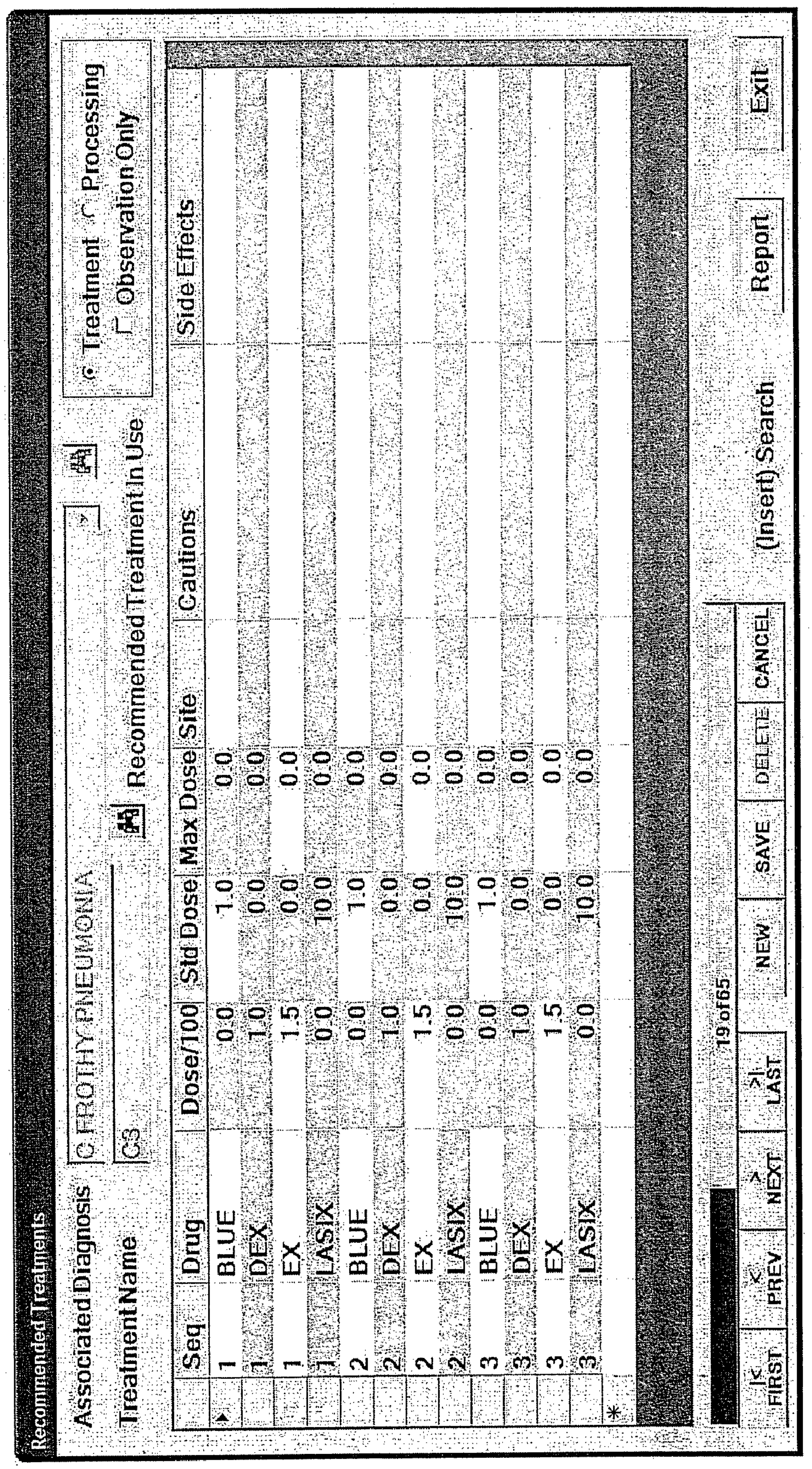
FIG. 68 is a user screen illustrating a recommended treatment allowing a user to enter particular treatment protocols or recommendations for a specified diagnosis.

FIG. 68 illustrates a recommended treatment screen that allows a user to enter a particular treatment protocol for a specified diagnosis. As shown, the particular diagnosis provided is frothy pneumonia, and the user has built a treatment protocol by entering in the sequence and types of drugs to be administered. Accordingly, once a particular animal is given a diagnosis, the user can then find out the recommended treatment by entering the diagnosis code. It may be desirable to limit the ability of the user to create or change particular treatments based upon the corresponding diagnosis. For example, to prevent a potential drug overdose, an algorithm may be established in a parameter table which does not allow a user to enter an excess quantity of the particular drug. Thus, according to the screen shown in FIG. 68, a user would be unable to simply enter any type of treatment regimen without receiving an error message indicating that the proposed regimen was unacceptable with system parameters.

Figure 69:
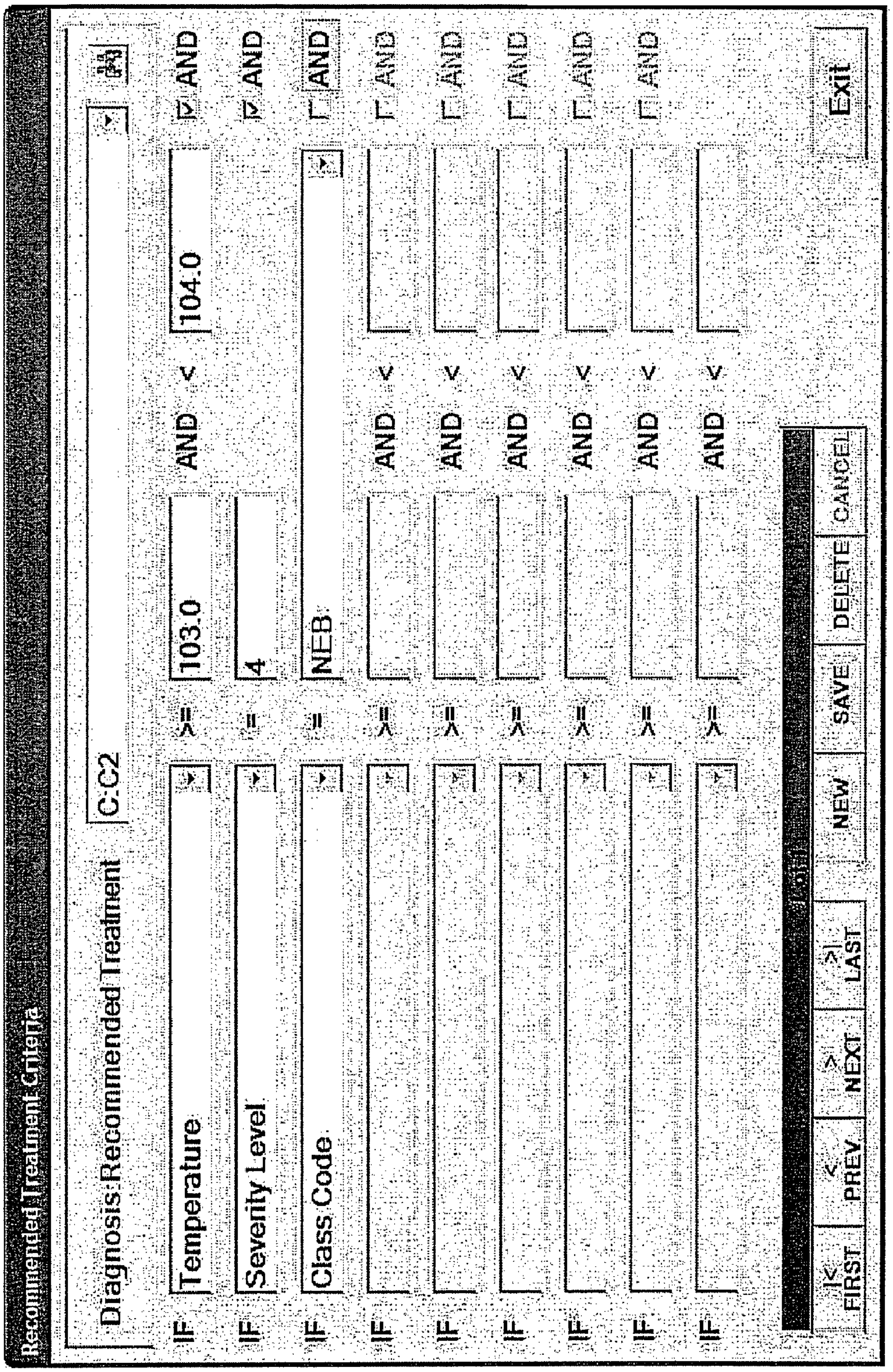
FIG. 69 is another example of a user screen for creating a recommended treatment based upon various criteria, and a mathematical relationship applied to the criteria.

FIG. 69 is another user screen illustrating an example for creating recommended treatments based on selected criteria. In the example of FIG. 69, if the animal has a diagnosis "C", and the animal has the designated temperature range, has the indicated severity level, and has other observed criteria/symptoms, then the recommended treatment is "C2".

Figure 70:
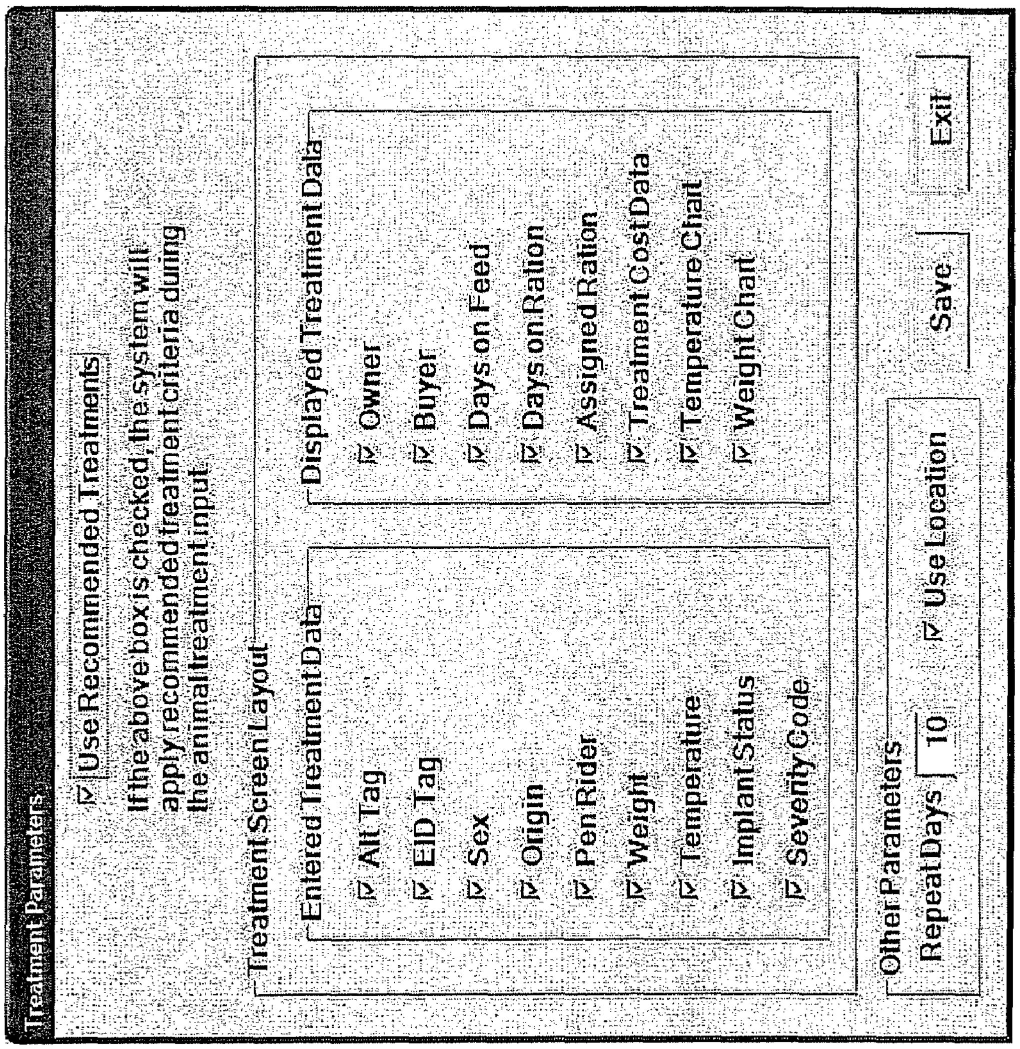
FIG. 70 is a user screen for viewing recommended treatments or to disable the display of recommended treatments during animal processing.

FIG. 70 is a screen allowing a user to view recommended treatments or to disable the display of recommended treatments during animal treatment input. This screen also allows a user to set up the screen layout for the treatment screen. As shown in FIG. 70, the user decided to adopt the recommended treatments by checking the box, and has also chosen to have the treatment screen show all available fields on both the entered treatment data as well as the displayed treatment data.

Figure 71:
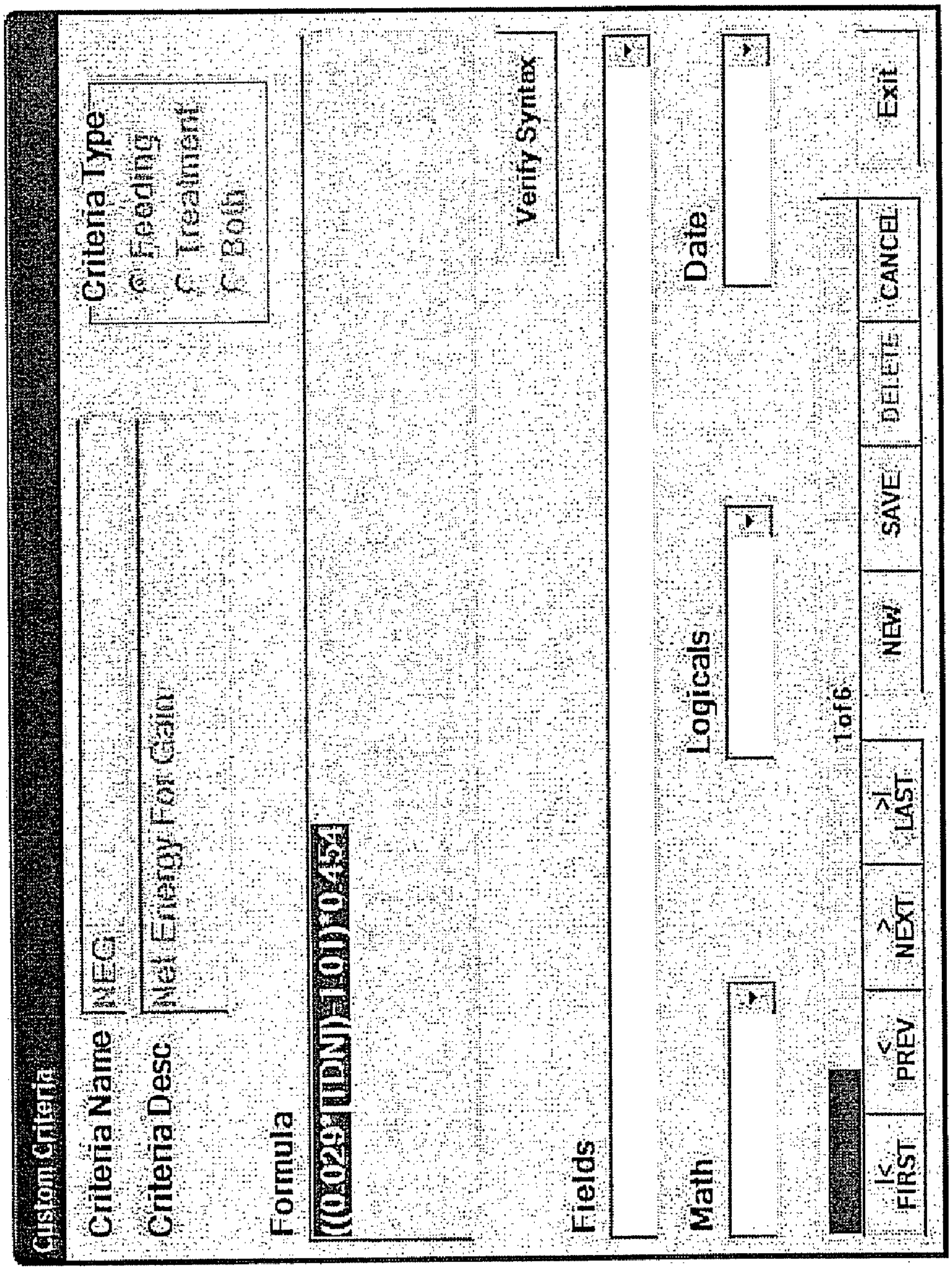
FIG. 71 is a user screen showing another example of data entry for establishing another custom criteria.

FIG. 71 is a user screen showing another example of data entry for establishing another custom criteria. In this particular figure, the user is developing a feeding criteria described as "Net Energy For Gain", and designated by the criteria name NEG. A formula is established to calculate the criteria, including the variable TDN that corresponds to a designated data field.

Figure 72:
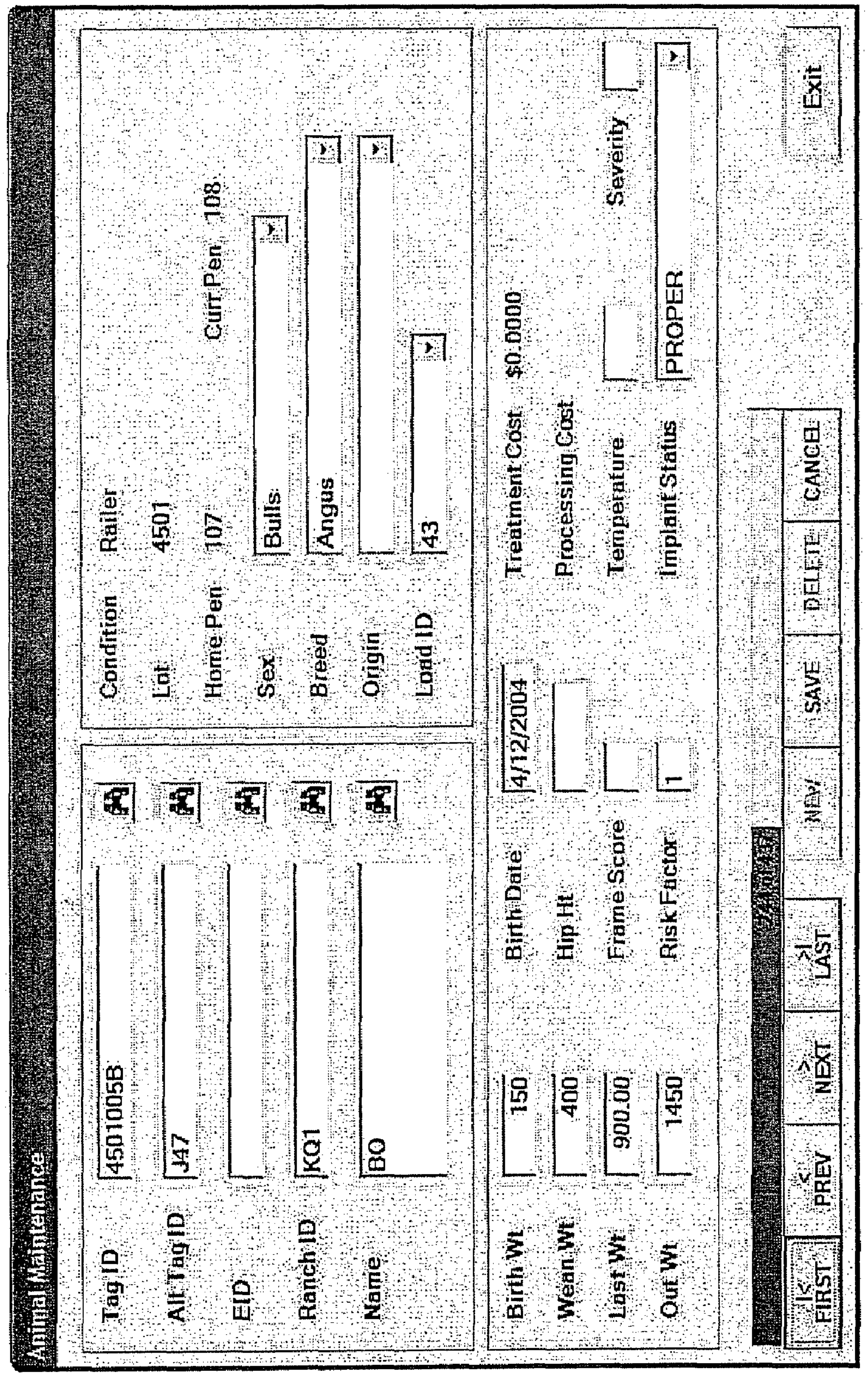
FIG. 72 is a user screen for data input of modifications to any of the individual status fields for a particular animal to include tag information and animal condition.

FIG. 72 is a user screen for animal maintenance allowing the user to input data regarding modifications to any of the individual status fields for a particular animal to include tag information and animal condition. For example, it may be necessary to correct data that was initially mis-entered. Any of the open fields shown in the figure can be modified as necessary. Of course, only selected system users would be given the authority to change such data.

Figure 73:
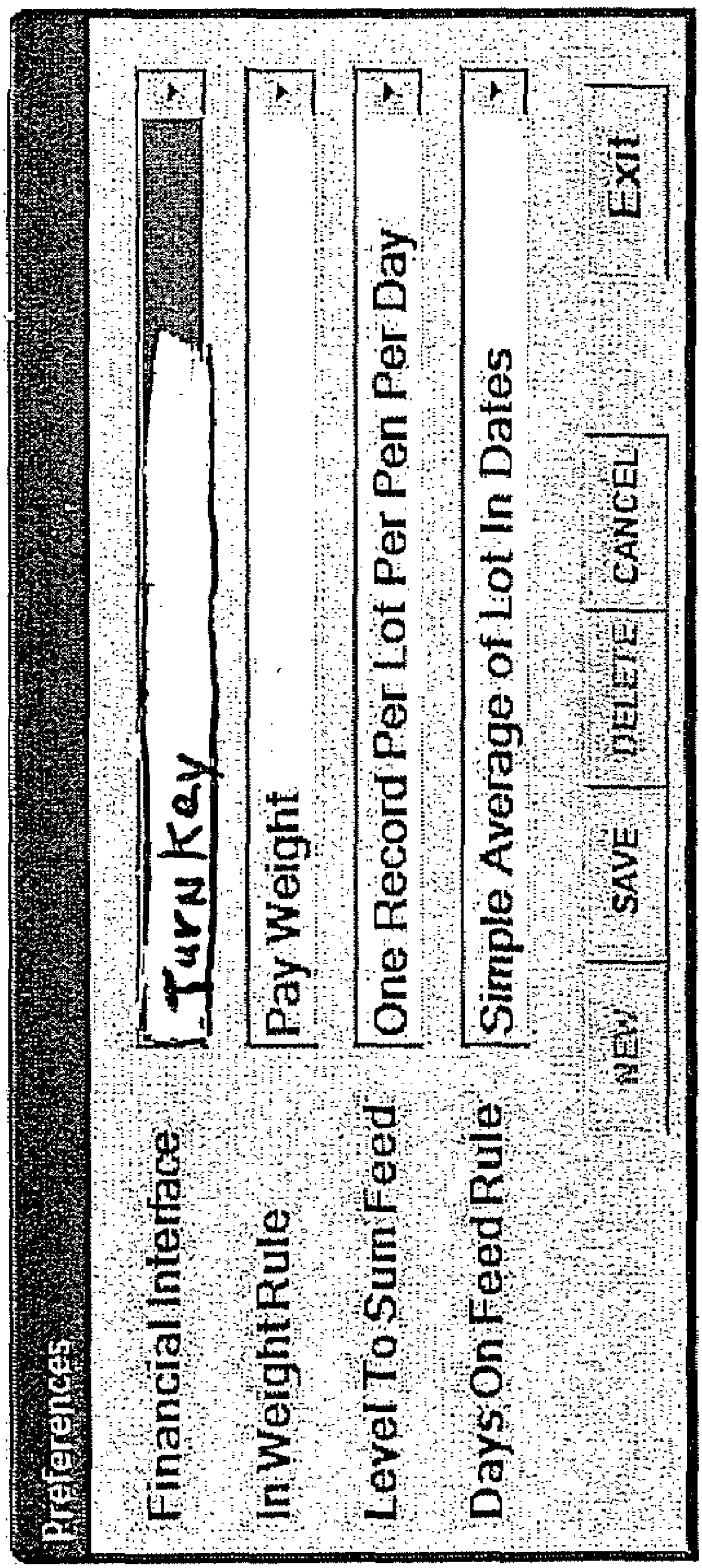
FIG. 73 is a user screen for setting preferences as to how data should be configured for transmission to another entity.

FIG. 73 is a user screen allowing one to set preferences as to how data should be configured for transmission to a financial institution, or for receiving information back from a financial institution. Thus, the screen shown in FIG. 73 allows the user to select how data is exchanged to best interface with other data processing systems. In the example of FIG. 73, the financial interface is with a system called TurnKey. The reporting weight of a particular animal will be by pay weight, the sum feed is based upon one record per lot per pen per day, and the days on feed rule is the simple average of lot in dates.

Figure 74:
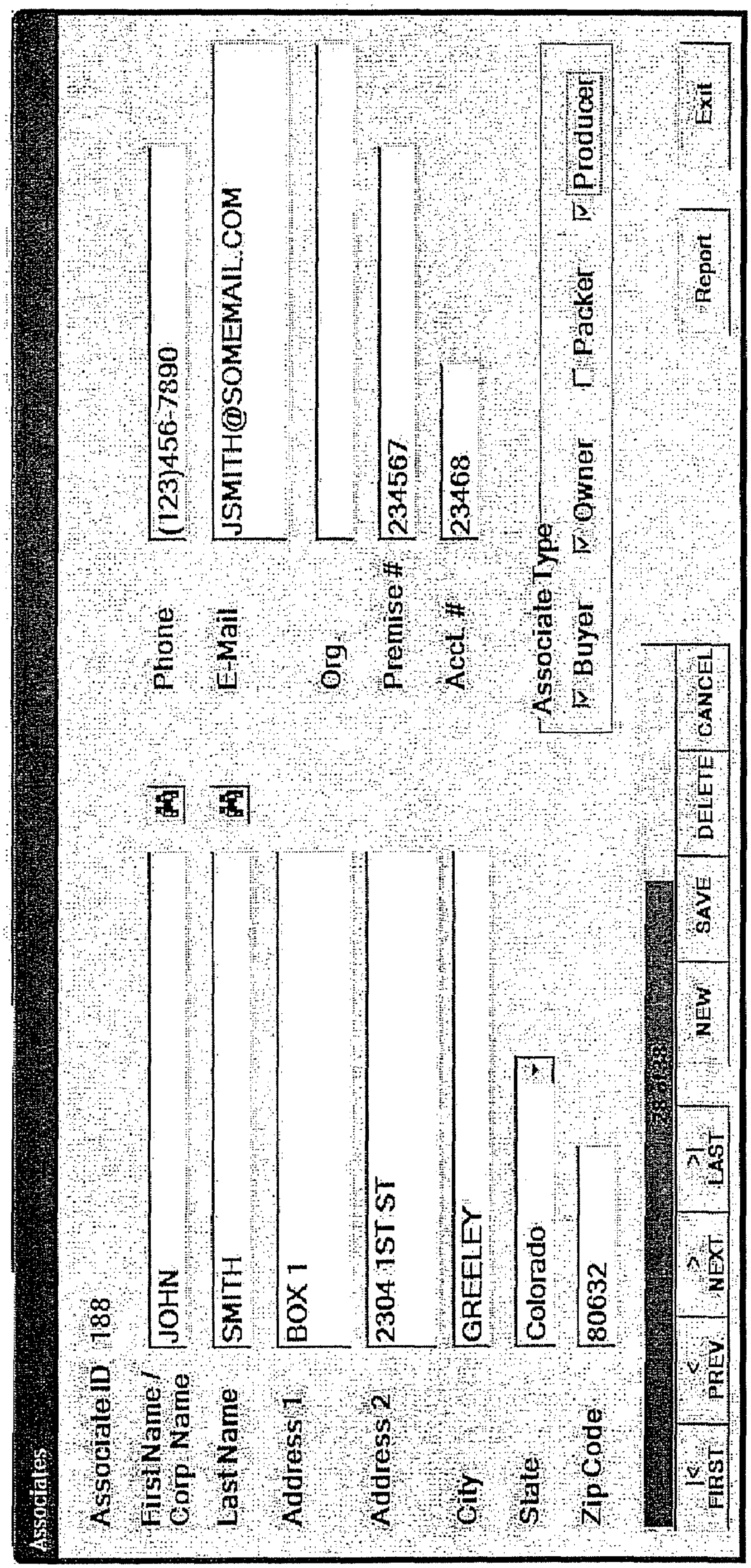
FIG. 74 is a user screen for data entry corresponding to associates within the data processing system.

FIG. 74 is a data entry screen for identifying associates within the system. Associates can be defined as buyers, owners, packers, producers (ranchers), etc. Each associate within the system is provided an associate ID which ultimately can determine the degree to which each can access data in the system or modify system data. The Associate screen is periodically updated to identify all associates participating in the data processing system.

Figure 75:
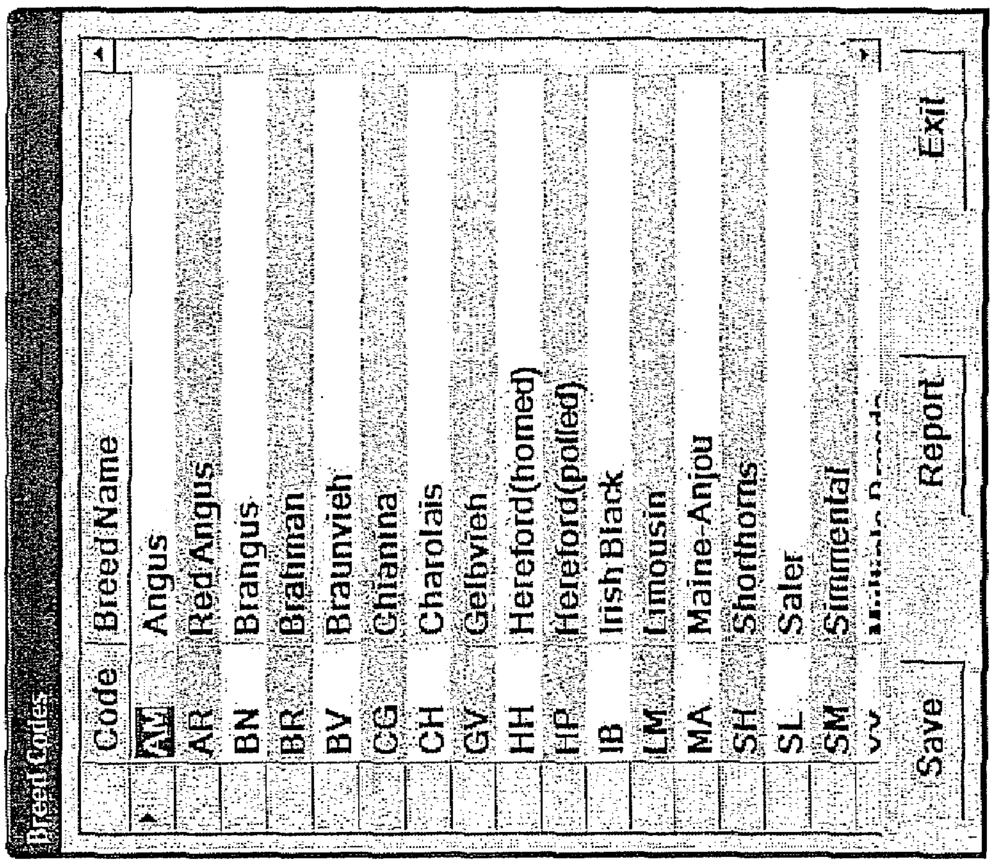
FIG. 75 is a data entry screen for read codes.

FIG. 75 is a data entry screen regarding breed codes that can be used within the data processing system. The user can select from the provided listing of breed codes, or may add additional breed codes as required. These breed codes can be used throughout the system to identify each animal entered into the system by breed.

Figure 76:
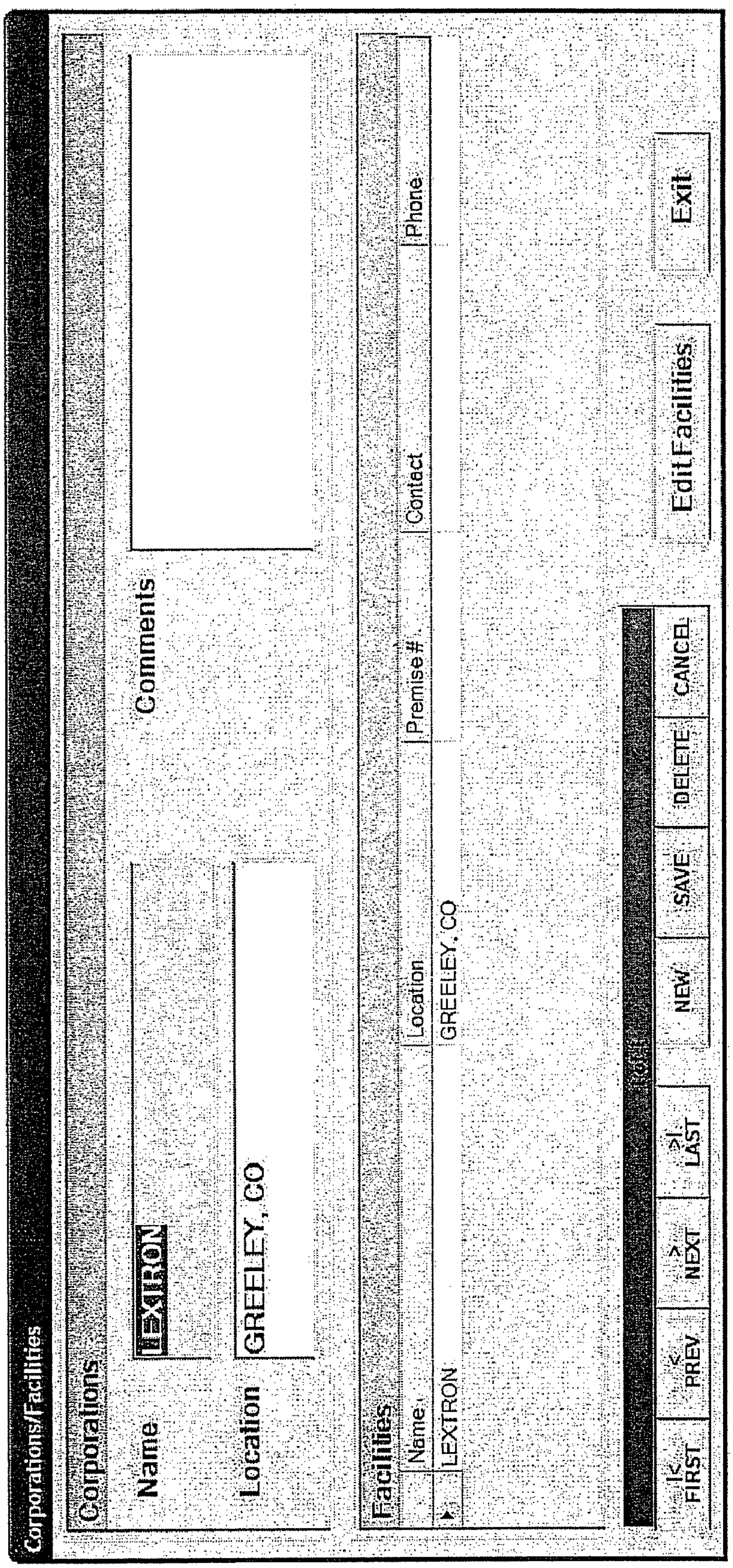
FIG. 76 is a data entry screen for setting up particular facilities within the data processing system.

FIG. 76 is a data entry screen for setting up particular facilities within the system for determining what type of system access should be provided, what type of data should be made available to a particular facility, etc.

Figure 77:
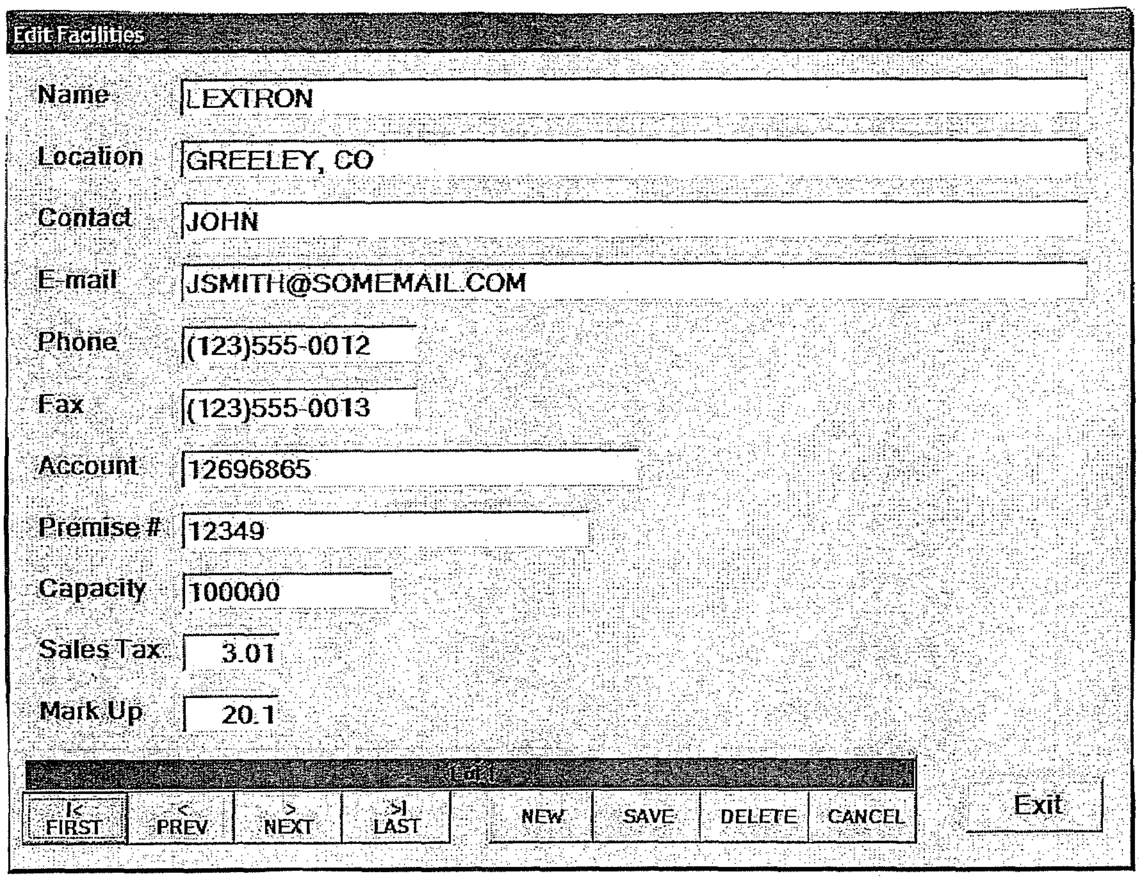
FIG. 77 is a data entry screen for editing specific data concerning each facility.

FIG. 77 is another data entry screen that allows one to edit specific data about each facility.

Figure 78:
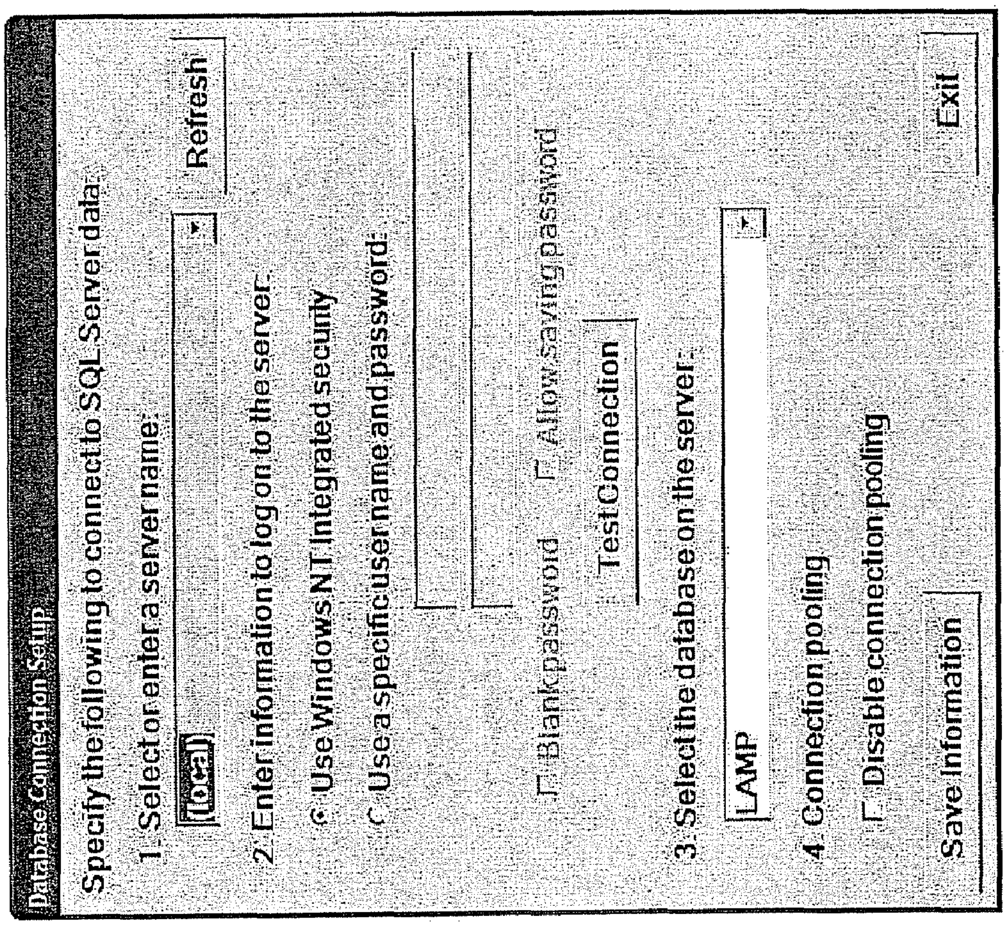
FIG. 78 is a user screen for configuring a desired type of connection to be set up between local or central database servers and a particular facility.

FIG. 78 is a configuration screen allowing the user to determine the necessary or desired type of connection set up between the local or central database servers and a particular facility. As shown in the figure, the user would enter the server name, the manner in which the user would log on to the server, select a particular database(s) on the server which the user wanted to access, and also determine connection pooling.

Figure 79:
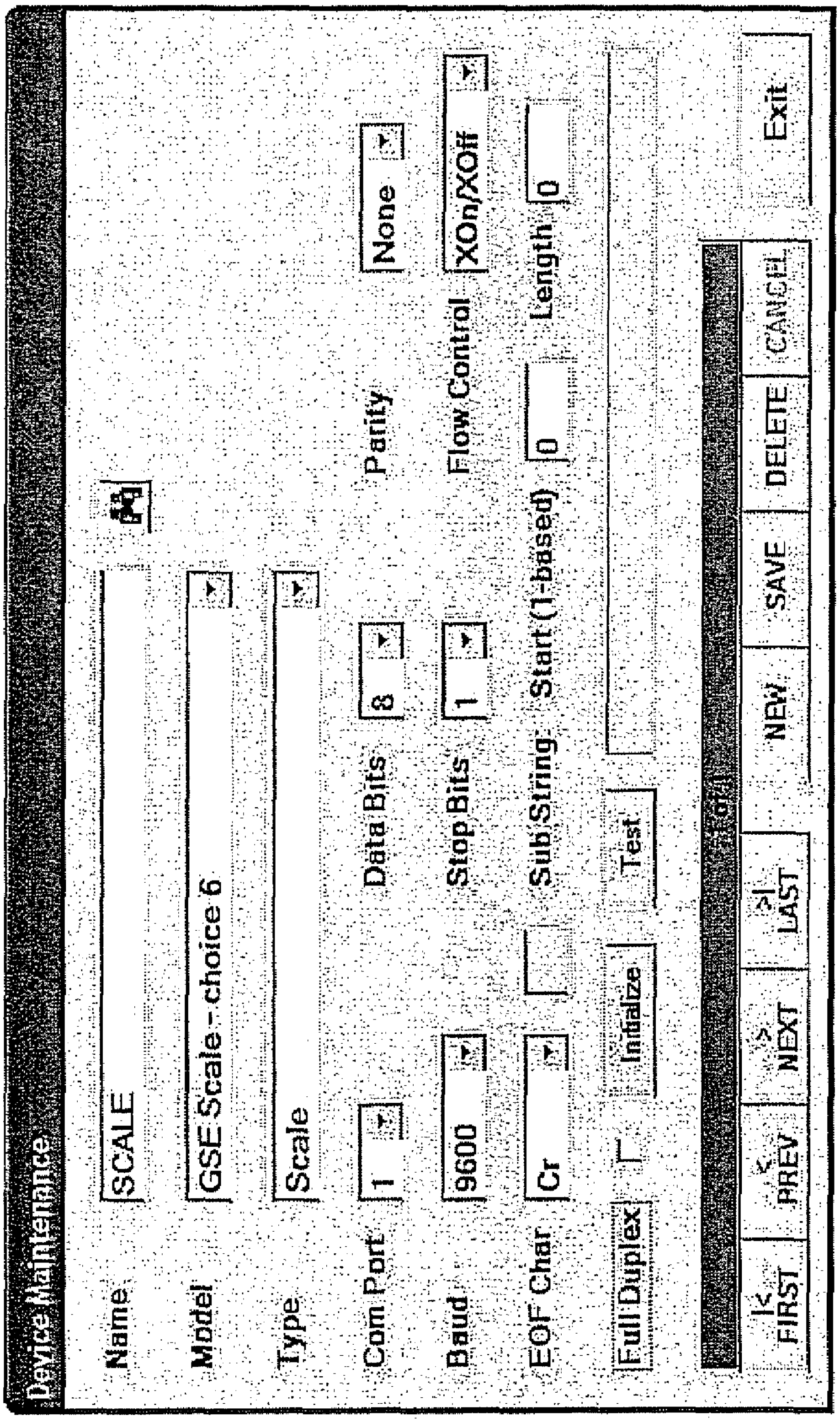
FIG. 79 is a user screen for setting up a device driver that allows a field device such as a scale to download information directly into the database of the data processing system.

FIG. 79 is another user screen that allows the user to set up a device driver that allows a field device such as a scale to download information directly into the data processing system. In the example of FIG. 79, the example field device is a GSE scale having 8 data bits, a baud rate of 9600, and 1 stop bit. The system provides a device driver allowing the driver to receive the data in the specified format, and then to reconfigure the received data so that it may be stored within the corresponding field of the selected database(s).

Figure 80:
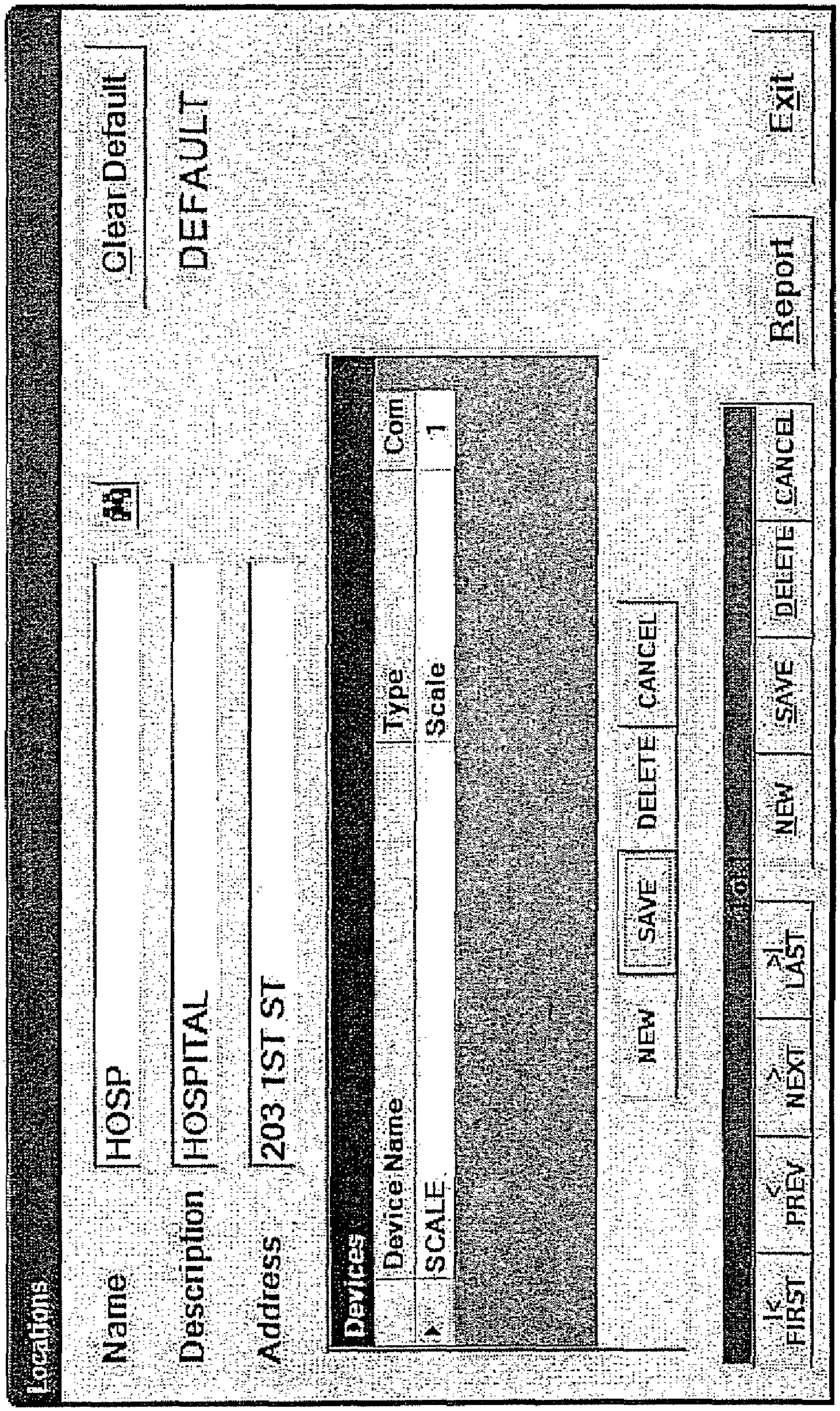
FIG. 80 is another user screen for setting up another field device assigned to a designated location within the facility.

FIG. 80 is another user screen allowing a user to set up field devices assigned to a designated location within the facility. Each field device must be assigned to a particular location so that data generated from the field device can be correctly recorded. For example, there may be many scales that generate data within the system from various locations, and it must be known as to which scale generates data from which location.

Figure 81:
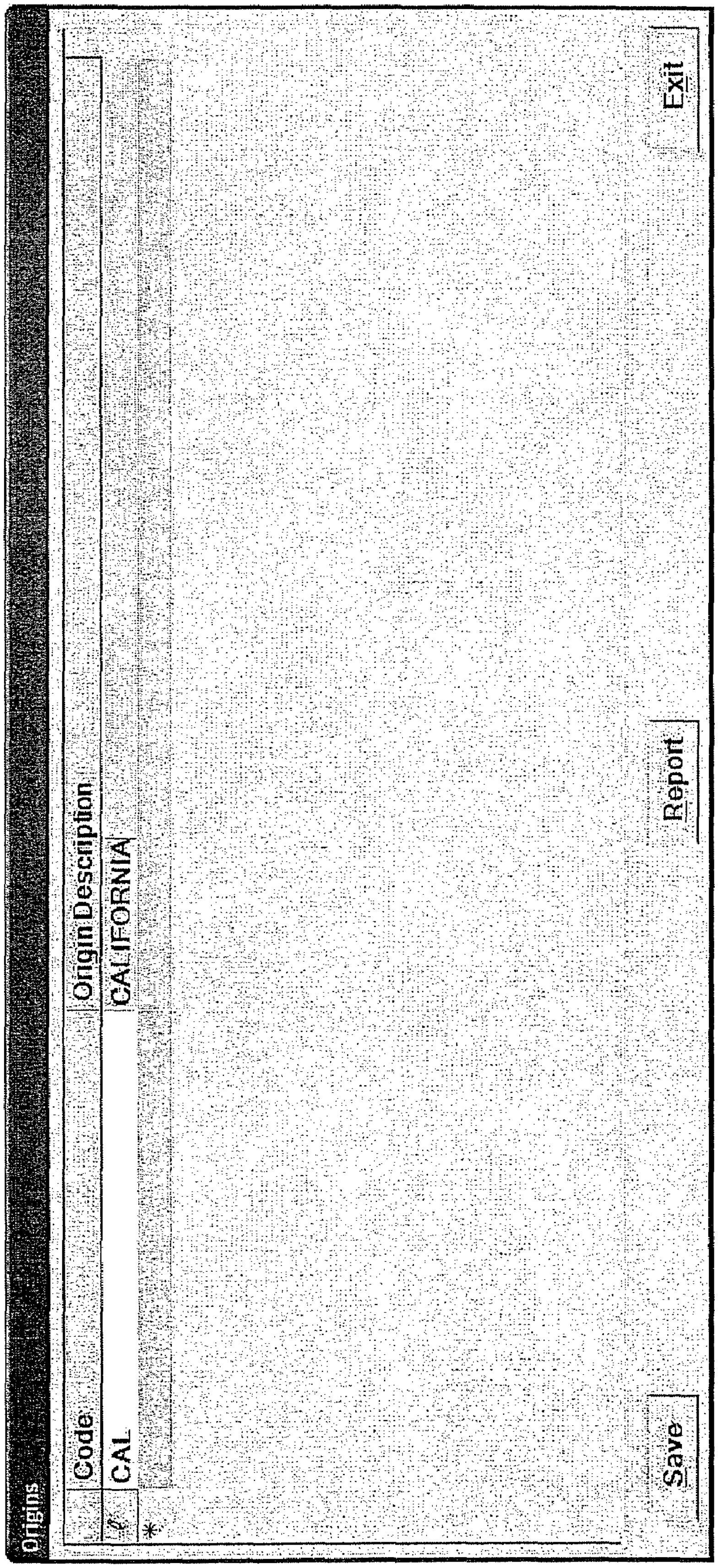
FIG. 81 is a user screen for setup of origin descriptions.

FIG. 81 is a user screen allowing set up of origin descriptions. For example, each animal entered into the system will be designated an origin code as to the location of birth. A user can build various origin descriptions and codes corresponding to exact locations where animals are born.

Figure 82:
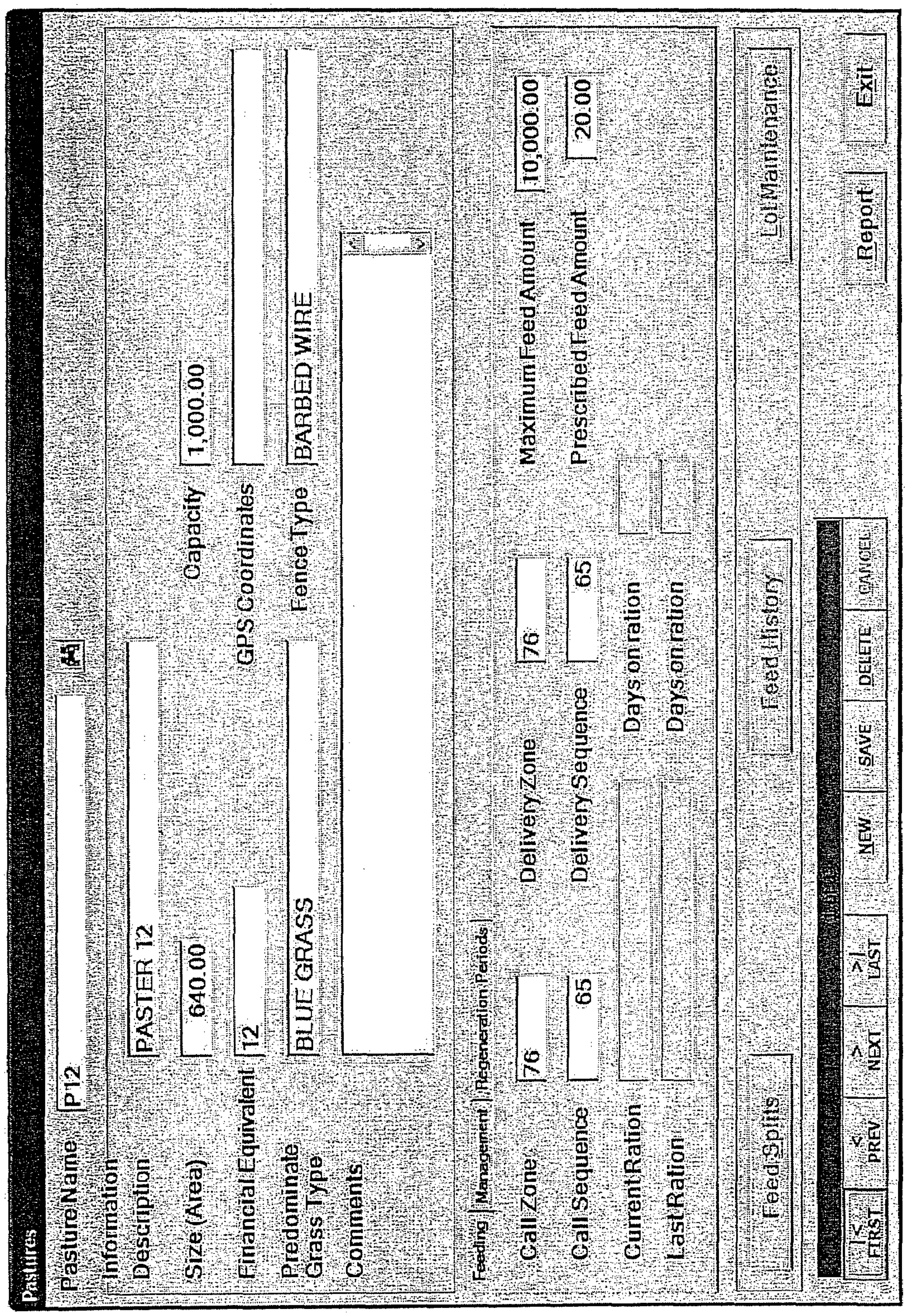
FIG. 82 is a user screen for designating location destinations such as pastures.

FIG. 82 is another setup screen allowing a user to designate pasture names and/or pasture designations within the system.

Figure 83:
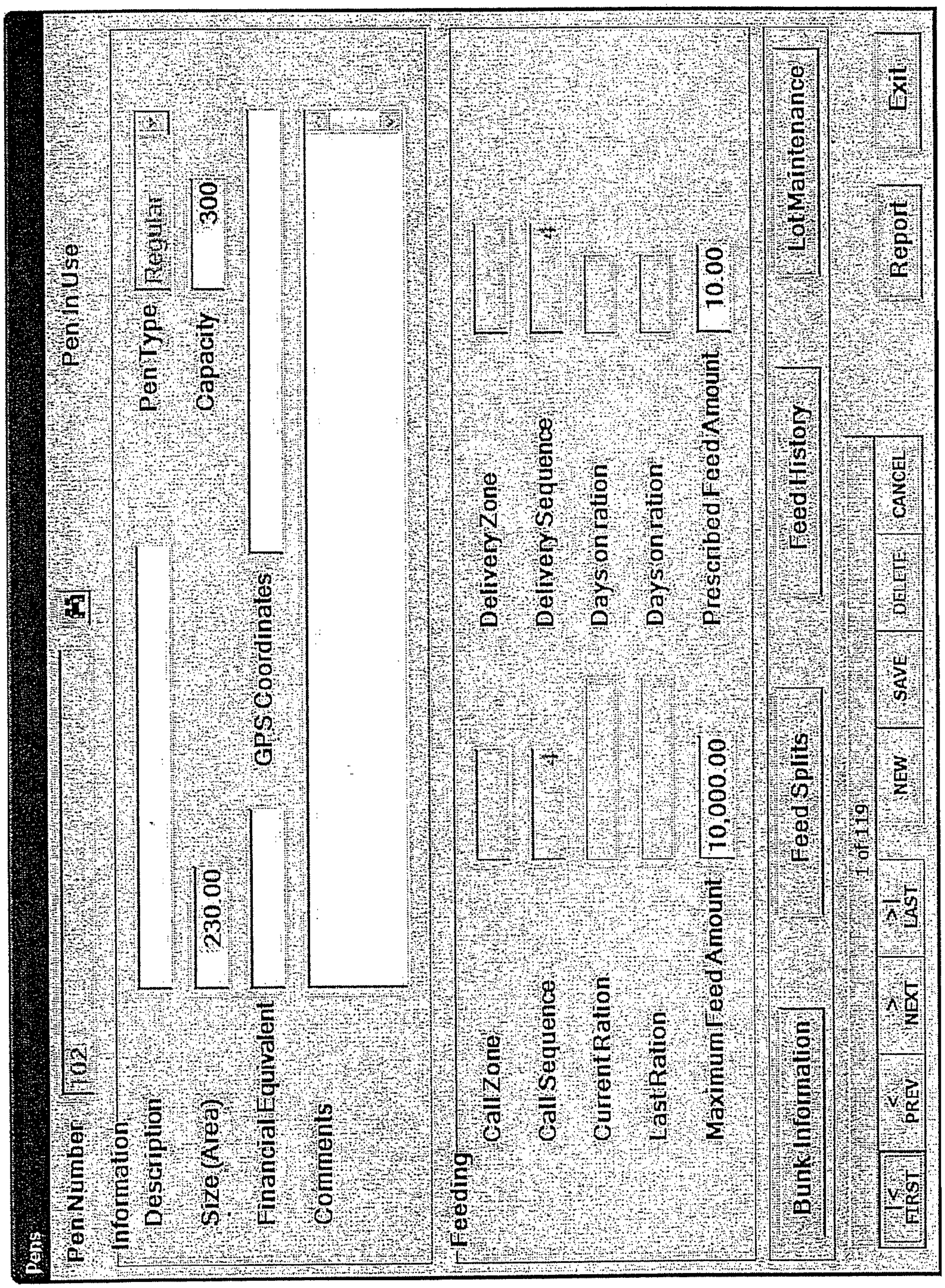
FIG. 83 is a user screen for setup of particular locations such as pen numbers.

FIG. 83 is another example of a data entry screen allowing a user to set up particular pen numbers and corresponding information about each pen.

Figure 84:
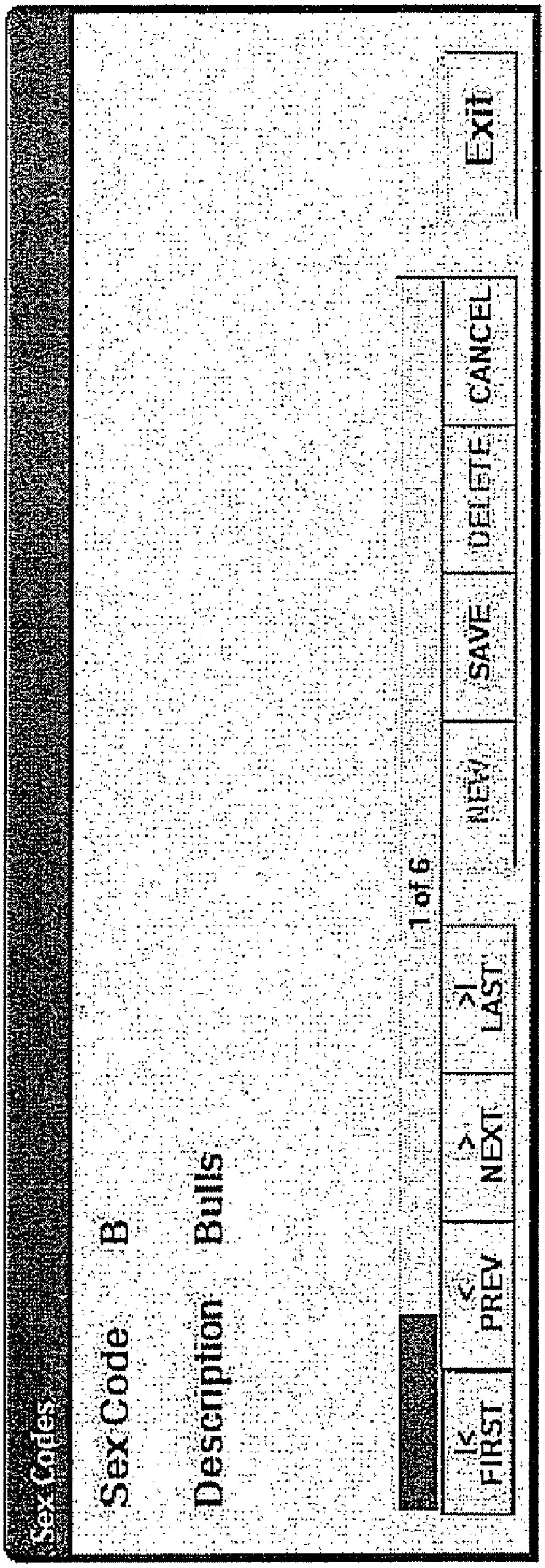
FIG. 84 is a user screen for setup of sex codes and descriptions for each animal.

FIG. 84 is a data entry screen allowing a user to set up sex codes and descriptions for each animal.

Figure 85:
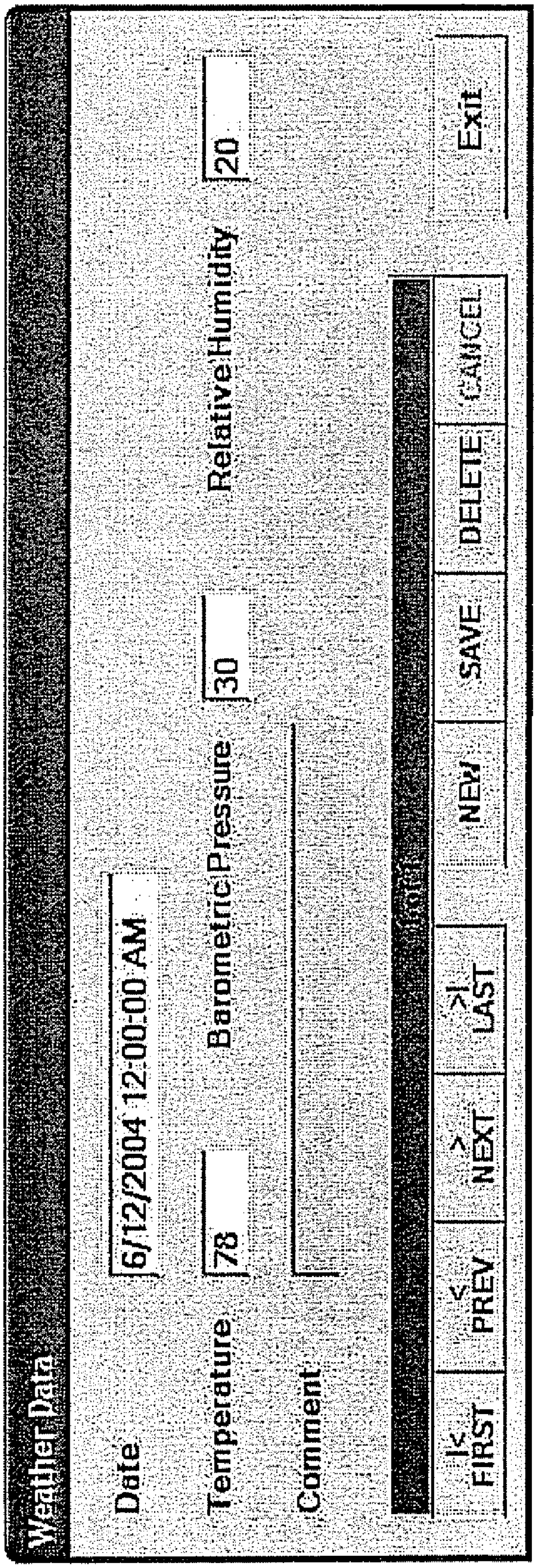
FIG. 85 is a user screen for recording weather data for a particular date and time.

FIG. 85 is a data entry screen allowing a user to establish weather data for a particular date and time. This weather data can be used within various graphs, such as in consumption of feed over time. Increased consumption often corresponds to significant drops in temperature. Therefore, it may be useful for a feedlot to understand changes in consumption as it may relate to changes in weather.

Figure 86:
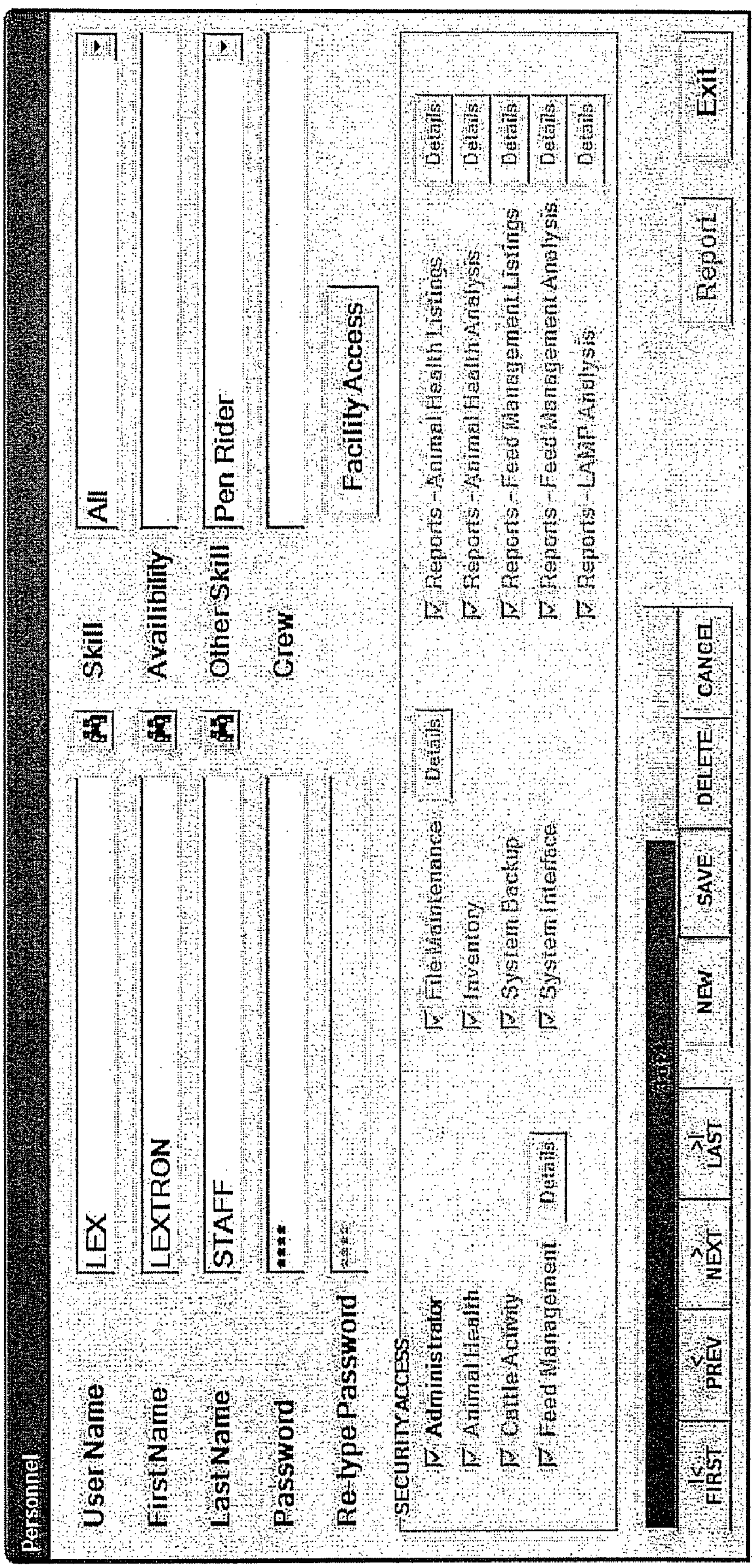
FIG. 86 is a user screen allowing an administrator to identify and set up access for each and every user of the system.

FIG. 86 is a screen allowing an administrator to identify and set up access for each and every user of the system. Each user in the system is assigned their own user name and password for security purposes. As also shown, this screen allows the administrator to designate the type or level of access for each user to include the various system modules and reports.

Figure 87:
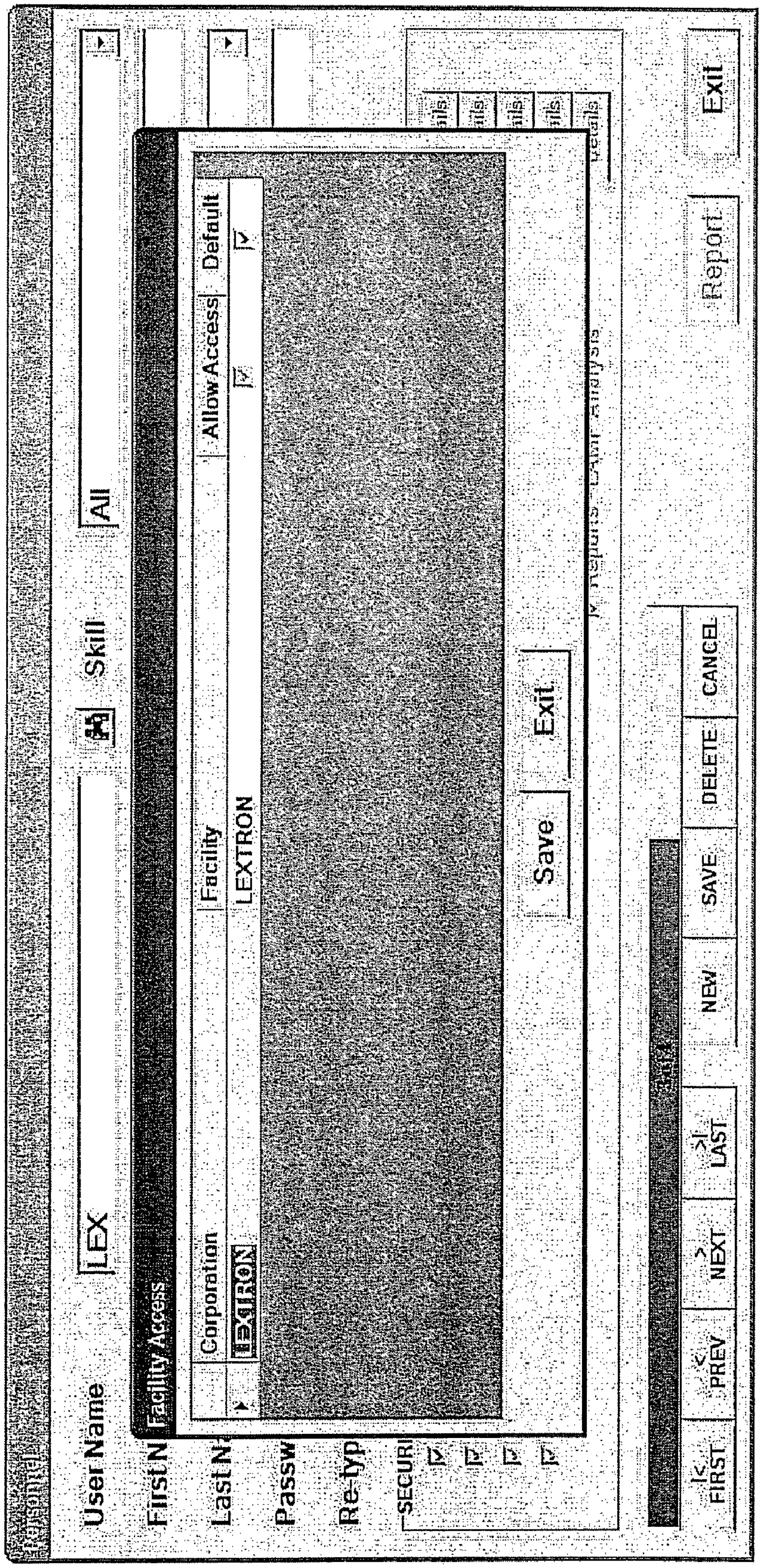
FIG. 87 is another user screen allowing an administrator to choose particular facility access for each user in the system.

FIG. 87 is another administrator screen allowing one to choose the particular facility access for each user in the system. Thus, not all users within the system are allowed to access data from each and every facility; rather, personnel may only be assigned access to particular facilities.

D. Interface Sub-Module

The interface sub-module enables all interface transactions; that is, the exchange of data between the system and sources outside the system. As mentioned above, the sources external to the data processing system may include various financial systems, outside cow/calf systems, packer systems, state and federal unique identification systems, weather systems, and portable treatment devices.

Figure 88:
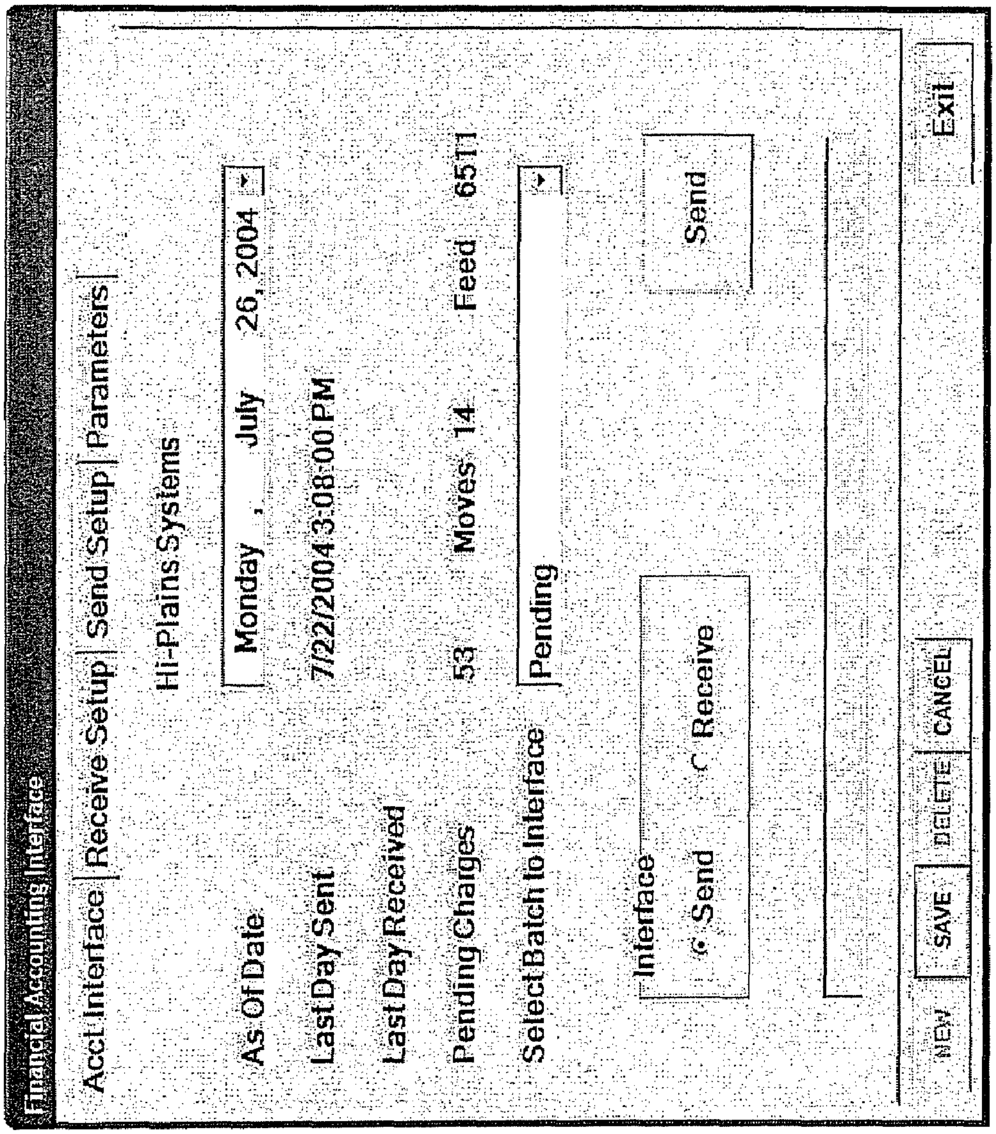
FIG. 88 is a user screen for establishing an interface with a financial accounting system.

FIG. 88 is an example setup screen allowing interface with a financial accounting system.

Figure 89:
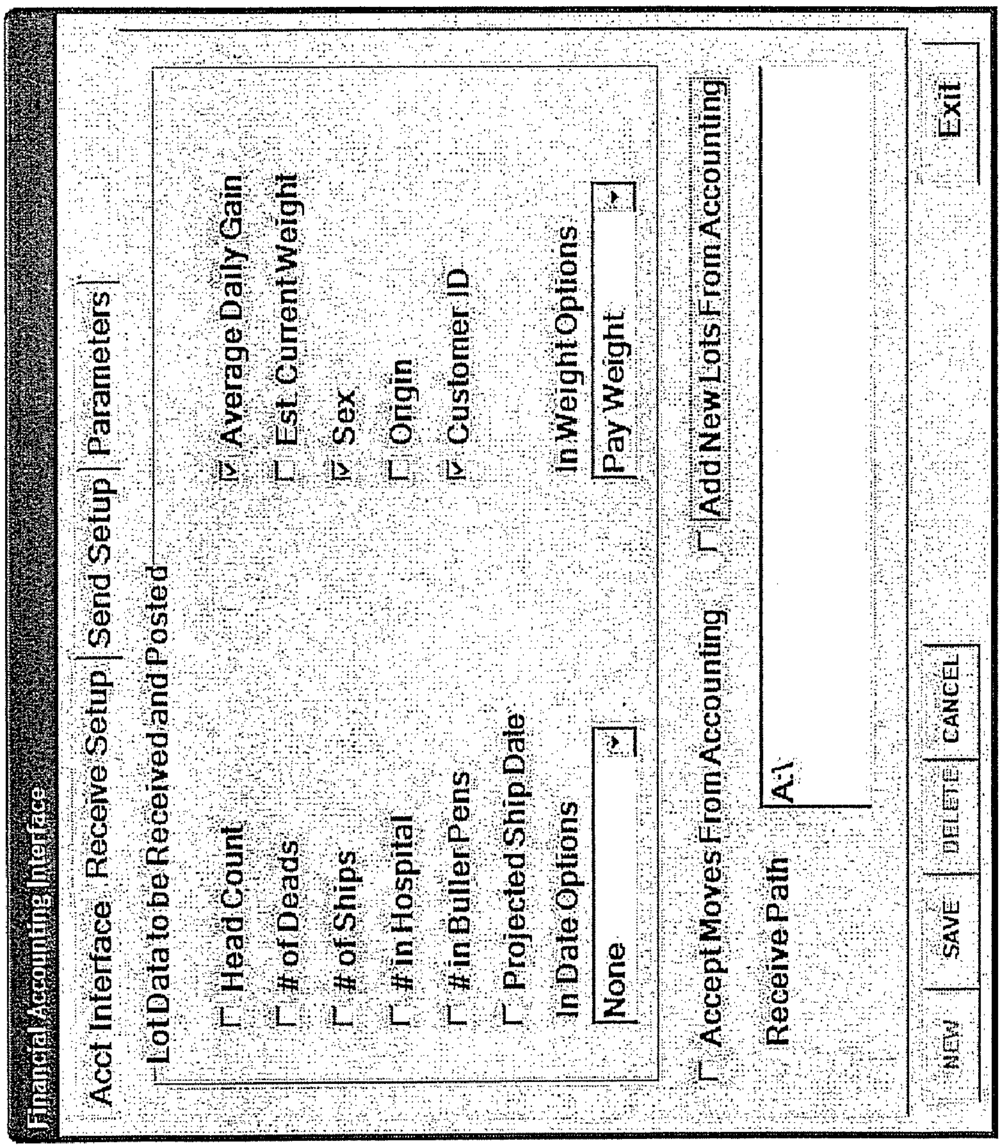
FIG. 89 is another user screen screen for establishing an interface with a financial accounting system.

FIG. 89 is another setup screen allowing interface with a financial accounting system specifying a type of data to be received and posted from the financial accounting system.

Figure 90:
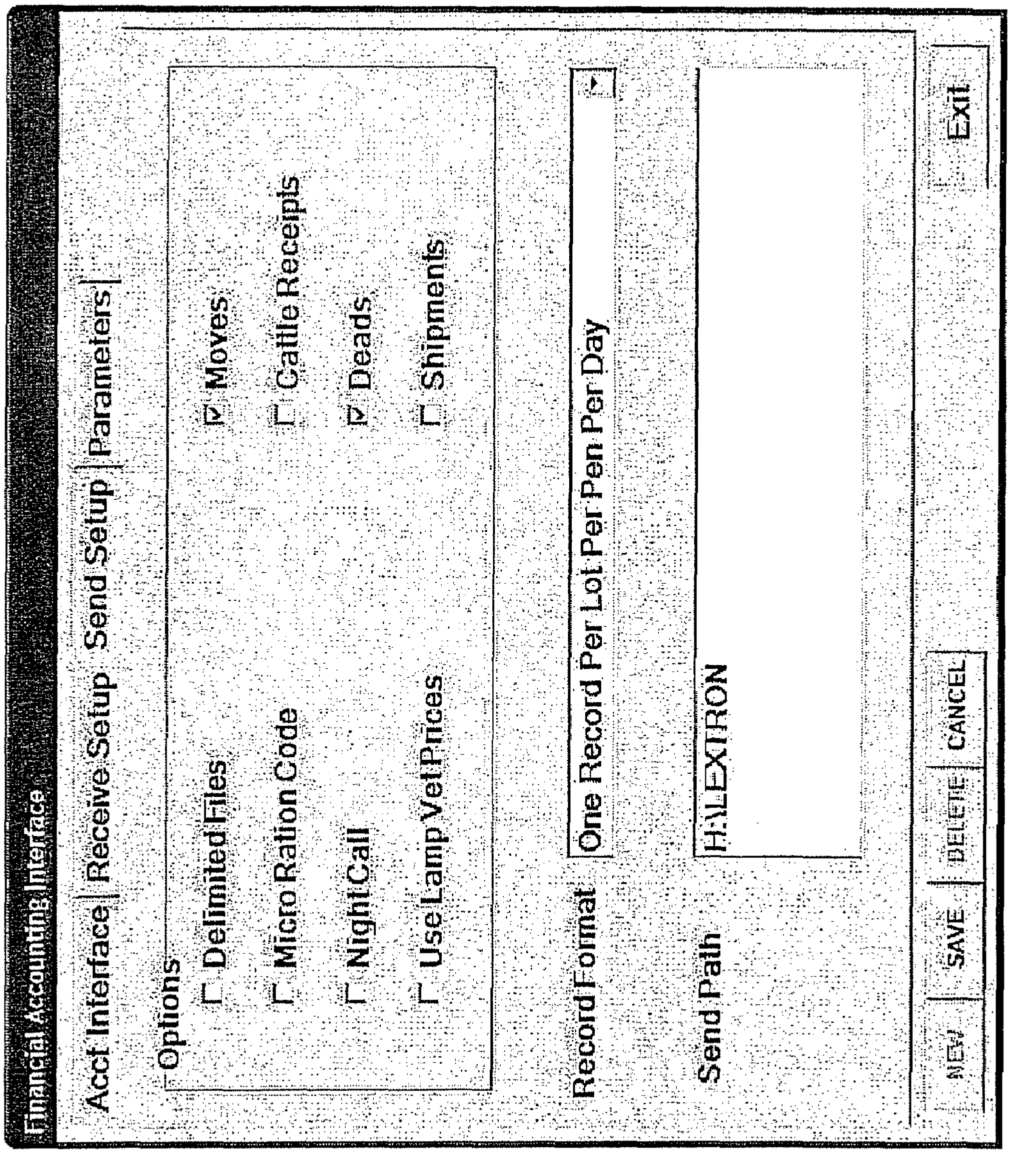
FIG. 90 is a user screen illustrating options for setup an accounting interface.

FIG. 90 is another setup screen illustrating options for setting up a financial accounting interface.

Figure 91:
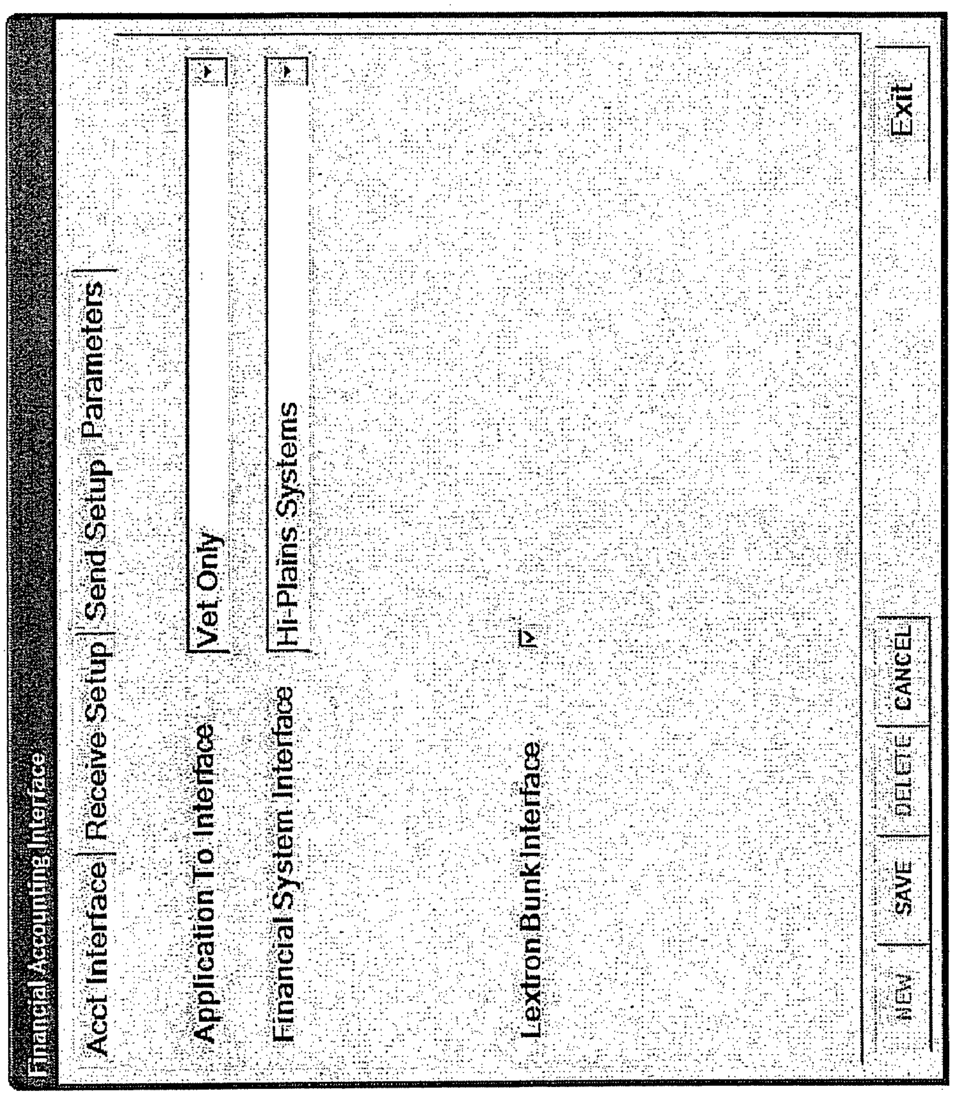
FIG. 91 is a user screen for selecting the particular type of interface and application to the interface.

FIG. 91 is another setup screen allowing interface with a financial institution where the user may select the particular financial system interface and application to the interface.

Figure 92:
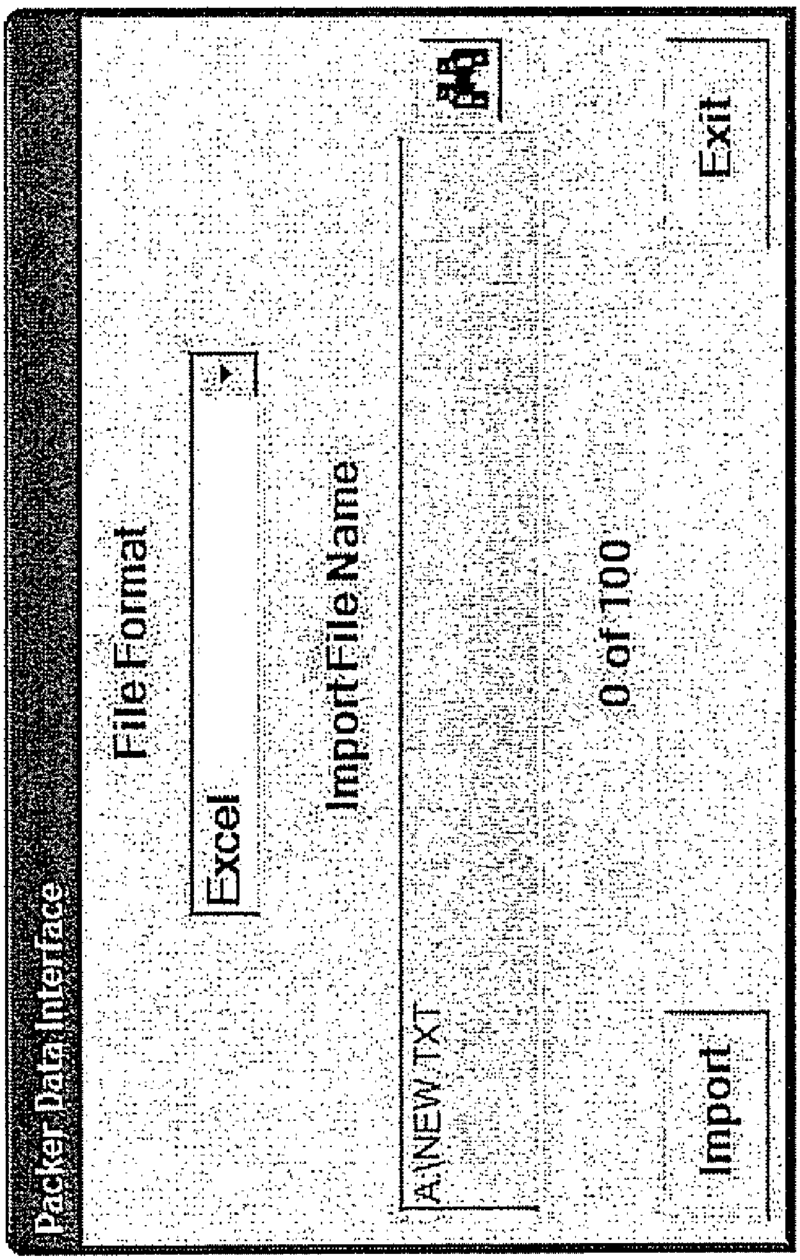
FIG. 92 is a user screen for setup of a packer data interface.

FIG. 92 is another user screen allowing setup for packer data interface. More specifically, this screen allows a user to setup a particular file format corresponding to a particular packer.

E. Reporting Sub-Module

The reporting sub-module of the present data processing system includes a variety of standard reports. The standard reports may be grouped by each sub-module and transaction groups within each sub-module. In addition to the standard reports, it is also contemplated within the present invention to provide custom reports that can be formatted for particular purposes. FIGS. 93-137 are a number of sample reports that can be generated from the data processing system. Each different report is shown as having its own unique report number. The extensive number of sample reports illustrate the vast quantity of diverse data that is managed by the present invention. Each report is generated by selecting the desired data fields from the central database. Implementation of a central database allows a user to easily generate reports by sorting one or more data fields. The reporting sub-module allows a user to designate which data fields are to be generated in the report, and then to modify the report as necessary to add or delete individual data fields.

FIG. 93 is a hospital pen location report providing the tag number for each animal in the particular hospital pen, and also illustrating the home pen, from pen, and lot for each particular animal.

FIG. 94 is another hospital pen report, but data is sorted based upon the particular hospital pen, and the animals in each of the listed hospital pens.

FIG. 95 is a hospital location report showing last treatment dates for particular animals.

FIG. 96 is a hospital movements report sorted by lots showing movement of identified animals for a particular day.

FIG. 97 illustrates another hospital movement report sorted by lot, as well as a hospital/special pen movements summary.

FIG. 98 is another hospital movements report sorted by lot, and also showing a summary of first day pulls to the hospitals. The first day pulls identify those animals that are transported to the hospital on that particular date.

Figure 99:
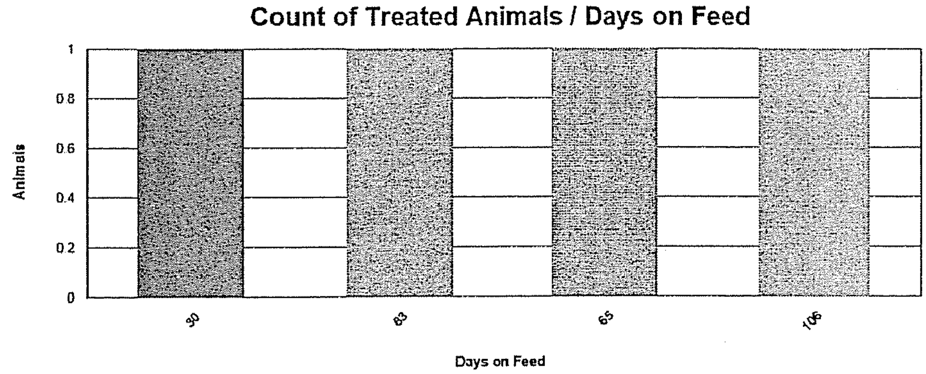

FIG. 99 is a report showing a count of animals treated, average days treated, and average days on feed.

Figure 100:
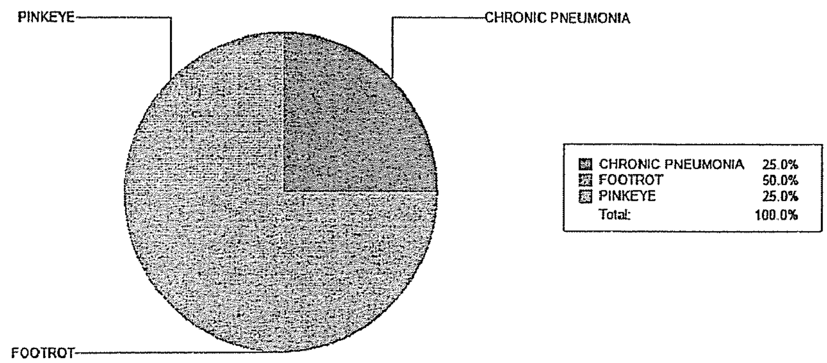

FIG. 100 shows a diagnosis breakdown for selected ailments, the average days treated, and average days on feed.

FIG. 101 shows a report for detailing information on all treatments for a particular lot and pen.

FIG. 102 is a report showing information including the treatment analysis summary and a corresponding cost analysis summary for treatments administered.

FIG. 103 is an overall lot summary report including information regarding head counts, treatment summaries, death summaries, and price summaries.

FIG. 104 is another report showing a lot summary including the dates in, heads in, treatments, and mortality information.

FIG. 105 is a lot comparison report detailing health related deaths and a description of the corresponding ailments for a particular location such as a feedlot.

FIG. 106 illustrates a lot analysis by owner report detailing the location, count, and other information for a particular owner.

FIG. 107 is a pen rider analysis report for a designated pen rider, an identification of the animals and diagnosis corresponding to the pen rider.

FIG. 108 is a lot analysis report detailing information on a particular lot chosen.

FIG. 109 is a detailed treatment history report by listing drugs administered during treatments.

FIG. 110 is a lot summary report detailing additional information on a particular chosen lot.

FIG. 111 illustrates a treatment exceptions report. This report captures information on any changes made to a preconfigured treatment. For example, if a user decides to adjust the dosage or type of drug administered to an animal versus that which is recommended in the preconfigured treatment, this report details all changed data.

FIG. 112 illustrates an inventory variance report detailing information on the actual amount of a drug on-hand versus an estimated on-hand amount based upon prior inventory and usage.

FIG. 113 is a billing report for a designated lot including information on the cost of various drugs administered.

FIG. 114 is another billing report detailing information by individual treatments administered to selected animals.

FIG. 115 is a quality assurance report detailing information on mass treatments and individual treatments for a particular lot.

FIG. 116 is a morbidity report summarizing treatments, diagnosis breakdowns, deads, and movements.

FIG. 117 is a morbidity report detailing information on diseases, treatments, and other information on animals that suffer from the various diagnosed afflictions.

FIG. 118 is another morbidity report providing treatment detail for date by origin reported by lot and pen number.

FIG. 119 is a mortality summary report for a designated period.

FIG. 120 is another mortality report detailing deaths by date range, to include information on treatment history of a particular animal.

FIG. 121 is a death notification slip report detailing information on the death of a particular animal.

FIG. 122 is an active item drug report showing drugs in inventory for a particular location, the recommended dosage, and the unit of measure for administering the dosage.

FIG. 123 is a lot master listing report detailing customer information for cattle retained in a particular location. Specifically, this report provides the sex, average weight, and head count for each owner in each lot and pen.

FIG. 124 is a report showing suggested treatments sorted by diagnosis codes, the detailed information including the recommended drugs, dosages, and units.

FIG. 125 is a scheduled processing report listing particular lot and pen numbers that are scheduled for a particular type of processing on the designated date. The scheduled processing could include any number of cattle management functions to include a scheduled sorting operation, animal health check-ups, and others.

FIG. 126 is a processing history report detailing information on treatments administered to the designated pen and lot numbers.

FIG. 127 is a listing of the active diagnosis codes.

FIG. 128 is a weight gain report showing information on weight gain for a particular lot and pen.

FIG. 129 is a listing of implant status codes.

FIG. 130 is a railer summary report detailing the number of animals railed, average days treated and average days on feed.

FIG. 131 is a railer analysis report detailing reasons for animals being railed.

FIG. 132 is a railer notification slip detailing instructions for the animal being railed.

FIG. 133 is a cattle activity receiving report showing the date, lot number, pen number and number of head received on the date.

FIG. 134 is a cattle activity movement report detailing date information on movement of cattle between various pens and lots.

FIG. 135 is a cattle activity deads report detailing information on cattle that have died at various locations.

FIG. 136 is a cattle activity shipment report detailing information on animals shipped from one location to another location.

FIG. 137 is a pen master listing report sorting the information by pen number.

F. Feed Management Sub-Module

A feed management sub-module is also provided within the grower/feedlot module. The purpose of the feed management module is to manage the assignment, calling, delivery and analysis of an animal feeding operation at the feedlot. The module allows recordation and reporting of all activities occurring during feeding, and also provides capability to interface the detailed feeding information to external financial systems, feed delivery systems within a particular feedlot operation or grower operation, as well as feed mill batching systems within a particular operation. Furthermore, the module also facilitates the assignment of types and amounts of rations to the various locations within the feedlot, the assignments which take into consideration various animal movements, receipt of new animals, shipment of animals from the feedlot, and many other factors that may alter the type and amount of rations to be delivered to each location within the feedlot. The feed management module data is stored at the local server databases or the central database, and therefore, the data can be fully integrated within the animal health module and all of the modules of the data processing system. This sub-module provides a user with a complete record history of how individual and group of animals have been fed over a period of time to include recordation of what the animals have been fed and over the particular time period in which the animals have been fed. The functionality provided by the feed management sub-module of the present invention allows great control of the feeding function in order to maximize the production cycle of each and every animal. By the control features incorporated in this feed management sub-module, feeding problems such as underfeeding, feeding at inappropriate times, as well as many other feeding deficiencies can be more easily identified and remedied. Because of the detailed data that is gathered in a timely and real time manner, such data can be used as predictive tools for maximizing nutrition delivered for maximum growth and weigh gain. Ultimately, the feed management sub-module enables feed yard operators to maximize the efficiency of basic feed yard operations and to achieve desired weight gain goals for each animal. Logical relationships in the form of rules/algorithms may be applied to the entered data in order to provide data analysis, recommended management actions, and to provide reporting and other user interface outputs that enable a feed yard operation to optimize feed management. Also like the other sub-modules, feed management data can be exported to other data processing systems, and the system may also have feed management data imported into the feed management module.

One example of a reference disclosing the operation of a feed yard is the U.S. Pat. No. 6,216,053. This patent is hereby incorporated by reference in its entirety for disclosing basic feed yard operations to include the manner in which feed is delivered to various locations within the yard.

Commercial feedlots are used extensively to feed thousands of head of cattle or other animals at various stages of growth. The major reason for using an animal feedlot to feed cattle rather than the "open range" is to expedite the cattle growth process and thus be able to bring cattle to the market in a shorter time period.

Within an animal feedlot, cattle are physically contained in cattle pens, each of which has a feedbunk to receive feed. Ownership of cattle in the feedlot is defined by unique lot numbers associated with the group(s) of cattle in each pen. The number of cattle in an owner's lot can vary and may occupy a fraction of one or more cattle pens. Within a particular pen, cattle are fed the same feed ration, (i.e., the same type and quantity of feed). In order to accommodate cattle at various stages of growth or which require special feeding because they are sick, undernourished or the like, the feedlot comprises a large number of pens.

Generally, feeding cattle in a feedlot involves checking each pen daily to determine the ration quantity to be fed to the cattle therein at each particular feeding cycle during that day, the condition of the cattle, and the condition of the pen. At a feedmill, feed trucks are then loaded with appropriate quantities of feed for delivery during a particular feeding cycle. Thereafter, the loaded feed trucks are driven to the feedbunks and the assigned ration quantity for each pen is dispensed in its feedbunk. The above process is then repeated for each designated feeding cycle. Owing to the large number of feed ration quantities assigned for delivery each day in the feedlot, feeding animals in a large feedlot has become an enormously complex and time-consuming process.

It is known in the art to use computers to simplify feedlot management operations. As early as 1984, computers have been used to simplify calculations on feed, cattle movements, payroll and accounting, invoicing and least-cost feed blending. From such calculations, market projections, "break-even prices" on any given head of cattle, and analyzable historical records can be easily created while permitting feedlot managers to keep track of virtually all overhead costs, from labor and equipment costs, down to the last bushel of corn or gram of micro-nutrients.

It is also well known to use portable computing equipment in order to facilitate the assignment and delivery of feed rations in a feedlot. For example, U.S. Pat. No. 5,008,821 to Pratt, et al. discloses one prior art system in which portable computers are used in feed ration assignment and delivery operations. As disclosed, this prior art computer system uses portable computers during the feed ration assignment and delivery process. Using such computers, the feedbunk reader assigns particular feedtrucks and drivers to deliver specified loads of feed to specified sequences of pens along a prioritized feed route during each physical feeding cycle. Thereafter, the specified feed loads are loaded onto preassigned feed delivery vehicles, and then the feed delivery vehicles dispense the feed rations into the feedbunks associated with the corresponding animal pens along the prioritized feeding route.

In order to carry out feed delivery operations, known feed delivery vehicles use a motor-driven auger to dispense the preassigned amount of feed ration from the vehicle into and along the length of the corresponding feedbunk.

The functionality of the feed management sub-module of the present invention will now be disclosed by referring to a number of user interface screens as well as a number of reports that can be generated from entered data. These screens and reports show the extreme detail in which every aspect of the feeding operation can be controlled, analyzed and recorded.

Figure 138:
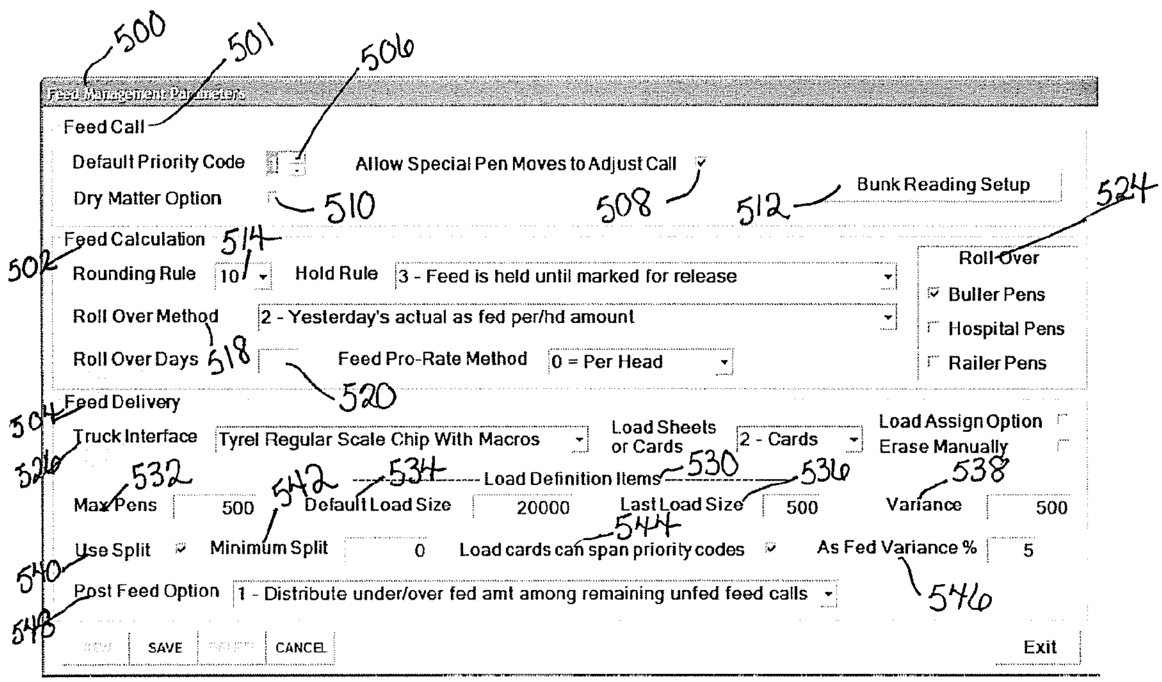
FIG. 138 is a user screen for establishing feed management parameters for the feed management sub-module of the present invention.

Referring first to FIG. 138, a user interface screen is provided for setting up feed management parameters in accordance with the data processing system of the present invention. As shown, the feed management parameters screen 500 can be conceptually separated into the feed call 501, the feed calculation 502, and the feed delivery 504. The feed call 500 refers to how feed will be distributed to individual animals and groups of animals within various designated locations of the feed yard. Depending upon the number of animals found within the feed yard at that particular time, and their particular status, the feed call may require adjustment on a daily basis, to include adjustments made between feedings during the same day. The feed calculation 502 refers to the manner in which calculations are made for each feed call in order to provide the right type and quantity of feed for each selected individual animal or group of animals. Feed delivery 504 refers to the manner in which feed is physically delivered to the various pen locations, and subsequent actions that should be taken after feed has been delivered.

Referring first to the feed call 500, a default priority code 506 is provided wherein each pen in the yard is assigned a code corresponding to when that particular pen will be fed for the next feeding. For example, a default priority code of 1 means that all pens assigned this priority code will be fed first in the next feeding. A change of priority codes between pens would accordingly alter the order in which pens were fed. A user can change the default priority code for each pen depending upon what has occurred in the feed yard to include any movements of cattle, and other factors that may affect the priority for feeding. Automatic adjustment of the feed call may be achieved by selecting the option shown at box 508, and entitled: allow special pen moves to adjust call. If this option is checked, each time animals are moved out of any special pen such as hospital pens, recovery pens, etc., the feed call will be automatically adjusted based upon the number of animals actually found in the pen for the next scheduled feed delivery time. For example, so long as there has been a data entry showing that one or more cattle have been moved, the feed call for the next scheduled feed call will be adjusted to account for those animals that have been moved. Further for example, if one or more animals have been moved out of a hospital pen and have been added to a regular pen, then the feed call will be incrementally decreased in the hospital pen, and incrementally increased in the regular pen to account for the move.

The dry matter option block 510 refers to the manner in which the data processing system will calculate feed if the feed yard utilizes a dry matter calculation. Many feed yards use consumption calculations based upon the amount of dry matter that is contained within a particular type of feed. For example, if the feed call for a particular pen is 100 pounds, and the ration prescribed has 80% dry matter, then the actual feed call delivered would be 80 pounds of dry matter, and 20 pounds of liquid would be added at the appropriate time.

The bunk reading setup button 512 when activated provides access to another screen enabling a user to setup the manner in which the bunk reading information will be displayed to the feed yard employee responsible for gathering data on the status of feed delivered to the pens, referred to as the bunk reader. As discussed further below, the bunk reading setup can be modified to display a number of different types of information. The bunk reading setup is discussed in further detail below with respect to FIG. 139.

Referring to the feed calculation function 502, a number of features are provided in order to establish and modify the feed calculation. Block 514 corresponds to a selected rounding rule that is established to round the total feed call for the next day. Depending upon the number of animals in the pens being fed, the appropriate rounding rule can be chosen by the user. As shown in the figure, the rounding rule 14 is set at 10, which means that feed is rounded to the nearest ten-pound increment. The pull down menu for the rounding rule provides other values for the rounding rule as needed based on the type of scales being used and other factors. The rounding rule is limited by the accuracy of the scales being used on feed delivery trucks. Typically, feed delivery trucks are only accurate to plus or minus 10 pounds; therefore, the most accurate rounding rule would typically be 10 pounds. For example, if a particular feed call requires a delivery of 2,000 pounds of feed, an assigned rounding rule of 10 would allow delivery between 1,990 and 2,010 pounds Hold rule 516 corresponds to a particular rule chosen as to what should happen to feed that is to be delivered to a selected bunk, but a decision is made at the time of feeding to hold the delivery of the feed to the bunk. For example, when reading a feed bunk, the feed bunk operator may notice that a particular bunk contains feed from the previous feeding. In that case, the bunk reader may wish to hold the feeding, and the particular hold rule assigned would govern what is to happen with the feed in the feed call being held. A number of hold rules can be made available which correspond to instructions if a decision is made to hold a particular feeding. For example, one hold rule could simply remove the held feed from the total feed call. Another hold rule could take the amount of feed held, and then add it to a subsequent feeding for the day, or add the held feed into subsequent feedings by incrementally splitting the held feed equally in the number of subsequent feedings.

The rollover method 518 refers to the method by which feed will be calculated for the next day's feeding. A number of options are provided that enable an automatic calculation for the next day's feed. For example, the rollover method can be calculated based upon the prior days consumption, or consumption averaged over a period of time, such as a three or five-day period. Another manner in which to calculate the rollover method is by previous call amounts, such as the average call for the prior day, or an averaged call amount over a selected period of time. Yet another rollover method that can be chosen would be to adjust the next day's calculated rollover amount by subtracting the amount left in a pen, and then using the prior day's actual fed or called amount. In the example, the rollover method selected is yesterday's actual as fed per head of cattle amount.

The feed pro-rate method 522 corresponds to the method by which feed is pro-rated/adjusted based upon movements within pens in the feed yard. There are two primary methods by which feed can be adjusted among pens based upon movement of animals within the yard. One method is by the number of head being moved, and the other is by weight of the animals being moved. The per head method changes the feed calculation for each pen based upon number of animals that are moved from one pen to another. If the weight option is chosen, then an incremental increase or decrease in amount of feed provided to the pens is based upon the weights of the animals collectively found in each particular pen at that time, accounting for any movements of animals within the pens for the next feeding.

The rollover option 524 corresponds to the method by which feed is to be calculated for delivery for the next day to special pens within the feed yard, such as buller pens, hospital pens and railer pens. Normally, a rollover takes place for all regular pens in the yard for purposes of preparing feed delivery for the next day. As long as cattle remain in each of the pens fed in the day prior, a rollover feed call will be created for each pen based upon the feed call from the prior day. The special rollover option 524 is used to generate an automatic feed call for the next day for the particular pens that are checked. If any special pen in the yard is not checked, then a new feed calculation is required for each pen(s) not checked. For example, if the hospital pens block is not checked, then a new feed calculation would have to be made for any cattle in the hospital pen(s). Some yards may prefer not to have the automatic call of feed for cattle in special pens, and would rather inspect each of the pens to determine the appropriate feed call for the next feeding day.

The rollover days option 520 refers to the number of days chosen in which the particular designated rollover will apply for the next day's feed. For example, assuming that the feed method does not change, and the same ration will be fed to the designated group of animals within the designated pens, one can choose the number of days in which the particular rollover parameters should be applied to the next day's feed.

Now referring to the feed delivery 504, truck interface 526 describes the type of interface that is used on the delivery trucks, and selecting the desired option determines how data will be exchanged between the truck interfaces and the data processing system. For example, the delivery trucks may have different types of scales that provide data output in various formats. Additionally, one scale may require a ration amount and a head count in order to then transmit data as to the amount of feed actually delivered. Ultimately, selection of the truck interface depends upon the particular type of software and hardware that is used in the feed delivery trucks, these systems generally recording the weight of feed delivered to each pen at each feeding. The data processing system of the present invention is adaptable for any type of truck interface that may be encountered, and allows the user with the ability to choose the correct truck interface based upon the trucks that are actually being used in the feed yard. Data transmission from the trucks to the system of the present invention can take place in a number of ways to include more manual methods such as recordation of the data on media such as computer disks, or more automated methods such as wireless transmission (internet or RF). If a particular truck cannot transmit and receive information electronically (e.g., by cable, disk, or internet/radio frequency), then the data processing system can produce load sheets or cards that provide the truck driver with detailed information on how the truck should be loaded for each feeding and detailed instructions on how the pens should be fed from the load instructions. Load sheets or cards option 528 allows load cards or sheets to be produced. Load sheets/cards are simply printouts of data detailing the type of ration to be loaded, the ration amounts, the order in which the rations should be delivered, and other information which enable the truck drivers to load and deliver the correct type and amount of feed to the designated pens, and at the designated times.

Within the feed delivery function 504, there are a number of load definition items 530 that can be chosen. The load definitions 530 define a number of variables within the feed calls which detail how feed is to be delivered. The max pens option 532 designates the maximum number of pens to be fed on a single load of a truck. Limiting the number of pens per load can be a function of many variables, such as particular feed mixes that can only be mixed for a set period of time, because otherwise, the feed mix may become over-mixed and therefore unacceptable for delivery. For example, there is typically a set amount of liquid that is added to dry feed. The feed delivery trucks have a rotating feed container in which the feed is held prior to delivery. Mixing the liquid with the dry feed over too long a period of time can cause the feed to become too soggy due to excess liquid absorption. Limiting the number of pens per load can prevent over-mixing of feed.

The default load size 534 refers to the load size that will always be calculated unless there is a different load size assigned to a specific type of ration. A feed yard may wish to assign a finished load size corresponding to a size that will not jeopardize mix instructions for any feed mix used, and will not otherwise violate mix parameters for any feed mix used within the feed yard.

The last load size 536 corresponds to the minimum load size that a feed truck can mix, and yet achieve proper required mixing. Because of the rotating feed container used on the trucks, if too small of an amount of feed is used on the last load of the feeding, that small amount of feed may just remain in the bottom of the mixer and not be properly mixed. Improper mixing is undesired for many feed mixes. Thus depending upon the particular feed call, there may be some excess amount of feed that remains in the truck after the last load is delivered, since the amount to be delivered in the last load may be less than the minimum load size that can be carried by the truck to achieve proper mixing. Of course, it is desirable to minimize the excess amount of feed in the last load delivered.

The variance option 538 refers to the amount that the default load size can be varied in order to best accommodate delivery to the desired number of pens for a particular feeding. For example, if a default load size was 20,000 pounds to feed a targeted number of pens, but the required feeding amount was 19,500 pounds. Assuming the next pen to be delivered only requires 1,000 pounds, then in accordance with a variance of 500, the load size could be increased to 20,500 that would allow delivery to the first group of pens, and the extra pen only requiring the 1,000 pounds. If no variance is chosen and the load size remains 20,000 pounds, then the remaining 500 pounds could be delivered to the last pen. A later load would then be required to finish feeding the last pen by delivering the remaining required 500 pounds. Alternatively, the 500 lb. excess could be taken off the load, and the last pen could be fed in the next truck delivery.

At option 540, the user may split a load with respect to pens being fed. More specifically, use split option 540 allows feed delivery to be split among different truckloads in order to satisfy the required amount of feed that should be delivered to the particular pen. If the use split option 540 is not checked, then feed cannot be split among different loads for a particular pen, and the entire amount of feed for a particular pen must be delivered on one truck.

Minimum split 542 refers to the minimum amount of feed in pounds that can be split in a particular load, assuming that the use split option 540 is chosen. The minimum split 542 is chosen based upon factors such as the capability of the scales on the trucks to weigh a minimum amount of feed. Option 544 enables a user to select whether a particular truckload of feed can span between more than one priority code. As mentioned above, the priority codes relate to the order in which feed is to be delivered to each pen. A feed call with a number 1 priority code would correspond to those pens that must be fed first in the designated feeding. If the option 544 is checked, this indicates that a particular truckload can deliver feed to pens having different priority codes. In some circumstances, it may be desirable for a truck to only deliver to pens having the same priority codes.

The as fed variance option 546 corresponds to the variance between the actual amounts fed to the pens based upon the called amount. For example, based upon data read from the scales on the feed trucks, an amount of feed actually delivered to each pen is recorded. After a truck has completed its delivery, the actual fed amounts for each pen is information that is automatically transmitted to the data processing system (in the case of electronic truck interfaces), or is manually entered by the truck drivers/data input clerks. A percentage is then calculated based upon the feed call for each particular pen versus the amount of feed actually delivered. Option 546 enables a user to set the as fed variance to conform with the amount of feed which should actually be delivered. If the as fed variance exceeds the set percentage, then when the feeding is posted, a flag in the form of a report or some other user interface is generated showing that the variance has been exceeded in one or more pens. Accordingly, remedial actions can then be taken to correct the as fed variance overage or shortage. Exceeding an as fed variance can be caused by a number of situations, such as a malfunctioning scale, a malfunctioning feed screw from a feed truck delivery mechanism, feed truck driver error, etc.

The post feed option 548 corresponds to the pull down menu which enables a user to choose the post feed option in the event that the as fed variance exceeds the set threshold amount. As shown in the example of FIG. 138, one option is to distribute the under fed amount equally among the remaining unfed feed calls of the day so that the total feed actually delivered for the day's feed call is accurate after the last feeding of the day. Similarly, if there has been an over fed amount, feed can be taken away equally among the remaining unfed feed calls of the day so that the total feed actually delivered is accurate. If there is an observed variance exceeding the set threshold amount in the last feed delivery of the day, a user has the option of adjusting the roll over amount for the next day in order to remedy any over or under feeding that may have occurred.

Figure 139:
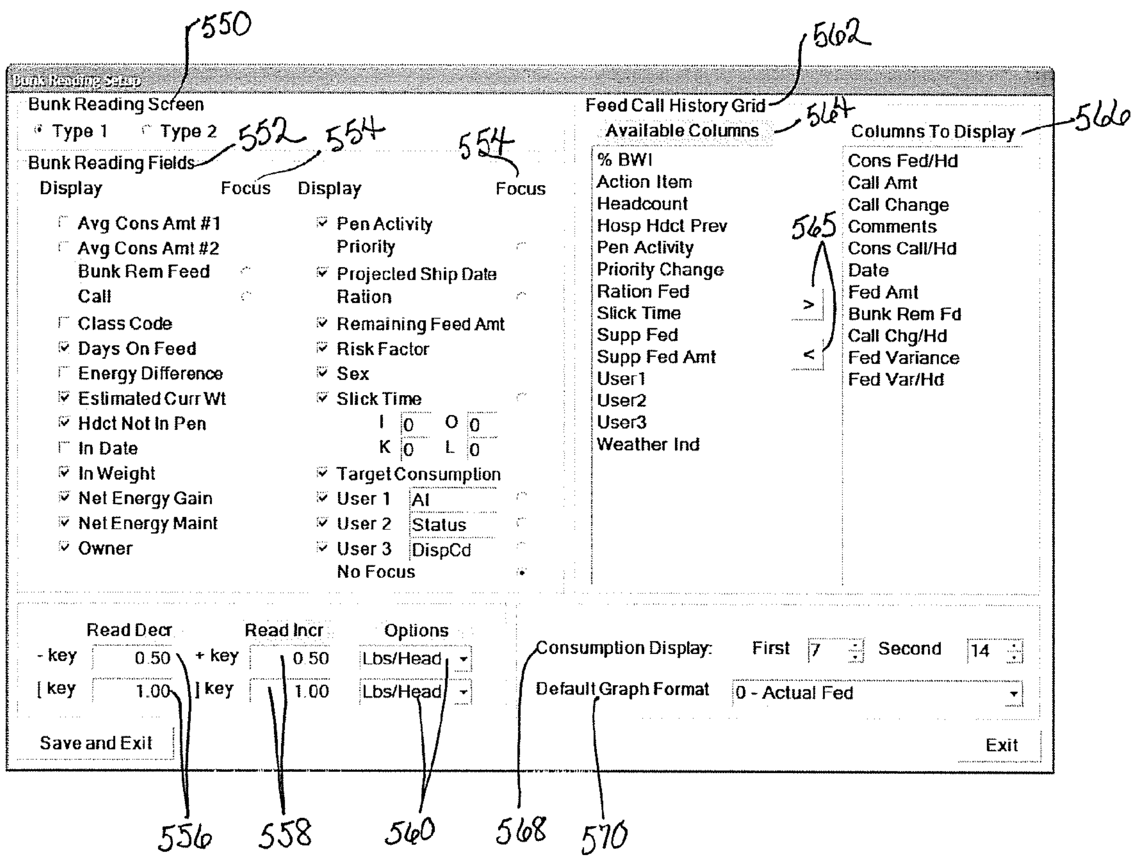
FIG. 139 is a user screen for setting up a bunk reading screen used by bunk readers in managing feed operations.

FIG. 139 illustrates a bunk reading setup screen 550 that is displayed when selecting button 512 from FIG. 138. As mentioned above, each feed delivery truck or another designated vehicle used in the feed yard may be equipped with a portable computer that interfaces with the data processing system. The interface is preferably wireless (e.g., internet, RF, or satellite). The truck operator/bunk reader on the portable computer can view one or more feed bunk screens. These screens display detailed information on each of the feed bunks. The truck operator/bunk reader may adjust feed amounts based upon the observed status of a feed bunk just prior to delivery, as well as based upon historical data about the feed bunk that dictates how the feed bunk should be fed. The portable computers also may run the truck interface software that records the actual weight of the feed delivered as integrated with the truck scales. In accordance with FIG. 139, there are two basic types of bunk reading screens that may be established, namely, type 1 and type 2 screens. The type 1 and type 2 bunk reading screens simply represent two general options in terms of how bunk information may be displayed on the portable computers, with the details of each bunk reading screen being controlled by the user. The bunk reading fields 552 correspond to the data fields within the bunk reading screens that can be displayed, by checking the appropriate box. The focus options 554 correspond to those display options where the cursor can be located when the screen is displayed, and if more than one option 554 is chosen, the user simply can use the tab key in order to change the focus of the cursor between the selected fields. For example, the projected ship date ration and the slick time may be selected for a particular focus when the user views the bunk reading screen. The cursor will be placed on one of the fields enabling a user to make a more easy data entry on that screen. FIG. 139 also shows the controls that can be utilized to increment or decrement the amount of feed to be delivered to a particular pen when the truck operator/bunk reader is located at the pen location, and is delivering the feed. As the example shows, the operator can decrease the amount of feed to be delivered at fields 556 by either pressing the minus key or the left bracket key. In order to increase the feed amount, the operator may either press the plus key or right bracket key at fields 558. In the options blocks 560, the increment/decrement can be controlled either by pounds per head, or total pounds in the pen. For example, if the total pounds option is chosen, then the increment/decrements could be 200, which would correspond to a 200-pound increase or decrease in delivery of feed to the particular pen. If the pounds per head option is chosen, then the increment/decrement, for example, could be one pound per head in which case the feed would be adjusted one pound per head based upon the number of head in the pen at the time. The feed call history grid option 562 allows the user to select the type of information to be displayed in graphical form on the bunk reading screen. As shown in the available columns 564, there is a listing of different fields that can be displayed in the feed call history grid. By using the selection arrows 565, the user can decide which columns to display or not to display. The data fields to be displayed are the ones listed in columns to display 566. The consumption display 568 enables a user to choose between two different ranges for average days consumption. In the example of FIG. 139, the first consumption display would encompass the 7-day period, while the second consumption display would cover a 14-day period. The default graph format 570 describes the format of the particular graph chosen for viewing. For example, it is possible to display actual fed amounts, actual fed versus called amounts, called amounts only, etc. In the example of FIG. 139, the operator has chosen to view the actual fed amounts on the graph.

Figure 140:
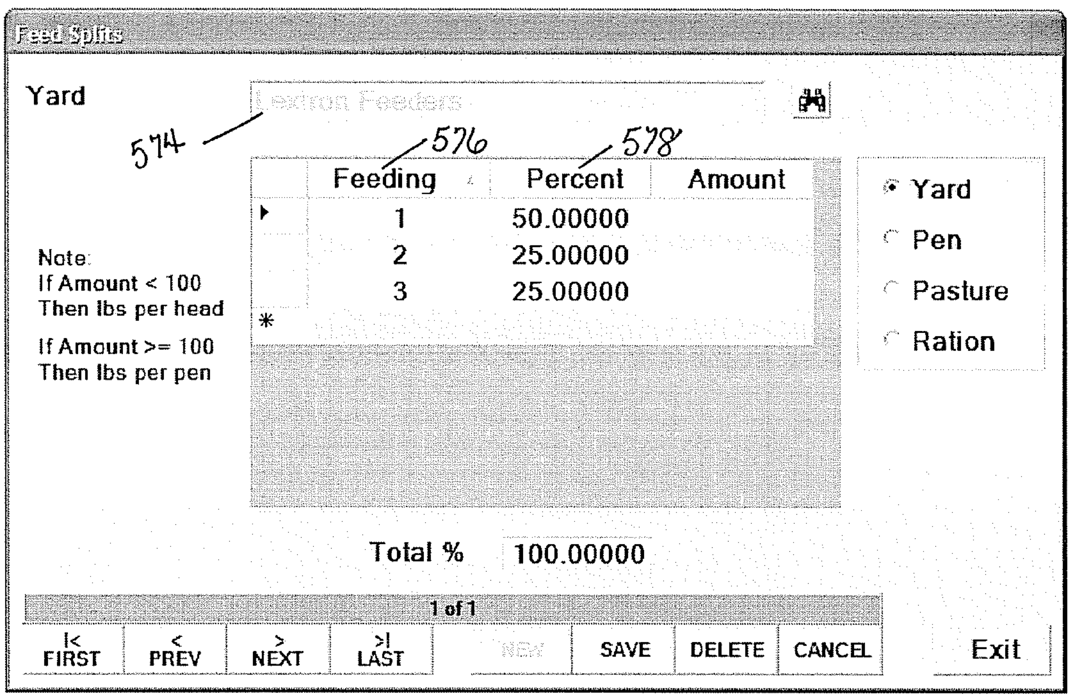
FIG. 140 is a user screen for establishing feed splits

FIG. 140 illustrates another file maintenance menu selection screen, namely, a feed splits screen. This screen allows the user to enter rules by which the total daily feed call for a pen of animals will be divided into separate feed deliveries to the pen. The user can elect to enter a general default rule for the feed yard, split rules for a particular pen of animals, split rules for a particular pasture containing the animals, or split rules for particular ration codes. The split rules can be entered as percents of the total daily call, or as pounds per head/pounds per pen if the amount values are selected. In the example of FIG. 140, a particular yard/facility 574 is chosen, and there are three feedings 576 scheduled in the daily feed call. The percentages 578 for each feeding are shown, namely, 50% for the first feeding, 25% for the second feeding, and 25% for the third feeding. Based upon these feed splits designated, the feed calls for each feeding are calculated and delivered.

Figure 141:
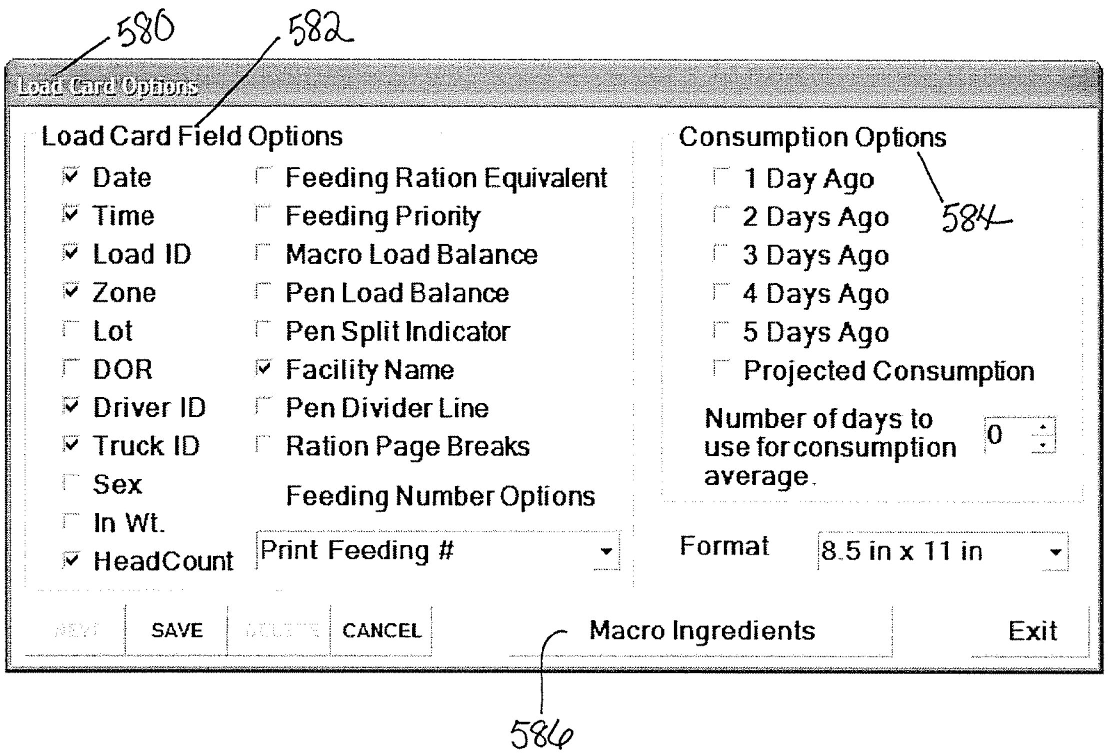
FIG. 141 is a user screen for setting data elements to be displayed on load cards/feed sheets.

FIG. 141 is another file maintenance menu selection screen, shown as a load card options screen 580. This screen allows a user to define what data elements will be displayed on load cards/feed sheets. Load cards/feed sheets are the feeding instructions carried by the truck driver that provide detailed information of the ingredients that are to be loaded on the truck at the feed mill or ingredient loading site, as well as the listing of pens that are to be fed from the loaded truck. These printed cards/sheets can be used as the primary means of instructions for the drivers when one or more of the delivery trucks do not have an electronic truck interface. The truck may also have its own separate feed truck interface with the mill computer allowing the load card/sheet to be displayed on a user interface screen on the truck computer as well as on the mill computer. The load cards can be provided to the feedmill in the form of a user screen that is generated from the options chosen in FIG. 141. As shown, there are various load card field options 582 and consumption options 584.

FIG. 141 also includes the macro ingredients button 586 which, when selected by the user, allows the user to select which macro ingredients contained in the ration formulas will be displayed on the load card/load sheets report.

Figure 142:
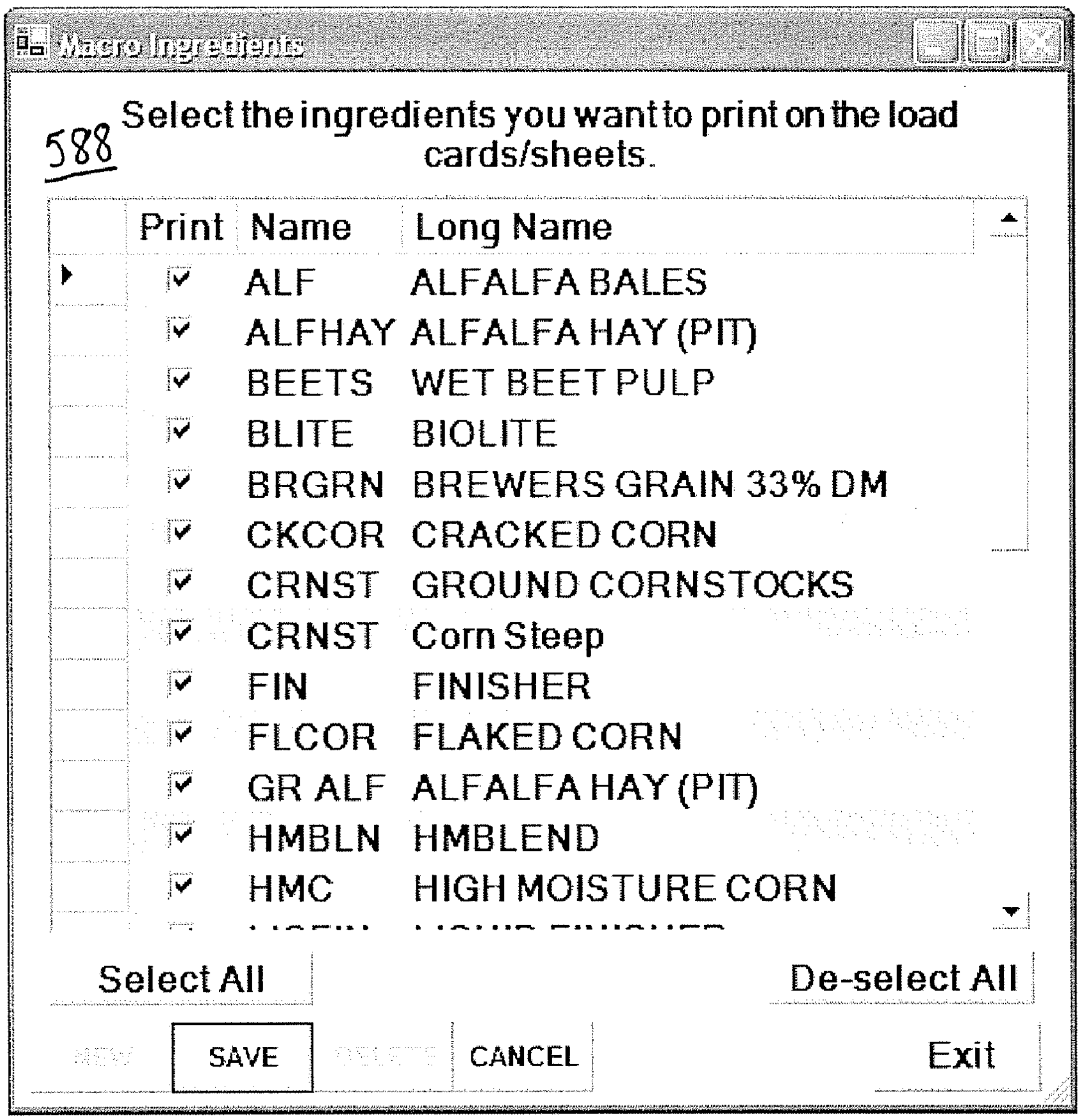
FIG. 142 is a user screen listing particular ingredients that can be chosen for display on the load cards/feed sheets.

FIG. 142 is the user screen that appears when the user selects the macro ingredients button 586. The macro ingredients listing 588 allows the user to select the particular ingredients that are capable of being printed on the load card/sheets. As shown, the user can select all listed macro ingredients, may select specific ingredients, or may de-select and then re-select desired ingredients.

Figure 143:
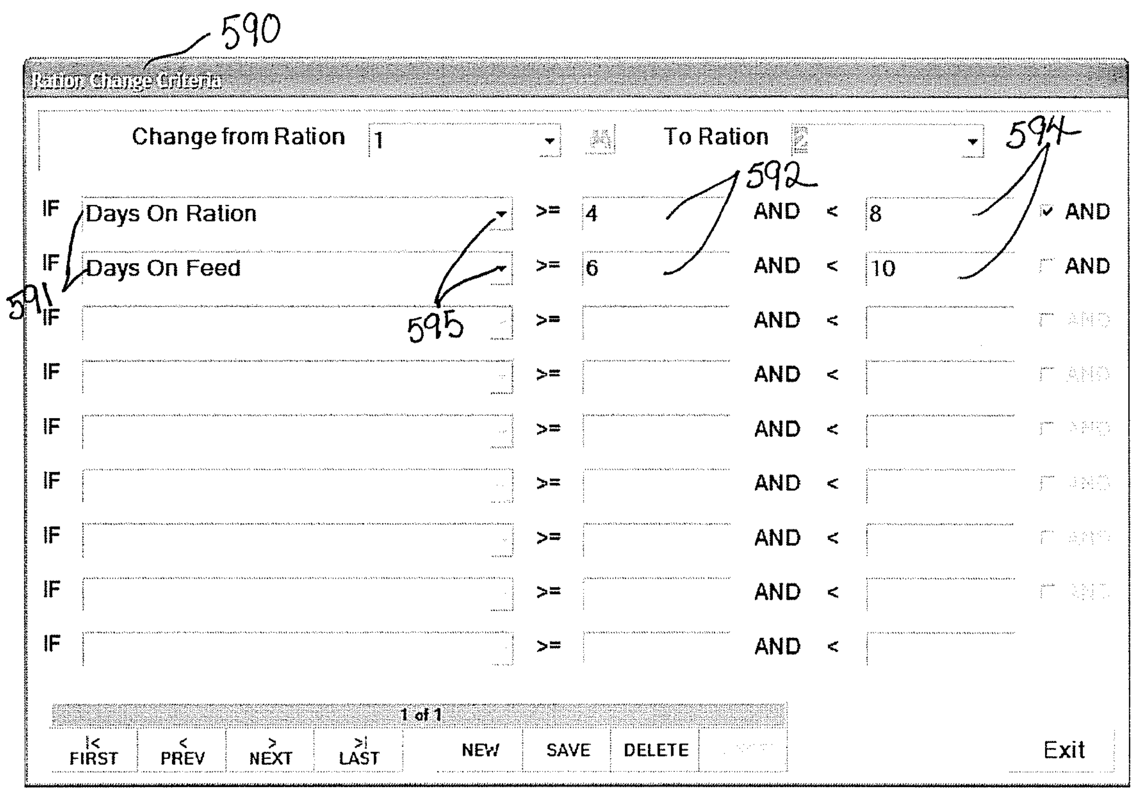
FIG. 143 is a ration change criteria screen allowing a user to enter rules that govern when the system will generate a recommendation that a ration change take place for a selected group of animals.

FIG. 143 is another file maintenance menu selection screen, namely, a ration change criteria screen 590. This screen allows a user to enter rules that will govern when the system will recommend that an individual animal or a pen of animals should be changed from an assigned ration code to the next preferred ration code/feeding sequence. As shown in the figure, criteria 591 are provided for establishing the rules. Criteria values can be selected between the designated ranges, the range limits being defined by the values entered in blocks 592 and 594. The criteria 590 may be chosen from predefined pull down lists by selecting the corresponding pull down icons 595. When a pen of animals is displayed on any of the bunk reading screens, the data processing system will evaluate all of the listed rules contained in this table of rules. The system will generate a notice to the user if any pen data matches any of the recommended ration change criteria. The notice may include a listing of the current criteria values for the affected pen. The system does not automatically change the ration code of the affected pen to the recommended ration code, but allows the user to elect whether to adopt the change or to continue feeding the currently assigned ration code. If the user elects to not change to the suggested ration code, the system will continue to notify the user each time that the affected pen's data is displayed on the bunk reading screen. The system also records the criteria evaluation in a history table that may be evaluated by yard management to better control feeding schedules within the facility. The notification to the user may be achieved by a separate notification screen, similar to the notification screen discussed below with respect to FIG. 168. The notification summarizes the ration change criteria, and requests the user to confirm whether the ration change should take place (yes/no buttons on screen). Additionally, notification could be achieved by automatic generation of a written notice (not shown).

Figure 144:
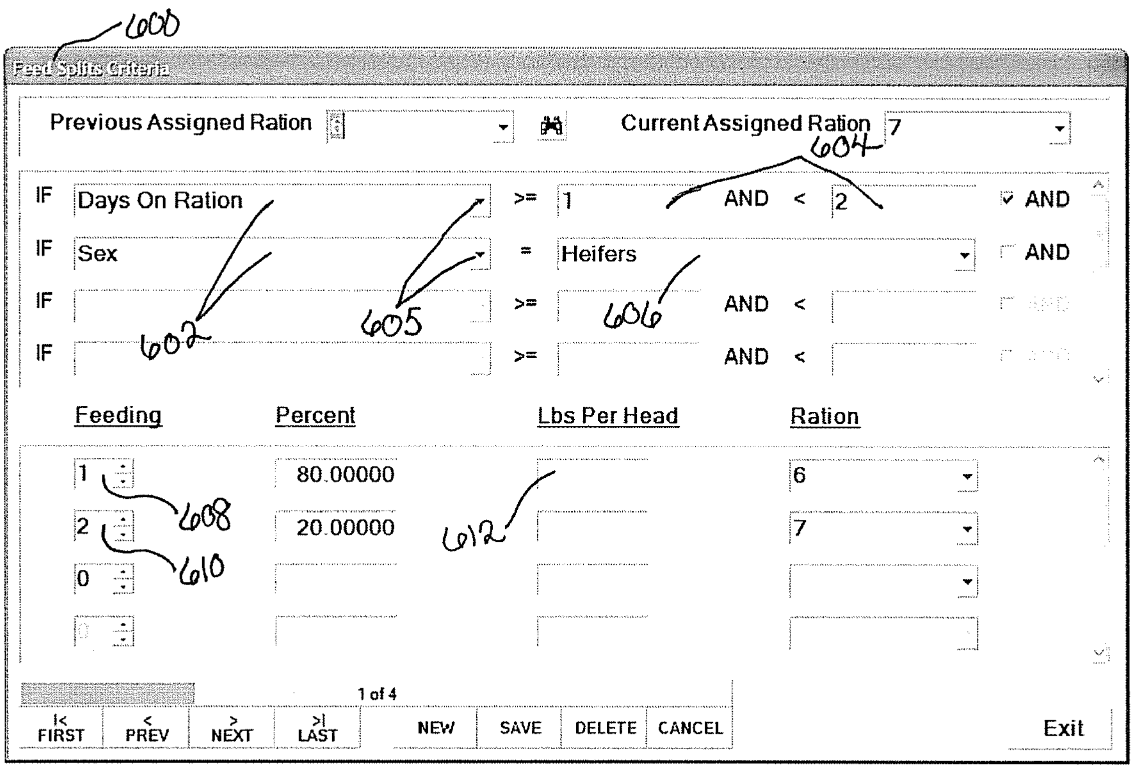
FIG. 144 is a feed splits criteria screen allowing a user to enter rules that govern how the system will calculate feeding values during the change from one assigned ration to another.

FIG. 144 corresponds to another file maintenance menu selection screen, namely, a feed splits criteria screen 600. This screen allows users to enter rules that will govern how the data processing system will calculate feeding values during the change from one assigned ration code to another. The criteria for these rules are selected from a predefined list of criteria 602 that can be chosen from the pull down menus for each criteria block. As with the ration change criteria screen of FIG. 143, a user can click on the pull down menu icons 605 in order to view and select the criteria. Thus, the desired criteria are entered in fields 602, and the corresponding desired criteria values are entered in blocks 604 and 606. As shown in the example of FIG. 144, the feed splits criteria established apply to a change from ration code 6 to ration code 7. Along with the criteria to be established, the user also may enter the rules for calculating the feedings to be delivered to the pen of animals. As also shown in the example, the first feeding 608 results in delivering 80% of the feed call for the day, while the second feeding 610 results in the remaining 20% of the feed call being delivered. In lieu of delivering a percentage amount for each feeding, the feedings may be split based on pounds per head, shown in data entry blocks 612.

Figure 145:
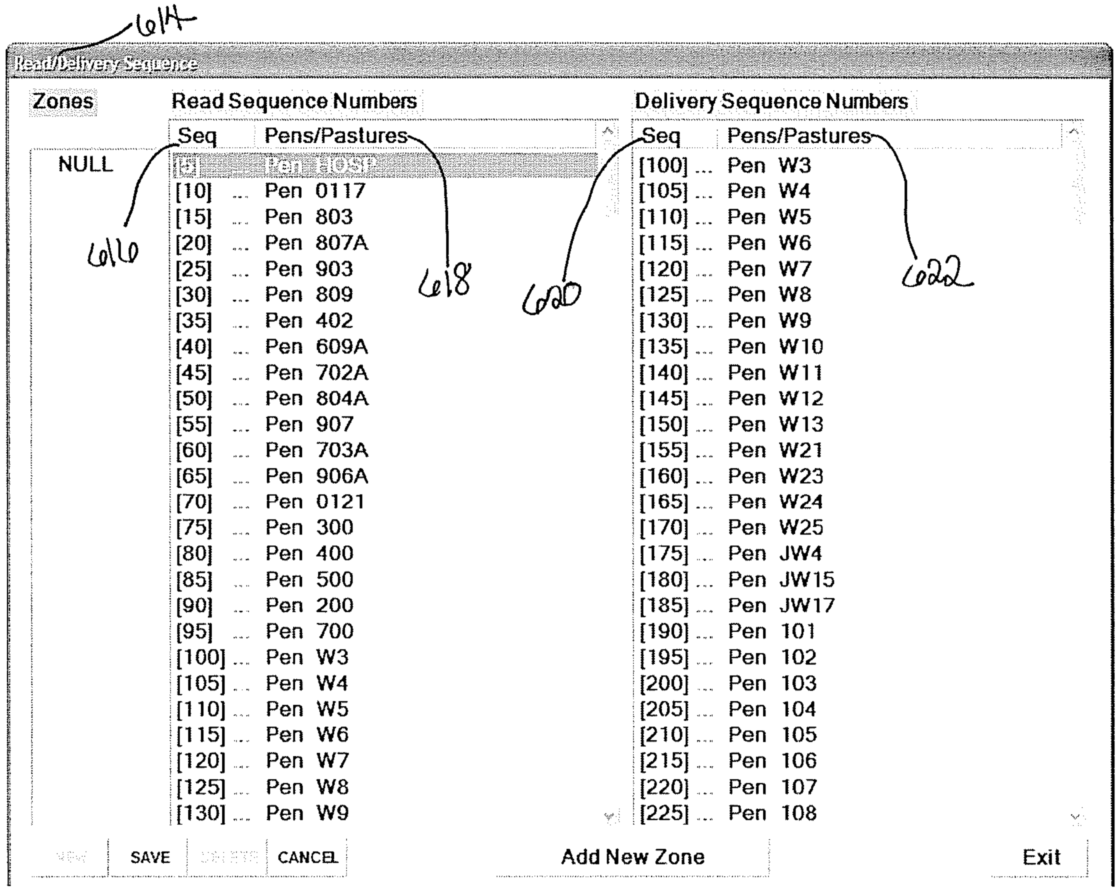
FIG. 145 is a read delivery sequence screen allowing a user to define zones or groups of pens within a feed yard, and the order in which feed bunks in these zones are read and receive rations.

FIG. 145 illustrates another file maintenance menu selection screen, namely, a read delivery sequence screen 614. This screen allows the user to define the physical zones or groups of pens, and the reading and delivery sequences assigned to the pens within the defined zones. Thus, this screen controls the order in which pens are displayed during the bunk reading process as well as the order in which rations are delivered to the pens. It should be understood that the reading and delivery sequences can be independent of one another. For example, it may be necessary to first have the bunk reader gather the information on the status of a select group of pens before delivery of feed for the day. Thus, the order of bunk reading may be different that the actual order of feed delivered to those bunks. In order to assign the read sequence, the user enters in the sequence column 616 the numerical sequence that is desired for reading the corresponding physical zone/pen 618. As shown in the example, the read sequence is incremented by 5, and various pen numbers are listed with their corresponding assigned read sequence number. The first read sequence number is shown as the number 5. For the delivery sequence, sequence numbers are also assigned in delivery sequence column 620, and the corresponding zones/pastures are entered in column 622. The delivery sequences have also been provided in increments of 5, the first delivery sequence number being 100. Ultimately, these read sequence numbers and delivery sequence numbers simplify feed delivery by allowing the user to view physical zones within the feed yard in a sequence that corresponds to the order in which the pens are fed and read.

Figure 146:
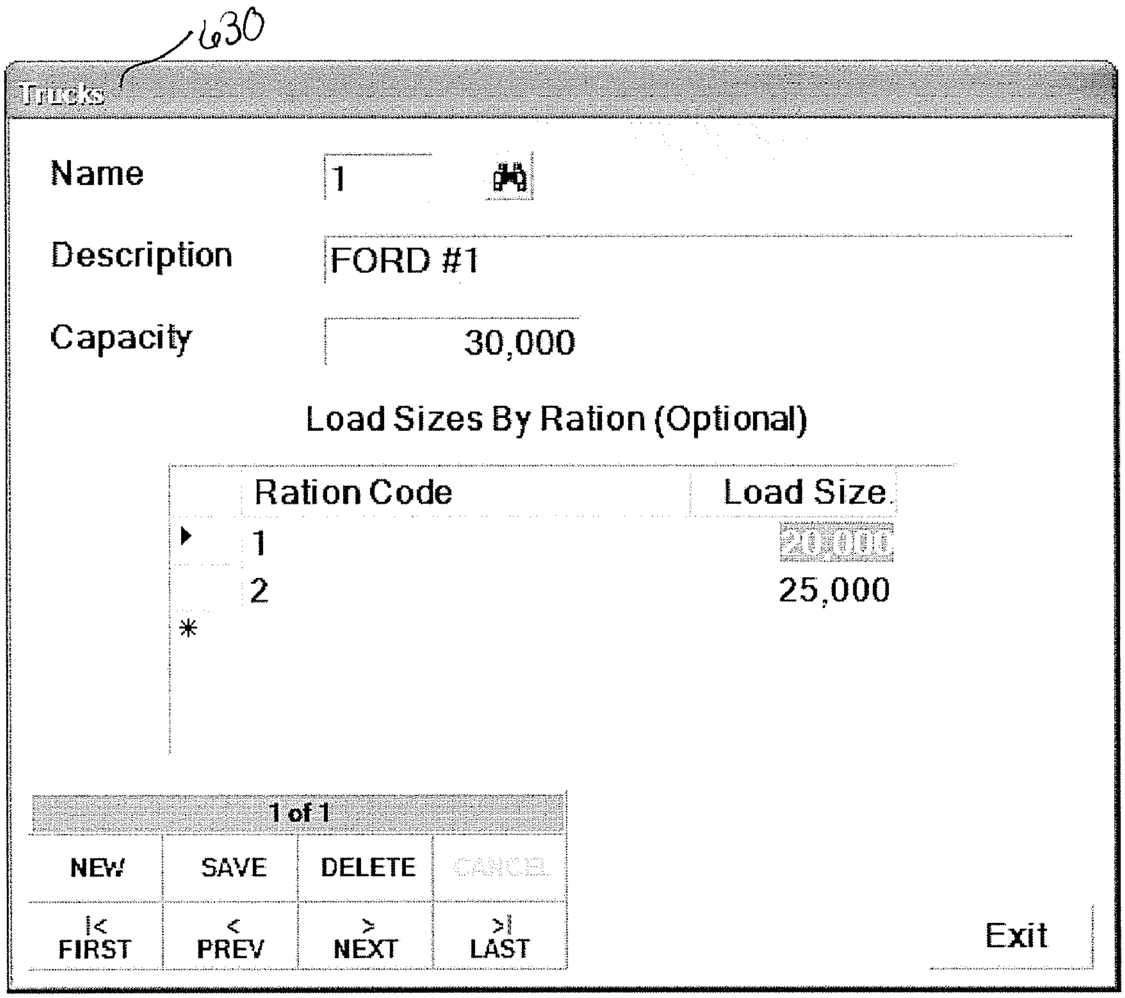
FIG. 146 is a user screen for entering information regarding feed trucks located at a particular facility.

FIG. 146 is another file maintenance menu selection screen, namely a trucks screen 630 for entering detailed information regarding feed trucks located at the facility. As shown, the trucks screen 630 allows a user to enter the name, description, and capacity of each feed truck. This feed truck data controls how the system analyzes and reports on truck activities as well as how feed loads are assigned and calculated by the system for delivery to the various physical zones within the feed yard. Additionally, trucks may be categorized based upon their capability to carry certain types of rations designated by the respective ration codes. In the example of FIG. 146, truck number 1 has a general capacity of 30,000 pounds; however, for ration code 1, its capacity is 20,000 pounds, and for ration code 2, its capacity is 25,000 pounds.

Figure 147:
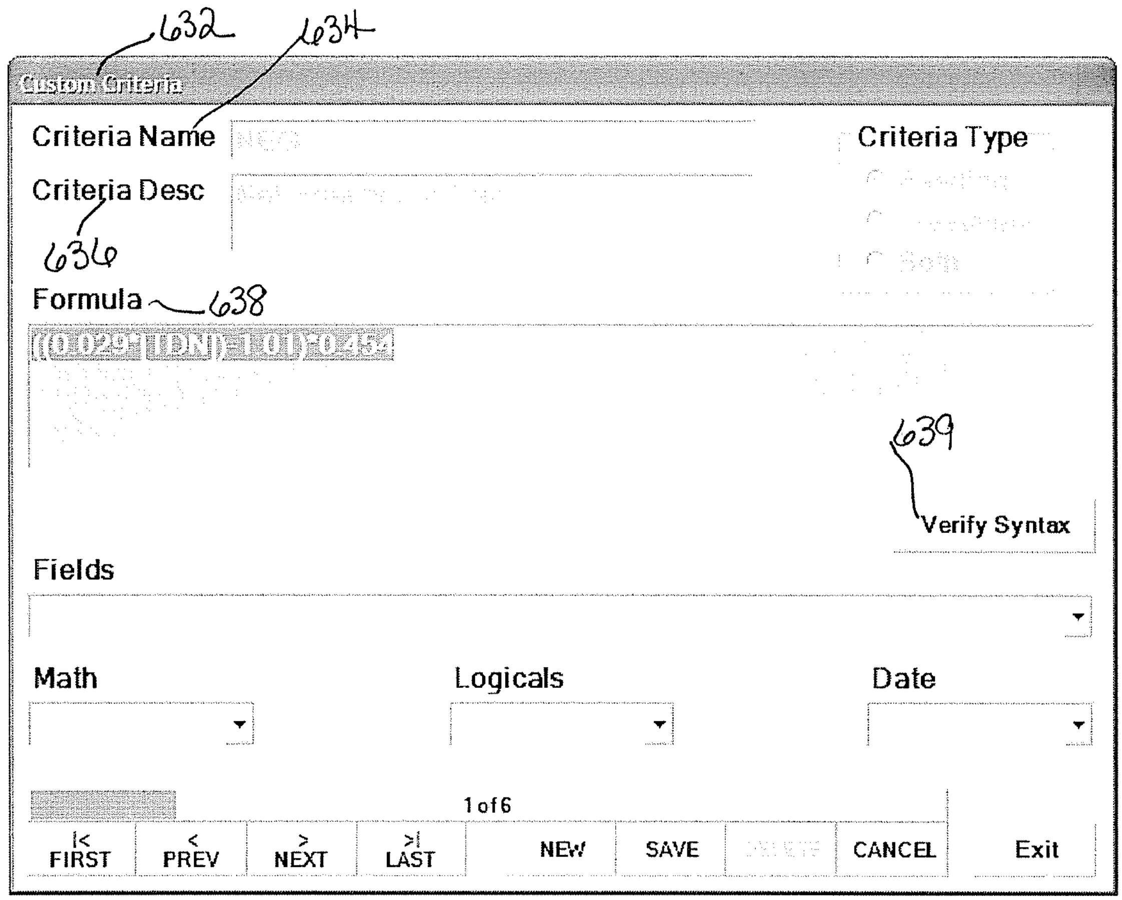
FIG. 147 is a custom criteria screen allowing a user to add custom feeding criteria.

FIG. 147 illustrates yet another file maintenance menu selection screen, namely, a custom criteria screen 632. This screen allows a user to add custom feeding criteria for evaluation by the system. These custom criteria may consist of any combination of the tabled criteria items, numerical values, and mathematical calculations. These custom criteria formulas once established may then be added to the criteria tables with an assigned name, and are made available to the user from the respective criteria pull down lists for the feed splits criteria and the ration change criteria screens. In the example of FIG. 147, the criteria name 634 is designated as NEG. The criteria description 636 corresponds to net energy for gain. The formula 638 provides the numerical relationship for satisfying the criteria. The formula 638 may be built from the other data entry blocks shown on the screen, namely, fields, math, logicals, and date. Each of these data entry blocks have their own pull down menus that the user can select from in building the formula 638. The verify syntax button 639 is used to validate the syntax of the mathematical formula so that the formula can in fact be calculated when used.

Figure 148:
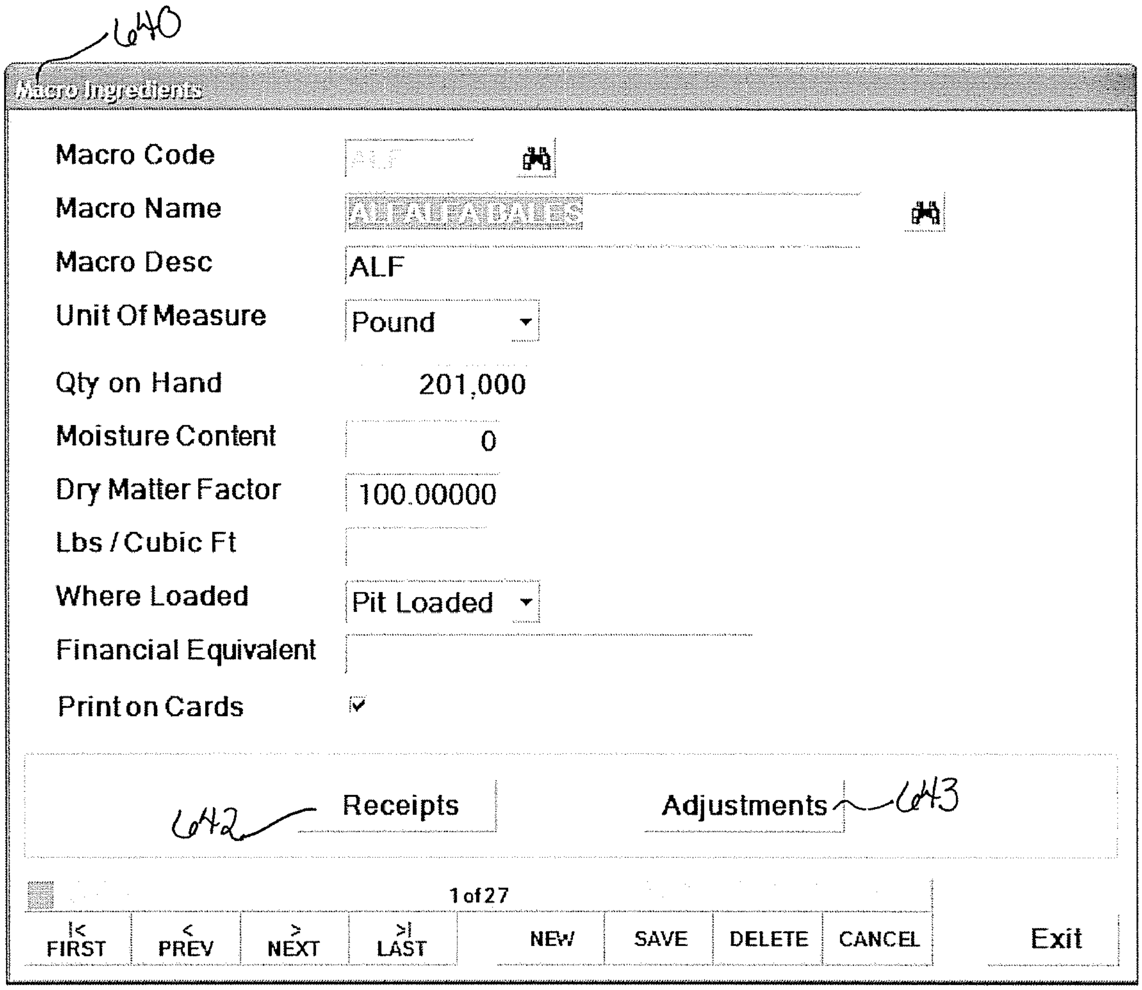
FIG. 148 is a macro ingredient screen allowing a user to enter and modify available macro ingredients to be used in ration formulations.

FIG. 148 is another file maintenance menu selection screen, namely, a macro ingredients screen 640. This screen allows a user to enter and modify available macro ingredients that may be used in ration formulations. This screen also allows the user to enter receipts and adjustments to inventory associated with each macro ingredient code. Examples of this screen and associated macro ingredient receipts (FIG. 149) and macro ingredients adjustments (FIGS. 150) are also displayed. More specifically, screen 640 controls how the system displays the macro ingredients and how certain data values associated with each macro ingredient are calculated by the system. In the example, the macro ingredient is alfalfa bales, a unit of measure in pounds, 200,001 pounds on hand, zero moisture content, and a dry matter factor of 100. The alfalfa bales are located within a loaded pit. The recorded entries for the macro ingredients are used by other data screens within the data processing system in order to calculate other displayed values. This screen along with actual fed data will enable a user to control physical inventories of macro ingredients on hand.

Figure 149:
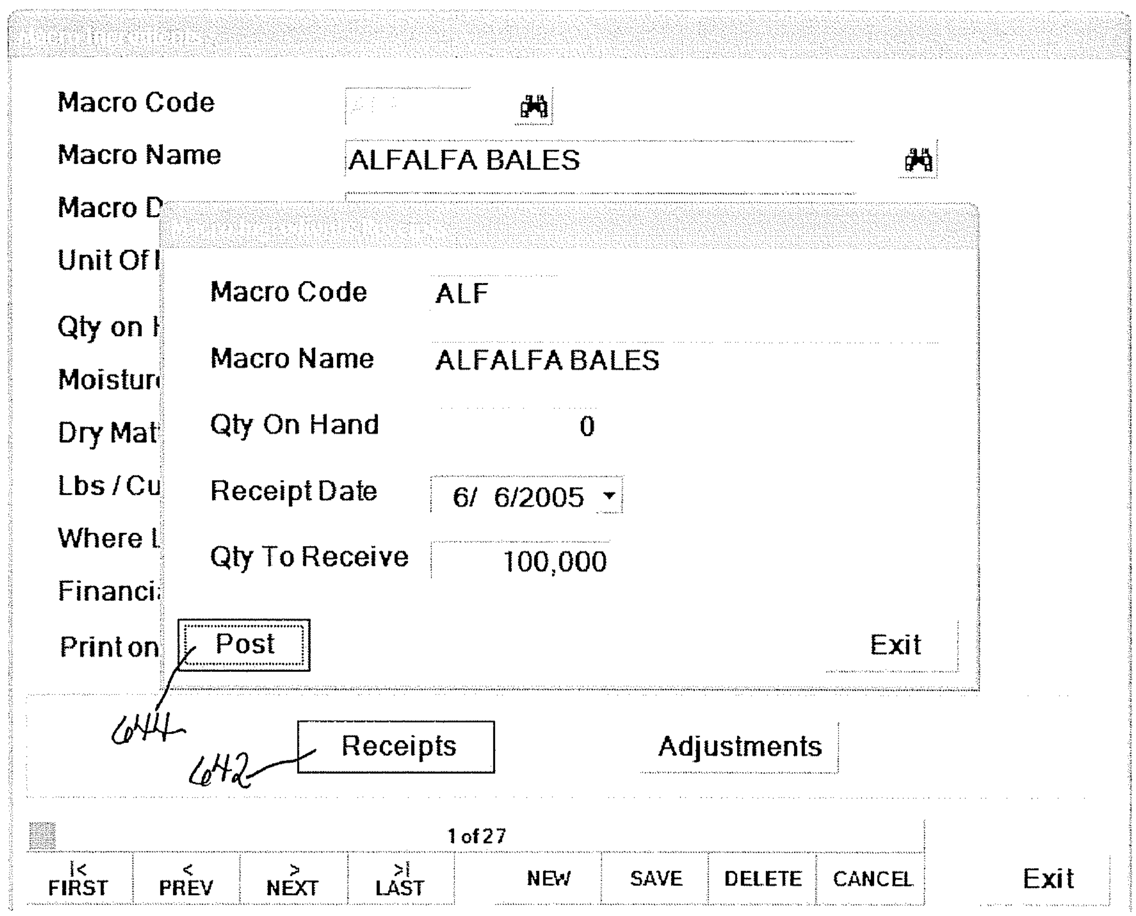
FIG. 149 is a receipts screen enabling a user to post received macro ingredients.

Referring to FIG. 149, when the receipts button 642 of FIG. 148 is activated, the user can view this receipts screen enabling the user to post received macro ingredients by entering the appropriate amount and date received, and then pressing the post button 644. In the example of FIG. 149, 100,000 pounds of alfalfa have been recorded as being received on Jun. 6, 2005.

Figure 150:
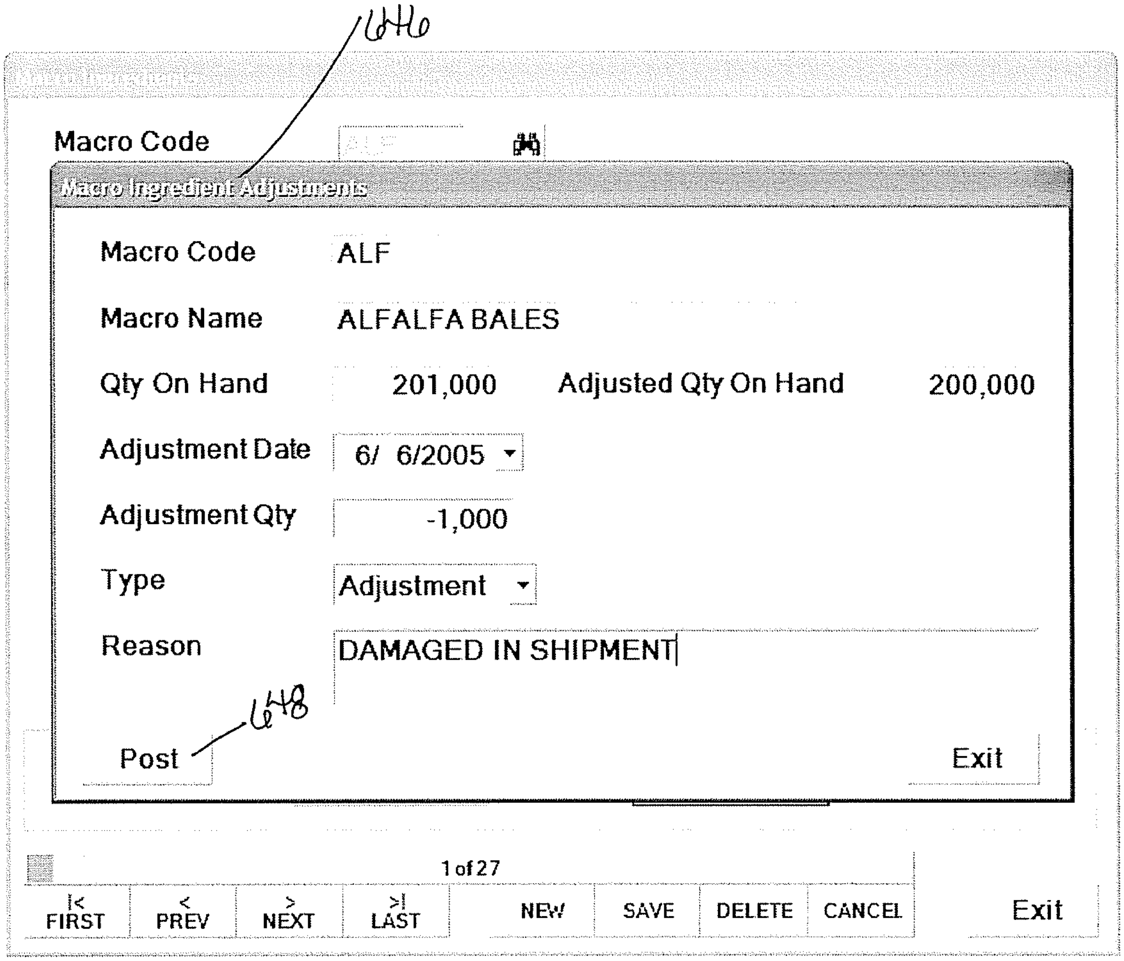
FIG. 150 is a macro ingredients adjustment screen enabling a user to adjust on hand inventories of macro ingredients.

FIG. 150 illustrates a macro ingredients adjustments screen 646 that can be used to adjust the on hand inventory of a particular macro ingredient. This screen appears if the user presses the adjustments button 643 of FIG. 148. As shown in the example of FIG. 150, 1,000 pounds of alfalfa has been damaged in shipment, and is to be subtracted from the quantity on hand. By pressing the post button 648, the adjustment is recorded.

Figure 151:
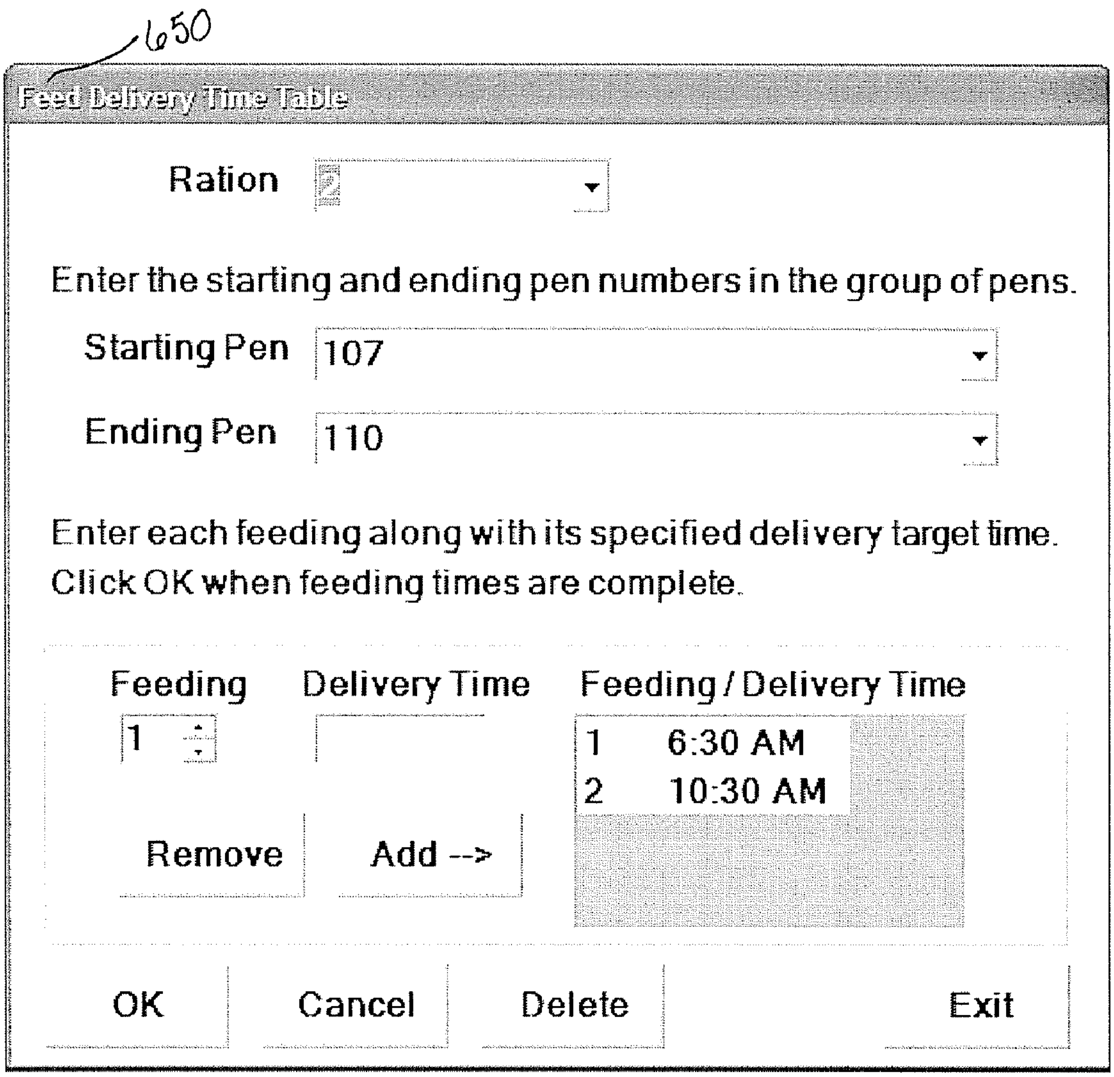
FIG. 151 is a feed delivery timetable screen enabling a user to enter and modify target delivery times for locations within a feedlot.

FIG. 151 is another file maintenance menu selection screen, namely, a feed delivery timetable screen 650. This screen allows the user to enter and modify target delivery times for each pen and ration within the feedlot. This screen also allows reporting within the system to compare actual delivery times recorded from the feed truck data to the target times, and also to display variance times for ration delivery for each pen in the feedlot. As shown in the example, ration 2 is to be delivered to pens 107-110. The first feeding is to take place at 6:30 a.m., and the second feeding is to take place at 10:30 a.m. The user can choose the ration, pens, feeding, and delivery times as shown.

Figure 152:
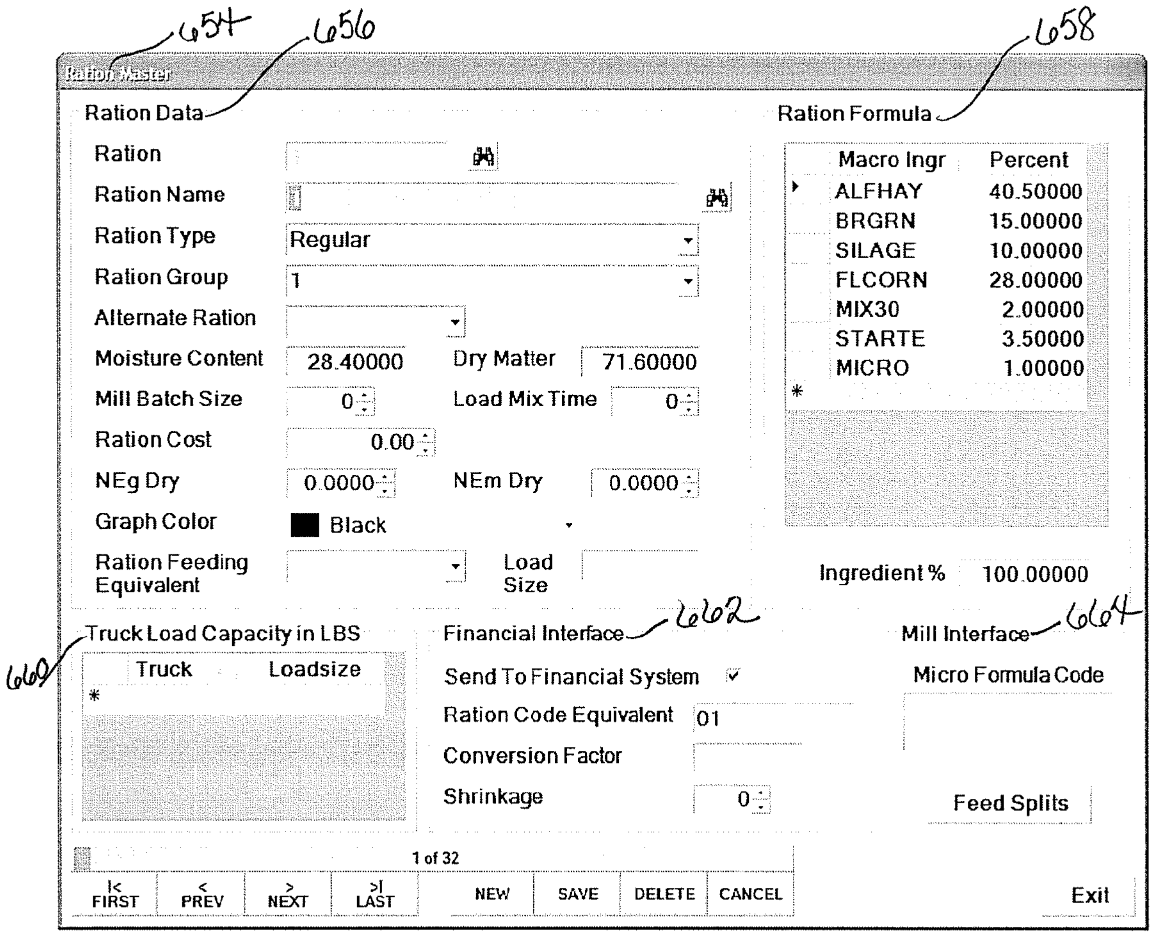
FIG. 152 is a ration master screen allowing a user to enter and modify available rations in the feedyard.

FIG. 152 is another file maintenance menu selection screen, namely, a ration master screen 654. This screen allows the user to enter and modify available rations. This screen controls how the system displays the ration details and how certain data values associated with each ration are calculated by the system. As shown, the ration data 656 includes a wide array of information that describes various attributes of the ration, as well as how the ration data is to be shown on other user screens (for example, graph color). When a ration code is displayed, the corresponding ration formula 658 is also shown which details the composition of the ration formula. The truckload capacity for the particular ration is shown at 660, as well as the corresponding financial interface 662 and mill interface 664. The interfaces with the financial system and the mill enable a direct conversion of the ration code established in the data processing system to be transferred to other data processing systems. Thus, the interfaces 662 and 664 allow conversion of data regarding consumed rations that may be directly reported to the various financial institutions or feedmills.

FIGS. 153-166 comprise user interface screens for controlling various feed management functions. As discussed in further detail, these screens allow a user to select and tailor feed management functions to be executed in the daily management of the feed yard. More specifically, these screens control basic transactions concerning the assignment of feed and the delivery of feed to groups of animals located in the feed yard.

Figure 153:
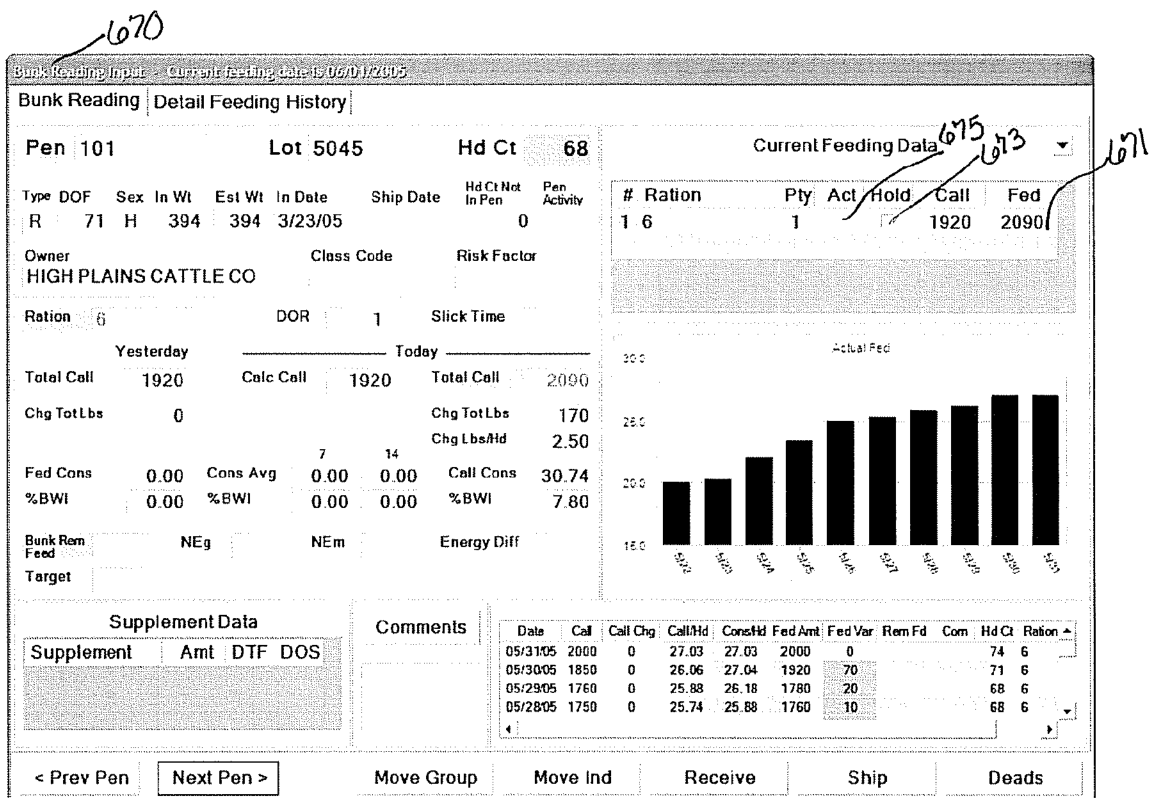
FIG. 153 is a feed management menu selection screen, namely, one of two basic formats available to a user for bunk reading input screens.

FIG. 153 shows a feed management menu selection screen 670, namely, one of the two basic formats for a bunk reading input screen/feed call screen. This is the primary screen used by the bunk reader in controlling feed yard operations. This screen allows the bunk reader to change a number of feed parameters as well as record the status of the pens. The ability to reassign a pen or group of pens to a specific feed load is available to the bunk reader on this screen (ask inventors how done on this screen). As discussed previously with respect to FIG. 139, the user may modify the particular display format. As shown in the example bunk reading input screen 670, the particular pen and lot number of the pen to be fed is shown, along with the head count. The calculated feed call shown in this example is 1,920 pounds. The actual fed amount is 2,090 pounds resulting in a variance of 170 pounds. A historical graph is shown which details the actual fed amounts for a preselected time period, and detailed information on the graph found in the lower right hand corner of the screen details additional historical information such as the fed variance. After the particular pen has been fed for the current feeding, the bunk reader/operator enters the actual amount fed by manually auditing by pen or by load from the truck scale or by auditing via the user interface associated with the truck scale indicating the actual amount delivered to the pen at that feeding. The actual amount fed is shown in data entry block 671 located under the current feeding data header. If during observation of the feed bunk for the pen a decision is made to hold the feed for the pen, the bunk reader/operator checks the hold box 673 or utilizes the associated function key which then records that the feed has been held for that pen. The bunk reader/operator may also change the assigned ration on the bunk reading input screen to include adding or modifying feed supplements. The Act column 675 under the current feeding data header refers to bunk activity to be completed for that pen, if any, as designated by the bunk reader. For example, prior to delivering the ration to the pen, the truck driver may have to scoop or clean the pen, as instructed in the Act column 675.

Figure 154:
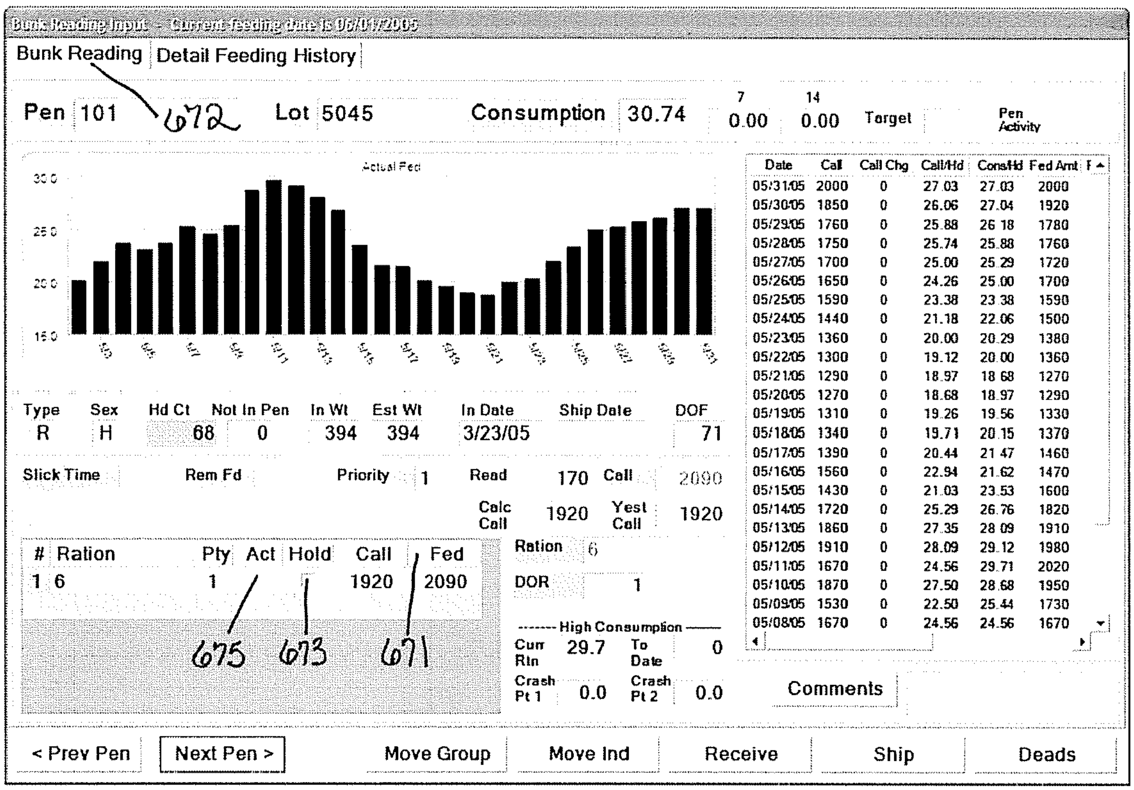
FIG. 154 shows the other basic format available to a user for a bunk reading input screen.

FIG. 154 shows the other standard bunk reading input screen 672. As shown, the information provided on the screen is arranged in a slightly different format, with some additional information being shown (such as the high consumption data) while other information being omitted (such as details on the current day's call). In order to enter the actual amount of feed delivered, the user would enter the amount in block 671. If feed were held for the pen, the user would check the hold box 673. As mentioned above with respect to the bunk reading setup screen, the user has the ability to tailor the information shown on the bunk reading input screens to meet their specific needs without otherwise changing basic source code.

Figure 155:
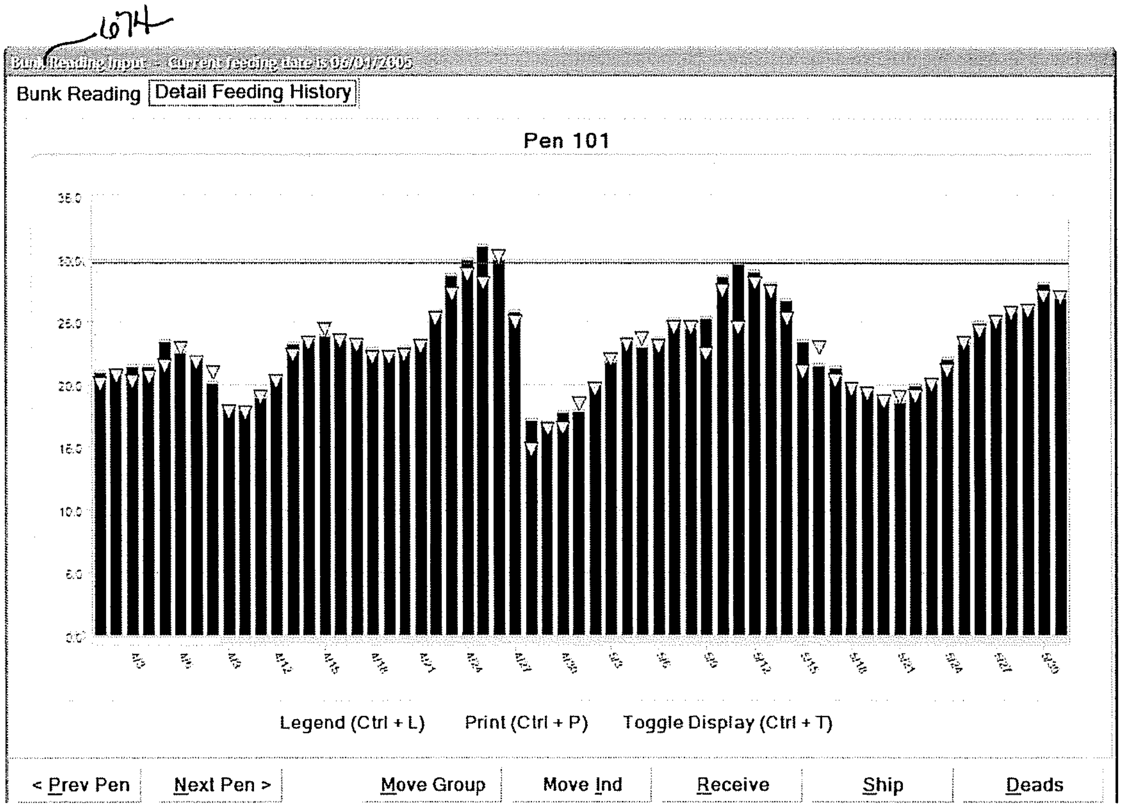

FIGS. 155 and 156 illustrate the detailed feeding history tabs from the bunk reading input screens. As shown in FIG. 155, this feeding history detail screen 674 provides a historical graph showing consumption for a specific pen over a selected period of time. This detailed screen shows data for each feeding of each day, and allows the viewing of fed rations and consumption differences between daily feedings. This screen can also show supplements that have been fed. The screen can also incorporate the use of a number of symbols or indicators that correspond to actions that have taken place in the pen. For example, indicators are available to be displayed if the pen has been identified as having, for example, bunk activity, movement of animals into or from the pen, a priority change in terms of when the bunk was fed in the order of feeding, target consumption data, dry matter percentage data, etc. These indicators are identified by means of symbols such as squares, triangles, circles, and may be colored to differentiate for ease of user viewing.

The feeding history detail screen 676 of FIG. 156 is a spreadsheet providing feeding history data to include call amounts, actual fed amounts, head counts, ration types, and identification of the particular location in the yard by pen and lot number. The information displayed in FIGS. 155 and 156 can be directed to an output file for export to other data processing systems, such as a data processing system of a financial institution. Accordingly, this information can be used by other parties in analyzing the production history of a selected group of animals within the feed yard.

Figure 157:
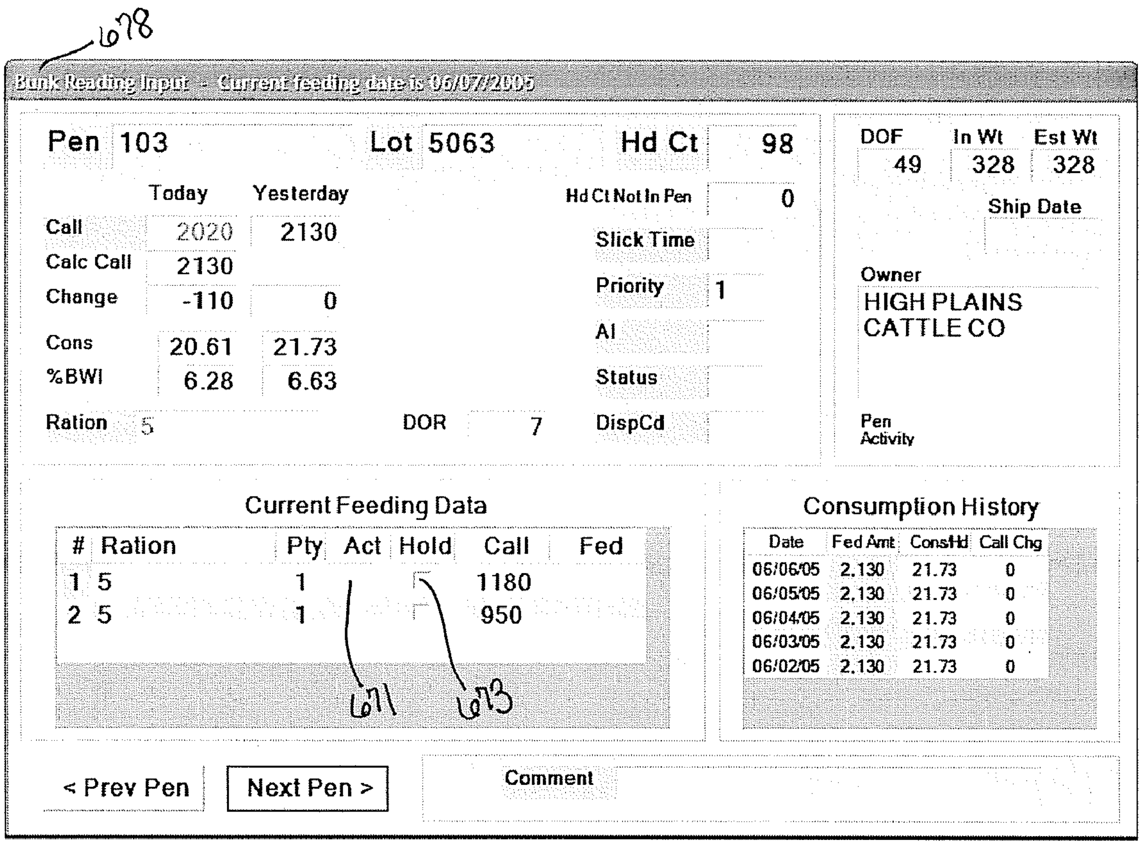
FIG. 157 illustrates an abbreviated format for a bunk reading input screen.

FIG. 157 illustrates another bunk reading input screen, namely, an abbreviated bunk reading input screen 678. A user may elect to use the abbreviated format of this screen as opposed to the formats provided in FIGS. 153 and 154. This particular bunk reading input screen removes some of the information found in the previous bunk reading input screens, such as the historical graph. As shown in this figure, entering the numerical value in data entry block 671 completes entry of the actual feed delivered, and recordation of holding the delivery is achieved by checking the box 673.

Figure 158:
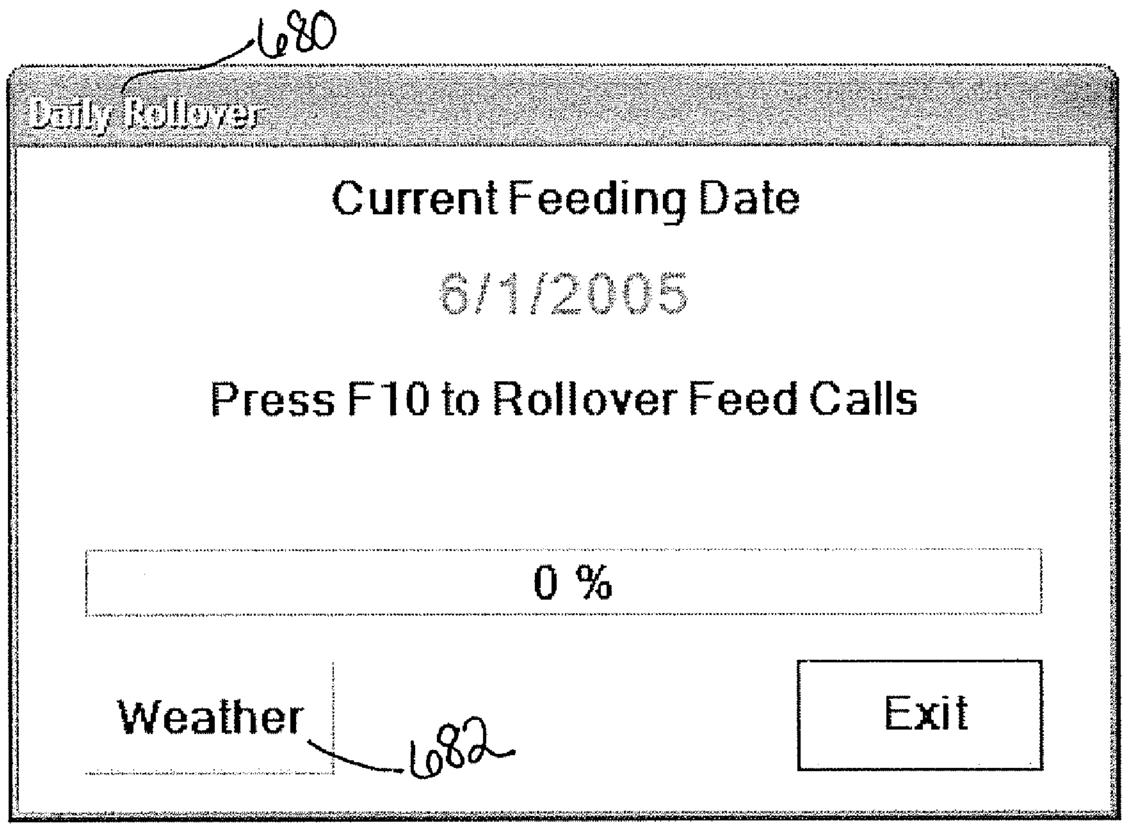
FIG. 158 shows a daily rollover screen enabling a user to prepare feeding tables for the next feeding date.

FIG. 158 is another feed management menu selection screen, namely, a daily rollover screen 680. This screen allows a user to prepare the feeding table for the next feeding date. This transaction can be performed at the end of the feeding day when all reports have been produced or at the beginning of the next day before the user enters the standard reading or abbreviated reading screens. Execution of this transaction by pressing F10 will move all of the current day's feeding data to the history tables and will then produce the feeding records for the next feeding date based on the rules set in the parameters screen, feed split screen, and feeding method criteria screen. If the user wishes to view a weather forecast, the user presses the weather button 682. The weather information may be obtained from a link to an online weather forecasting service. If the user observes that inclement or drastic weather changes may be occurring the next day, the user may wish to change the feeding parameters for the day, or otherwise adjust the feed call to account for the upcoming weather conditions.

Figure 159:
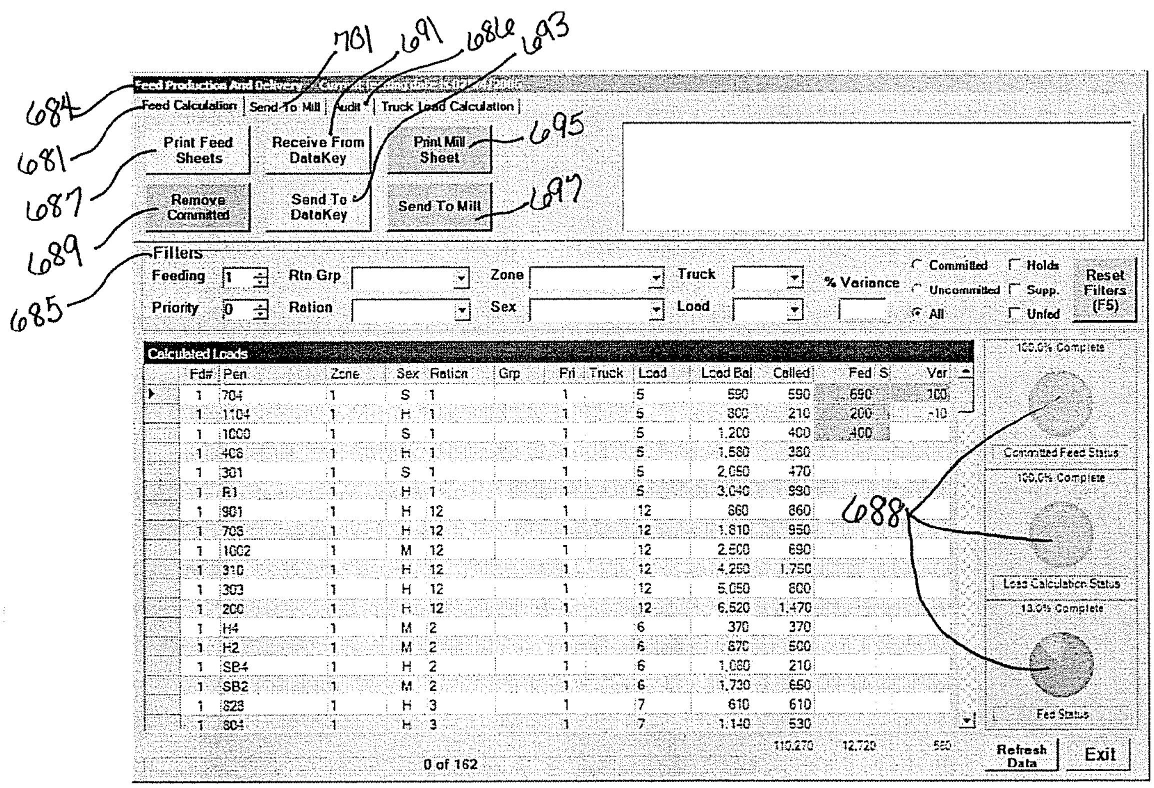
FIG. 159 is a feed production and delivery screen allowing a user to enter and execute transactions associated with the basic feed management functions.

FIG. 159 is another feed management menu selection screen, namely, a feed production and delivery screen 684. In general, this screen allows the user to enter and execute all the transactions associated with the committing of feed calls for delivery, producing the loads to be assigned to the feed trucks, sending those loads to the feed trucks, and auditing of actual fed amounts delivered by the feed trucks. After the last feeding of the day, the user would access this screen in order to generate the instructions for the next day's feeding. The user would also access this screen to monitor the status of the feed process as it was in progress throughout the feeding day, and to modify any previously issued feeding instructions. The feed calculation tab 681 provides the user with six options, namely, print feed sheets 687, receive from datakey 691, print mill sheet 695, remove committed 689, send to datakey 693, and send to mill 697. The print feed sheets option 687, if activated, will produce the feed sheets/load cards, the documents that detail the feeding instructions for each truck. The send to datakey option 693 also produces the detailed feeding instructions for the pens selected, but sends the information electronically to the feed delivery trucks, for example, by wireless transmission such as RF communications, or by interface with memory cards used in the portable computers on the trucks. The send to mill option 697, if activated, results in electronic transfer of the feed mill instructions to the feed mill batching system and/or instructions to the micro-ingredient system. The micro-ingredient system adds designated micro-ingredients to a feed batch, such as vitamins, pharmaceuticals, etc. The instructions sent provide details on the exact ingredients to be batched so that each truck will be loaded with the proper type and amount of feed ingredients for each of the day's feedings. The transfer of data can be configured in the desired manner to include automatic sending to a designated location on the same computer that is running the feed management module, any computer that is on the cattle management system network, or to any type of storage media (e.g., disk, flash drive, etc.) which is then manually transported to the computer to process the data.

Again, this electronic transfer could be a wireless transmission, or any other transmission type used in the feed yard. FIG. 161 discussed below shows the user screen which appears when selecting the send to mill tab 701. The print mill sheets option 695, if activated, prints the instructions for the feed mill, i.e., the amounts and types of rations that need to be prepared at the feed mill for pick up by the feed trucks. The printed feed mill instructions also provide the details for the feed mill and/or micro-ingredient system so that each truck will be loaded with the proper ration type, ration ingredients, and amount of feed for each feeding of the day. The instructions for the feed mill are generated in the form of a feed mill projected production sheet as discussed below with respect to FIG. 160. (Note: will have to renumber all of the figures after this figure). The receive from datakey option 691, if activated, allows incoming information from the feed trucks and feed mill to be posted to the system to include updating the pie status charts 688 discussed below. For example, a memory card/flash card would be retrieved from one or more of the feed trucks, after they have completed delivering their loads, if those feed trucks did not have a wireless connection, and the memory card would be inserted in the workstation computer to download the feeding information. The remove committed option 689, if activated, allows a user to modify the feed call for any particular pen if there has already been a committed feed request from the pen for a particular feeding. Thus, the original feed request for a selected pen is deleted in favor of the modified feed request entered and posted by the user in this option. Thus, this option 689 provides for manual entry of feed requests when it may be necessary to adjust scheduled feeding amounts and/or ingredients for a selected pen. To view the calculated loads for any of the pens, the selected filter options 685 would be checked, and the bottom portion of the screen provides a spreadsheet for the selected data. In the example, the feeding data for the next feeding is displayed (feeding 1). As shown, call amounts are listed for each pen, but no pens have yet been fed. The user can choose to modify the sort of the spreadsheet by selecting any one or more of the filters 685. The filters include the feeding number, delivery priority, ration group, ration type, zone, sex, truck, or load. The data can also be sorted by committed or uncommitted pens. Committed pens are those in which feed sheet instructions have already been issued and/or mill instructions have already been issued. Uncommitted pens are those in which no action has yet taken place to feed those pens the next scheduled feeding. The audit tab 686 as discussed below is utilized to display and post the actual fed amounts as recorded by the feed truck scale interfaces or as recorded by manually posting the fed amounts. The user may also audit the actual fed amounts for each pen on screen 684 by clicking on the fed column of the spreadsheet for a selected pen and entering the total fed amount. The system subsequently recalculates the variance amount for each pen and displays that information on the corresponding line on the spreadsheet for the particular pen. The pie graphs 688 show the completion status of the three major steps in the feeding process, namely, committing feed, load calculation, and fed status. As shown in the example, 100% of the pens are committed, 100% of the loads are completed (that is, 100% of the total feed call for the particular feeding has been loaded on trucks), and 13% of the pens have been fed. As discussed above, the feed management parameters screen 500 controls the transactions available on this screen, as well as how the transactions function. With the functionality available to a user in connection with the user screen shown at FIG. 159, dynamic loading of pens is possible. Dynamic loading refers to the ability to maximize truck load capacities per truck per feeding. For example, if only one or very few pens were assigned to a truck for a particular feeding, it may be possible to move the rations for those pens and assign them to a different truck, thereby eliminating the need to use the truck for that feeding and maximizing loads on other trucks. Accordingly, the user would reassign the loads to one or more other trucks that still had some capacity available. To reassign a load, the user would simply rekey the desired load number in the load column for the corresponding pen. Upon changing the load number for the pen, a message appears on the user screen advising the user that the total pounds for the new load has increased in an amount equal to the ration assigned to the pen. The user can accept or deny the requested change. If accepted, the load balance columns and load columns in FIG. 159 are automatically updated showing the new load balance sizes and load numbers.

Figure 160:
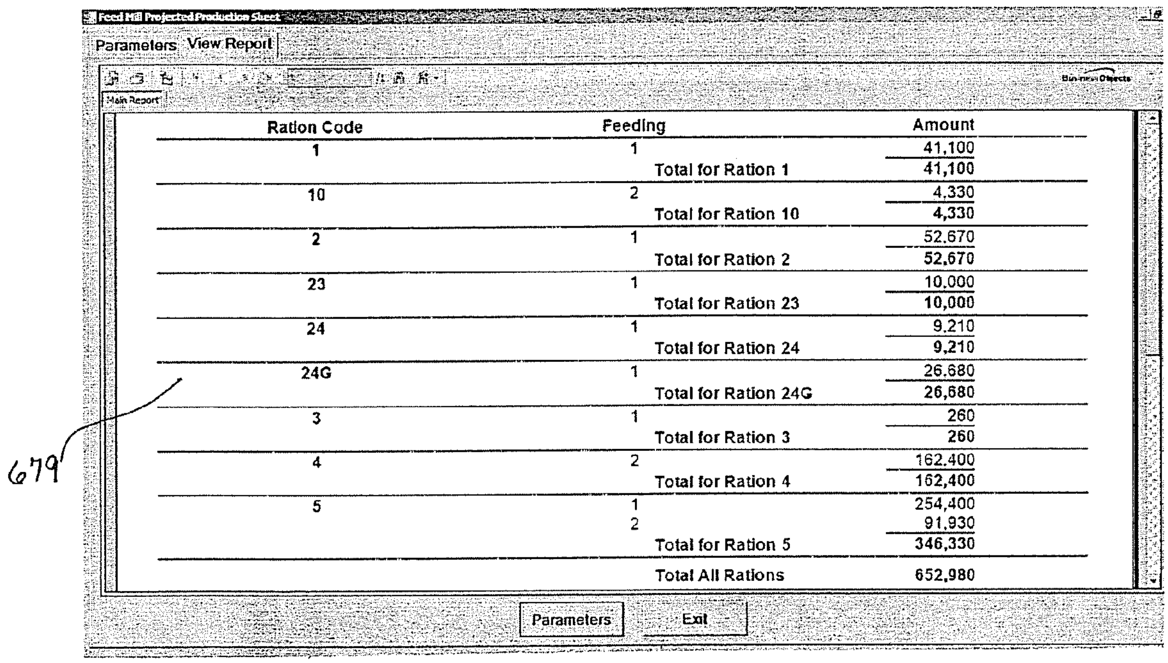
FIG. 160 shows an example feed mill projected production sheet.
Figure 161:
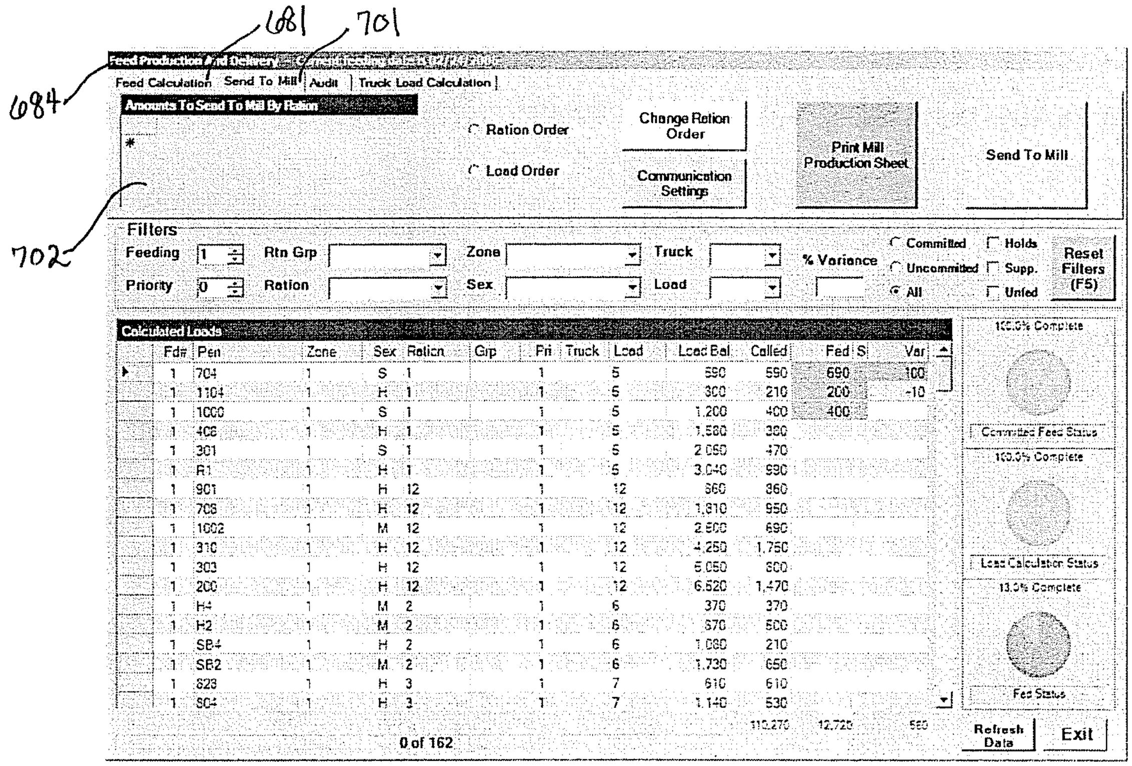
FIG. 161 shows a user screen for selecting the order in which data is transmitted to a feed mill batching system/micro-ingredient system.

FIG. 160 shows an example feed mill projected production sheet 679 that is generated when the user selects the print mill sheets option 695. The particular ration information displayed is based upon the selection of the filter settings 689 from the feed production and delivery screen 684.

FIG. 161 shows the user screen 702 displayed when the send to mill tab 701 is selected. In this screen, the user can select the order in which data is sent to the feed mill/micro-ingredient system. Specifically, the data can be sent either by ration order or load order. The user can also change the ration order itself and change the communication settings with the feed mill/micro-ingredient system. For change in the ration order, this corresponds to the Pri (Priority) column in the illustrated data. Thus, a change in the ration order would result in the pens being fed in a different order from the feed trucks. The communication settings can be changed to accommodate the specific communication interfaces used by the feed mill/micro-ingredient system, i.e., wireless protocol, wired connection, etc.

Figure 162:
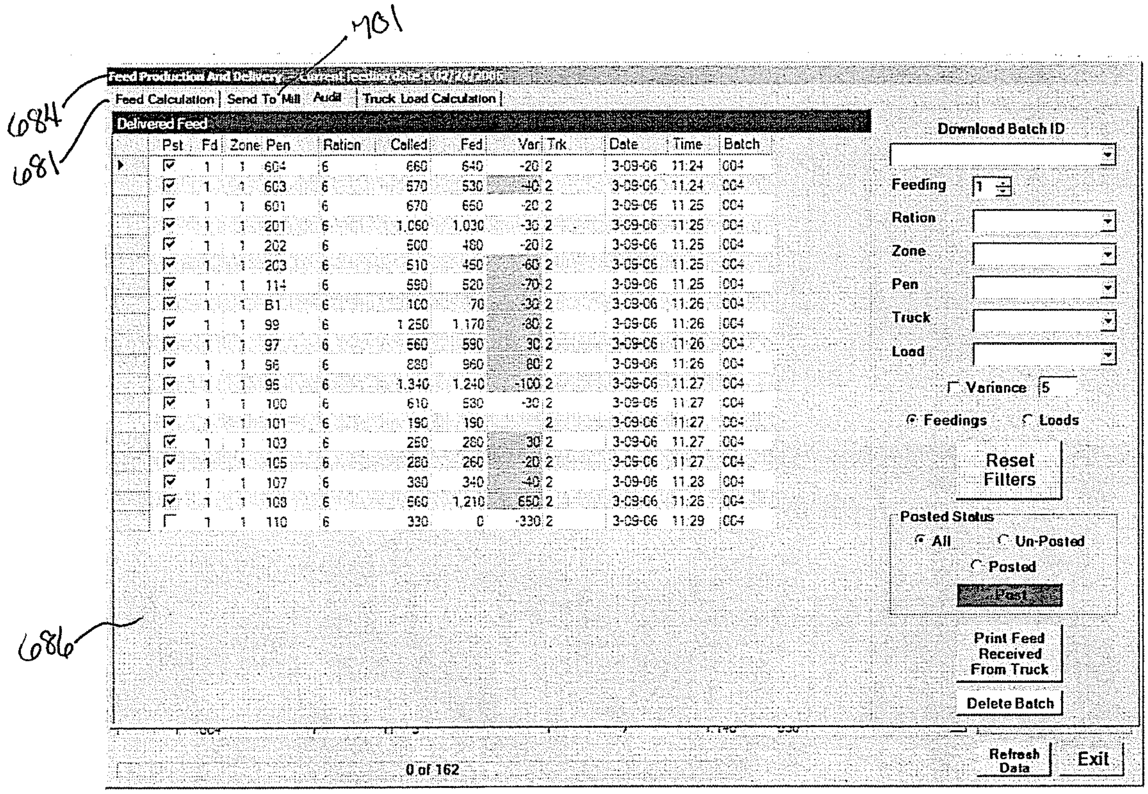
FIG. 162 shows a user screen for displaying feed delivery options.

FIG. 162 illustrates the delivered feed option from the audit tab 686. By selecting the Feedings option on the right side of the screen, this screen is generated. This screen allows the user to verify feed truck delivery data and post the data to the physical feeding record for the pen. As each truck completes the delivery to each pen, the truck will transfer data regarding the actual fed amounts. For trucks with a wireless interface, such data can be transmitted very soon after delivery. For trucks with no electronic interface, the data can be manually entered later or uploaded from storage media (disk, flash drive, etc.). Such data is then made available on the screen shown in FIG. 162. The data displayed is a comprehensive analysis of the ration assigned to each truck, the called amount per pen, the fed amount per pen, date, time, and batch number. As delivered information appears on the screen, the user can decide to post the information, by checking the box in the Pst (Post) column, and then selecting the post button.

Figure 163:
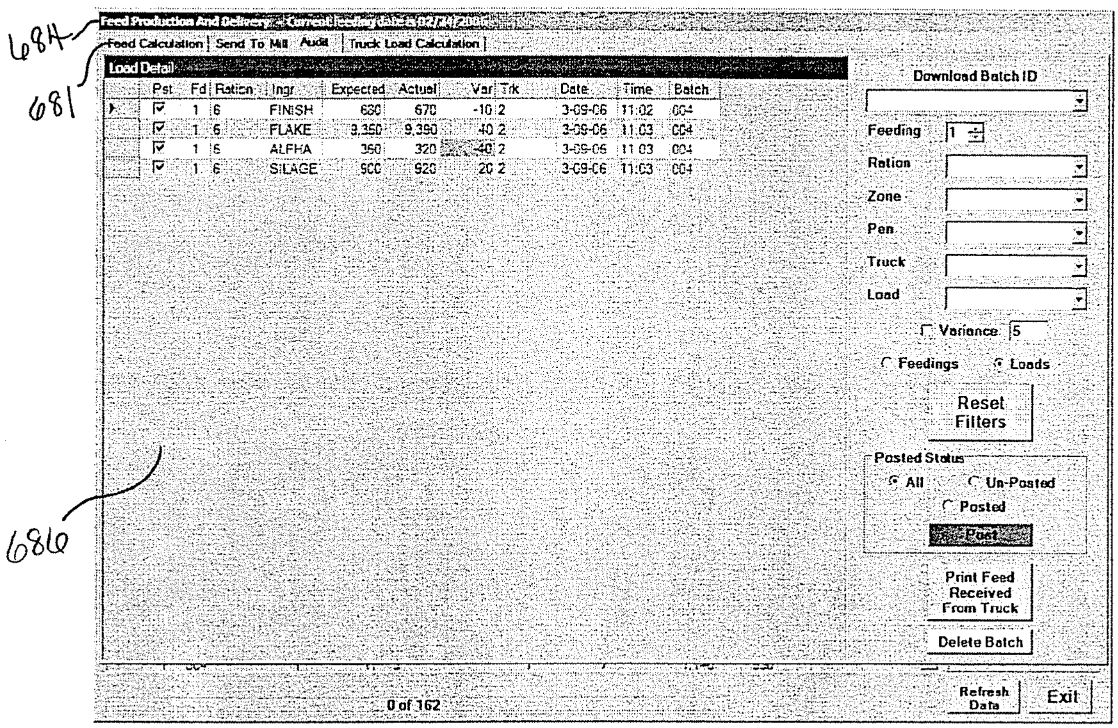
FIG. 163 illustrates a user screen displaying load data for a particular feeding.

FIG. 163 illustrates the load data from the load detail option of the audit tab 686. By selecting the Loads option on the right side of the screen, this screen is generated. As each load of feed is placed in a truck as well as micro-ingredients placed in a truck, the feed mill batcher and micro-ingredient system will respectively transfer data regarding each load, and such data is made available on the screen shown in FIG. 163. As with posting of data discussed above with respect to FIG. 162, as loaded data appears on the screen, the user can decide to post the information, by checking the box in the Pst (Post) column, and then selecting the post button.

For the auditing function discussed above with reference to FIGS. 162 and 163, the user can filter the feeding data to be audited by setting values in the filter fields located on the right side of the screen display. As shown, the filter fields include batch ID, feeding number, ration, zone, pen, truck, and load. Normally, the only filter that needs to be used is the feeding number where the user can post feeding data by feeding number. The batch ID refers to the unique number given by the feed mill to a load on a particular truck. Prior to posting the data, the user can view the variance of the called amount and the fed amount, shown in the screen under the Var (Variance) column . If there is a large discrepancy in the variance, the user can then adjust the Fed column of FIG. 162 to account for the variance based on information obtained that would explain the variance, or otherwise take corrective action to determine the discrepancy. For example, large variances could be caused by a malfunctioning truck scale, and in which case, it may be appropriate to adjust the actual fed amount. Similarly, for load amounts of FIG. 163, if there is a large variance in the expected load amount (Expected column) versus the actual loaded amount (Actual column), the user can adjust either the actual or expected load amounts based upon information obtained that would explain the variance. The print feed received from truck buttons shown in FIGS. 162 and 163 simply allows the user to print the downloaded data from the trucks in a convenient report format so the user can further analyze the information in order to make a decision as to whether the data should be posted. The delete batch buttons in these figures allows the user to completely delete the downloaded information received from the feed mill/micro-ingredient system, as occasionally such downloaded information will contain obvious errors, and the user may wish to manually post the feed data. By the auditing and posting functions provided in these audit screens, feedyard management is provided a detailed history for actual ingredients delivered to each pen. Tracking of over and under loaded ingredients as well as tracking of actual under and over fed amounts enables more timely and effective management of the feed call process, and particularly to remedy any potential noncompliance situations with respect to governmental rules or guidelines.

Figure 164:
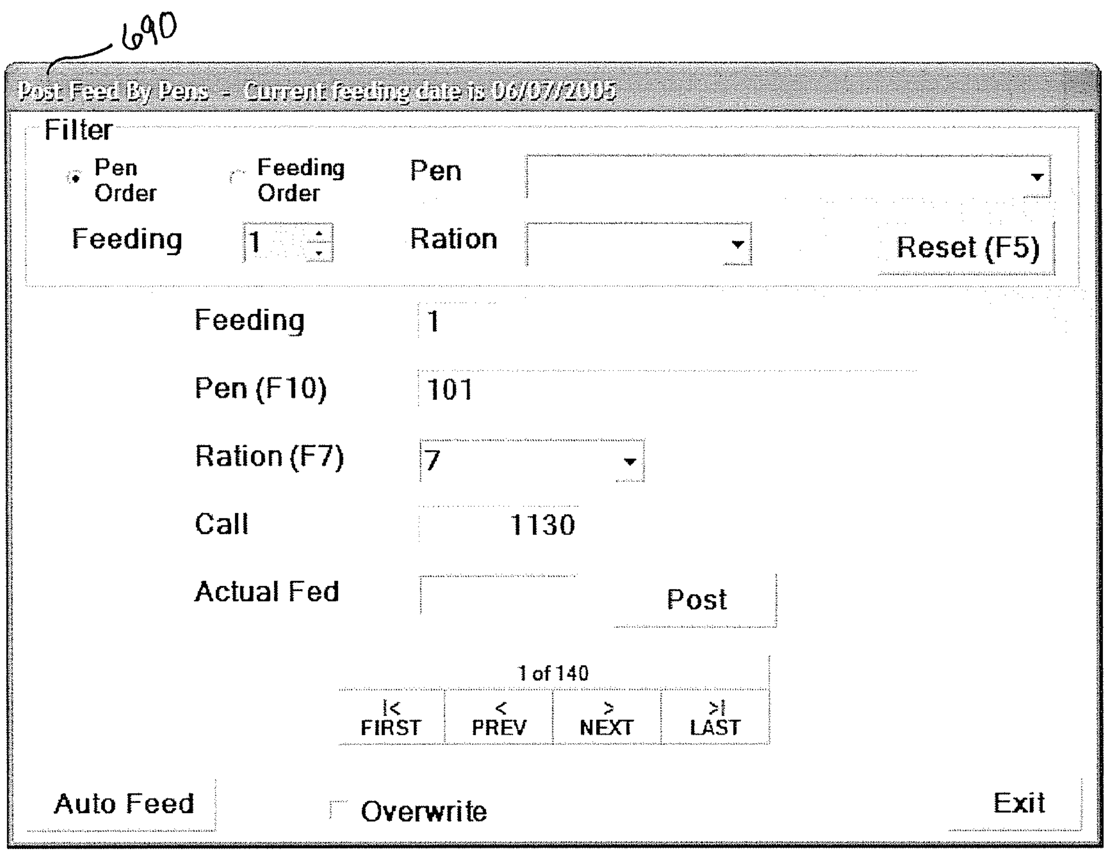

FIG. 164 illustrates another feed management menu selection, namely, a post feed by pens screen 690. This screen allows a user to manually post fed amounts to the committed feed calls. As shown, feed calls can be displayed in either pen order or feeding order. The screen has the ability to display selected pen feed call records based on the user selecting the feeding number, pen number and ration code. The user can then modify the actual fed amount and/or the ration code fed. The data will then be utilized by the system to produce various reporting for management. The auto feed button allows the user to accept the called ration amount for the actual fed amounts on a global basis for the feeding number selected.

Figure 165:
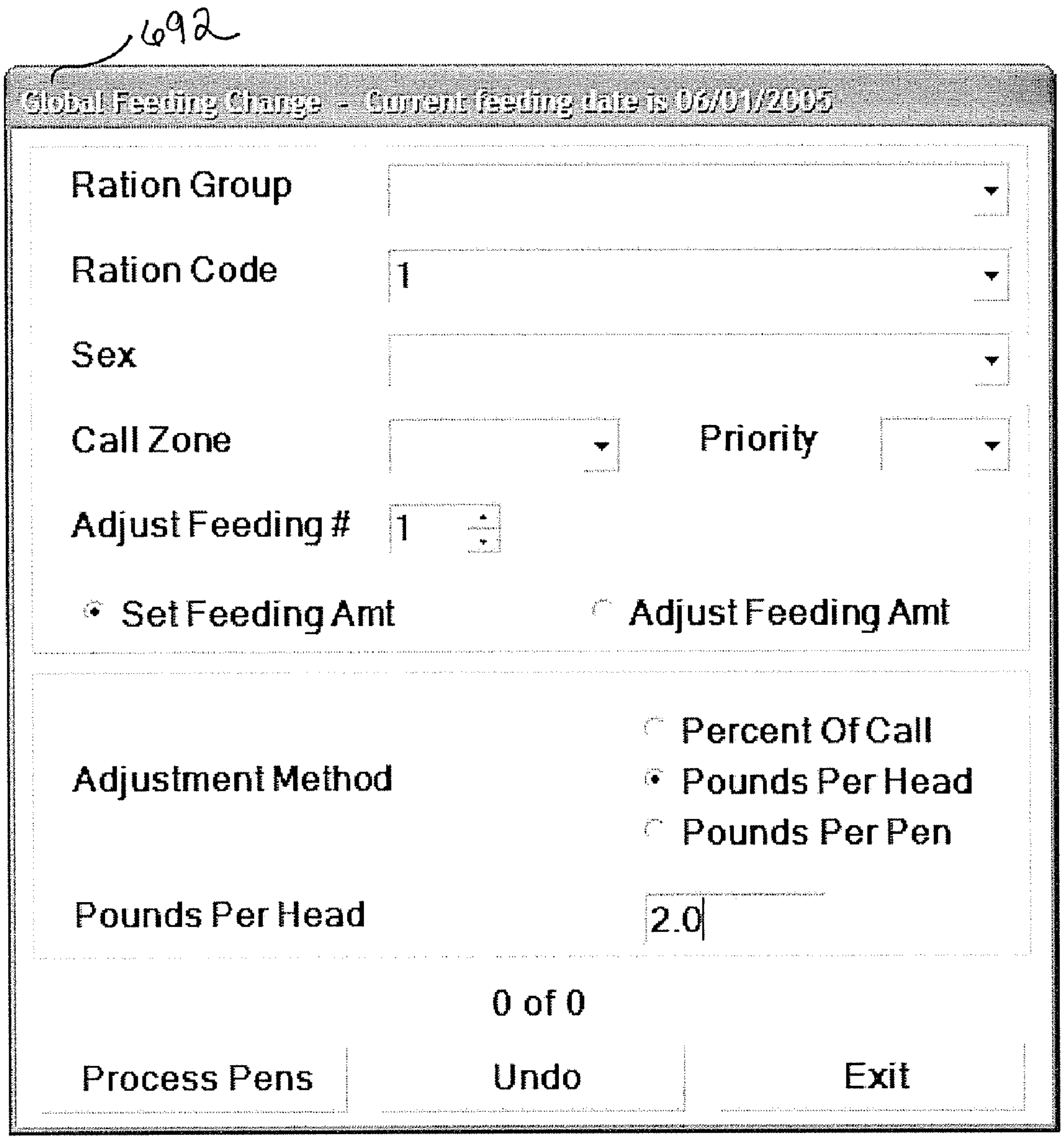

FIG. 165 is another feed management menu selection screen, namely, a global feeding change screen 692. This screen allows the user to globally change a selected group of feedings for the selected criteria loaded on the top section of the screen. As shown, the selection criteria include the ration group, ration code, sex, call zone, priority, and feeding number. There are two adjustment methods, namely, a set feeding amount and adjust feeding amount. The set feeding amount will set the total feeding amount for the selected physical feeding number maintaining the total call for the feeding day. The adjust feeding amount will adjust the total feeding amount of the selected physical feeding number according to the rules elected. The rules include percent of call, pounds per head and pounds per pen. This screen can be very helpful to the user if there is a large group of pens in which the feeding data needs to be adjusted. Otherwise, the user would have to make individual feed call changes for each pen using the standard reading or abbreviated reading screens.

Figure 166:
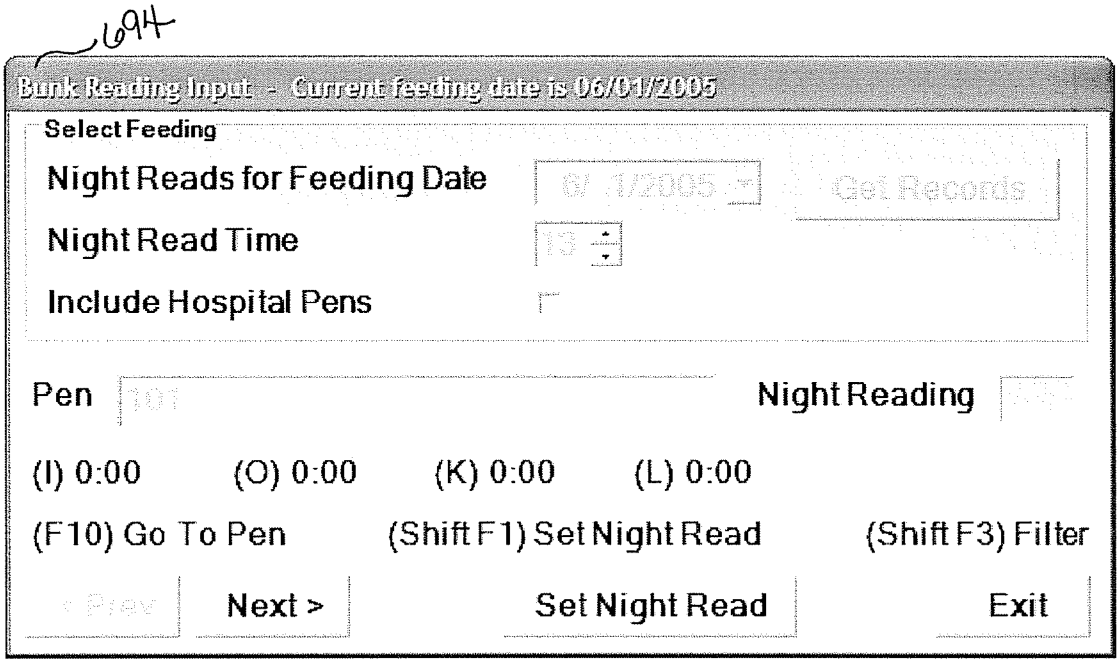

FIG. 166 is another feed management menu selection screen, namely, a bunk reading night reading screen 694. This screen allows the user to enter the date and time that the feeding bunk was empty of feed (slick time) based on a 24-hour clock measurement. The group of pens that this screen will display will depend on the filters set by the user. The user can elect to display only those pens for a set of entered data filters. These data filters are similar to the filters that can be set for the bunk reading screens. This data is usually entered by the night crew at a facility and will be used by the bunk reader during the next day's feed entry call process. This data is also one of the standard criteria items that can be used by the system to control the treatment and feeding processes at the facility. This data can also be entered on the bunk reading screens by the bunk reader during the feed call process.

Figure 167:
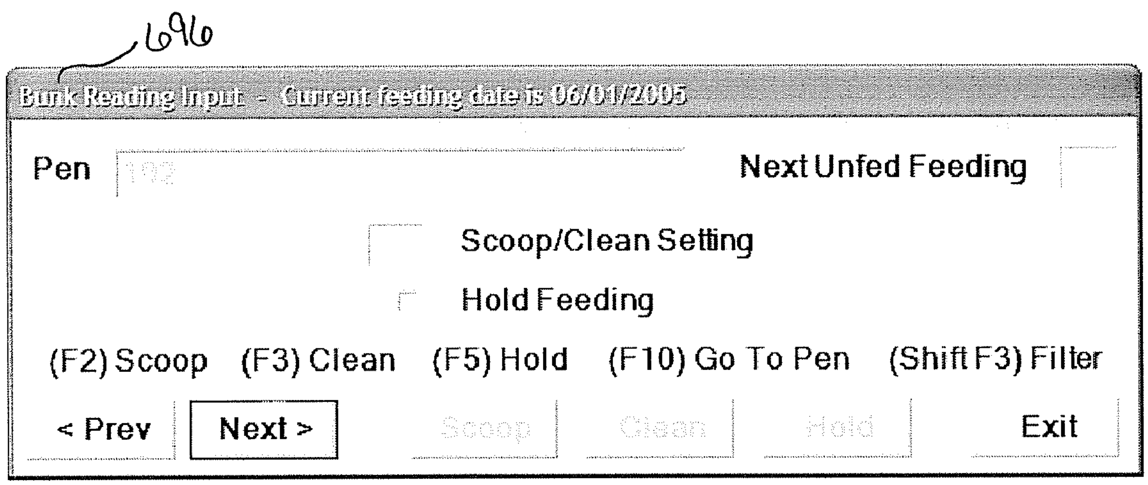

FIG. 167 is another feed management menu selection, namely, a bunk reading action assignments screen 696. This screen allows the user to set an action to be completed at each pen, namely, scoop, clean or hold the pen for the next uncommitted feeding. This data will produce reports that will list all pens that need to be scooped and/or cleaned before the next delivery of feed. The term "scoop" means simply the removal of existing feed within a feed bunk. The term "clean" means the removal of feed and cleaning of the feed bunk. Selecting the hold option will result in the selected pen being removed from the list of available pens that can be committed to feed delivery. This data can also be entered or modified on the standard bunk reading screens by the bunk reader operator during the normal calling of the feed process.

Figure 168:
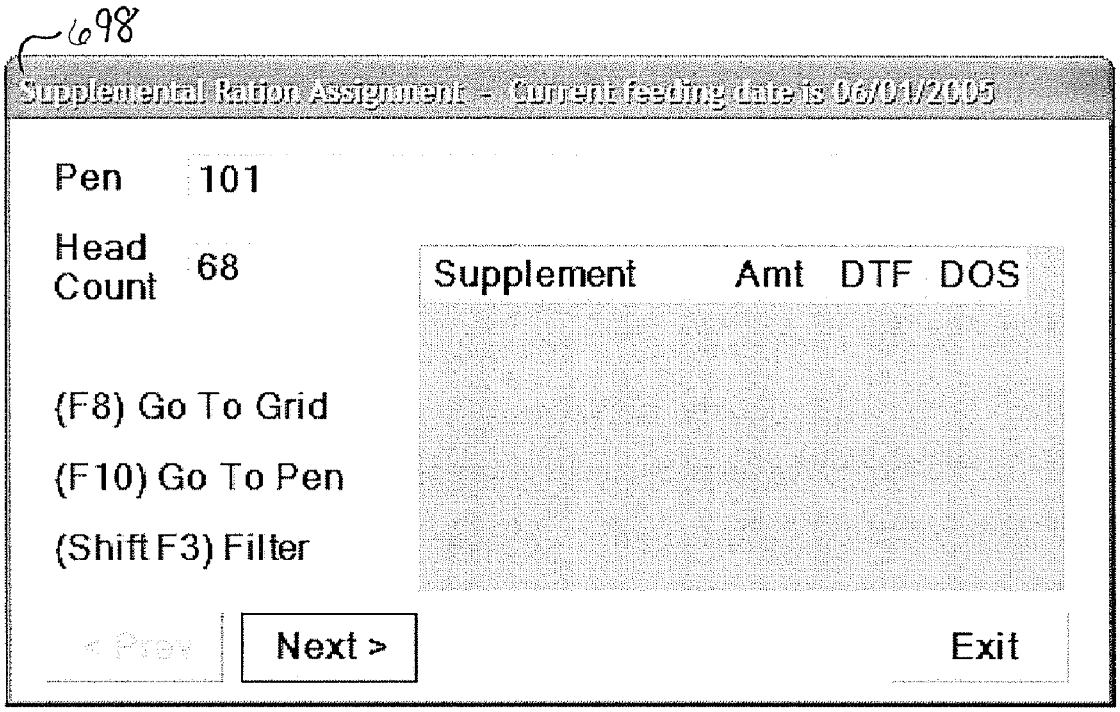

FIG. 168 is another feed management menu selection, namely, a supplemental ration assignment screen 698. This screen allows the user to call a supplemental ration such as hay for a selected group of pens in a much more efficient manner than the standard bunk reading screen. According to this screen, the user calls a supplemental ration for a displayed pen along with the total call amount for the feeding day. Also, the number of days the supplement is to be fed (Days to Feed (DTF)) can be entered. The Days on Supplement (DOS) is also displayed. This data can be modified on this screen or the standard bunk-reading screen subsequent to the original entry.

Figure 169:
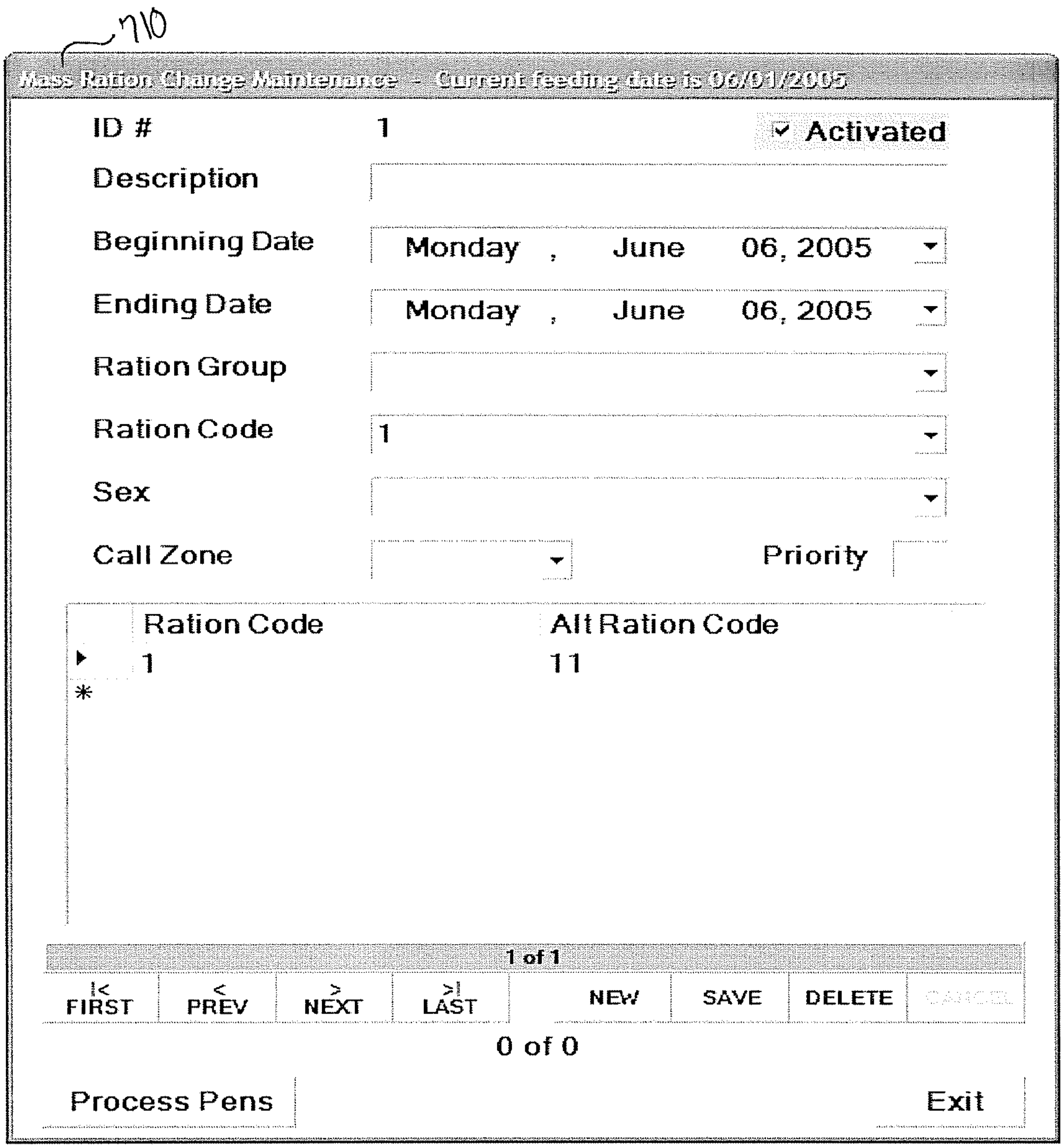

FIG. 169 is another feed management menu selection screen, namely, a mass ration change maintenance screen 710. This screen allows a user to globally change the called ration code for a selected group of pens, which as shown may be filtered by ration group, ration code, sex, call zone and priority code for a selected data range. This transaction will not change the assigned ration code for the pen in the system and rather will continue to count days on ration for the original assigned ration code. This transaction can be used to feed a special ration such as a medicated ration or a storm ration to a group of pens for selected date ranges without affecting any criteria checks being evaluated during the feed call process. This mass ration change can be used to change the assigned ration code by setting the change to the active status by checking the activated box. Once checked, and after the process pens button is activated, the ration change will be posted to change the assigned ration.

Figure 170:
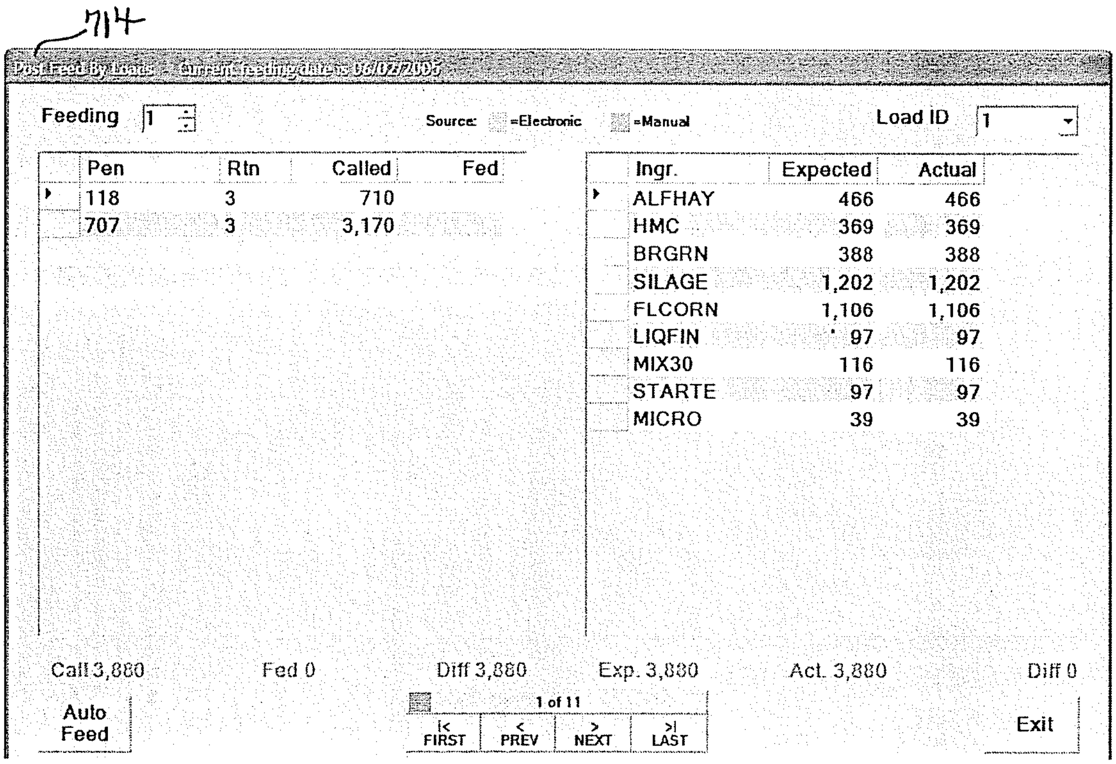

FIG. 170 is another feed management menu selection screen, namely, a post feed by loads screen 714. This screen allows a user to manually post actual delivered feed amounts and actual loaded macro ingredient amounts for each load delivered for each physical feeding. This data can be utilized to produce feeding variance and ration mix macro ingredients variance reports for facility management. This data will also be utilized by the system to update any maintained inventory for rations or ration ingredients. This screen allows the user to select load numbers for the current feeding day by feeding number. The screen will display the total ration call amount as well as the total ration fed amount and the total expected macro ingredient amount and the actual loaded macro ingredient amount with variances for each of the displayed loads. These amounts can be updated as the individual pen and macro ingredient amounts for the load are entered by the user.

Another feature of the feed management function of the present invention is the ability to actively manage medicated rations or other special rations that have withdrawal days associated with one or more ingredients used in the rations. Some ingredients used in rations must be fully digested/metabolized by the animals prior to the animals being shipped. The withdrawal days associated with these ingredients may be voluntarily set by the product manufacturer, or may be set by government regulation. Rations that have withdrawal requirements can be identified in the ration data of the ration master screen of FIG. 152, and such rations are provided their own ration codes. A withdrawal days field is associated with the ration data, and this field is used by the system to provide a bunk reader or other feed yard personnel with notification that the ration prevents shipment until the withdrawal days requirement has been met. A managed ingredient table can be provided in the system detailing each managed ingredient and the corresponding withdrawal day period. When building a ration such as on the ration master screen, the managed ingredient table can be accessed to automatically set the withdrawal day requirement within the ration data. The notification to the yard personnel can be in the form of a number of user interface screen warnings or reports as discussed below. For example, assume a group of cattle are 28 days from a projected ship date. The cattle are currently assigned a ration code 5 (a finish ration with no withdrawal requirement), but it is desired to change the ration code to a ration code 5Z (a ration that has a 3-day withdrawal requirement). Through the ration change criteria screen, (FIG. 143) this ration change could be scheduled according to the parameters set up there.

Figure 171:
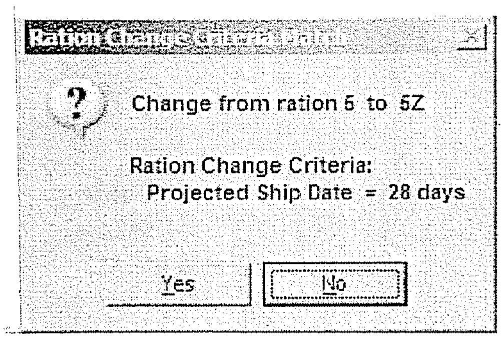

Referring to FIG. 171, the bunk reader would be notified in a user screen that a ration change has been scheduled. This notification would appear, for example, when the bunk reader was preparing to establish the feed call for the next day's feedings. The notification includes the identification of the rations involved and the ration change criteria. The bunk reader can accept or deny the change. If denied, the existing ration would be fed that day (ration 5), and the bunk reader would be prompted again the next day whether the ration change should take place. If accepted on the first notification, the ration change would take effect for 25 days, and the ration change would be recorded in the feed records. On day 26 prior to the first feeding, the bunk reader is notified again that a change of ration is scheduled, namely, from ration 5Z back to ration 5.

Figure 172:
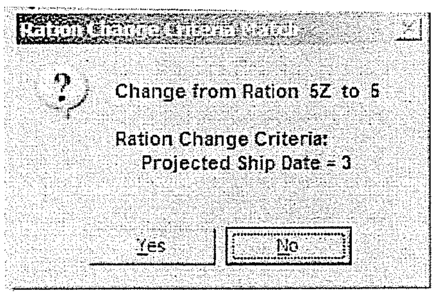

Referring to FIG. 172, the notification again shows the rations involved, change criteria, and projected ship date. If the scheduled shipment date is to be maintained, this change is required to satisfy the three-day withdrawal requirement. If the bunk reader accepts the change, the ration is changed and the projected ship date is unaffected. The feed records are again updated to reflect the ration change back to ration 5. If the bunk reader does not accept the change, then notification will be provided for each subsequent day that the cattle contained in the identified pens cannot be shipped until the withdrawal requirement is satisfied. The notification can be in many forms to include a shipment report generated each day for the group of cattle scheduled for shipment.

Figure 173:
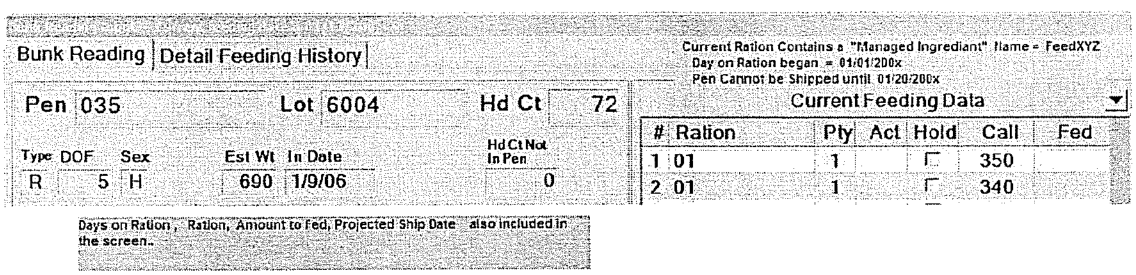

Referring to FIG. 173, a general notification of the use of a ration having a withdrawal requirement can be displayed on the bunk reading input screen. As shown in the upper right hand portion of the screen, information is provided regarding the ration at issue including when the ration began and earliest available shipment date.

Any attempt to ship a group or an individual animal prior to satisfying a withdrawal requirement results in a continuing notification that the animal(s) cannot be shipped. Also, if there were any movement of cattle between pens that includes cattle having been fed a ration with a withdrawal requirement, then notifications would also be generated by the system.

Figure 174:
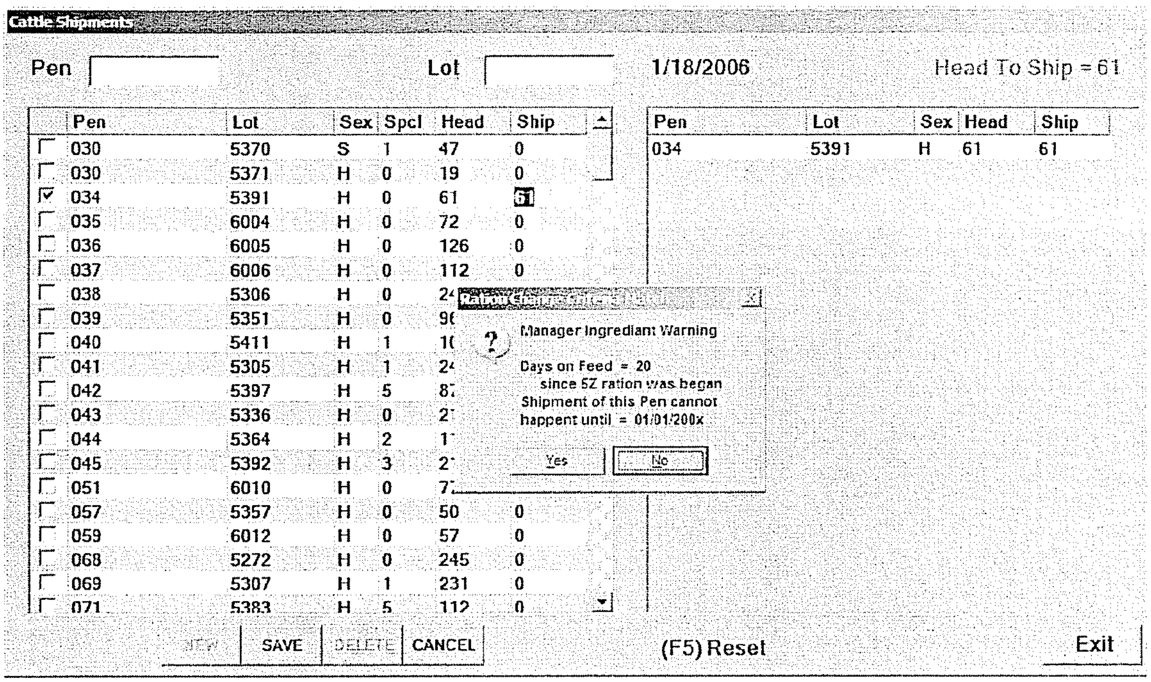

Referring to FIG. 174, a sample notification is shown that warns a user of the existence of cattle scheduled for shipment prior to satisfaction of a withdrawal requirement. In this example, a user attempted to schedule and execute a cattle shipment through a cattle shipment screen, but was advised of the ration change discrepancy. Additionally, various reports can be generated which detail projected ship dates and those animals that have been fed a ration having a withdrawal requirement.

The next group of user screens, namely, the screens shown in FIGS. 175-193, illustrate various types of reports that list table values used in the feed management feed sub-module.

Figure 175:
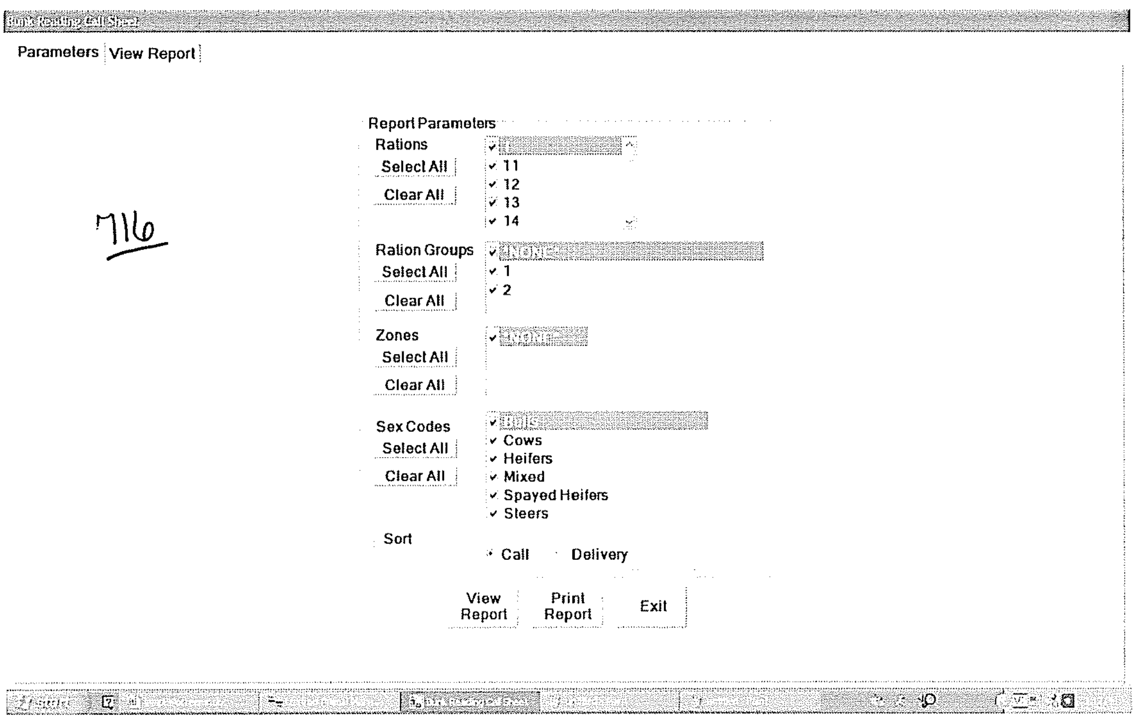

Referring first to FIG. 175, a bunk reading call sheet selection screen 716 is provided. This screen allows a user to select a group of pens to be displayed on a bunk reading call sheet report. As shown, the selection criteria include ration codes, ration groups, zones, and sex codes. A user may also elect to display a selected group of pens in either a call or delivery sequence.

FIG. 176 is another screen showing an example bunk reading call sheet report 718. This report can be utilized by the bunk reading personnel to manually record feed calls for a selected group of pens. As shown, this report lists basic data necessary for the bunk reading personnel to make a feed call for the displayed pens. For example, the bunk reader would record the call for each pen in the call field of each data line of the report. Subsequently, the call amounts could be posted to each pen using any of the standard bunk reading screens discussed above. This method of posting call amounts can be used in lieu of using the portable computer in the bunk reader truck that is typically connected via RF to the server computer. The specific fields in this report include the pen number, call amount to be assigned by the bunk reading personnel, calculated call amount based upon the feed call rollover rules, head count currently in the pen, head count currently in special pens, sex code, days on feed, night read, assigned ration code, days on ration, consumption in pounds per head for current day and five days of history, along with a five day average consumption, and the average weight of the cattle in the pens.

Figure 177:
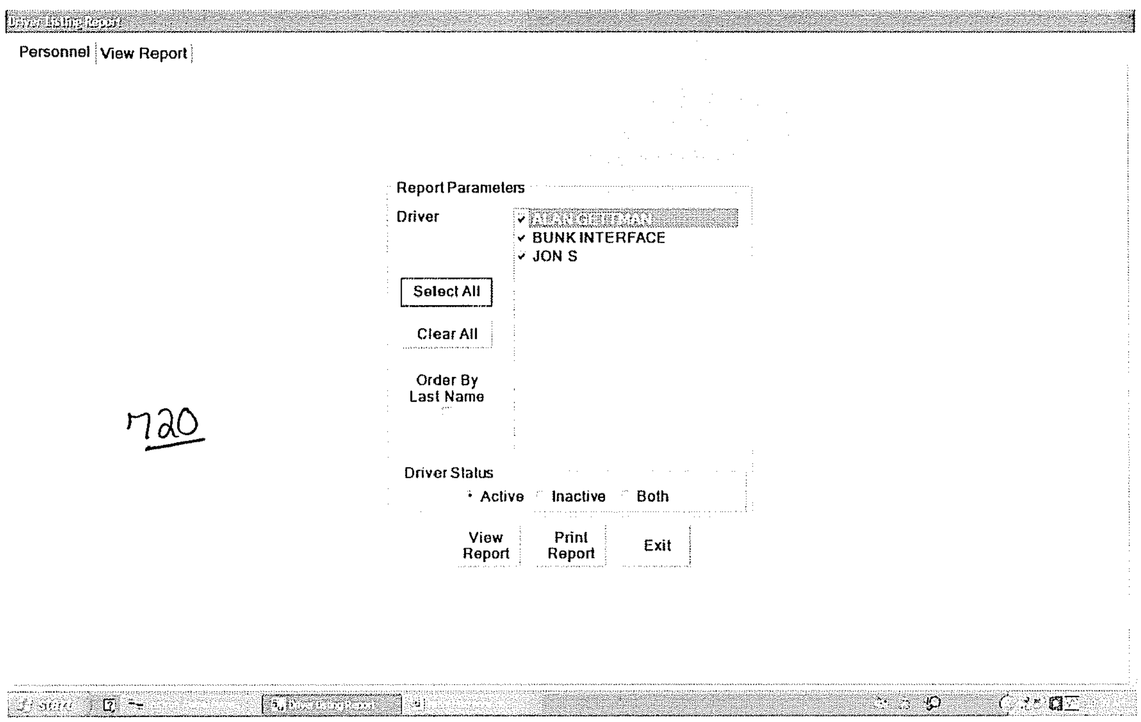

FIG. 177 is a driver listing report selection screen 720. This screen allows a user to select the group of feed truck drivers to be displayed on a driver listing report. The user may elect to display active, inactive, or both statuses of drivers.

Figure 178:
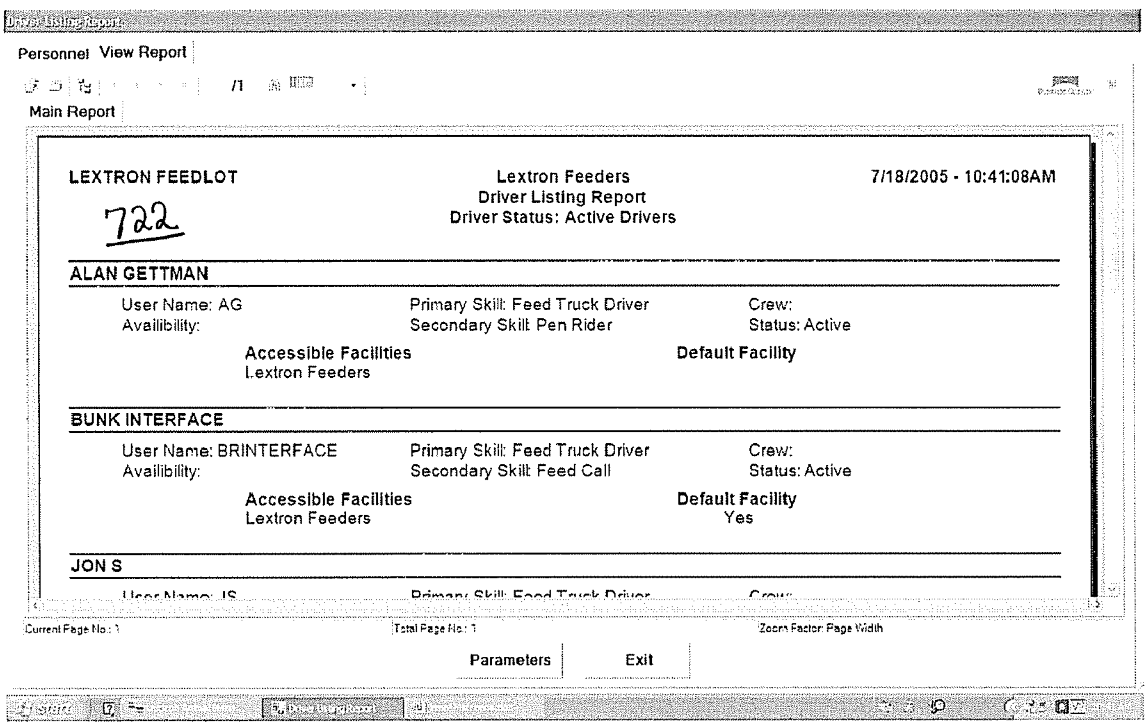

FIG. 178 illustrates the driver listing report 722 that may be used by management to display and verify all data associated with the selected group of feed truck drivers employed in the facility.

Figure 179:
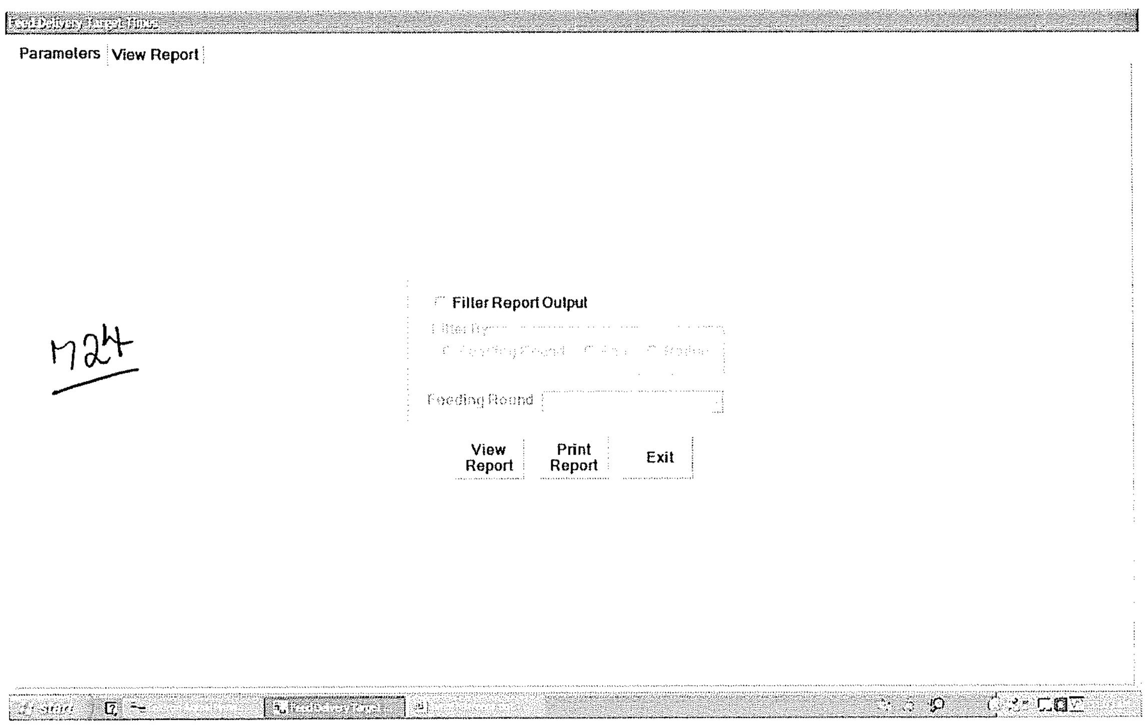

FIG. 179 illustrates a feed delivery target times selection screen 724. This screen allows a user to select the feeding round/number, group of pens, or ration codes desired to be displayed for a feed delivery target times report.

FIG. 180 is an example feed delivery target times report 726 that can be used to display and verify all of the target delivery times associated with the feeding rounds/numbers, pens, and ration codes contained on a delivery schedule table.

Figure 181:
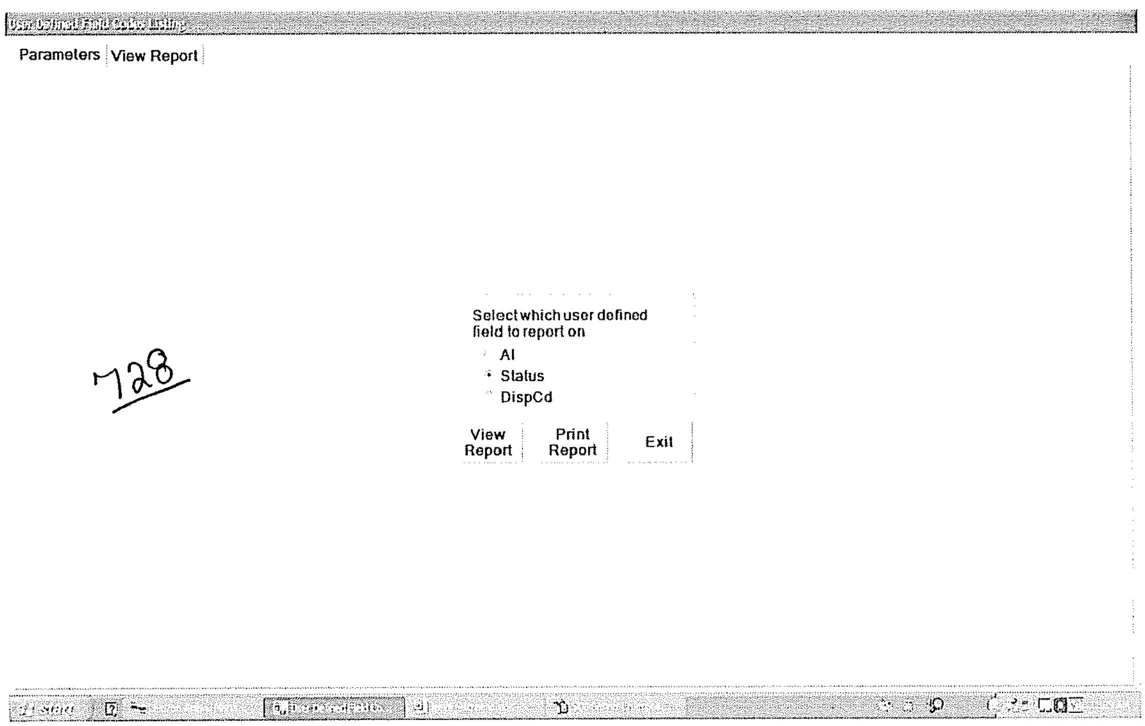

FIG. 181 is a field codes listing report selection screen 728 that allows a user to select the user-defined codes to be listed in a user-defined fields listing report. In the example of the bunk reader setup screen at FIG. 139, there are three user-defined codes provided (User 1, User 2, and User 3). These user-defined codes correspond to some observed status of the feed call operation as defined by the user.

Figure 182:
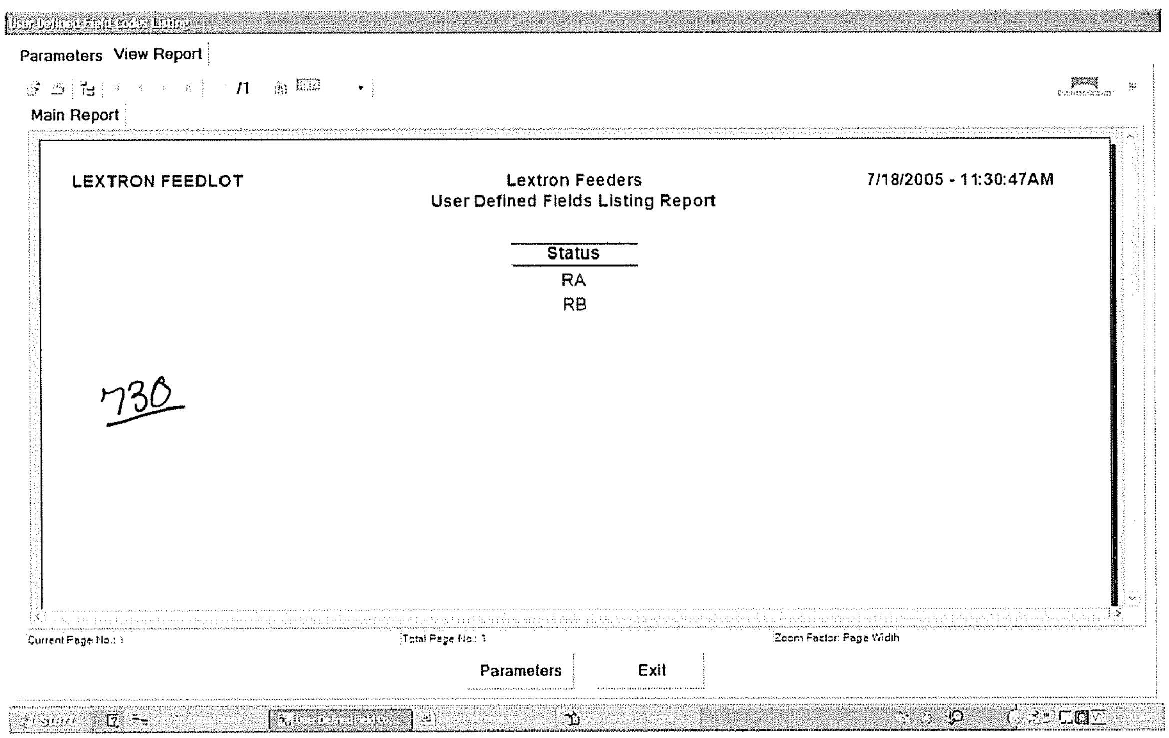

FIG. 182 is an example of a user defined fields listing report 730 that may be used by facility management to display and verify the list of any established user defined codes along with the posted values currently recorded on the feeding tables. As discussed above with reference to FIG. 139, the values of these user defined codes can be displayed on the bunk reading screens, can be recorded for each feeding date, and can be displayed on the bunk reading screen charts for use by bunk reading personnel during a daily feed call process. In the example of this figure, Status RA and RB simply correspond to some userdefined codes for the particular feedyard.

Figure 183:
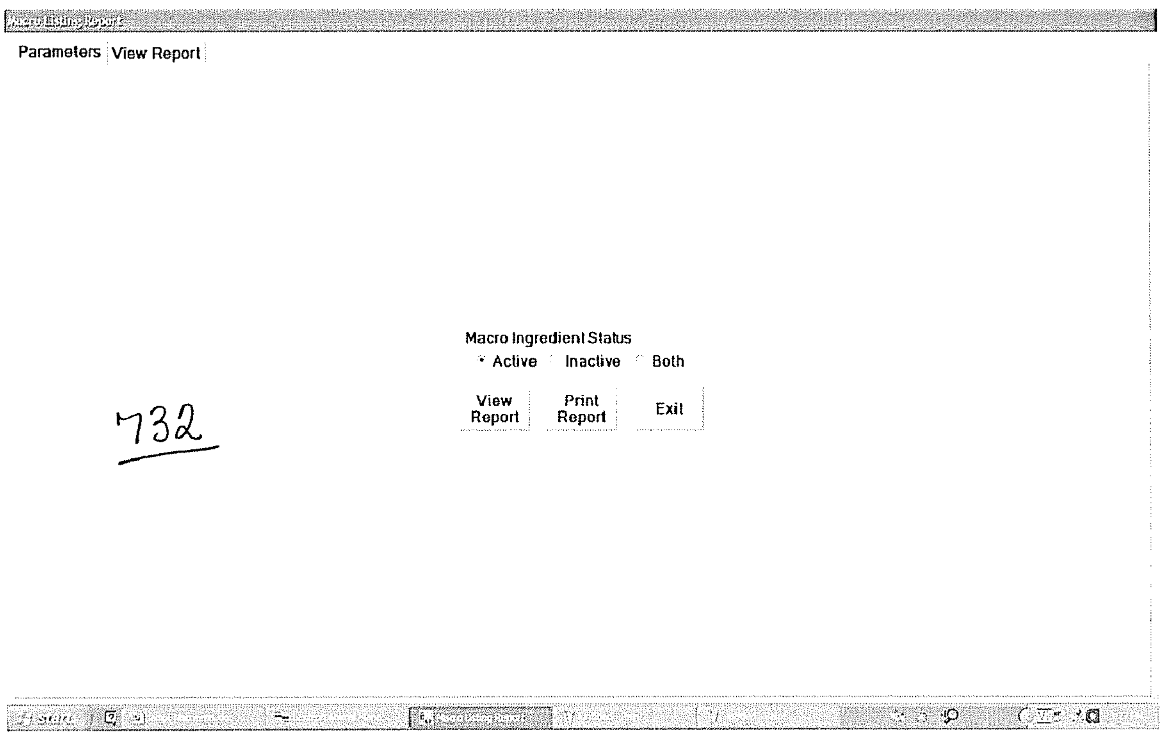

FIG. 183 is a macro listing report selection screen 732. This screen allows a user to select macro ingredients as either active, inactive, or both for purposes of displaying the macro ingredients on a macro listing report.

FIG. 184 shows an example of the macro ingredient listing report 734 that may be used to display the status of data for a selected group of macro ingredients. As shown, this report lists the macro ingredient abbreviation or short name, full name, moisture percent, pounds per cubic foot of ingredient, location to load ingredient, print control for load cards or load sheets report, financial interface equivalent code, status of the ingredient, and quantity on hand amount.

Figure 185:
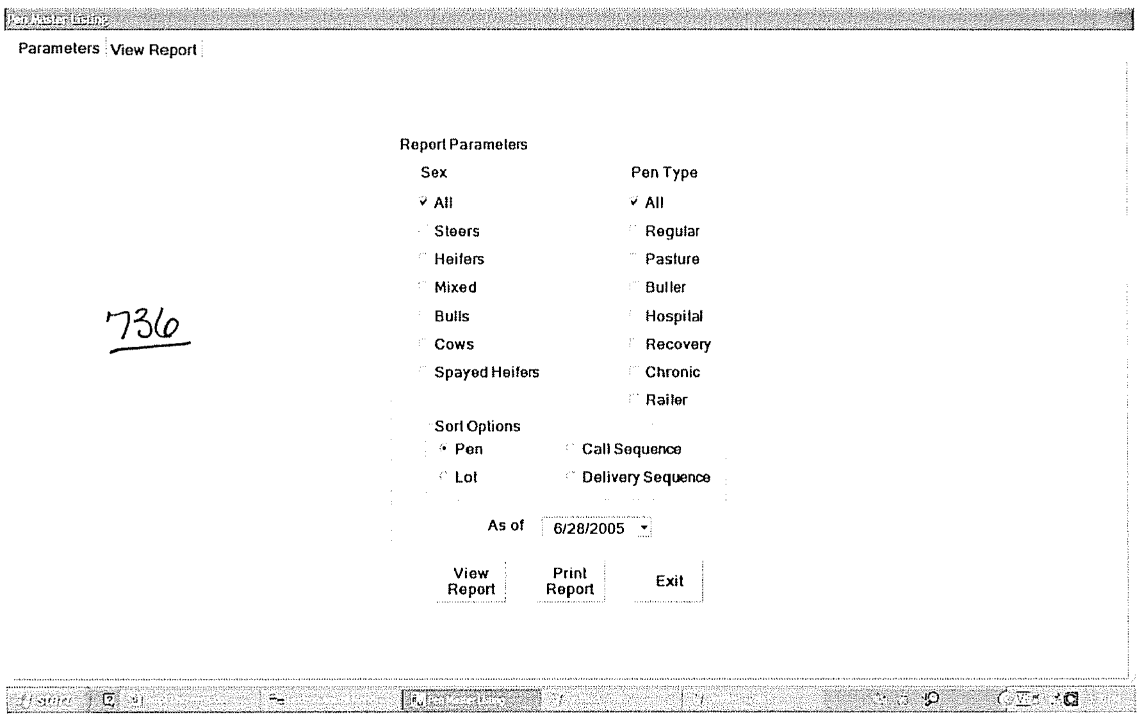

FIG. 185 shows a pen master listing report selection screen 736. This screen allows a user to select the group of pens to be displayed on a pen master listing report.

FIG. 186 is an example pen master listing report 738 that may be used by a user to display the status data for the selected group of pens. As shown, this report can list the pen number, pen type, sex, delivery zone and sequence number, call zone and sequence number, in date, projected ship date, lot number, head count currently in pen, head count not in pen, and special pen head count (buller, railer, chronic, and recovery). Any pens that have no current head count are displayed with an empty status in the head in pen column. Totals are displayed at the end of the report for head in pen, head not in pen, and special head pen counts. Any of the displayed data fields on this report can be modified in the pen master maintenance screen, delivery/read sequence screen, or movement and treatment screens discussed above.

Figure 187:
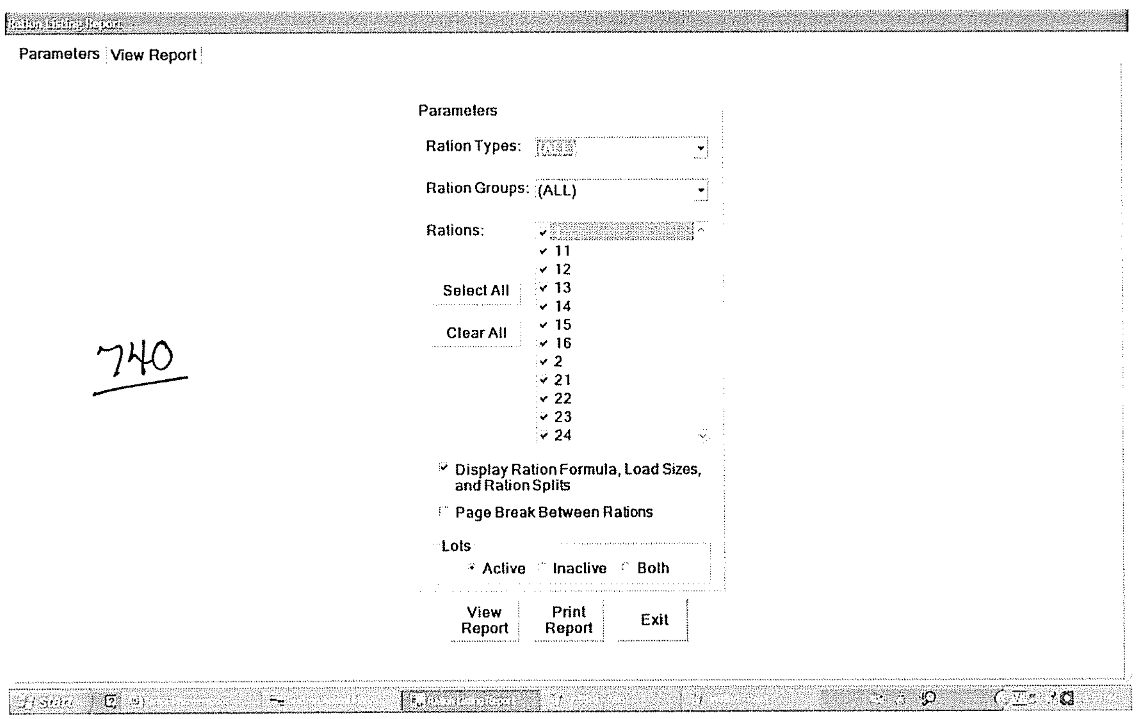

FIG. 187 shows a ration listing report selection screen 740. This screen allows a user to select a ration type (such as regular, medicated or supplemental), ration group, ration codes, and status code (such as active, inactive, or both), that are desired to be displayed on a ration listing report. This screen also allows a user to select whether to display the ration formula, load sizes, and ration split data for each ration code.

Figure 188:
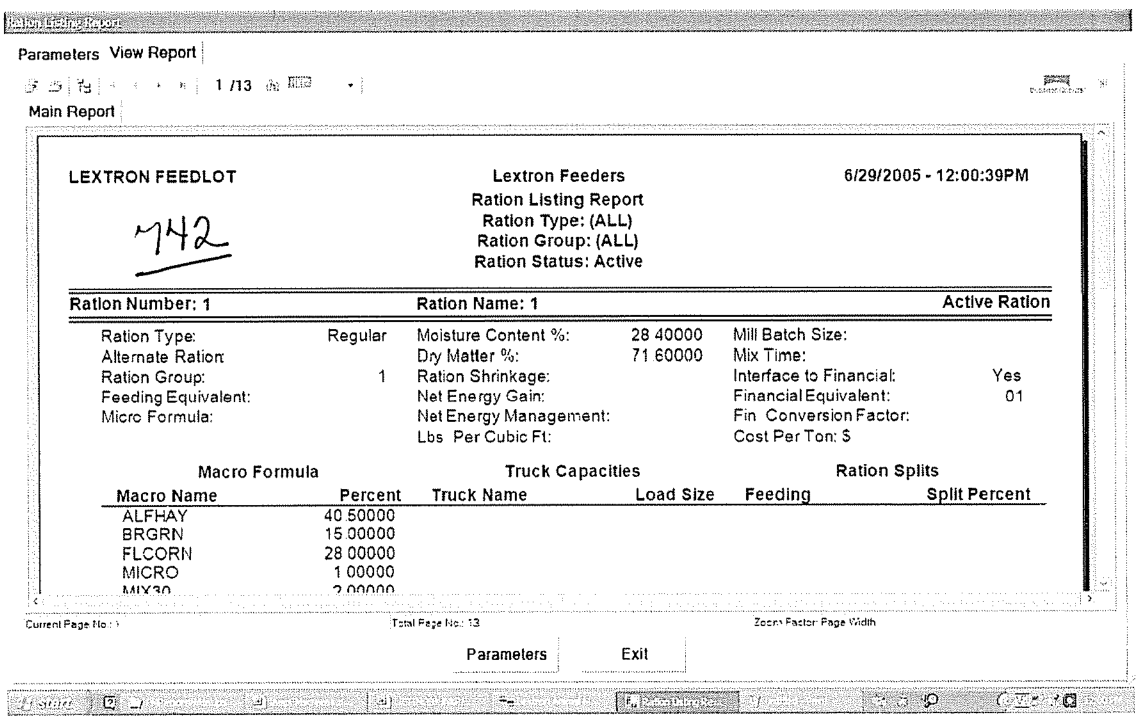

FIG. 188 is an example ration listing report 742. This report can be used by management to display and verify descriptive data for the selected group of ration codes. As shown, this report can list all of the associated descriptive data associated with each ration code. The displayed data on this report can be modified in the ration input, feed trucks, or feed splits screens discussed above.

Figure 189:
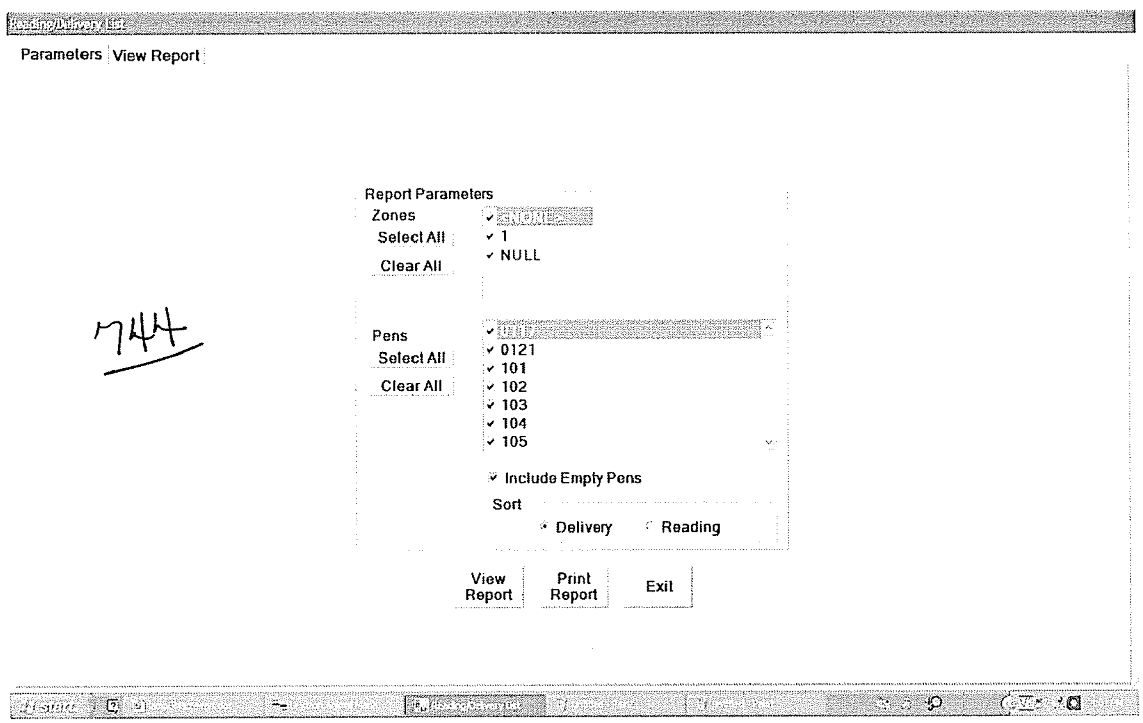

FIG. 189 shows a reading/delivery listing report selection screen 744. This screen allows a user to select a group of pens to be displayed on a reading/delivery list report. As shown, a user may select to display all or selected zones, all or selected pens, empty pens, and whether the report should be sorted in the feed delivery or bunk reading sequence.

FIG. 190 shows an example reading/delivery list report 746. This report may be utilized by management to display and verify descriptive data for the selected group of pens.

Figure 191:
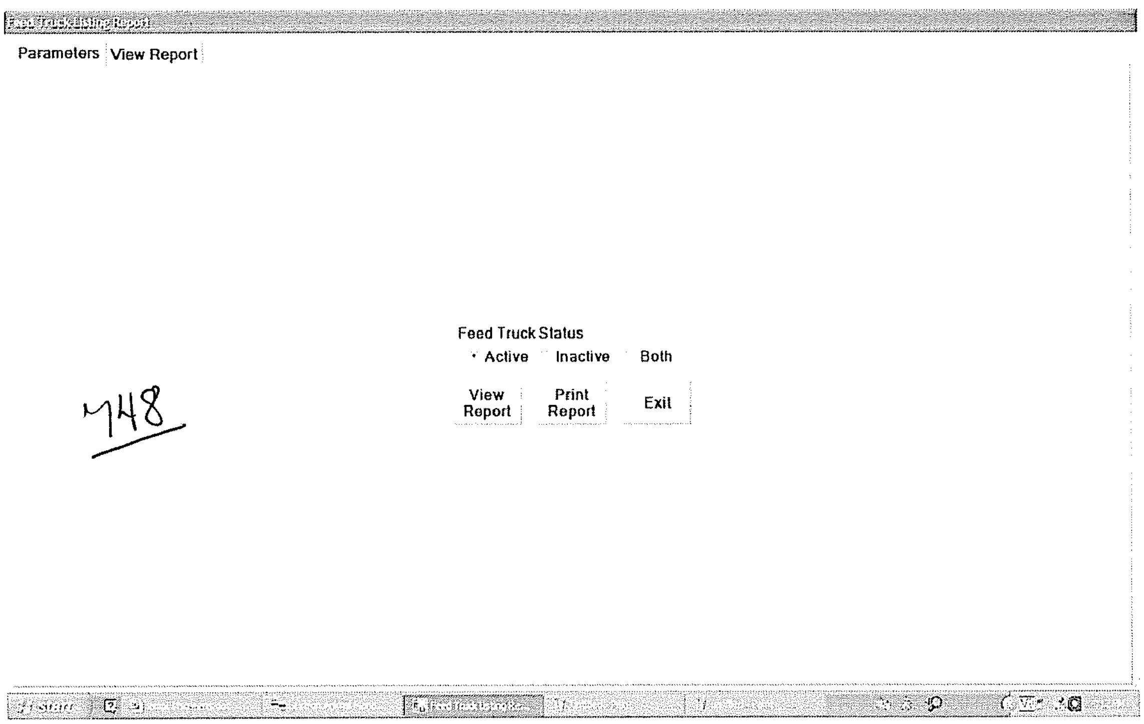

FIG. 191 shows a feed truck listing report selection screen 748. This screen allows a user to select a group of feed trucks for display on a feed truck listing report. As shown, a user may elect to display active, inactive, or both statuses of trucks.

Figure 192:
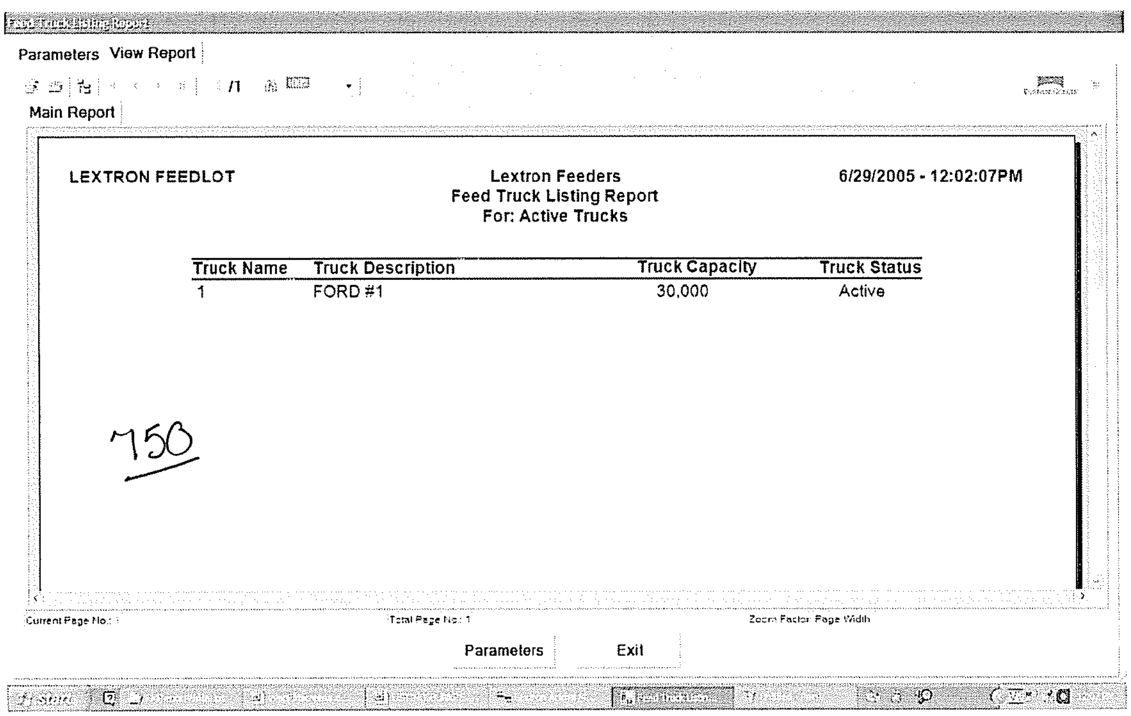

FIG. 192 shows an example feed truck listing report 750. This report shows the truck name, truck description, truck capacity, and truck status.

FIG. 193 shows an example projected consumption report 752. This report may be utilized to display and verify target consumption data for each weight range and days on feed recordation. The report can be sorted either in the weight range or days on feed fields. The data can be used to compare actual consumption to the target times in order to illustrate variances.

The next group of screens/reports shown in FIGS. 194-214 are feed management screens/reports enabling a user to select a group of feed delivery reports. These reports assist facility management in analysis of the feed call process and the assignment of status codes to each pen.

Figure 194:
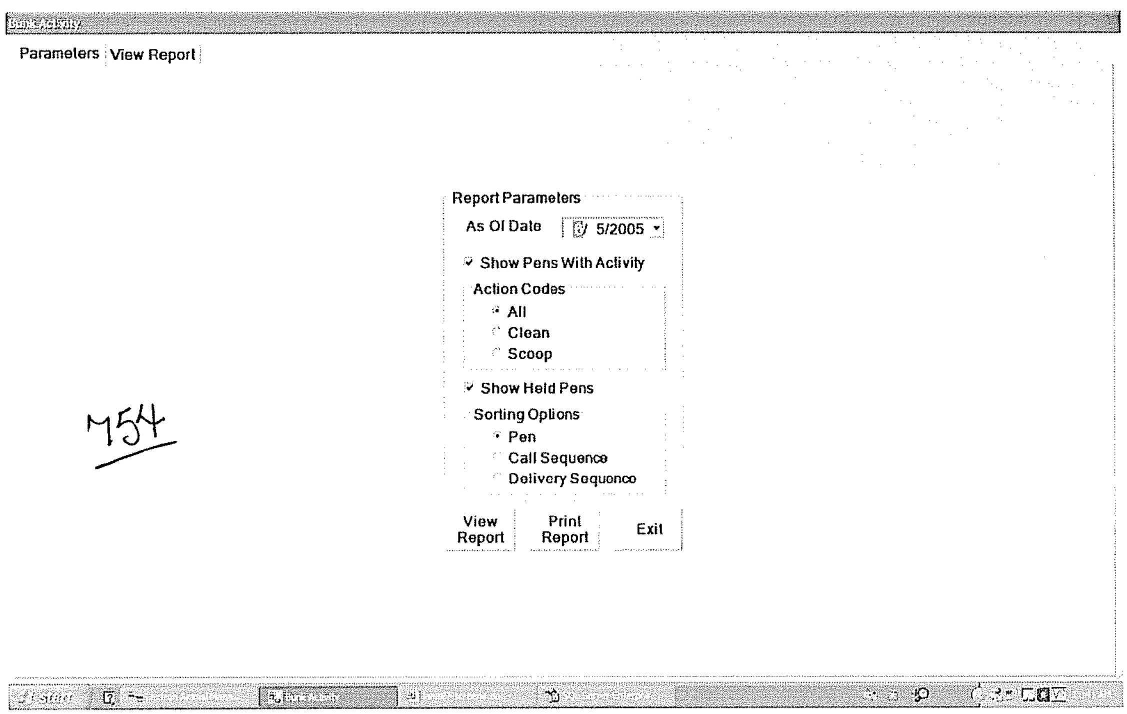

FIG. 194 shows a bunk activity report selection screen 754. This screen allows a user to select pens with activity codes assigned for a selected date. It also allows a user to display the three basic activity codes (clean, scoop and hold) or selected activity codes along with the sort order of the report, (pen order, call sequence or delivery sequence).

Figure 195:
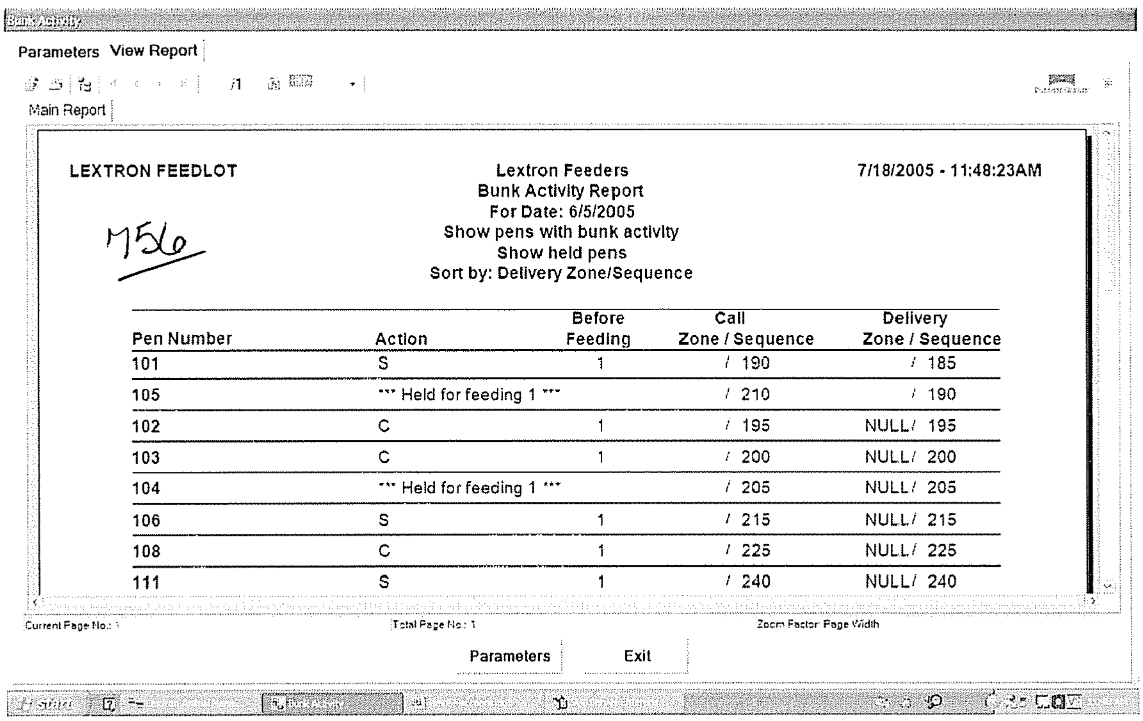

FIG. 195 shows an example bunk activity report 756. This report may be used to communicate a list of all pens that have some activity code assigned by the bunk reader. This report can be used by feeding personnel to verify which pens require some activity (such as scoop or clean) before the next scheduled physical feeding delivery. This report is also used by facility management to verify which pens have a hold code assigned to a physical feeding. For example, this hold code may assist personnel in subsequently releasing the held feeding for the listed pen(s) or adjusting the total feed call for the day for the listed pen(s). Depending upon the hold rule selected in the feed management parameter screen 500, the system may automatically adjust the total feed call or move the unfed feeding amount to the next scheduled feedings.

Figure 196:
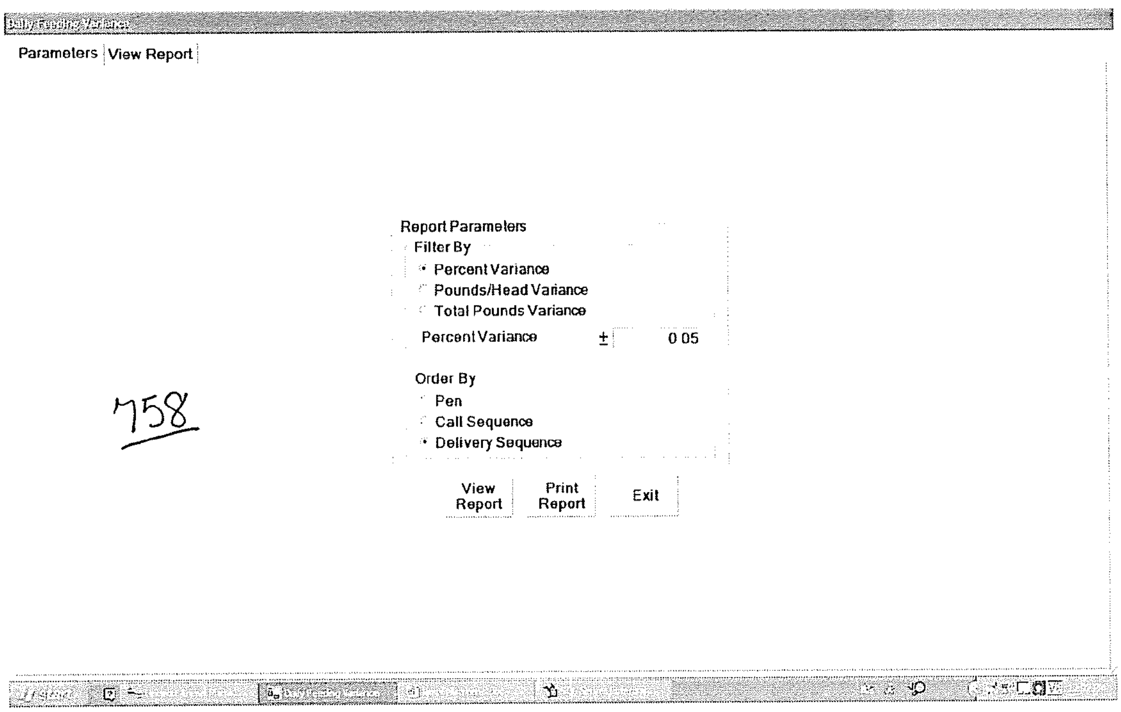

FIG. 196 shows a daily feeding variance report selection screen 758. This screen allows a user to select an allowable variance amount along with the sort order (pen order, call sequence, or delivery sequence) for the pens' feeding variance data.

FIG. 197 shows an example daily feeding variance report 760. This report may be used by management to display those pens that were delivered feed that exceeded or fell short of the total feed called for the particular feeding date. This report specifically identifies problems associated with the feed delivery process and not the feed calling process. This report can be used by bunk reading personnel to highlight those pens that should be observed during the next day's feed delivery to determine why there has been discrepancies in feed delivered. The data on this report can also be displayed on the bunk-reading screen in the detail history chart section. The bunk reader may wish to adjust the delivered feed amounts during the current day's feeding process before the feedings are rolled over to the next day's feed call. For example, if a pen has been greatly under delivered, the bunk reader may wish to adjust the current day's feed call to make up for the under delivered amount.

FIG. 198 illustrates another example of a daily feeding variance report 762, but this report has been sorted by delivery sequence. Accordingly, the first pen shown on the report shows the first pen to receive feed for the designated feeding.

Figure 199:
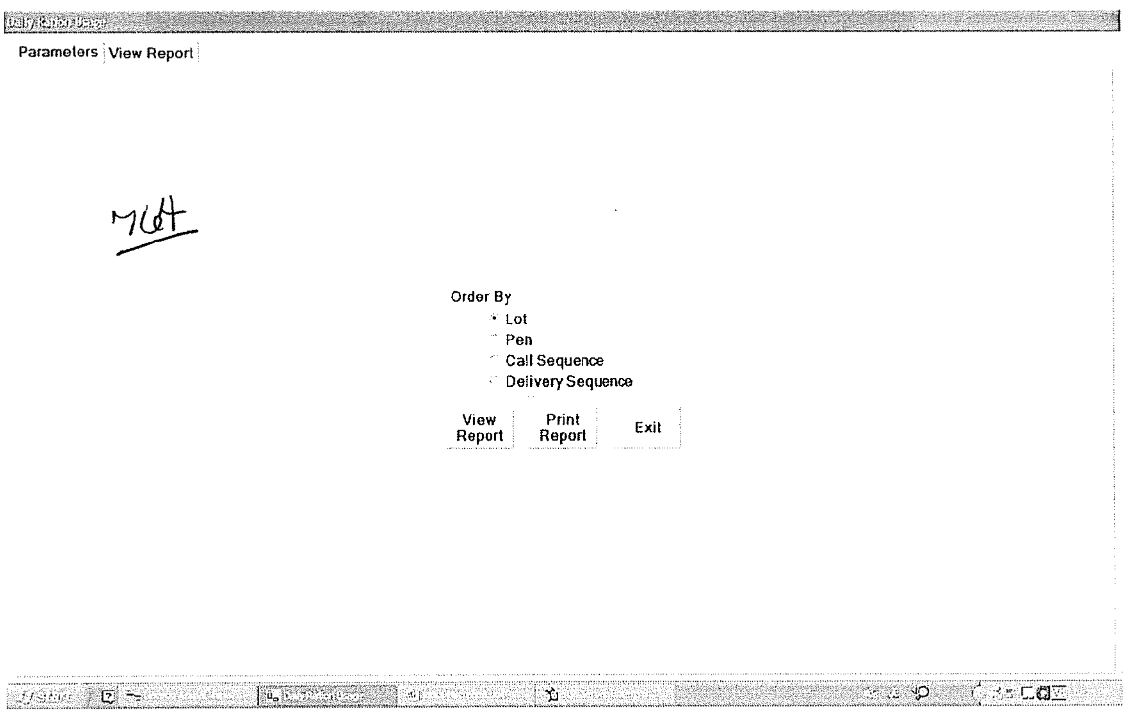

FIG. 199 is a daily ration usage report selection screen 764. This screen allows a user to select a sort order in which to list usage data in a daily ration usage report. As shown, the order may be sorted by lot, pen, call sequence and delivery sequence.

FIG. 200 shows an example daily ration usage report 766. This report is used by facility management to display a current day's feeding data for selected pens, and provides a comparison of two categories of average day's consumption for the selected pens. As shown, the report will list the lot, pen, ration code assigned, days on ration, days on feed, total delivered ration amount for the current day, head count in the pen for the current day, head count not in the pen for the current date, and the two average day's consumption based on the chosen time periods (shown 95 as 7 days and 14 days).

Figure 201:
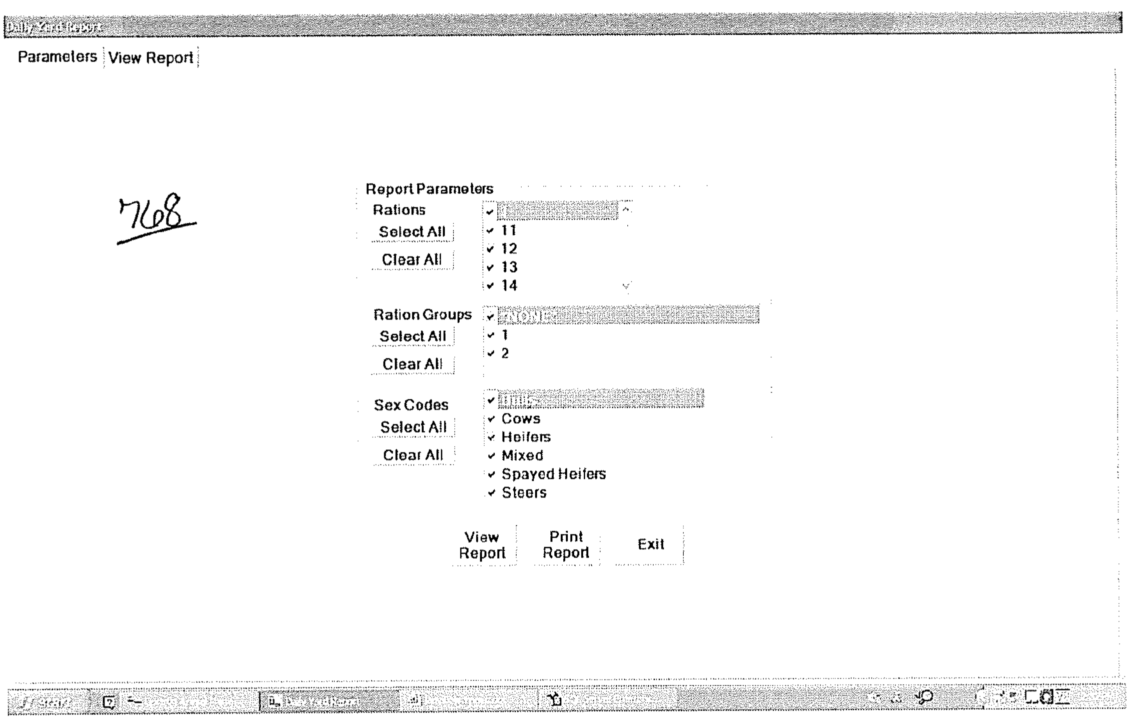

FIG. 201 is a daily yard report parameter screen 768. This screen allows a user to select ration codes, ration groups, and sex codes to be displayed in a daily yard report.

Figure 202:
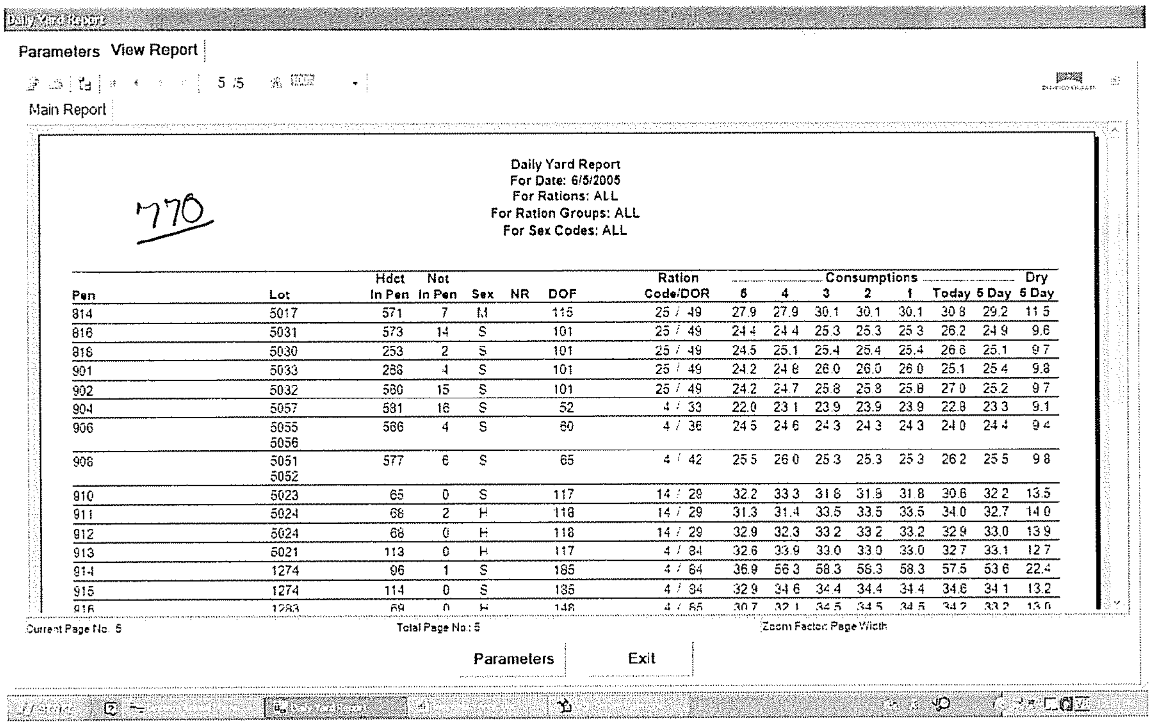

FIG. 202 shows an example of a daily yard report 770. This report may be used by management to list current pens with their corresponding assigned lots, head counts in pen, current head counts not in pen, sex, night read values, days on feed, assigned ration code, days on assigned ration, average consumptions for the current day, and a selected history of consumption, the report showing a 5-day average consumption. Additionally, the dry matter average consumption for the 5-day average may be shown. The report has been sorted in pen order.

Figure 203:
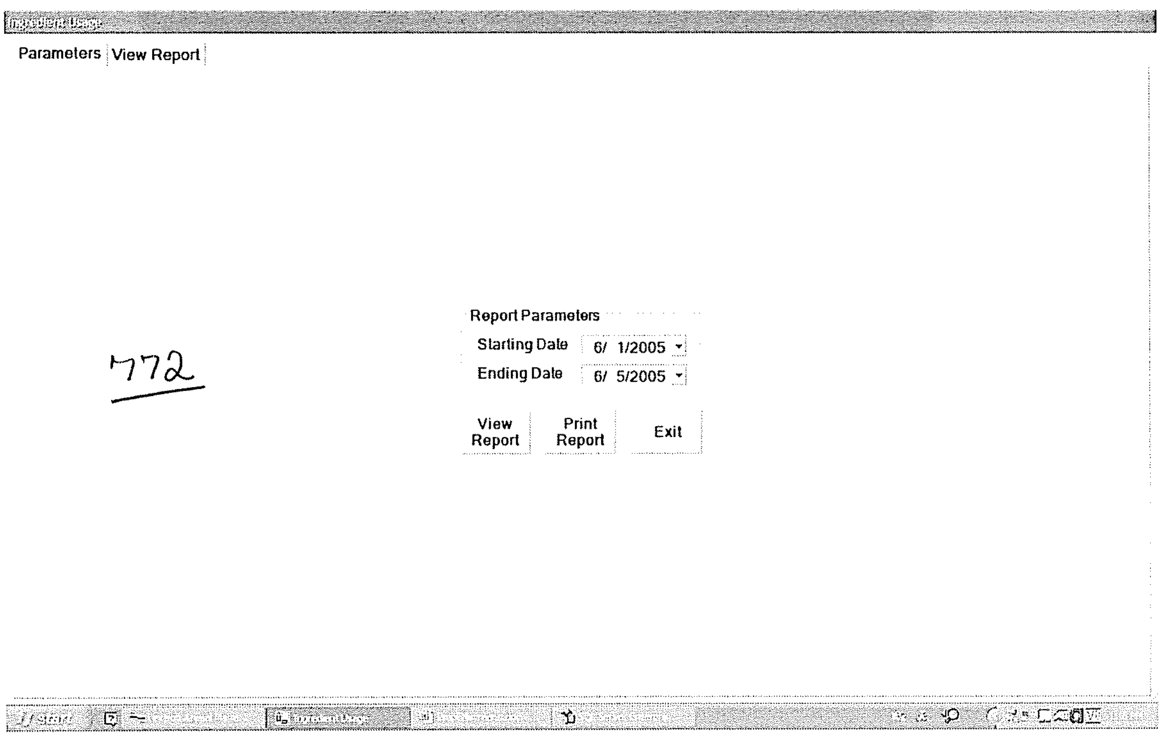

FIG. 203 is an ingredient usage report parameters screen 772. This screen allows a user to select a date range for compiling report data on an ingredient usage report.

Figure 204:
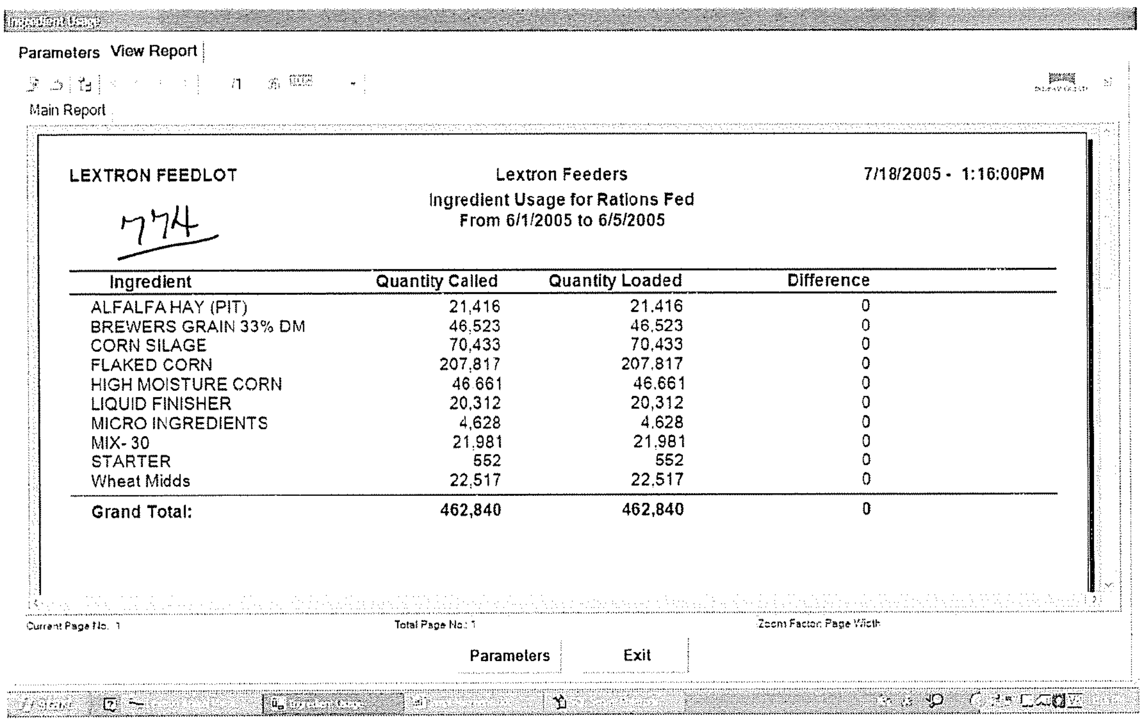

FIG. 204 shows an example ingredient usage report 774. This report may be used by management to show actual usage of each ingredient along with the corresponding ration formula calculated amounts and the variance between the called quantity and the loaded quantity. This report provides an indication as to how efficient the feed mixing operation has been conducted over a selected date range. This report is also used for management to control the buying of ingredients as well as inventory control.

Figure 205:
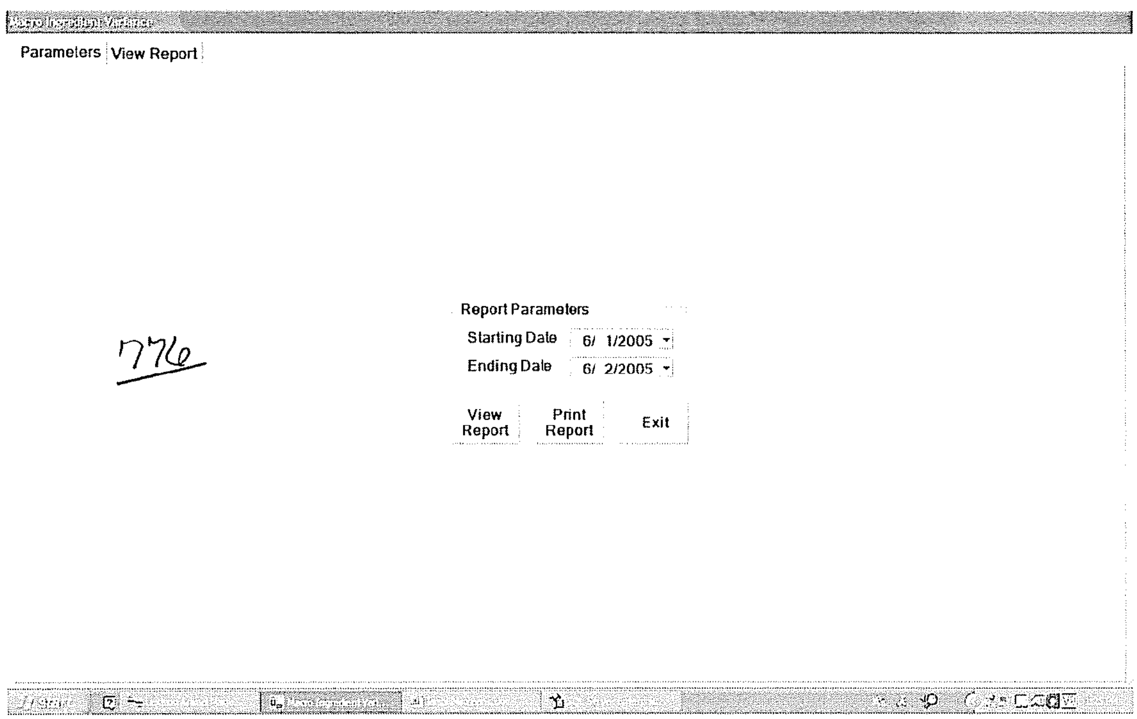

FIG. 205 is a macro ingredient variance report parameter screen 776. This screen allows a user to select a date range to display a macro ingredient variance report.

FIG. 206 shows an example macro ingredient variance report 778. This report may be used by facility management to check variance amounts between calculated macro ingredient amounts based on corresponding ration formulas and the actual macro ingredient amounts mixed for a selected date range. This report particularly assists management in identifying which ration codes are producing the major macro ingredient variance amounts. It is important to maintain proper ration formula mix amounts. The correct caloric content maintained in a properly mixed ration formula maximizes weight gain per head. The ration formulas are typically established by nutritionists who use their expertise to recommend rations that will supply maximum weight gain per head, and will be cost effective ration solutions.

Figure 207:
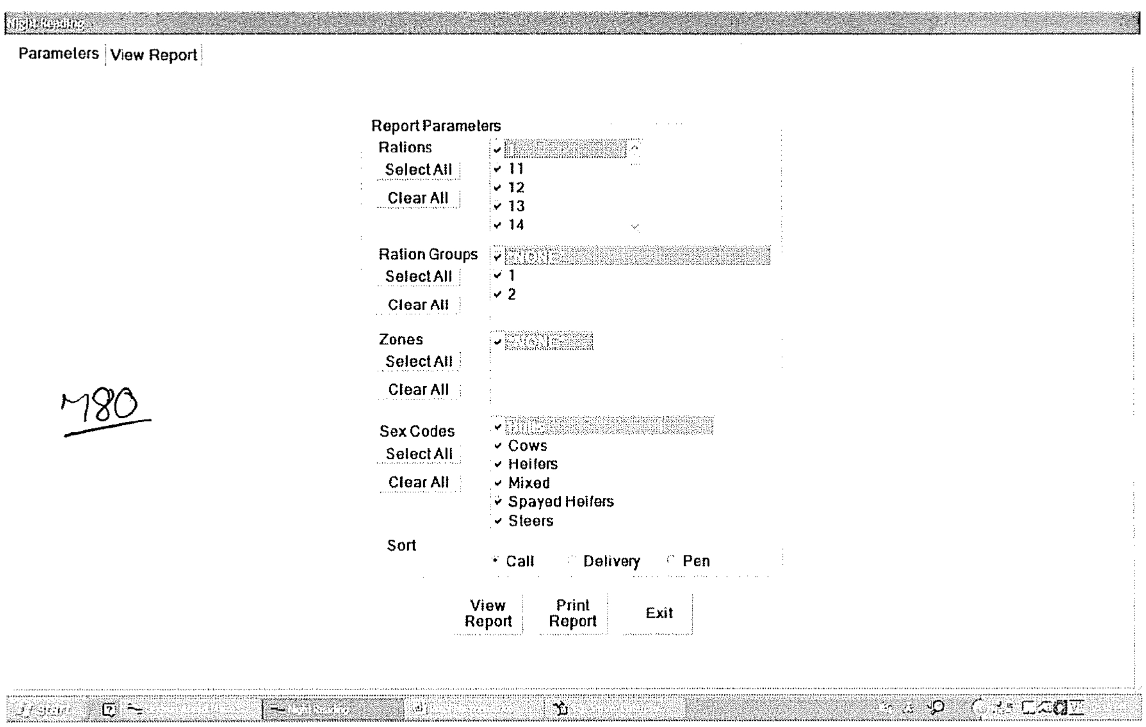

FIG. 207 is a night reading report parameter screen 780. This screen allows a user to select parameters to be reported on a night reading report. As shown, the screen allows selection of pens receiving selected ration codes, ration groups, call zones, and/or selected sex codes. This report can be sorted in any of the desired fields shown on the screen.

Figure 208:
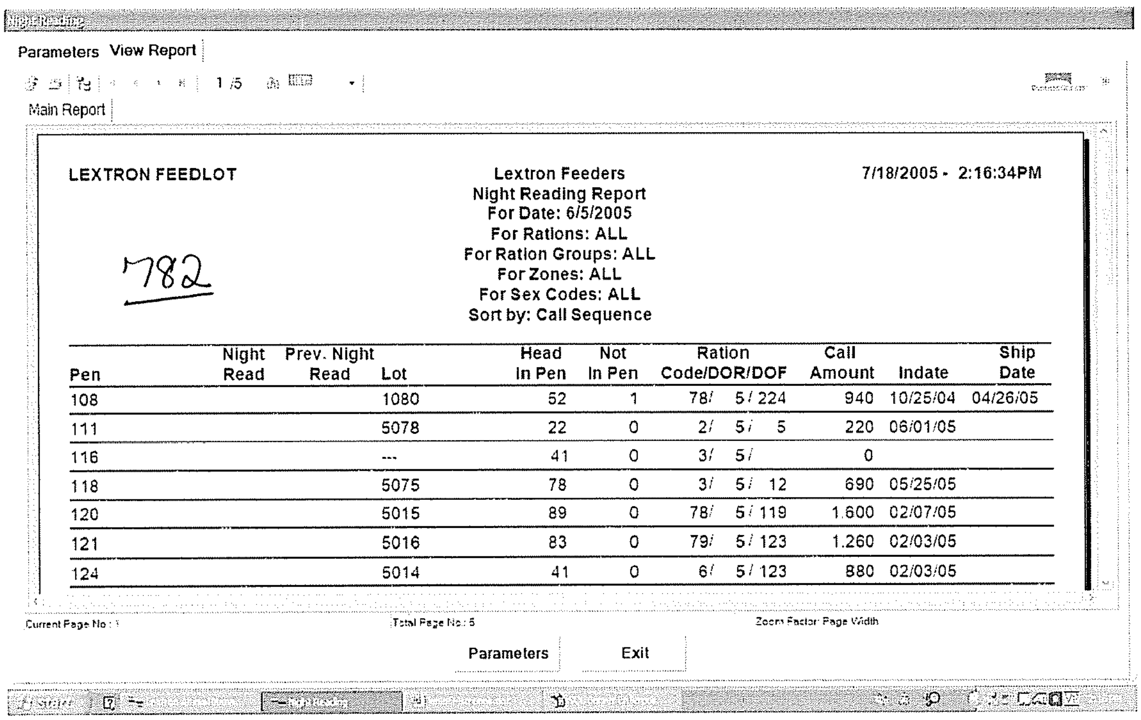

FIG. 208 shows an example night reading report 782. This report can be used by a night crew to enter respective night reads for each pen. The night read time recorded is the time in which the pen is observed as being empty. If a pen is not empty during the night hours, no entry is made in the night read column. This report can be used when the night crew does not have access to a remote computer for bunk reading. The night read times manually entered on the report can then be posted later on a terminal in the yard office or yard mill at the end of the shift. As shown, the report displays each pen in the yard, a night read column for entry of the night read time, the previous night read time, lot number, head count currently in pen, head count not in pen, assigned ration code, days on assigned ration code, days on feed, total call amount for the day, in date of pen, and scheduled ship date of the pen.

Figure 209:
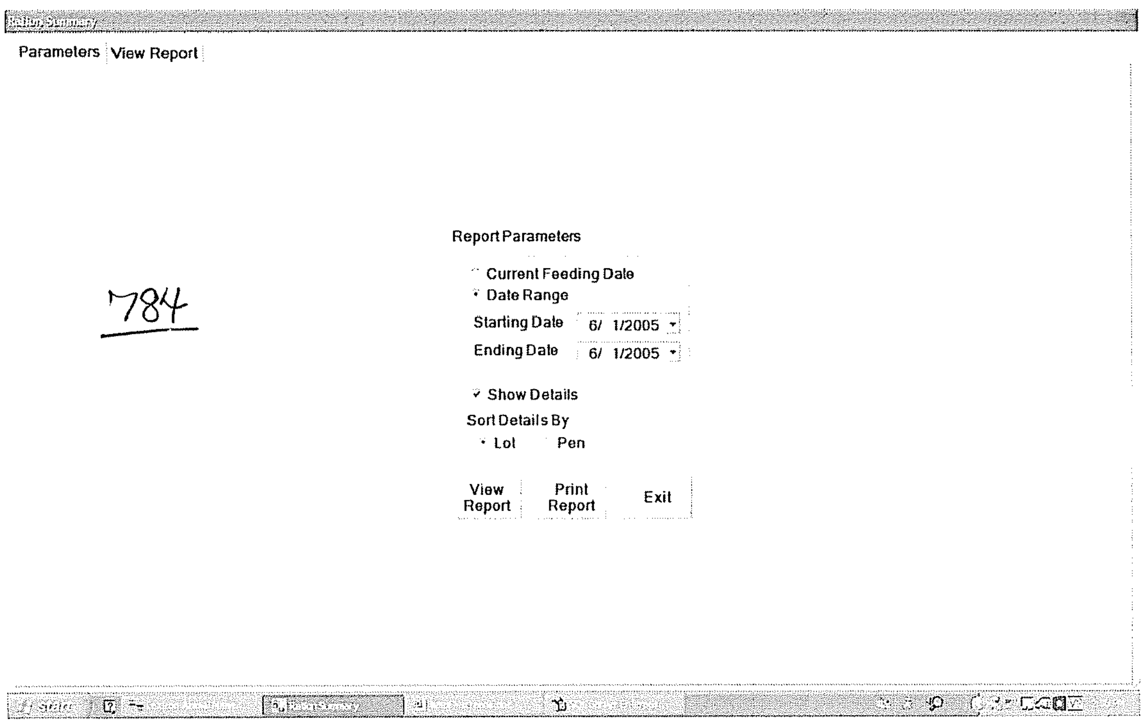

FIG. 209 is a ration summary report parameter screen 784. This screen allows a user to select a current date or date range, a sort order either by pen or lots and other display details.

Figure 210:
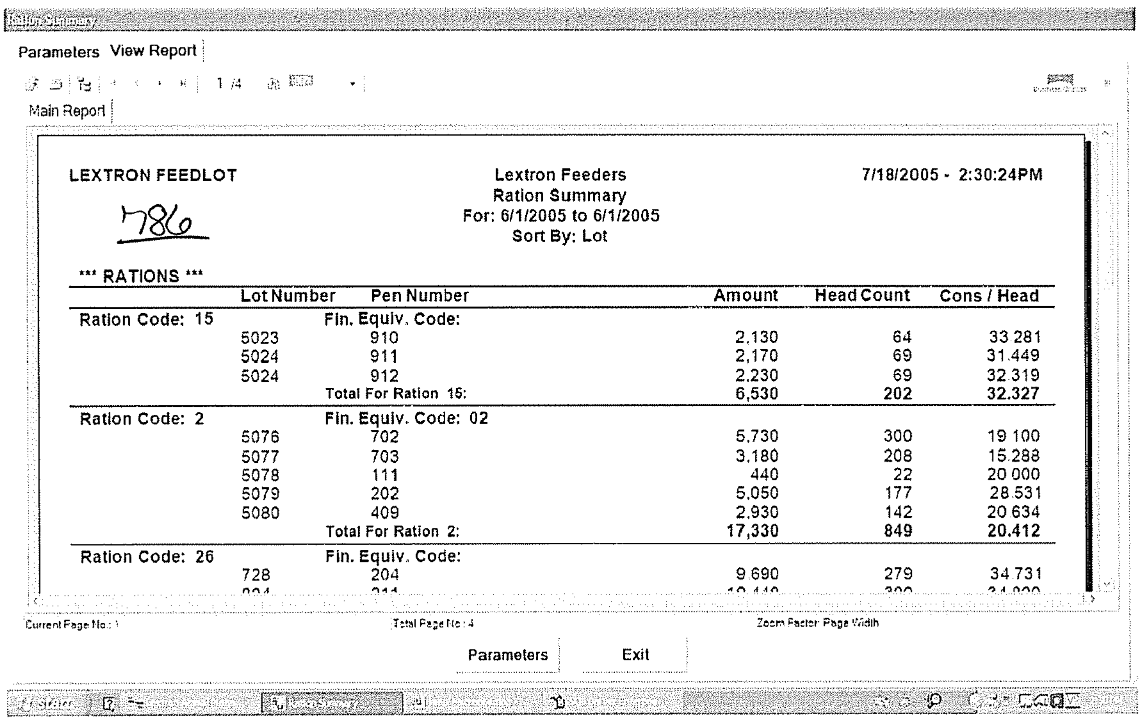

FIG. 210 is an example ration summary report 786. This report can be used by management to summarize ration by lot or pen for the current date or a specified date range. This data can be used by management to verify amounts or rations that will be interfaced with a financial system as well as to record the ration usage by date for later reference. As shown, the report displays the ration code and summarizes the ration amounts by lot and pen along with the current head count and the consumption per head amounts.

Figure 211:
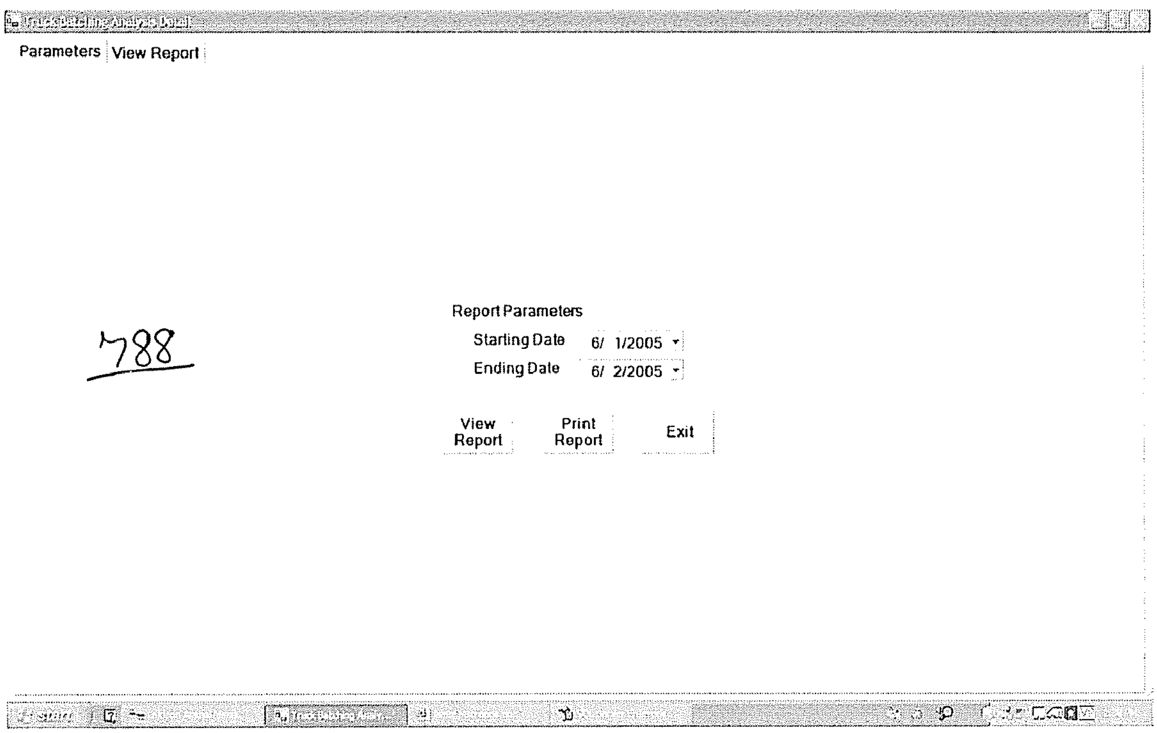

FIG. 211 is a truck batching analysis detail parameter screen 788. This screen allows a user to select a date range for a truck batching analysis report.

FIG. 212 is a truck batch analysis detail report 790. This report may be used by management to record each batch/load of ration along with the assigned pens to be delivered with the corresponding call amounts, actual delivered amounts, and the variance amounts. The report also provides the feeding number, load ID, ration code, driver assigned, and truck ID if available.

Figure 213:
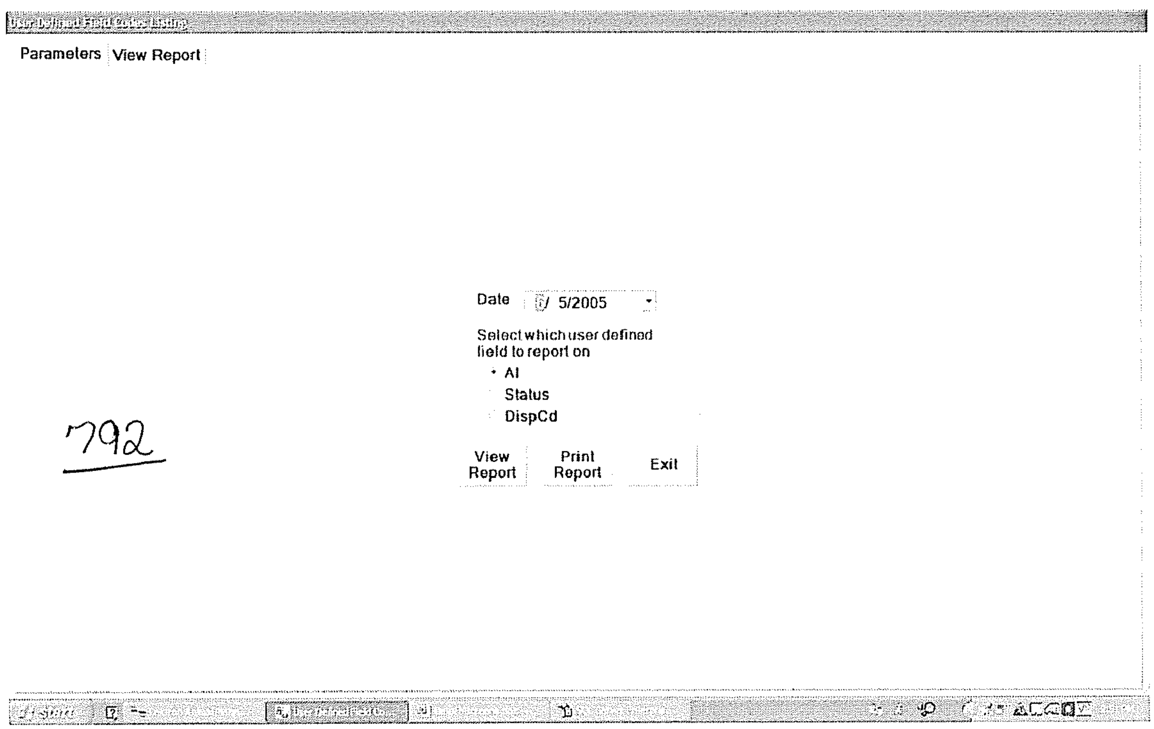

FIG. 213 is a user-defined field codes listing report parameter screen 792. This screen allows a user to select the date and one of the three user-defined codes they wish to display for a status report selected by the user.

Figure 214:
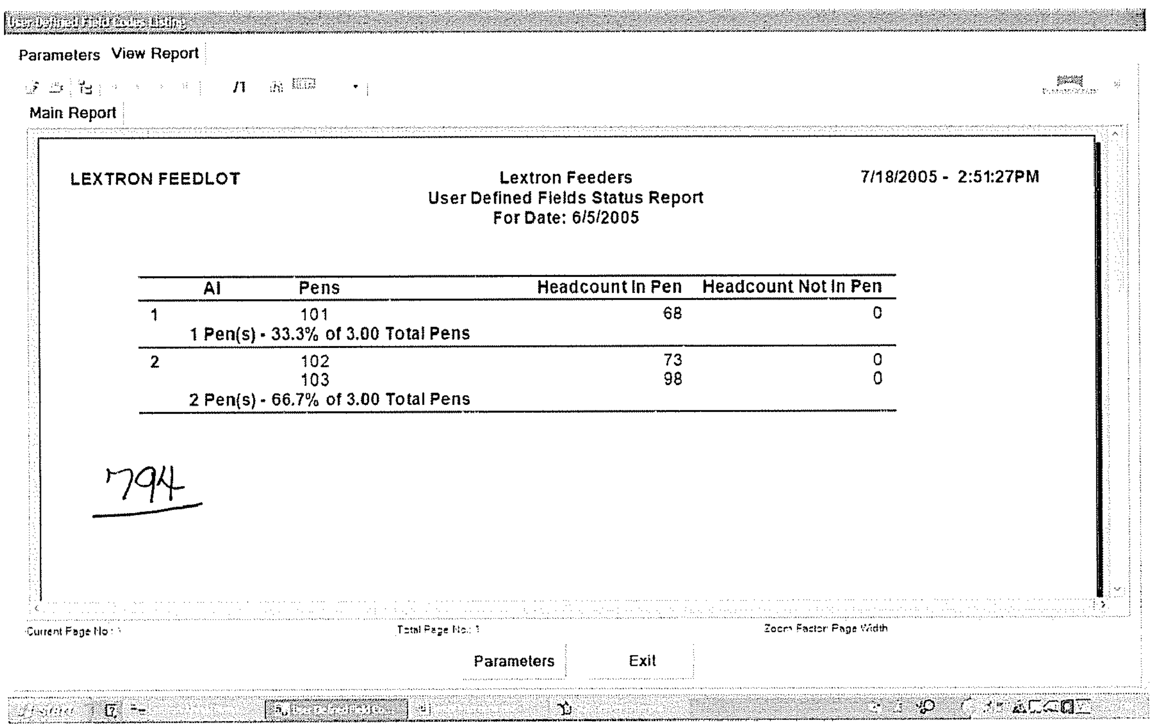

FIG. 214 shows one example of a user-defined report 794 that lists specific data as selected by the user. More specifically, this example report displays user-defined fields assigned to one or more of the pens, and the report is shown as being sorted by days. Only the pens with assigned user-defined fields are displayed in the report.

FIGS. 215-229 comprise various additional feed management reports, namely, feed analysis reports that assist management in the analysis of animal performance and the effectiveness of the feed delivery process.

Figure 215:
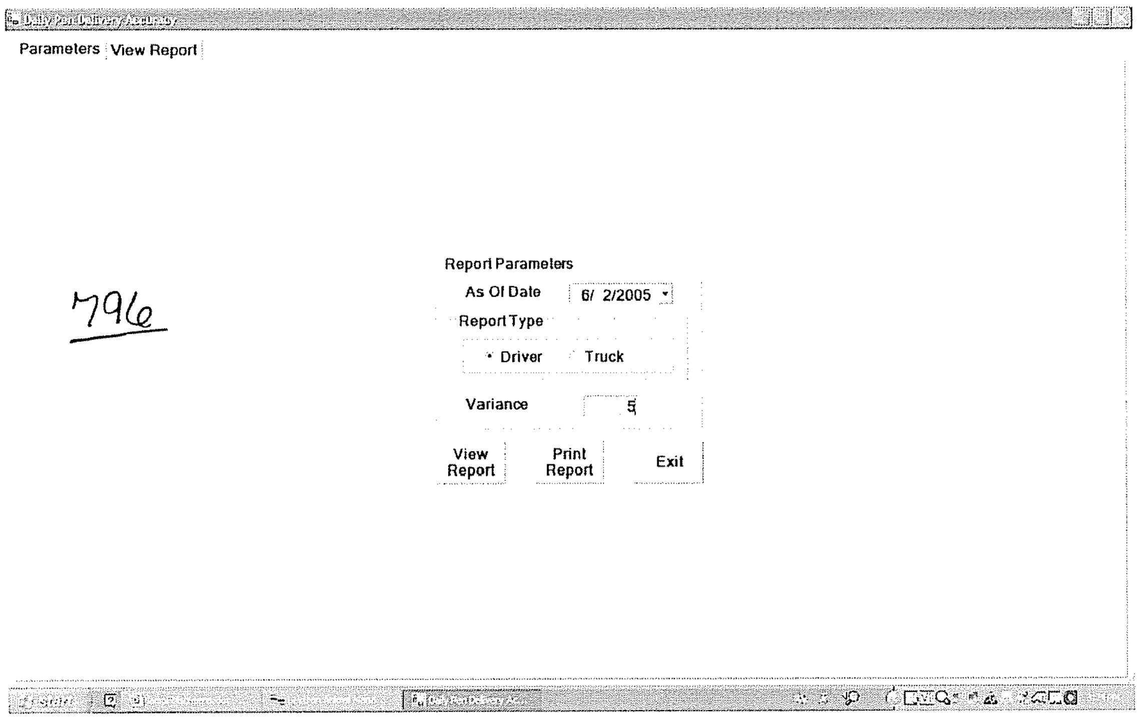

FIG. 215 is a daily pen delivery accuracy report parameter screen 796. This screen allows a user to select a date, report type (driver or truck), and variance amount for a daily pen delivery accuracy report.

FIG. 216 is an example daily pen delivery accuracy report 798. This report provides a detailed listing for each physical feeding for each pen of the dates selected. The report shows the pen number, feeding number, ration code, call amount for feeding, fed amount for feeding, variance amount, and head count in pen for feeding. As mentioned above, this report can be sorted by the driver code or truck code based on selection in the parameter screen. Only those pens that meet the variance percent criteria established on the variance parameter screen are displayed on the report. This report may be used by management in evaluation of the feed truck drivers, and their ability to accurately deliver the called feed amounts.

Figure 217:
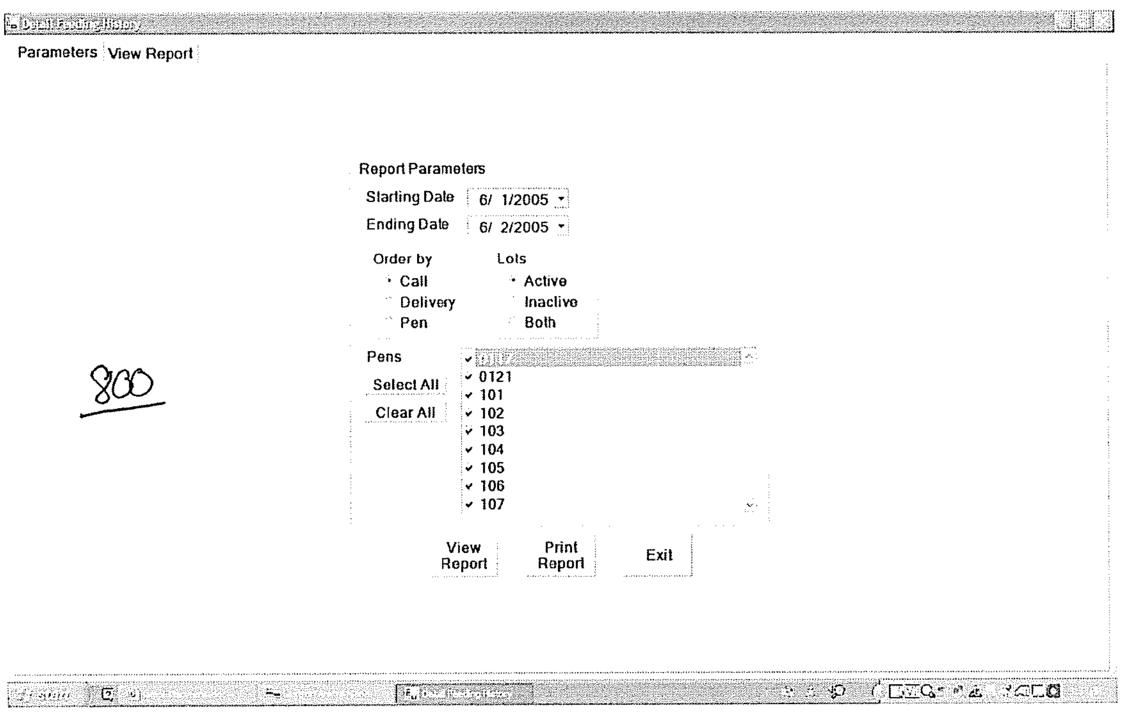

FIG. 217 is a detail feeding history report parameter screen 800. This screen allows a user to select a date range, sort order, lot numbers, and pens for a feeding history report.

Figure 218:
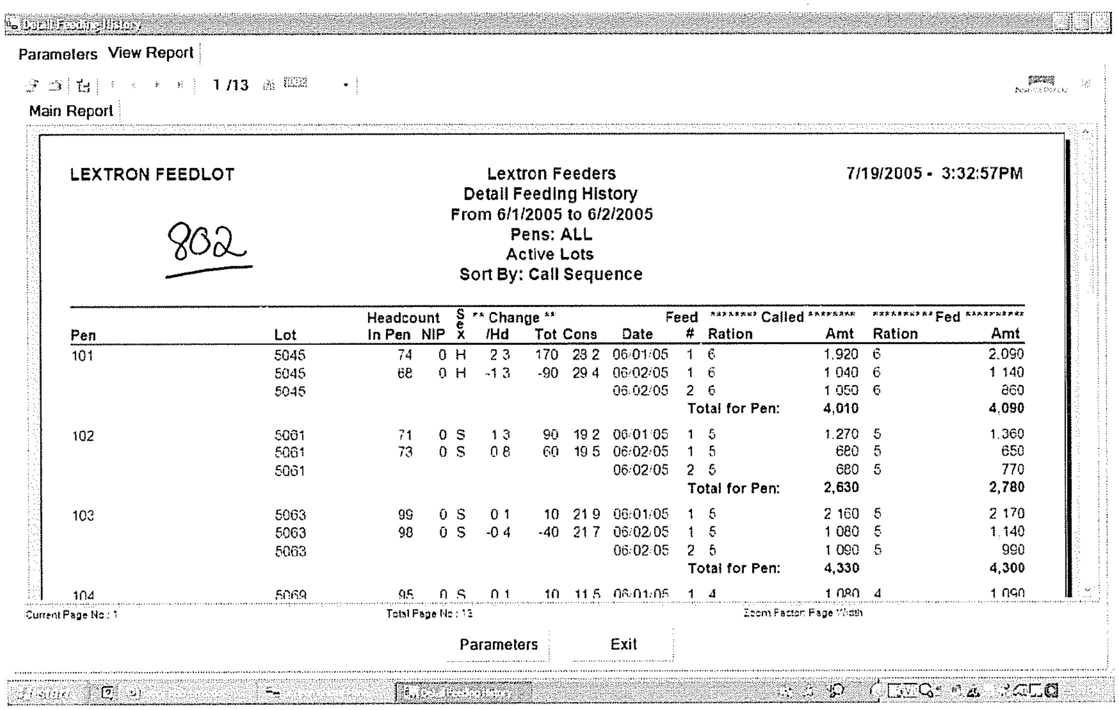

FIG. 218 shows an example detail feeding history report 802. This report can be used by management to display feeding history details for a group of pens to assist in managing feeding for pens in the yard. As shown, the report displays details for each date, each lot number in the pen, and all physical feedings for each date. Each line entry displays head count in pen, head count not in pen, sex code, change in pounds per head between the current date and the previous date, change in total pounds of feed for each date, feeding number, ration called, call amount, ration fed and fed ration amount. Totals for called amounts and fed amounts are provided for each pen's data.

Figure 219:
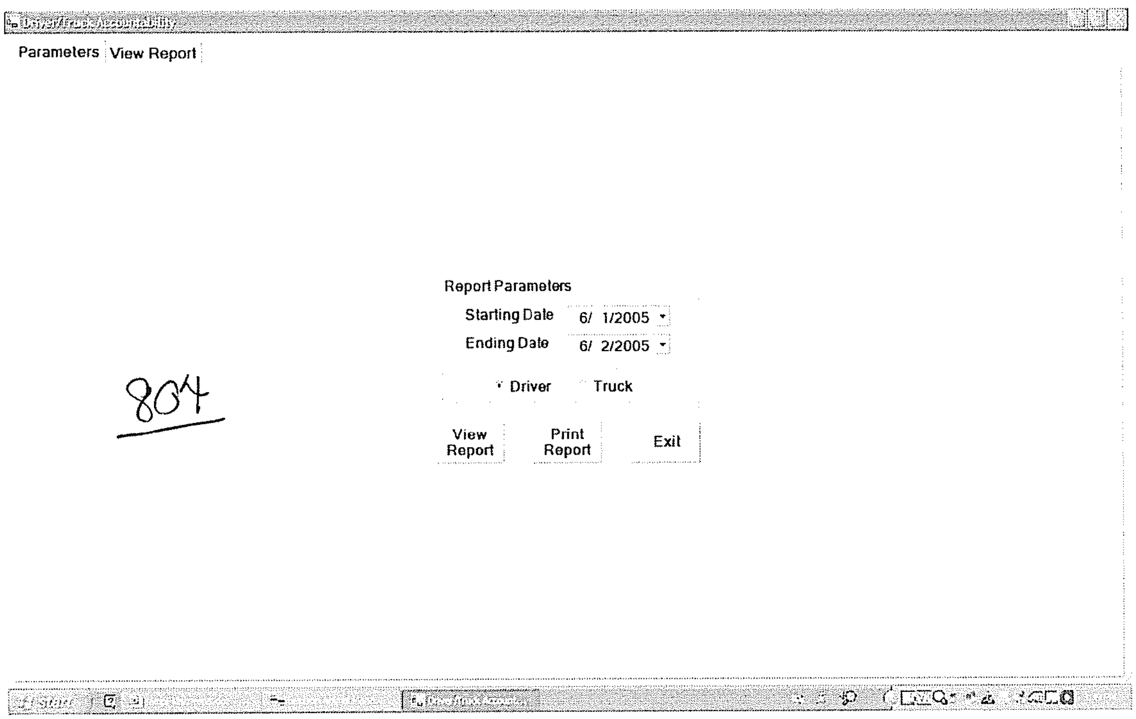

FIG. 219 is a driver/truck accountability report parameter screen 804. This screen allows a user to select the date range for a driver/truck accountability report.

Figure 220:
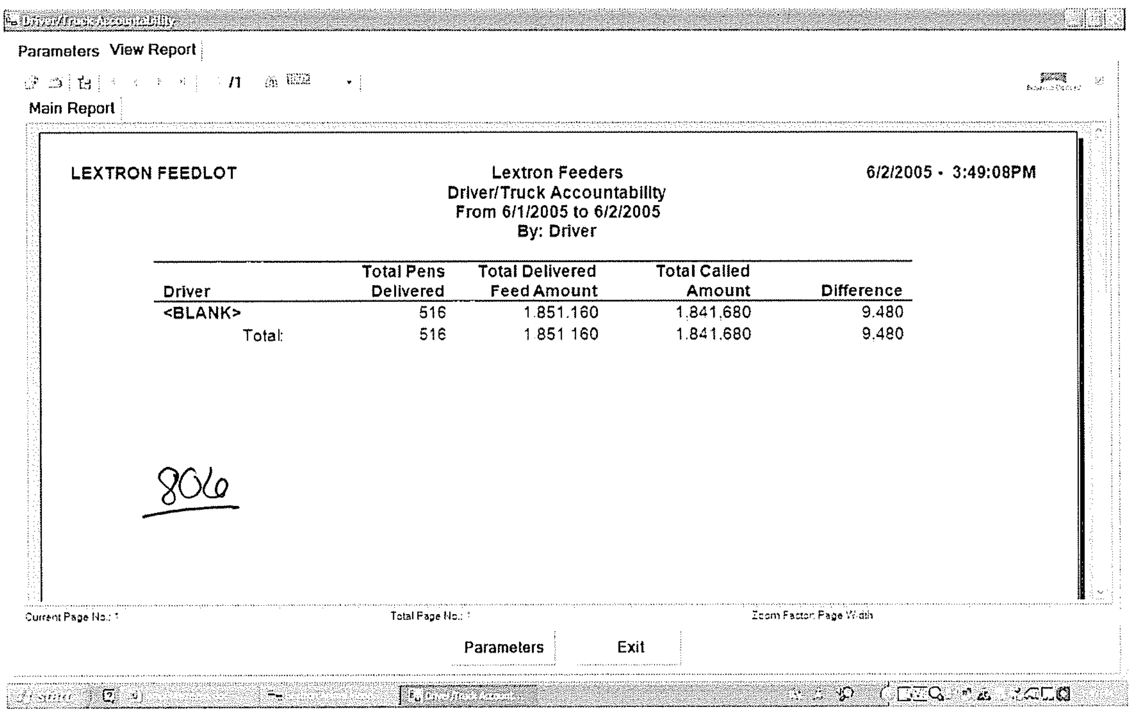

FIG. 220 shows an example driver/truck accountability report 806. This report lists the output of each driver or truck as to the total pens delivered for the date range selected, total pounds of feed delivered, total called feed amount, and the variance between the total fed and total called amount. Report totals can be provided for each field. This report assists management in the analysis of driver and truck delivery efficiency over a selected period of time.

FIG. 221 is a feed audit analysis report 808 that can be produced for the current feeding date. This report assists management in a daily analysis of the feed auditing function. The report shows details for each physical feeding for each pen number. The detail line for each pen provides a feeding number, ration code called, ration amount called, ration code delivered, ration amount delivered, variance amount between fed and called amount, audit code (e=electronically audited, m=manual audit entry), and a user identification code of the user logged on during the auditing process.

Figure 222:
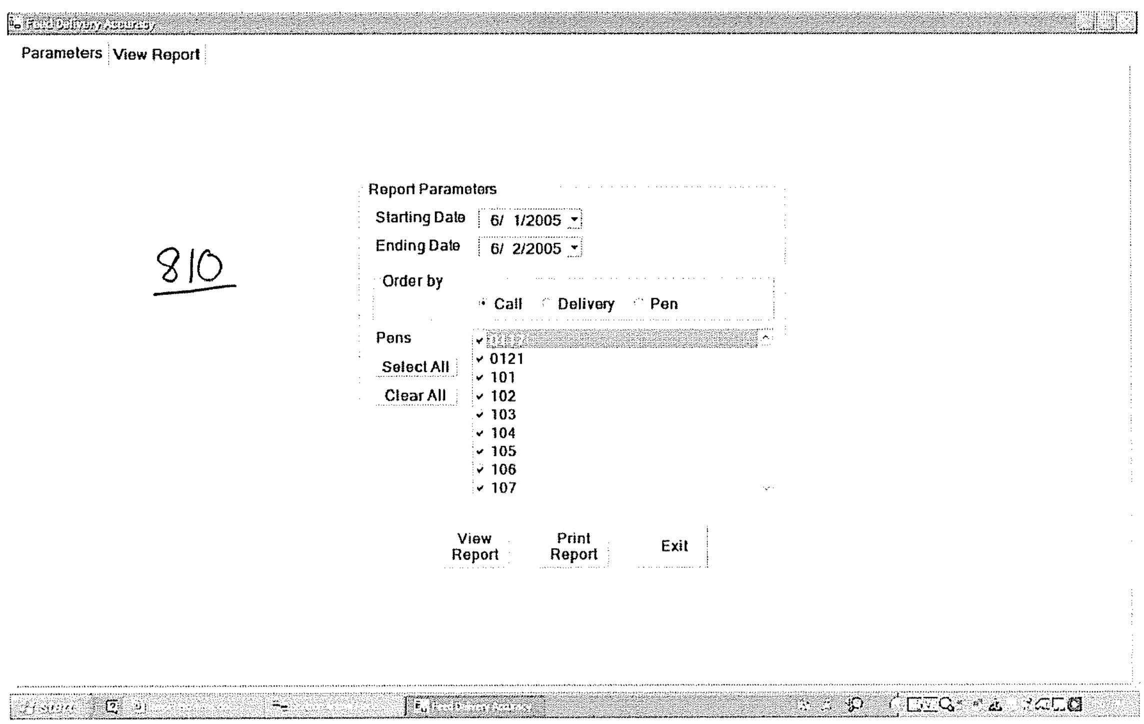

FIG. 222 is a feed delivery accuracy report parameter screen 810. This screen allows user to select a date range and a group of pens or all pens for a feed delivery accuracy report.

FIG. 223 is an example feed delivery accuracy report 812. This report assists management in analyzing the timing of the physical deliveries to each pen in the yard over a selected date range. As shown, this report lists a pen number, date and physical feeding by lot number, a reading change in pounds per head, the reading made by the bunk reader in pounds per head, ration called amount, ration fed amount, and delivery time for each physical feeding. Management can use this report to verify if physical feedings are delivered at approximately the same time each day of the report period. One theory in cattle management is that cattle gain weight faster if they are fed at approximately the same times each day.

Figure 224:
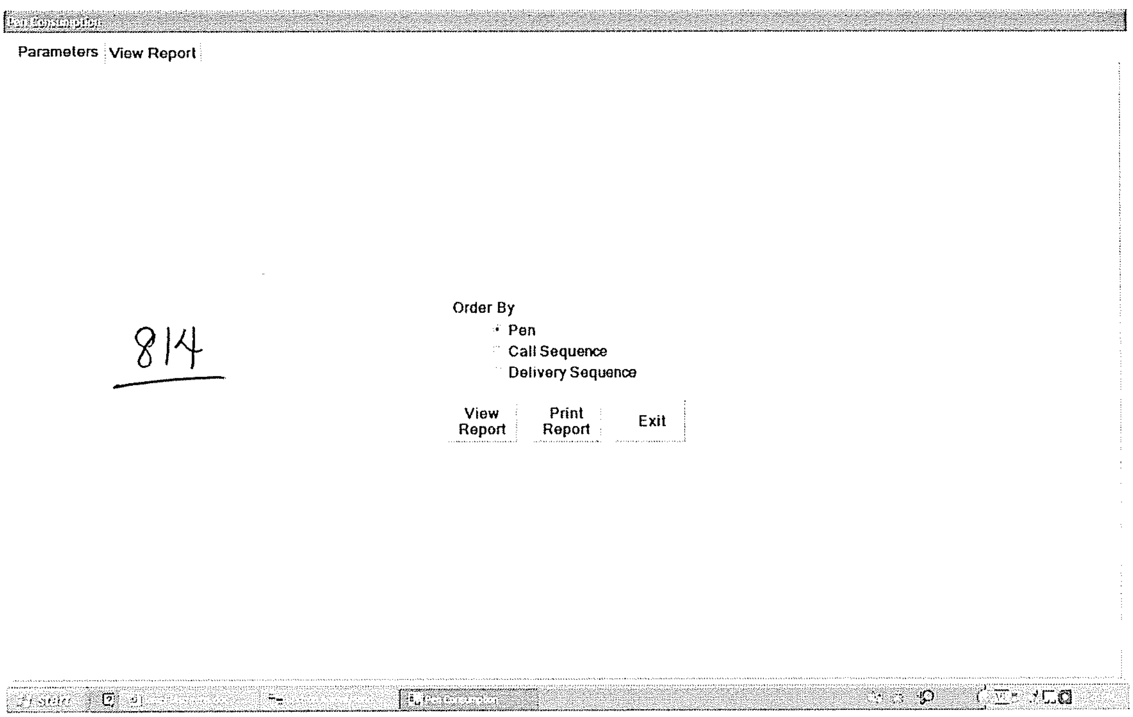

FIG. 224 is a pen consumption report parameter screen 814. This screen allows a user to select the order that a pen consumption report will be generated.

FIG. 225 shows an example pen consumption report 816. This report can assist management in analysis of the consumption history for all active pens. As shown, this report shows the consumption per head for a seven day period prior to the current feeding date, as well as the corresponding lot numbers, head count in pen, head count not in pen, sex code, pen weight of animals, estimated current weight of animals, days on feed, current assigned ration code, and days on current assigned ration code. Also displayed in the report are two average consumptions over selected periods, (shown as seven days and fourteen days), as well as to date consumption average.

Figure 226:
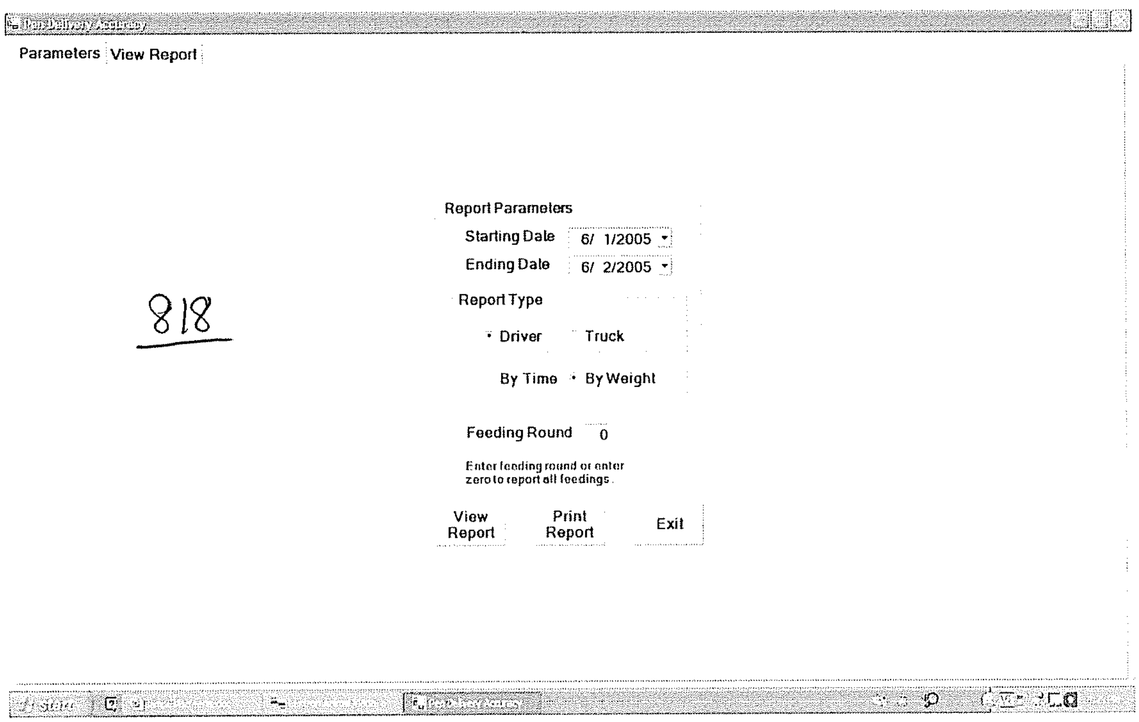

FIG. 226 is a pen delivery accuracy report parameter screen 818. This screen allows a user to select a date range to run a pen delivery accuracy report, which details the accuracy of the delivery of feed by weight or by time period. The user can also select a particular feeding number or all feedings for the date range.

Figure 227:
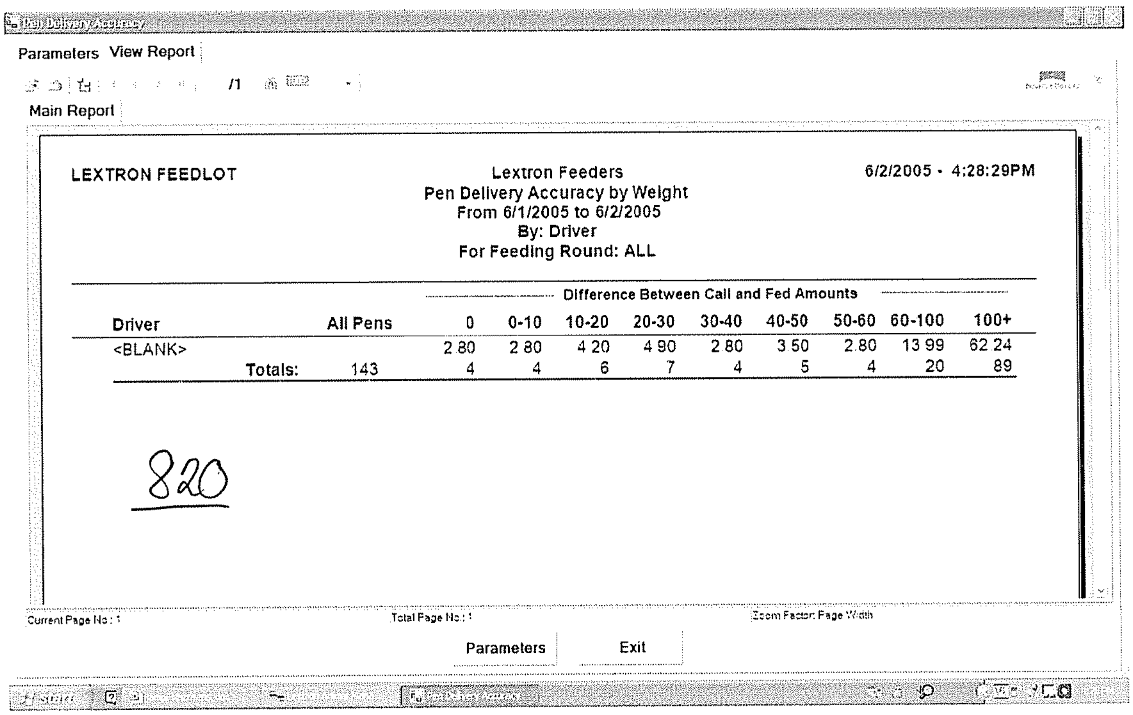

FIG. 227 shows an example pen delivery accuracy by weight report 820. This report shows the total number of pens delivered by drivers or trucks during the selected date range. The report also shows the number of pens for nine ranges of accuracy. Each range of accuracy shows the total pens that fall within the specified range, along with the percentage of the total pens delivered that fall within the specified range. This report further assists management in analysis of the accuracy of feed truck drivers during a particular time period.

Figure 228:
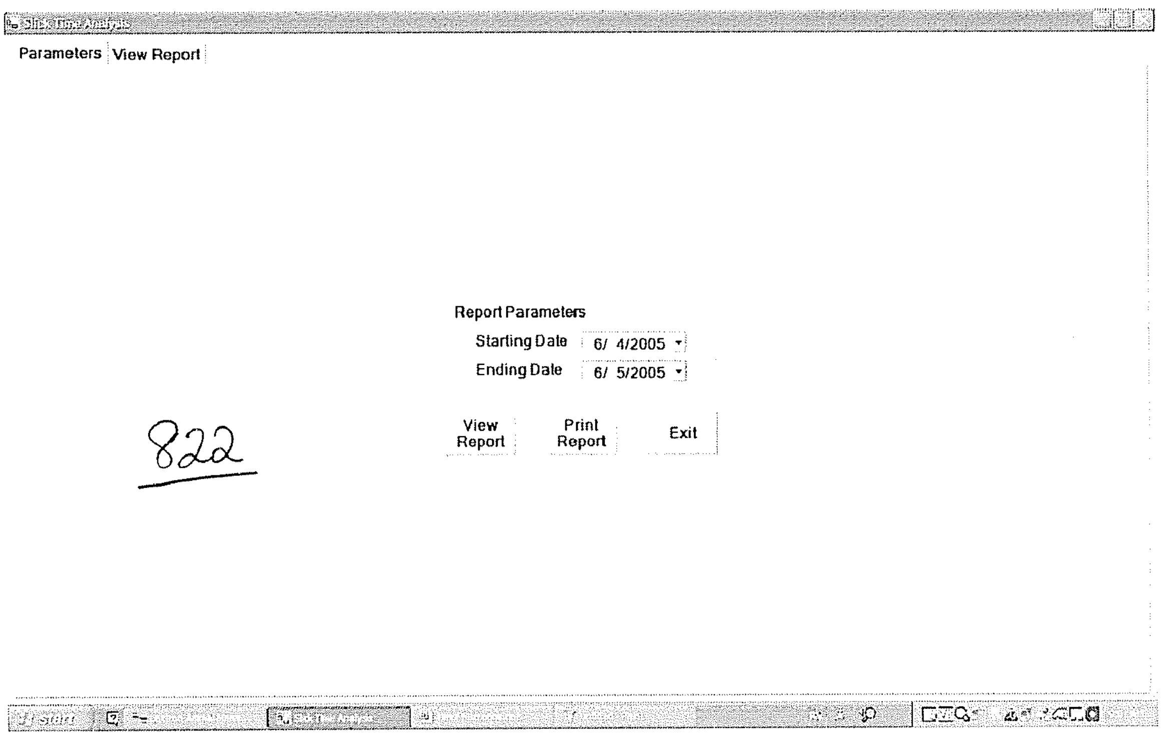

FIG. 228 is a slick time analysis report parameter screen 822. This screen allows a user to select a date range to display a slick time report.

Figure 229:
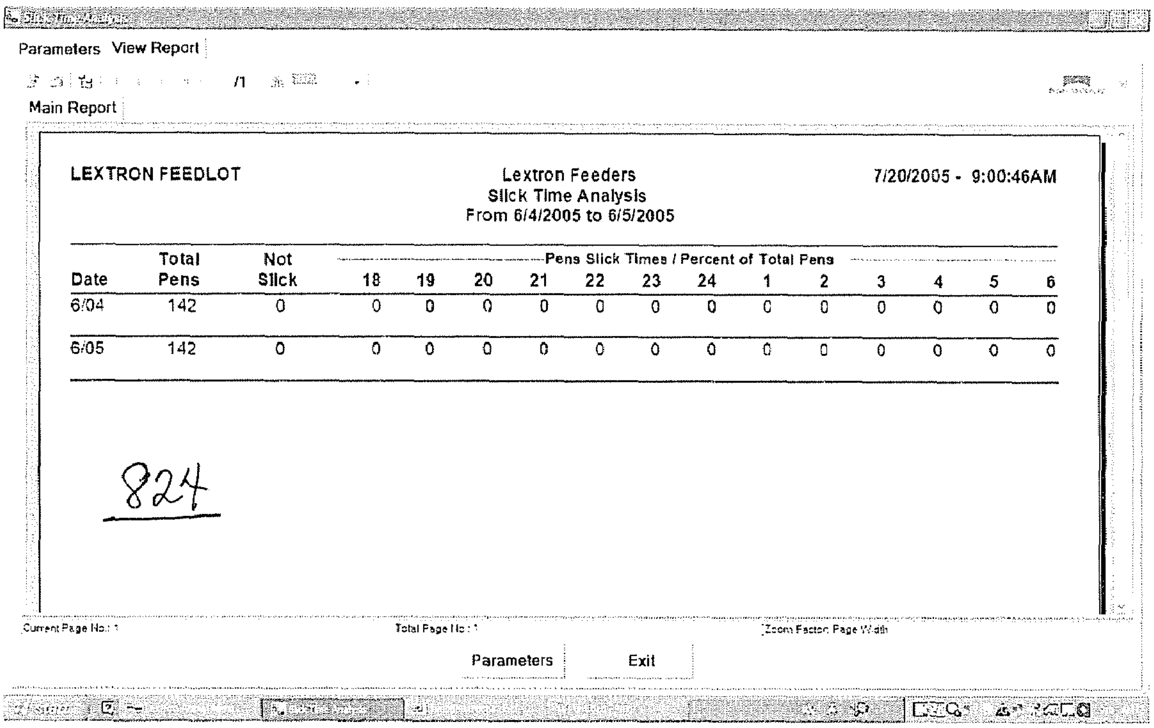

FIG. 229 shows an example slick time analysis report 824. This report shows a detail for each day of the date range indicating the total number of pens active on that day along with the number of pens that had no slick time recorded. All pens with recorded slick time are totaled for each hour from 6:00 p.m. of the feeding day through 6:00 a.m. of the next feeding day, along with the percent of total pen numbers displayed. This report assists management in the evaluation of bunk readers and their ability to effectively call feed for a date range. One nutritional theory is that each pen should have a set time range in which the pen should be slick in order to insure maximum weight gain for the animals. Feed remaining in a bunk at a designated slide time indicates a potential feeding problem to be addressed.

The next group of reports from the feed management report module, namely FIGS. 230-236 includes those reports which detail information associated with delivery of feed to the pens of animals at a selected facility.

Figure 230:
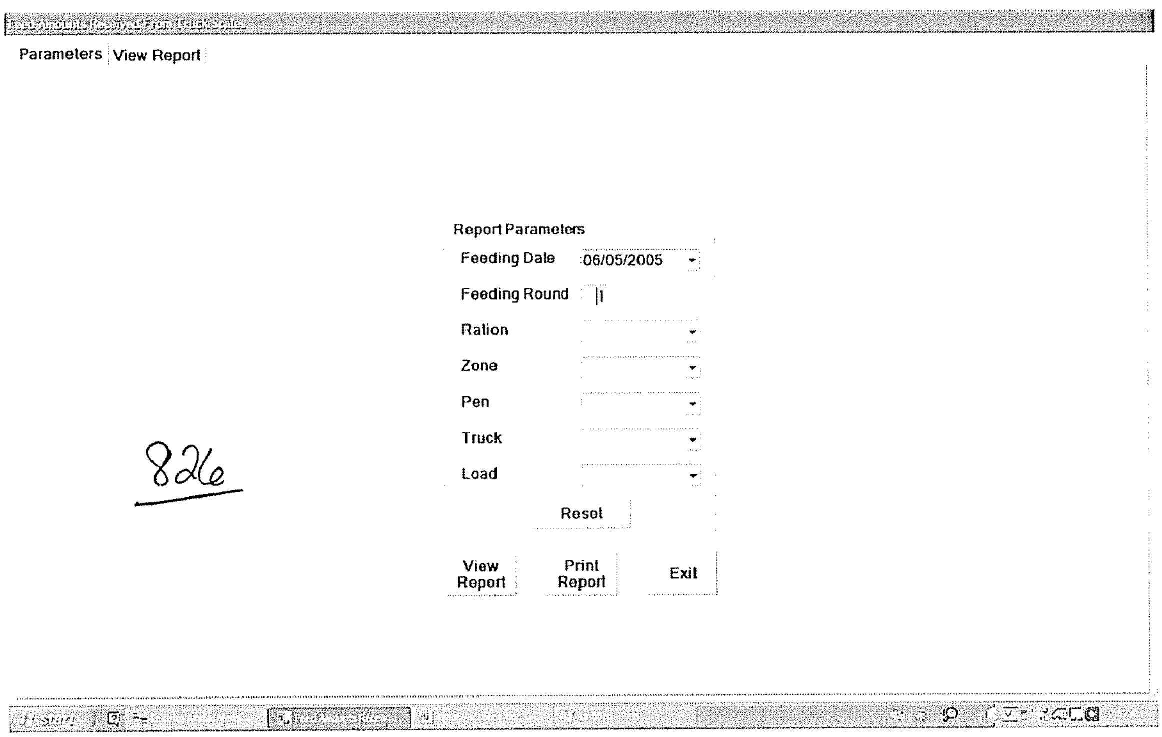

FIG. 230 is a feed amounts received from truck scales report parameter screen 826. This screen allows user to select the feeding date, feeding round, ration code, delivery zone, pens, feed truck code, and load identification number to display on a feed received amount report.

FIG. 231 shows an example feed amounts received from truck scales report 828. As shown, this report displays feeding receipt data from the feed truck scales. This report records and verifies all data received from the feed truck scales for future reference as well as assisting management in daily control of the accuracy of the feeding process at the facility. The report confirms fee deliveries to the pens as well as accuracy of the loading of the ration ingredients on the feed trucks.

Figure 232:
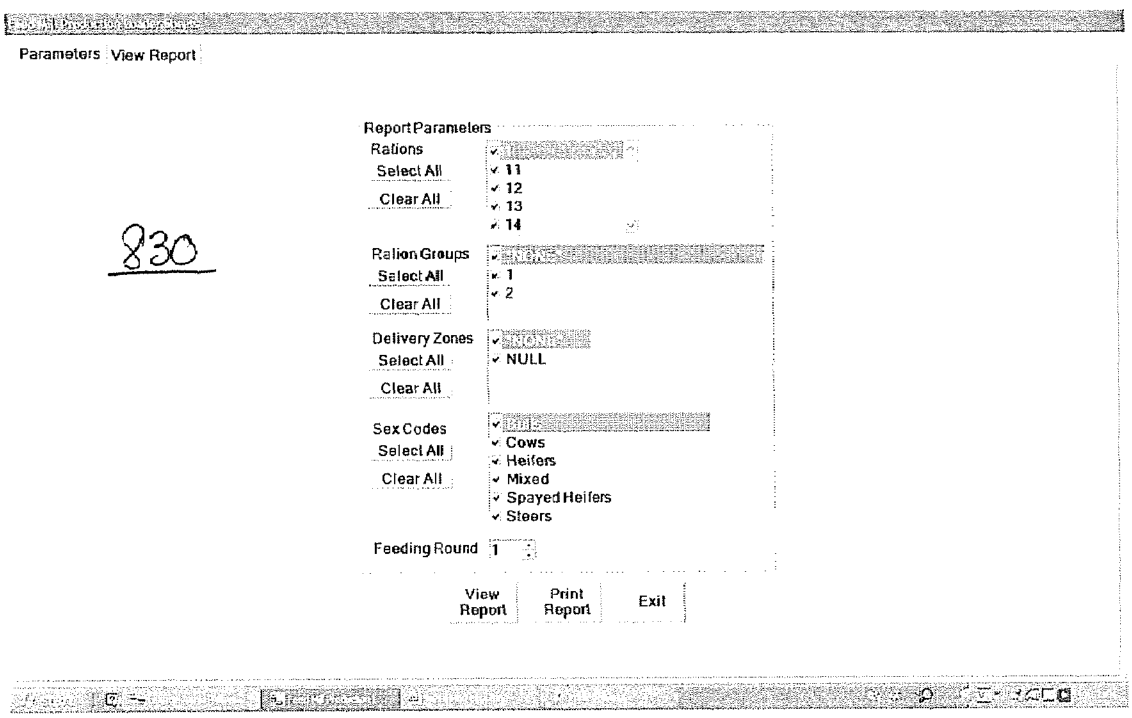

FIG. 232 is a feed mill production loader sheet report parameter screen 830. This screen allows a user to select ration load details for display on a feed mill production loader sheet report. As shown, the user can select ration codes, ration groups, delivery zones and sex codes for which they wish to display the loading data.

Figure 233:
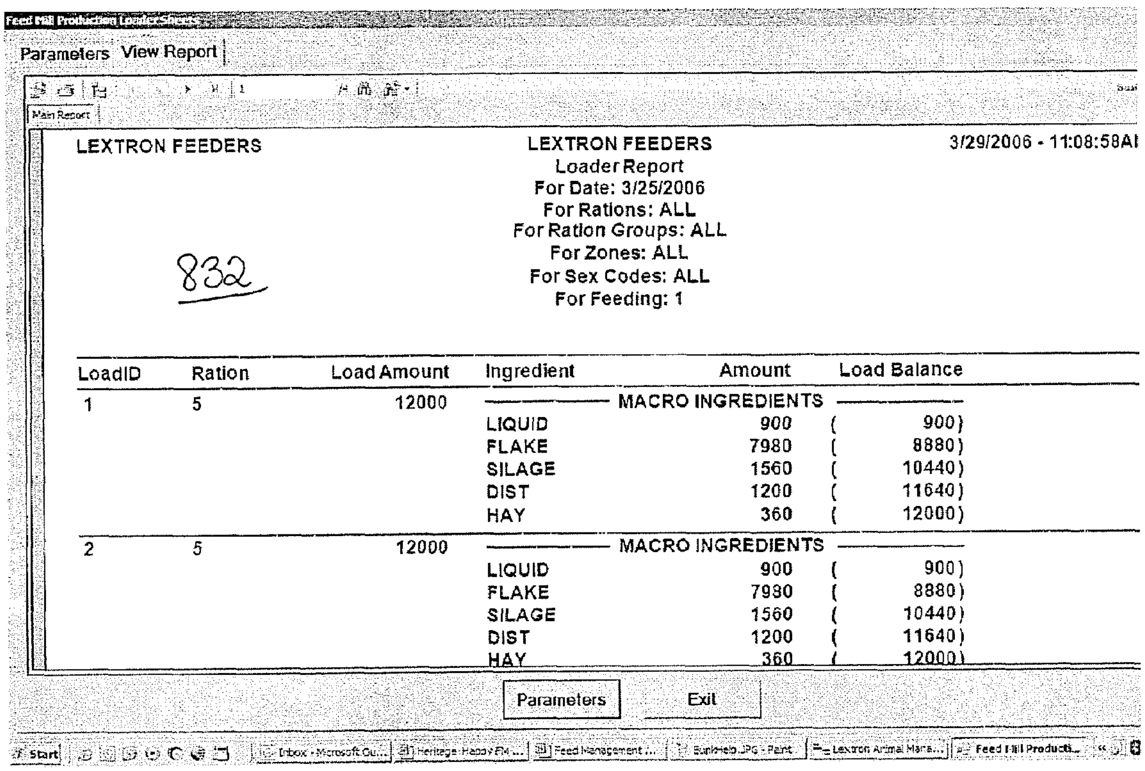

FIG. 233 is an example feed mill production loader sheet report 832. This report may be used by the feed mill to assist in the production of rations and the loading of the feed trucks at the facility.

Figure 234:
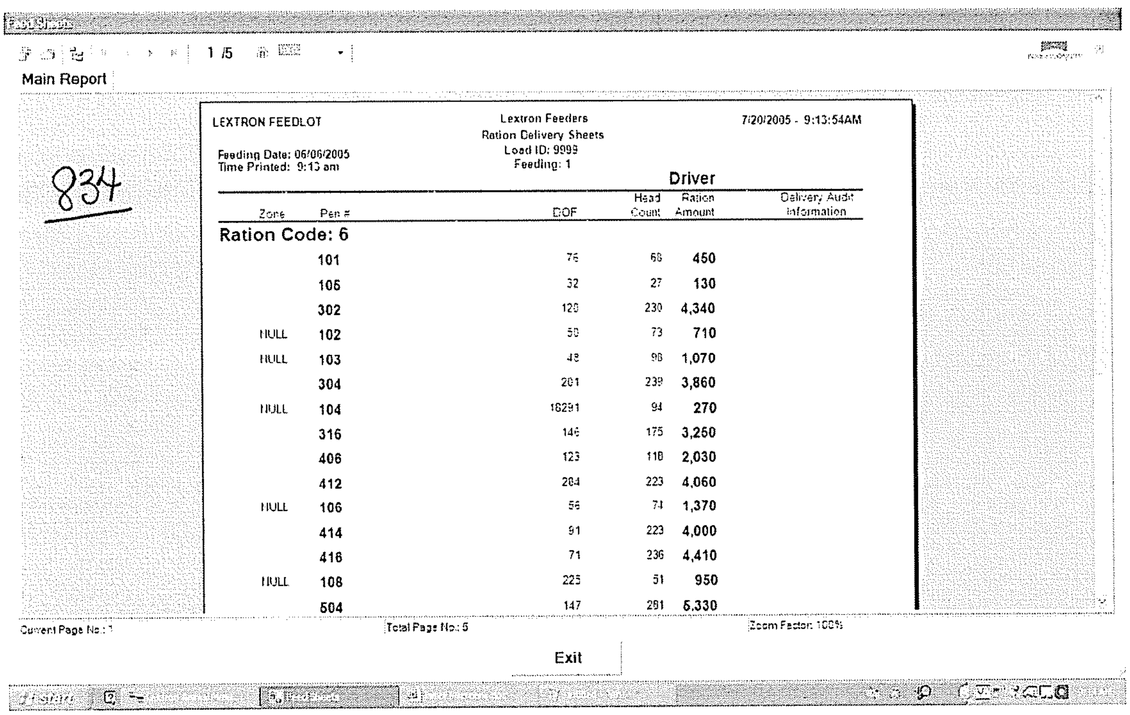

FIG. 234 is a feed sheets report 834 that is used to direct feed truck drivers to the proper pens in the correct order, and also indicates the ration and the amount to deliver to the pen. This report helps control the movement of the feed trucks in the feed yard in order to ensure uniform and timely delivery of the feed to the pens.

Figure 235:
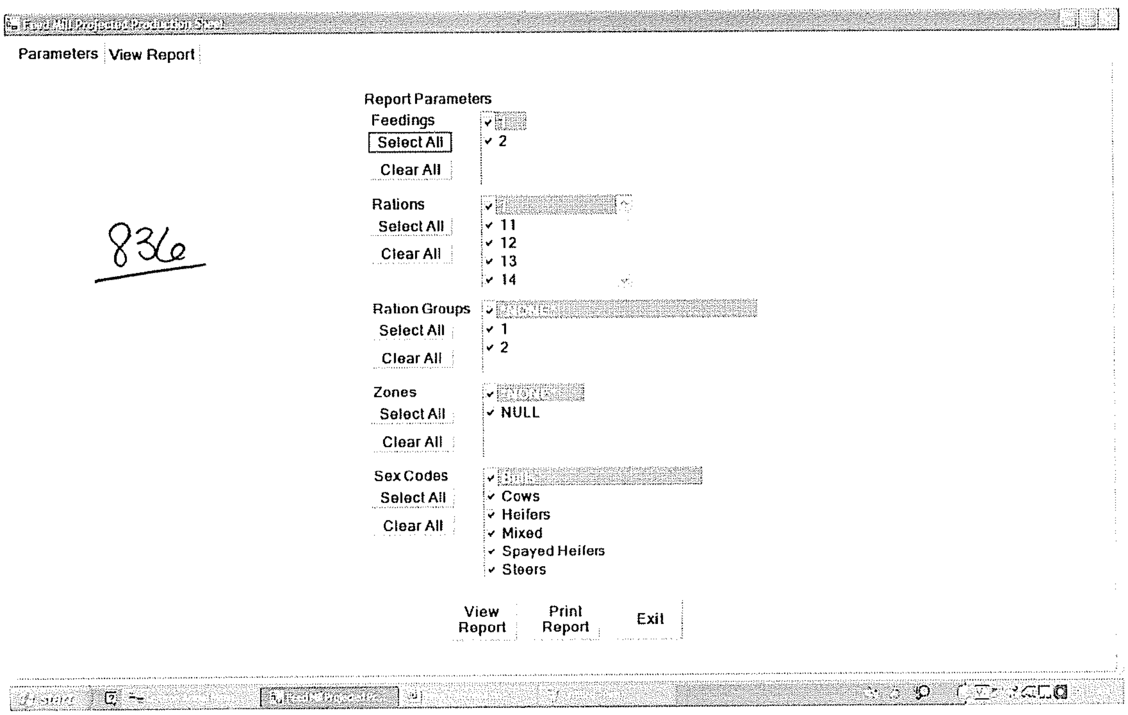

FIG. 235 is a feed mill projected production sheet report parameter screen 836. This screen allows the user to select the feeding round, ration codes, ration groups, delivery zones, and sex codes to show on a feed mill projected production report.

Figure 236:
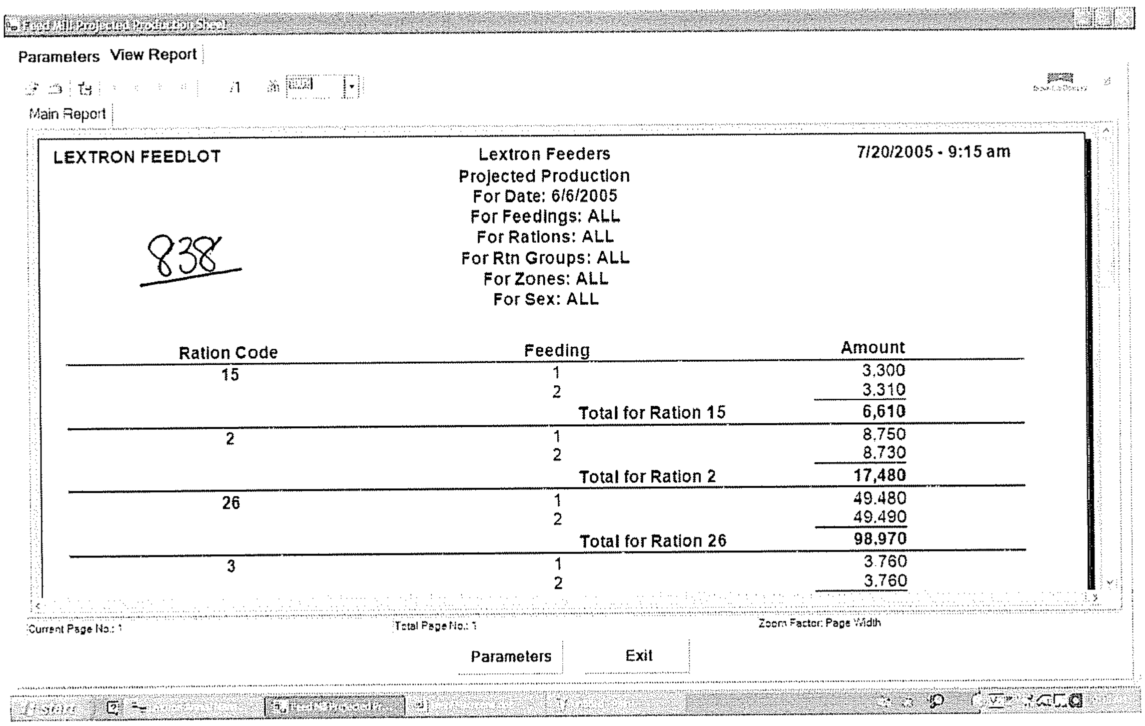

FIG. 236 is an example feed mill projected production report 838. This report shows the ration code and detailed information for each feeding with the total amount of ration needed to complete the feeding for the selected criteria. This report assists management and mill operators in scheduling the projection of rations for the feeding day.

The particular embodiments described above are intended to explain the best mode presently known in practicing the invention and to enable others skilled in the art to utilize the invention in such or in other embodiments and with various modifications required by their particular application or use of the invention. Therefore, it is intended that the appended claims be construed to include the alternative embodiments to the extent permitted by the prior art. Additionally, although the present invention is discussed particularly with respect to cattle, it shall be understood that the invention is also applicable for management of all livestock.

What is claimed is:

1. A method of managing cattle, said method comprising the steps of:

providing a data processing system including a processor, central data storage, and programming instructions for executing functions in response to data input;

establishing a plurality of recommended actions for management based upon mathematical relationships applied to a plurality of criteria corresponding to recorded animal data, conducting cattle management operations including conducting feeding of cattle;

inputting initial data to the data processing system corresponding to information regarding cattle feeding;

comparing the initial data to the recommendations to determine if the data corresponds to a recommended action;

providing the recommended action for cattle feed management, said recommended action including at least one of a printed report and a user interface screen prescribing details on the recommended action; and wherein subsequent data inputs made to the system result in providing an updated recommended action in response to a change in value of the mathematical relationships based upon the subsequent data inputs that differ from the initial data inputs.

2. A method, as claimed in claim 1, wherein:

one recommended action of said plurality of recommended actions includes prescribing a change of ration for the animal.

3. A method, as claimed in claim 2, wherein:

said change of ration includes a change of macro and micro-ingredients used in the ration.

4. A method, as claimed in claim 3, wherein:

said micro-ingredients include an ingredient having a corresponding withdrawal day requirement wherein cattle consuming said micro-ingredient cannot be shipped until the withdrawal day requirement is satisfied, and said method further comprises the step of generating an electronic message in the form of a user interface warning a user that the cattle cannot be shipped if the cattle are currently scheduled for shipment prior to said requirement.

5. A method, as claimed in claim 1, wherein:

one recommended action of said plurality of recommended actions includes prescribing a recommended feeding action including a description of the ration ingredients, an amount of the ration, and when the ration should be fed during a feeding day.

6. A system for managing cattle, said system comprising:

a data processor;

data storage associated with said data processor;

programming instructions residing in said data storage for executing instructions based upon user data input;

said programming instructions including a plurality of recommended actions for management of feed provided to the cattle based upon mathematical relationships applied to a plurality of criteria corresponding to selected animal data;

a data input device for inputting data into said data processing system;

means for outputting information reflective of the recommendations said outputting means including at least one of a printed report and a user interface screen prescribing details on the recommended action; and wherein data input into said data processing system is stored in a central database of said data storage, and subsequent data inputs made to the system result in providing an updated recommended action taking into account a change in value of the mathematical relationships based upon subsequent data inputs that differ from initial data inputs.

7. A system, as claimed in claim 6, wherein:

one recommended action of said plurality of recommended actions includes prescribing a change of ration for the animal.

8. A system, as claimed in claim 7, wherein:

said one recommended action includes a change of macro and micro-ingredients used in the ration.

9. A system, as claimed in claim 8, wherein:

said micro-ingredients include an ingredient having a corresponding withdrawal day requirement wherein cattle consuming said micro-ingredient cannot be shipped until the withdrawal day requirement is satisfied, and said method further comprises the step of generating an electronic message in the form of a user interface warning a user that the cattle cannot be shipped if the cattle are currently scheduled for shipment prior to said requirement.

10. A system, as claimed in claim 6, wherein:

one recommended action of said plurality of recommended actions includes prescribing a recommended feeding action including a description of the ration ingredients, an amount of the ration, and when the ration should be fed during a feeding day.

11. A method of generating a recommended action in a data processing system for cattle management, said method comprising the steps of:

providing a data processing system including a processor, central data storage, and programming instructions for executing functions in response to data input;

establishing a plurality of criteria corresponding to individual animal data and group animal data;

generating at least one mathematical formula incorporating at least one criteria; and determining a threshold value for the formula corresponding to a recommended management action, said recommended management action including at least one of a change of ration for an animal, and a method of administering the ration to the animal conducting cattle management operations to include feeding of cattle over a period of time;

entering data in the system reflective of actions taken place for feeding the cattle, at least some actions corresponding to said criteria;

calculating the actual value of the formula using the actions corresponding to said criteria and comparing the actual value to the threshold value;

generating said recommended management action if said actual value satisfies said threshold value, said recommended management action comprising at least one of a printed report and an electronic message in the form of a user interface each describing said recommended management action.

12. A method, as claimed in claim 11, wherein:

said criteria includes a feeding of the day, a percentage of how much to feed an animal during a particular feeding, a ration code identifying a type of ration, and an amount of ration per head of cattle.

13. A method, as claimed in claim 11, wherein:

said mathematical formula includes a plurality of mathematical formulas.

14. A method, as claimed in claim 11, wherein:

said threshold value of the formula comprises a range of values.

15. A method, as claimed in claim 11, wherein:

said criteria include at least one of a weight of the animal, a breed of the animal, and a sex of the animal.

16. A method of managing feeding of cattle in a data processing system for cattle management, said method comprising the steps of:

providing a data processing system including a processor, central data storage, and programming instructions for executing functions in response to data input;

establishing a plurality of management parameters including feed call, feed calculation, and feed delivery for a selected group of cattle in a selected location, said parameters being stored in said central data storage;

recording data concerning said cattle including the number, type, and locations of said cattle in a feed lot operation;

determining how to feed said cattle based on said management parameters, the tasks including what ration to feed, when to feed the cattle, how much to feed the cattle at each feeding, and what order the cattle should be fed at each feeding;

developing instructions for feeding said cattle including instructions for batching rations, loading feed trucks, and delivering feed to the selected cattle;

conducting cattle management operations to include feeding of cattle over a period of time, and observing and recording variances in amounts to be fed versus actually fed, variances in amounts to be loaded on feed trucks versus actually loaded on the trucks, and amounts of feed consumed in pens versus amounts delivered to the pens;

adjusting at least one of the feed call, feed calculation, and feed delivery parameters in response to said conducting step; and resuming said conducting step.

17. A method, as claimed in claim 16, further comprising the steps of:

providing a feed production and delivery user interface screen comprising a display of calculated loads derived from said management parameters and said recorded data, said display including a spreadsheet illustrating pens, load numbers, load balances, called amounts, actual fed amounts, and variances between said called amounts and said fed amounts.

18. A method, as claimed in claim 17, further comprising the steps of:

maximizing truck load capacities by dynamic loading, said dynamic loading including reassigning load numbers in said user interface screen resulting in loads being reassigned to said trucks and said spreadsheet of said user interface screen being refreshed to display new load numbers assigned to said trucks.

19. A method, as claimed in claim 16, wherein said feed production and delivery user interface screen further comprises a print feed sheets option for printing load cards reflective of said calculated loads.

20. A method, as claimed in claim 16, wherein said feed production and delivery user interface screen further comprises an electronic interface with a feed mill forsending batching instructions to said feed mill, said feed mill preparing rations of feed comprising macro and micro-ingredients.

21. A method, as claimed in claim 16, wherein said feed production and delivery user interface screen further comprises graphs illustrating the status of a particular feeding, said graphs comprising percentage completion of committing feed, load calculation, and fed status.

* * * * *